United States Patent [19]

Dhein

[11] Patent Number: 4,736,444

[45] Date of Patent: Apr. 5, 1988

[54] PAY TELEPHONE MONITORING SYSTEM

[75] Inventor: Robert Dhein, Ft. Lauderdale, Fla.

[73] Assignee: Tel-Tech Devices, Inc., Ft. Lauderdale, Fla.

[21] Appl. No.: 829,189

[22] Filed: Feb. 14, 1986

[51] Int. Cl.⁴ .......................................... H04M 17/02
[52] U.S. Cl. ...................................... 379/33; 379/132; 379/147
[58] Field of Search ...................... 379/33, 34, 35, 121, 379/123, 132, 145, 146, 147, 150, 154

[56] References Cited

U.S. PATENT DOCUMENTS

| Re. 30,973 | 6/1982 | Zarouni | 379/145 |
|---|---|---|---|
| 3,499,117 | 3/1970 | Clark, Jr. | 379/150 |
| 3,814,907 | 6/1974 | Edington et al. | 379/146 |
| 4,039,768 | 8/1977 | O'Maley | 379/33 |
| 4,041,243 | 8/1977 | Zarouni | 379/147 |
| 4,109,139 | 8/1978 | McMillan et al. | 377/7 |
| 4,123,623 | 10/1978 | McElliott | 379/33 |
| 4,124,774 | 11/1978 | Zarouni | 379/146 |
| 4,124,775 | 11/1978 | Zarouni | 379/147 |
| 4,206,321 | 6/1980 | McElliott | 379/33 |
| 4,208,549 | 6/1980 | Polillo et al. | 379/146 |
| 4,216,461 | 8/1980 | Werth et al. | 340/825.35 |
| 4,263,482 | 4/1981 | Serres et al. | 379/123 X |
| 4,326,103 | 4/1982 | Oehrig | 379/146 X |
| 4,413,158 | 11/1983 | Danford | 379/211 |
| 4,559,416 | 12/1985 | Theis et al. | 379/34 |
| 4,599,492 | 7/1986 | Otten | 379/147 |
| 4,604,499 | 8/1986 | Hughes | 178/22.09 X |

Primary Examiner—Jin F. Ng
Assistant Examiner—Mark E. Ham
Attorney, Agent, or Firm—Stevens, Davis, Miller & Mosher

[57] ABSTRACT

A passive, non-intrusive pay telephone monitoring system is disclosed for maintaining a talley of the amount of money present in a money box. A signal is sent over the line, interconnecting the pay telephone with its central office equipment when money in the box is collected by a collection agent, and the collected amount of money and the time of collection are then stored for verification of the collected amount.

34 Claims, 18 Drawing Sheets

PAY TELEPHONE MONITORING SYSTEM

BACKGROUND OF THE INVENTION

1. Field of the Invention

The present invention relates to a pay telephone monitoring system which accumulates at a central office location information concerning the amount of money present in the coin collection box of one or more pay telephones, and the amounts collected from the collection box. More particularly, the system is designed to be connected with existing central office equipment to provide a passive, non-intrusive pay telephone monitoring system which provides useful information to a telephone company concerning the amount of coins present in the collection box of one or more pay telephones, as well as collection histories. The invention also relates to a pay telephone monitoring system which is able to detect certain conditions occurring in a pay telephone and/or lines connected thereto which may indicate faulty equipment.

2. Discussion of the Prior Art

Despite significant achievements in the sophistication of telephone equipment and the additional features and services afforded by such equipment, there remains a significant deficiency with respect to the monitoring of pay telephone stations. Specifically, telephone companies have, as of yet, not been able to efficiently schedule the collection of pay station coin boxes, since it is difficult for the central offices to accurately determine how much money is present in a given pay telephone coin collection box. As a consequence, because an accurate determination of the amount of money present in a collection box is not known, the telephone company is susceptible to fraud in the collection process, as well as inefficiencies and costly procedures in the scheduling and collecting of the coin boxes of the many pay telephones which it services, and in the handling, counting, guarding and accounting of the money collected. Also, the telephone companies have not yet been able to solve the problem of having pay telephones sit idle because of full collection boxes which prevent telephone operation.

SUMMARY OF THE INVENTION

The present invention has been designed to provide a passive system for connection to a pay telephone station at the central office switching equipment to which it is connected for non-instrusively monitoring the amount of money deposited and collected in a pay telephone collection box. This data can be used by a telephone company to more economically schedule collection visits, or allow for third party agent collections, and/or to minimize or prevent fraud in the collection process, and/or to more economically handle, count, guard and account for collected money.

The present invention can also be used to collect various additional data concerning the use of a pay telephone station which may be useful to a telephone company in detecting a faulty pay telephone station, and/or the connection lines, and for determining the utilization of pay telephones.

Accordingly, one object of the present invention is to provide a non-intrusive, passive pay telephone station monitoring system which is designed to accurately keep track of the amount of money present in a collection box, as well as the amount of money which has been collected.

Another object of the invention is the provision of a non-intrusive, passive pay telephone station monitoring system which is capable of providing additional useful information to a telephone company concerning some of the operations of the pay telephone.

Another object of the invention is the provision of a non-intrusive, passive pay telephone station monitoring system which can recognize when a particular collection box has been collected by an authorized collection agent.

Another object of the invention is the provision of a non-intrusive, passive pay telephone station monitoring system which provides accurate accounting information on the amount of money collected by an agent, thereby facilitating use of non-telephone company employees as collection agents.

Another object of the invention is the provision of a non-intrusive, passive pay telephone station monitoring system which can help eliminate the problem of pay telephone inactivity due to a full collection box.

Another object of the invention is the provision of a non-intrusive pay telephone station monitoring system which employs two processing levels, one using a central office processor (COP) and another using a line-monitor processor (LMP), with each being able to restore critical data in the other should that data become lost.

Another object of the invention is the provision of a non-intrusive pay telephone station monitoring system which is able to recognize proper pay telephone totalizer tones, signaling the deposit of coins, even in the presence of signal dropouts and other spurious effects.

The above and other objects, features and advantages of the invention will be more fully understood from the following detailed description which is provided in connection with the accompanying drawings.

DETAILED DESCRIPTION OF THE INVENTION

Figure 1:
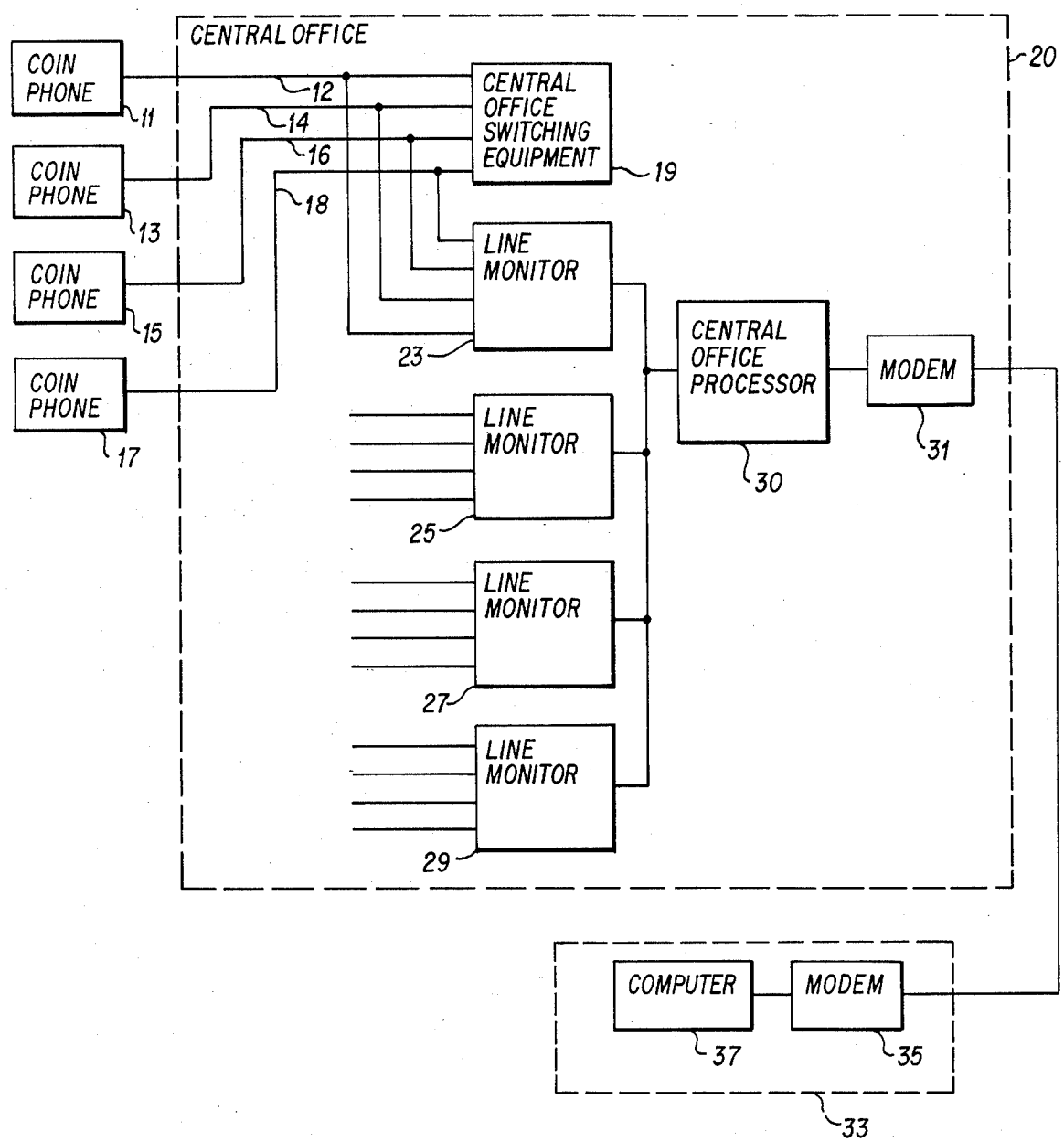
FIG. 1 shows in block diagram form the overall arrangement of the pay telephone monitoring system of the invention.

The present invention is a system which monitors the signal conditions present on a telephone line pair which interconnects a pay telephone station and its associate central office switching and control equipment for the purpose of (1) determining the amount of money present in a collection box at the telephone; (2) determining when certain abnormal conditions occur, such as the telephone being on-hook or off-hook for exceedingly long periods or the use of an excessive number of collect or return signals by the central office to cause a collect or return function at the telephone; (3) determining when an agent has collected the money present in a collection box; and (4) keeping track of past histories of collected amounts and the time of collection. The system of the invention is connected to the telphone line pair, typicallY at the central office, and is non-intrusive and totally passive so that it does not interfere with the normal operations which occur at either the central office or pay telephone station.

The system incorporates at least one line monitor, each including a line monitor microprocessor (LMP) which is capable of polling, and thus monitoring, up to four telephone pay stations and developing data concerning the parameters discussed above, and a central office process (COP) which polls, and thus communicates with, and extracts that data from a plurality of line monitor processors. The COP is also capable of transmitting its data to a telephone company computer upon computer request or passing data from the telephone company computer directly to the line monitor processors.

The central office processor extracts its data from the line monitor processors by polling them in sequence, and is capable of downloading and uploading critical data to or from the line monitor processors whenever the central office processor or a line monitor processor resumes processing after being disabled, thereby reducing the risk of loss of valuable data due to a fault or the need to replace a central office processor or a line monitor processor.

Before describing the invention in detail, a brief discussion of the signals which typically pass between a pay telephone and its associated central office equipment, which are detected and used in the invention, is helpful. Included are totalizer tone signals, which are tone pair bursts generated at the pay telephone station to signal to the central office the amount of coins which have been deposited in a coin pending area of the pay telephone. Each burst in a burst sequence represents a nickel-equivalent unit. Thus, if a nickel ($0.05) is deposited, a single tone burst is sent, for a dime ($0.10), two tone bursts are sent and, for a quarter ($0.25), five tone bursts are sent. Typically, the duration of each tone pair burst is longer for nickels and dimes than for quarters. Other signals passing between the pay telephone and the central office include collect or return voltage signals sent by the central office equipment to a pay telephone station, instructing the station to either return the deposited coins held in the coin-pending area to a user or to collect the deposited coins by sending them to a collection box. Still other signals which are present include dial tone, a beep tone, which may be a tone pair, generated by a coin box collection agent when a coin box is collected, other miscellaneous ansitory tones and a voltage signal representing an off-hook condition.

These signals are detected and processed by the line monitor processor of the invention to develop data representing the following information for a pay telephone: the amount of money, if any, presently deposited in a pending coin area in nickel-equivalent units; the accumulated amount of money presently in a collection box (in nickel-equivalent units); the time when the collection box was last collected; the accumulated amount of money present in the collection box at the time of last collection; the number of times the box was collected; and past histories, typically for the three last collections, of the amount of money present in a collection box at the time of collection and the time when the box was collected. In addition, data can also be developed representing the average number of collect or return signals which a central office was required to generate to effect a collect or return operation at the pay telephone, and the amount of time a pay telephone was on-hook or off-hook. The collect/return number and amount of one-hook and off-hook time is used to determine certain faulty conditions which may be occurring at a pay telephone station, or in the lines connected thereto.

Figure 2:
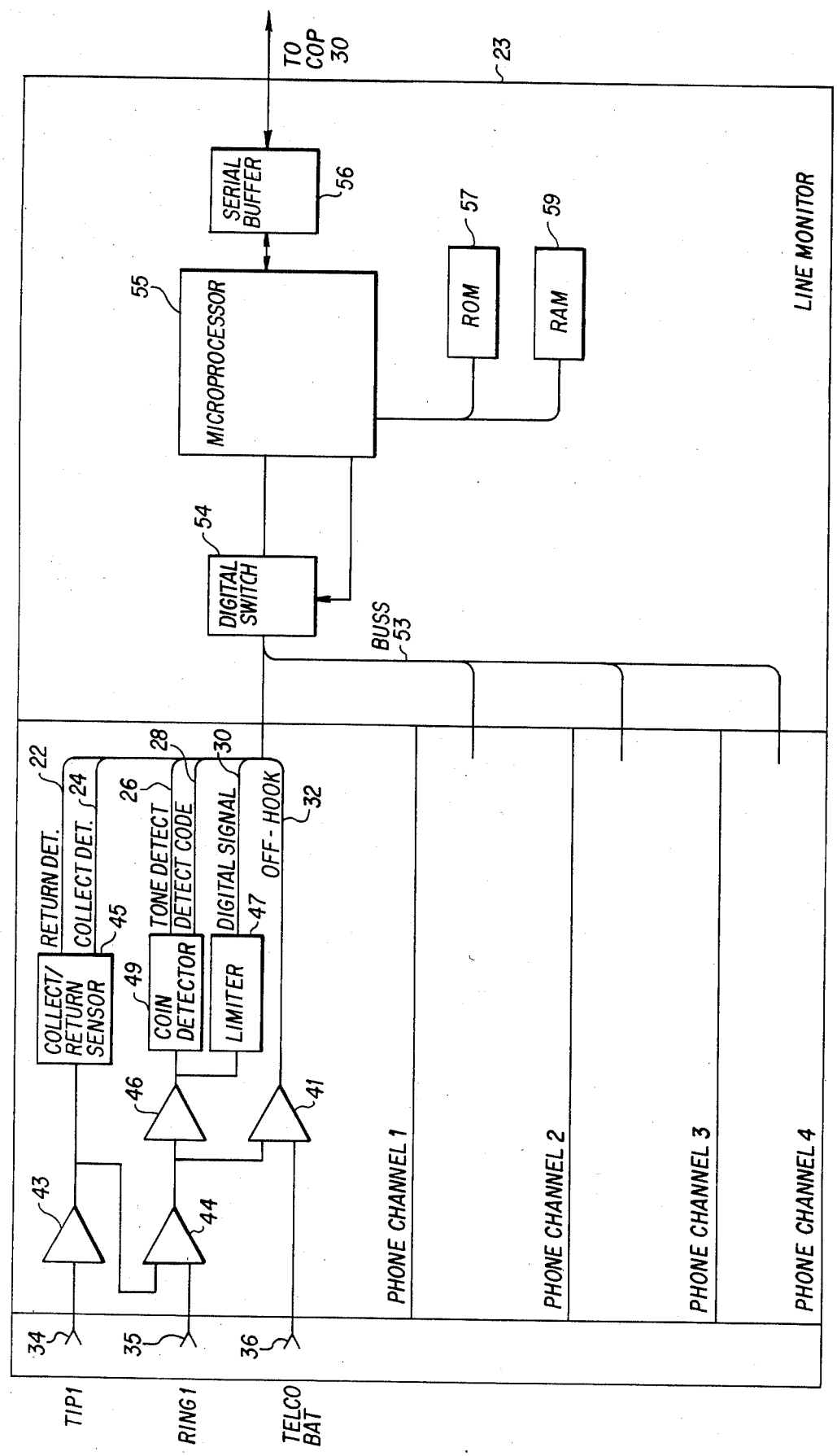
FIG. 2 illustrates in greater detail a portion of the system illustrated in FIG. 1.
Figure 3:
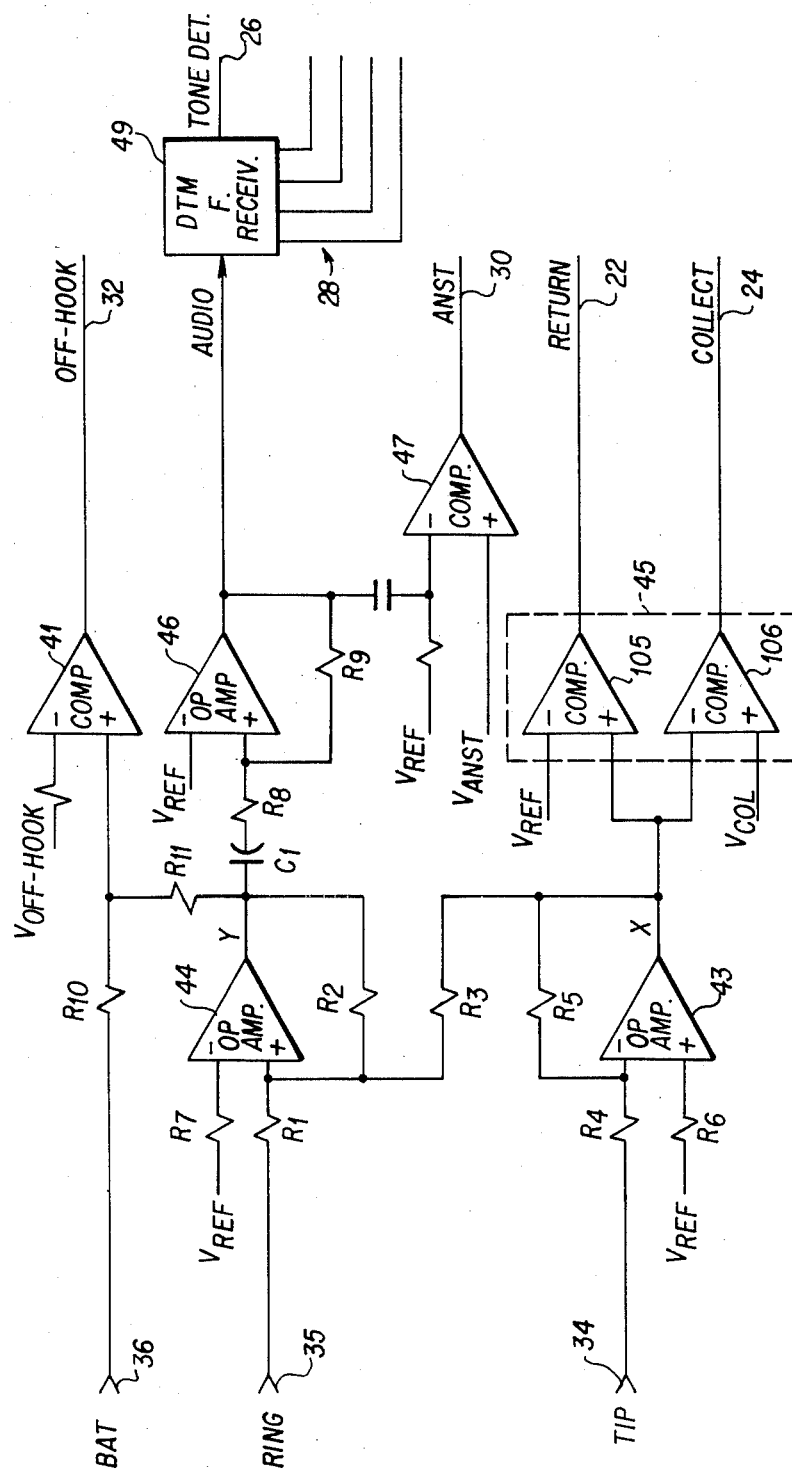
FIG. 3 illustrates in greater detail the circuits used for monitoring various signal conditions on the pay telephone line and for generating signals representing the same.

The system of the invention is illustrated in FIGS. 1–3. Starting with the overall system diagram illustrated in FIG. 1, a plurality of pay telephones are illustrated by numerals 11, 13, 15 and 17. Each is respectively connected to a central office 20 switching equipment 19 by a respective telephone line wire pair 12, 14, 16 and 18. Central office 20 includes, in addition to the switching equipment 19, passive monitoring equipment constructed in accordance with the invention and depicted in FIG. 1 as line monitors 23, 25, 27 and 29, each monitoring up to four telephone lines connected with respective pay telephones, a central office processor (COP) 30 which scans the line monitors 23, 25, 27 and 29 communicating with and assembling data therefrom, and a modem 31 for enabling the central office processor to communicate with a business office host computer 37, located at business office 33, via a business office modem 35.

Each of the line monitors 23, 25, 27, 29, as noted, is adapted to monitor the telephone lines of up to four associated pay telephones. Although four-line monitors are illustrated in FIG. 1, it should be appreciated that other numbers of line monitors, e.g., 128, can be employed, all being polled by and thus communicating with the central office processor 30.

The structure of each line monitor is illustrated in greater detail in FIG. 2, which depicts line monitor 23 of FIG. 1. Each line monitor includes up to four channels, each connected to a respective telephone line pair (T,R) of a pay telephone station. The four channels communicate over a bus 53 via an electronic switch 54 with a line monitor microprocessor 55, which in turn also communicates with a ROM program memory 57 and a RAM data and program memory 59. The microprocessor 55, in turn, also communicates, when polled, through a serial buffer 56 with the central office processor 30.

Each channel of the line monitor includes connector terminals 34, 35 for connection with a telephone line pair (tip and ring) of a pay telephone station, the connection being made at the central office between the pay telephone station and the switching equipment associated therewith, as shown in FIG. 1. A connector 36, for connection with a telephone company battery, is also provided. The connector terminals 34, 35 are connected to operational amplifiers 43, 44, the tip line to attenuating, inverting amplifier 43, and the ring line to attenuating, inverting and summing amplifier 44. The tip signal at the output of amplifier 43 is used by a collect/return sensor 45 to determine if the telephone company central office equipment is applying a collect or return signal to the tip lead. The collect/return sensor 45 detects the attenuated voltage level of approximately plus or minus 130 volts on the tip lead to respectively indicate collect or return, and passes the resultant digital output on line 22 for return and on line 24 for collect to the line monitor processor 55.

The output of amplifier 43 is also applied as an input to the attenuating, inverting and summing amplifier 44. This amplifier attenuates the ring signal by the same amount as the attenuation of amplifier 43 so that the resultant output of amplifier 44 provides a differential amplification of the tip/ring signal used by the telephone company to convey speech information. The audio output of amplifier 44 is applied to amplifier 46, which amplifies the tip/ring differential signal to the approximate level it was at the input of connectors 34, 35. The output of amplifier 46 is used by coin detector 49 to determine when coin tone bursts are present in the audio data. When coin tone bursts are detected, detector 49 generates a coin tone detect signal on line 26, together with a multi-bit code signal on lines 28, representing the detected tone pair frequencies. Microprocessor 55 uses the signals on lines 26, 28 to detect coin tone signals representing coins deposited in a pay telephone.

A limiter 47 is also driven from the output of amplifier 46 and is used as an audio zero crossing detector. The output of limiter 47 on line 30 is used by the microprocessor 55 to determine the crossing interval, and thereby the frequency of audio signals at the output of amplifier 46. The signals on line 30 are used by microprocessor 55 to detect the presence of other single frequency tones on the telephone line, that is, tones other than those used for coin counting by coin detector 49. One such tone used in the invention is dial tone. Other tones which could be detected are busy signals, 60 Hz hum, or DTMF touch tones present on the line.

The output of amplifier 44, along with the telephone company battery applied at connector 36, is also used by a summing amplifier 41 to determine if the DC tip/ring voltage has decreased sufficiently from the battery voltage to indicate an off-hook condition. Amplifier 41 thus operates as a comparator to generate an off-hook signal on line 32, which is also applied to and used by microprocessor 55.

The microprocessor 55 is adapted to poll each of the four channels to which it is assigned, applying the output signals from a polled channel on lines 22, 24, 26, 28, 30 and 32 to inputs of the microprocessor 55.

FIG. 3 illustrates in somewhat greater detail the analog circuitry used in one channel of the line monitor. Operational amplifier 43 receives the tip signal and a reference voltage VREF and amplifies the tip signal by a gain factor of k. The gain factor k is much less than 1, so the output voltage of amplifier 43 will remain within the input range of comparators 105 and 106, described below, which are used in the collect/return sensor 45. The amplified and inverted tip signal is summed together with the ring signal in operational amplifier 44, which also receives the reference voltage VREF, in such a manner that a differential output signal of the tip and ring signals is formed. This differential signal is passed through a high pass filter formed by $C_1$ and $R_8$ to eliminate DC and low frequency components, and is then amplified in operational amplifier 46 using a gain of approximately 1/k in order to generate a differential audio output AUDIO=tip-ring. The output signal of amplifier 44 is also added to the central office battery reference voltage, BAT, using the attenuating resistor network $R_{11}/R_{10}$ to create an off-hook sensing voltage. Operational amplifier 41, functioning as a comparator, senses whenever this voltage is greater than a predefined threshold, Voff-hook, in order to generate an OFF-HOOK signal on line 32.

A comparison operational amplifier 105 provides at its output a return signal, while a comparison operational amplifier 106 provides at its output a collect signal. Amplifiers 105 and 106 are responsive to respective threshold voltages $V_{ret}$, $V_{col}$, and to voltages applied to the TIP line by central office equipment which appear at the output of amplifier 43, to instruct a pay telephone station to collect deposited money in a collection box or return deposited money to a customer. Typically, a voltage of +130 volts between tip and earth ground is used to signal a coin collection, while a voltage of −130 volts between tip and earth ground is used to actuate a coin return within a pay telephone. Operational amplifier 43 is designed to reduce these large voltages to lower voltages, which can be sensed by comparison amplifiers 105 and 106 and used to provide collect and return signals at their respective outputs.

The coin tone detector 49 is formed by a tone detector which is capable of recognizing the tones used by a totalizer in a pay telephone to signal the deposit of money. Typically, a tone pair of audio frequencies $f_1$ and $f_2$ is used by the pay telephone totalizer to signal to the central office a "nickel-equivalent" unit of money, with the number of bursts of this tone pair indicating the number of "nickel" units deposited. The coin detector 49 detects the presence of the tone pair and provides two separate output signals, one on line 26 indicating the detection of a tone pair, and another multi-bit, e.g., 4 bit, digital code signal on lines 28 representing a specific tone pair which is detected. Detector 49 may be a conventional touch-tone multi-frequency (DTMF) receiver used to detect touch-tone dialing signals, such as a MITEL 8870 DTMF, in which case detection of the tone pair of $f_1$ and $f_2$ can be accomplished by using a crystal of the frequency 6.513646 MHz, instead of the usual crystal frequency of 3.58 MHz. Use of a dual-tone multi-frequency receiver also permits use and detection of other tone pairs which may be used for various sensing and control operations, with the other detected tone pairs being uniquely identified by the multi-bit code present on lines 28. One such tone pair may be used by a collection agent, or by the pay telephone itself, to signal a box collection operation. Detection and use of such a signal is described below.

In summary, the signals present in the line monitors, for each channel, are a coin tone present signal on line 26, a multi-bit code signal representing a detected tone pair of lines 28, return or collect signals from the collect/return detector 45 on respective lines 22 and 24, a digital zero crossing signal at the output of the limiter 47 on line 30, and an off-hook signal at the output of operational amplifier 41 on line 32.

Software programs which are used by both the line monitor microprocessor 55 and the central office microproceassor 30 to acquire and transmit coin deposit and collection date is attached as an Appendix hereto. To facilitate subsequent description of the invention, the operations executed by the line monitor microprocessor 55 and central office processor 30 in carrying out those programs will be summarized with reference to the flowcharts and processor state diagrams depicted in FIGS. 4–6 and 9–17. FIGS. 4–6 and 9–16 represent operations performed by line monitor microprocessor 55, while FIG. 17 represents operations performed by the central office processor 30.

Figure 4:
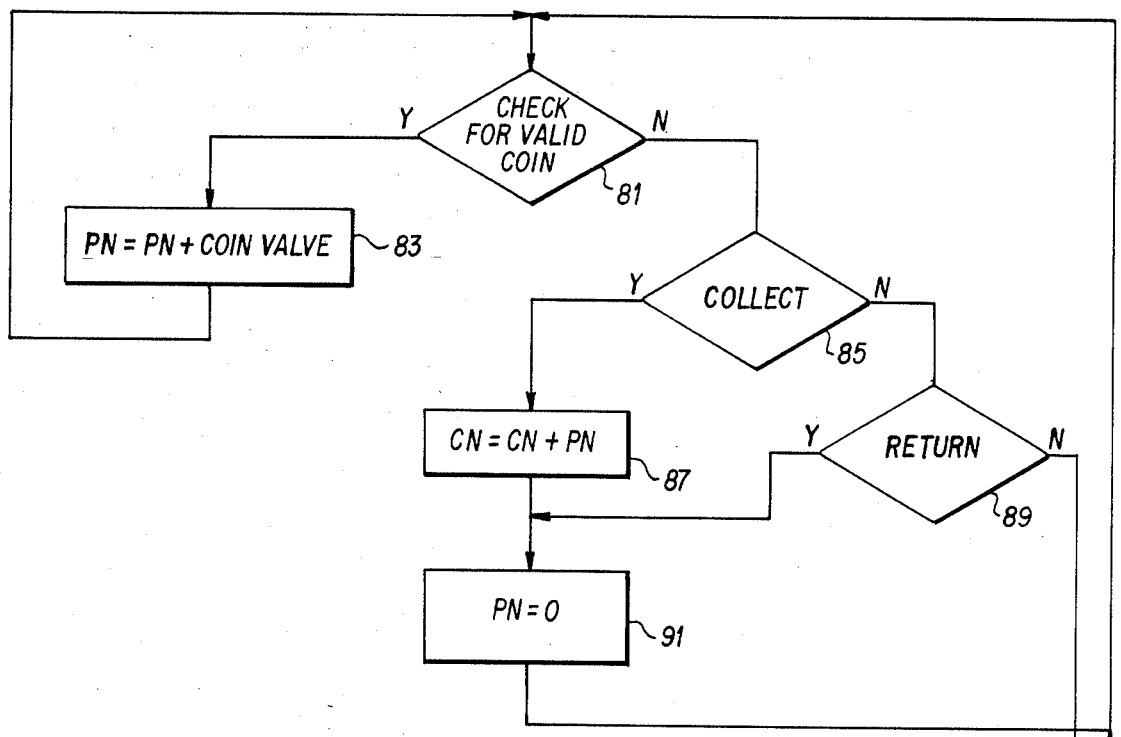
FIG. 4 is a flowchart representing the overall operation of the invention in detecting and counting money deposited and collected in a collection box, and in determining when a collection agent has collected the box.

FIG. 4 illustrates, in simplified flowchart form, an overview of the operation performed by microprocessor 55 in connection with formulating date on the amount of money present in a collection box, as well as collection histories. As illustrated in step 81, the microprocessor 55 basically checks for a valid coin deposit and, when the same is found, proceeds to step 83 where a pending nickels count PN, which is a count of the amount of money deposited in the pending area of a pay telephone in nickel-equivalent units, is augmented by adding to an old pending nickels count the amount of money represented by the valid coin detected in step 81. Thereafter, the microprocessor proceeds back to step 81 and waits to see if additional valid coins are deposited. If, after a predetermined amount of time, there is no additional money deposited, the microprocessor determines this in step 81 as a no response to the inquiry and then proceeds to step 85, where it determines whether a collect signal has been sent from a central office to a pay telephone station. If a collect signal is detected, the microprocessor proceeds to step 87, where it augments a cumulative nickels CN count by adding to a previous cumulative nickels CN count the amount of money which has been retained in the pending nickels PN count (CN=CN+PN). In other words, once a collection signal has been detected, the microprocessor 55 determines that the amount of money then held in the pending area of the pay telephone has been transported to the collection box. Accordingly, the cumulative nickels CN counter is augmented. Thereafter, microprocessor 55 proceeds to step 91, where it clears the pending nickels PN count to zero and then returns to step 81, where is again awaits for valid coin tone deposit signals.

If, in step 85, the microprocessor does not detect that a collect signal has been received, it then proceeds to step 89, where it determines whether a return signal is received by the pay telephone from the central office. If a return signal is received, indicating that the coins in the pending area of the telephone are to be returned to a user, microprocessor 55 then clears the pending nickels PN count to zero in step 91 and returns to step 81. If, on the other hand, a return signal is not received in step 89, the microprocess then proceeds to step 93, where it determines whether or not a collection beep has been detected on the line. This beep is present when a collection agent, either through manipulation of the tone pad at the pay telephone or through the provision of a portable tone beeper, signals that a collection has occurred. If the collection beep is detected in step 93, the microprocessor proceeds to step 95, where it augments a coin collection CC count by the amount of money in the cumulative nickels counter CN (CC=CN). In addition, a time of collection is noted by reading the CPU clock. Also, in step 95, previous coin collection counts and times of collection are stored for the past several times that a collection beep has been recognized. If no collection beep is detected in step 93, the microprocessor returns to step 81 and awaits the deposit of valid coins.

The summary shown in FIG. 4 is merely an overview, and is not intended to represent the detailed step-by-step operations performed by microprocessor 55. These are provided by the attached actual programs in the Appendix. A more detailed understanding of the workings of the microprocessor 55, as well as the central office processor 30, in executing these programs will now be provided with the assistance of FIGS. 5–17.

The overall operation of the line monitor microprocessor 55 is governed by a program called a task scheduler, which in turn utilizes and controls timing information in five counters identified by the designations TFF, TF, TS, T2M and T9H. These respective counter count clocking signals of a frequency of approximately 500 microseconds, 2 milliseconds, 0.5 seconds, 2 minutes, and 9 hours. The task scheduler program executed by the line monitor microprocessor 55 controls the incrementing of these counters upon the occurrence of 500 microsecond interrupt signals, and also detects various states thereof in order to control execution of various other subprograms which are called for by the task scheduler during its execution.

There are several sub-programs which are executed by microprocessor 55 in carrying out its assigned tasks, and the times at which these sub-programs are executed are governed by the task scheduler. This program will now be described with reference to FIGS. 5 and 6.

Figure 5:
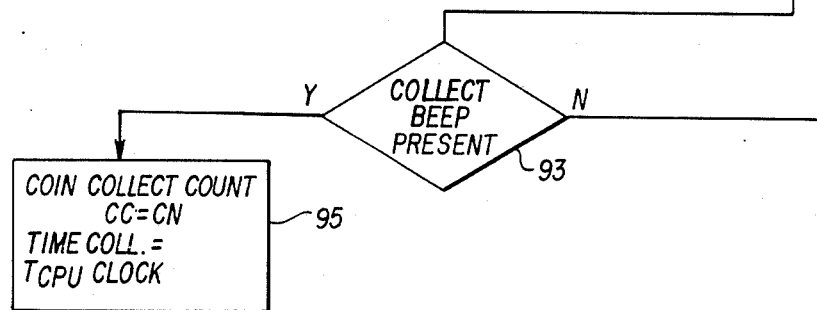
FIG. 5 is an flowchart representing a portion of the program executed by a line monitor microprocessor employed in the invention at each of a number of recurring interrupt signals.
Figure 5:
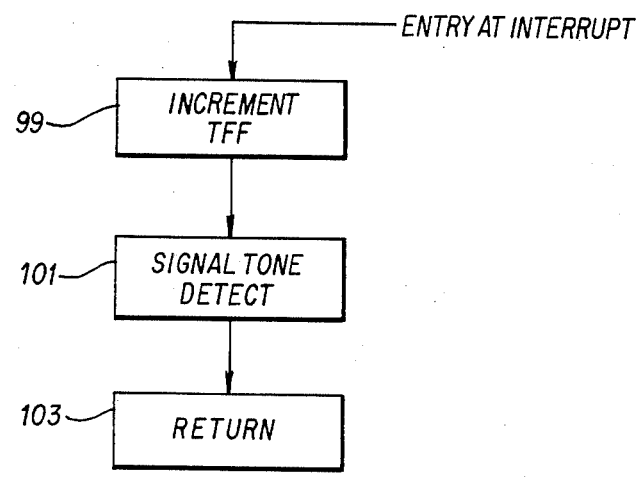

FIG. 5 illustrates a program executed by miroprocessor 55 at the occurrence of each interrupt, which is generated by an interrupt clock at 500 microsecond intervals. In the first step 99 of this program, the microprocessor 55 increments the counter TFF, after which it executes a signal tone detect routine in step 101. This routine is used in the present invention to detect the presence of dial tone on the line, and is described in detail below with respect to FIG. 9. Upon completion of the signal tone detect routine in step 101, the microprocessor returns in step 103.

Figure 6:
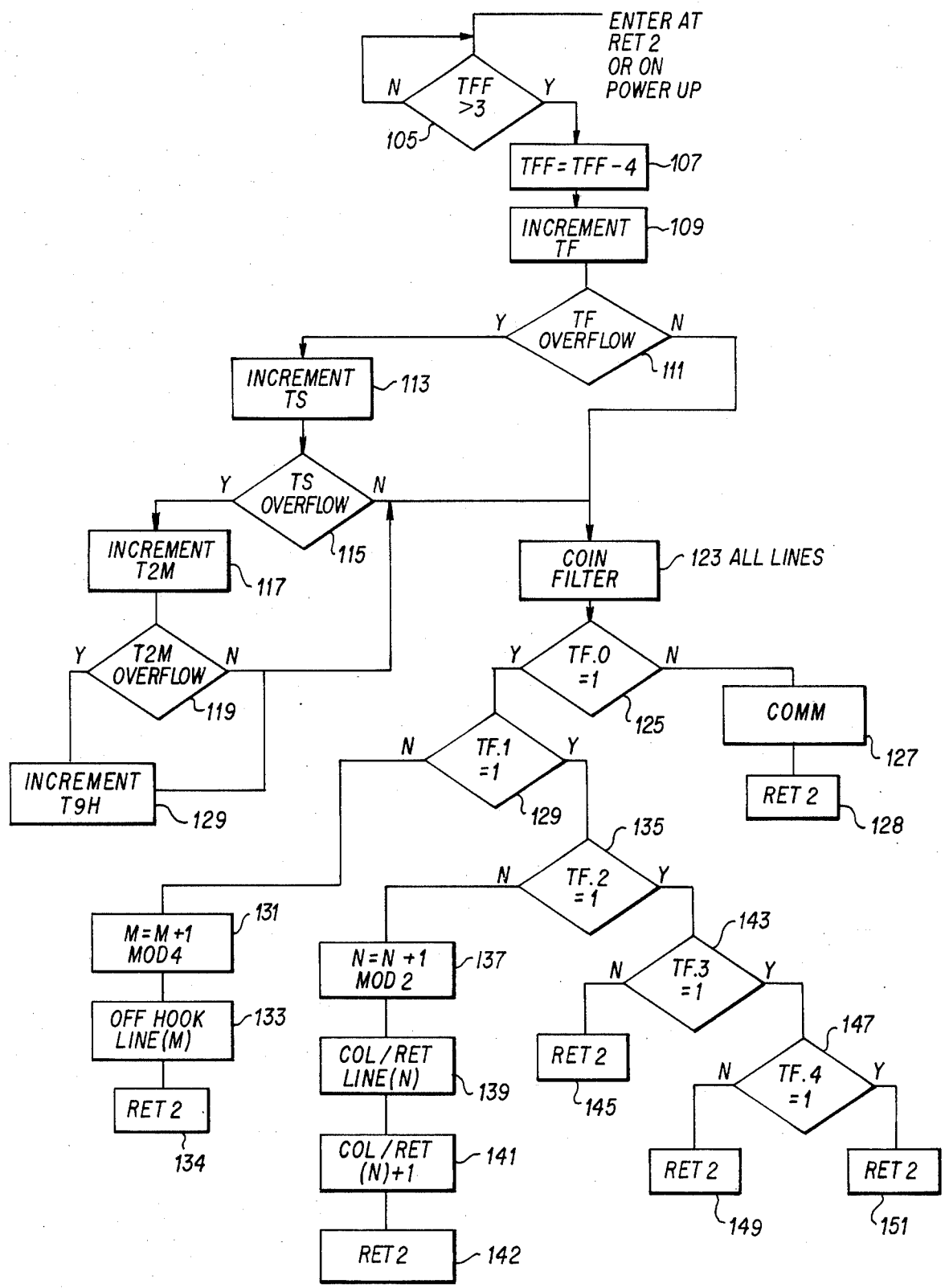
FIG. 6 is a flowchart representing a scheduling program used by the line monitor microprocessor.

The microprocessor also, while processing the program of FIG. 5 upon the occurence of an interrupt, is also processing the program illustrated in FIG. 6, which is the task scheduling program. When an interrupt occurs, execution of the FIG. 6 task scheduling program is interrupted, while the FIG. 5 program is executed, after which processing of the task scheduler resumes. The task scheduler program of FIG. 6 is entered whenever a return is encountered in a sub-program executed during execution of a task scheduler program or after power-up of the microprocessor 55 once an initialization program, in which various parameters are initialized, is executed.

In the first step 105 of the task scheduler program, the microprocessor reads the contents of the TFF counter and, if the value thereof is less than 3, the microprocessor remains in step 105. Once a value of 3 has been detected, the microprocessor proceeds from step 105 to step 107, wherein it decrements the TFF counter by a value of 4. After that, the microprocessor proceeds to step 109, where it increments a TF counter, and thereafter proceeds to step 111, where it determined whether the TF counter has overflowed or not. The TF counter overflows approximately every half second. If the TF counter has overflowed, the microprocessor proceeds to step 113, where it increments a TS counter, and from three proceeds to step 115 where it determines whether the TS counter has overflowed. The TS counter overflows in intervals of approximately every two minutes. If the TS counter has overflowed, the microprocessor proceeds to step 117, where it increments a T2M counter, and from there proceeds to step 119 where it tests whether the T2M counter has overflowed. The T2M counter overflows approximately every 9 hours. If, in step 119, a yes response is detected, the microprocessor proceeds to increment the T9H counter in step 121, following which it proceeds to step 123. If a no response was received at steps 111, 115 or 119, the microprocessor also proceeds to step 123.

In step 123, the microprocessor executes, for all four channels to which it is connected, a coin filter program. This program is described in greater detail below with respect to the state diagrams of FIGS. 10A and 10B. After this program is executed, microprocessor 55 proceeds to step 125, where it determines whether the first bit (LSB) position TF.0, that is, bit zero, of the TF counter equals one. If it does not, microprocessor 55 proceeds to step 127, where it executes a communications program, following which it returns to step 128. The returns in the task scheduler program are denominated return 2 to distinguish them from the return at step 103 in FIG. 5. A return 2 indicates a return to the task scheduler program of FIG. 6 and entry thereof in step 105.

If a yes response is received in step 125, the microprocessor 55 proceeds to step 129, where it tests the next most significant bit position, that is, TF.1, to determine whether it equals one or not. If it does not, microprocessor 55 then proceeds to step 131, where it increments a modulo-4 counter M by a value of one. The modulo-4 counter will count the value 0, 1, 2, 3, 0, 1, etc. After executing step 131, microprocessor 55 proceeds to step 133, where it executes an off-hook line processing routine for line (M), which is described in greater detail below with respect to the state diagram of FIG. 14. Following this, it returns in step 134. It should be apparent that each time the off-hook processing routine is executed in step 133, it is for a different channel.

If, in step 129, a yes response was received, microprocessor 55 proceeds to step 135 where it tests the third bit position of the TF counter TF.2 for a value of one. If a no response is received, microprocessor 55 proceeds to step 137, where it increments a modulo-2N counter by a value of one. This counter counts the value of 0, 1, 0, 1, etc. Thereafter, microprocessor 55 proceeds to step 139, where it executes a collect/return program for the channel 2(N). Following this, microprocessor 55 proceeds to step 141, where it executes a collect/return program for channel 2(N)+1. Thereafter, it returns at step 142. It should be apparent that in steps 139 and 141 the microprocessor is executing the collect/return program for two channels of the four channels which are capable of being processed. On the next pass through the task scheduler program of FIG. 6, the other two lines or channels wil be processed.

If a yes response is received in step 135, the microprocessor proceeds to step 143, where it tests the fourth bit position TF.3 of the TF counter to see if it equals one or not. If a no is detected, a return is executed in step 145, while if a yes is detected, the microprocessor proceeds to step 147, where it tests the fifth bit position TF.4 to see whether it equals one or not. If no, the microprocessor returns at step 149, if yes the microprocessor returns at step 151. The returns provided at steps 145, 149 and 151 are designed to handle optional programs which may later be added in the system. These optional programs can be executed ahead of the returns shown at these steps.

As evident from the above, the task scheduler program will call for and execute coin filter, communications, off-hook, and collect/return programs at various times as called for by the contents of the TF counter. In addition, a signal tone detect program is executed at step 101 upon the occurrence of each interrupt. These programs which are called and executed will now be described.

Figure 9:
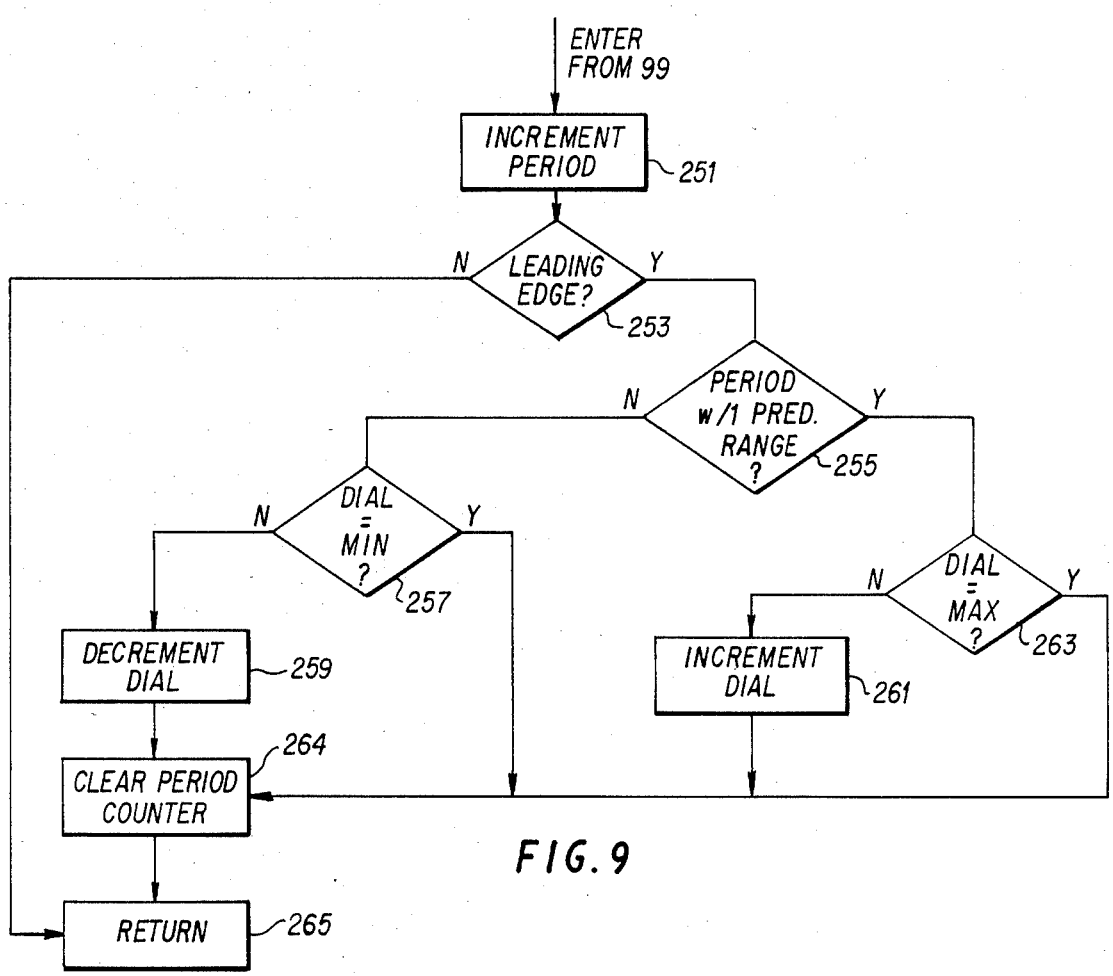
FIG. 9 is a flowchart representing a program used by the line monitor microprocessor to detect the presence of a dial tone.

The signal tone detect program is illustrated in greater detail in FIG. 9. It is executed by the microprocessor 55 in order to determine the presence of dial tone. A determination of whether dial tone is present is not actually made in FIG. 9, but is made elsewhere in the collect/return program described below.

In the first step 251 of the signal detect program of FIG. 9, a period counter is incremented. Thereafter, the microprocessor 55 proceeds to step 253, where it determines whether the signal being monitored, which is on line 30 of the line monitor, is at its leading edge or not. This is done by comparing a present sample with a previous sample of this line. If it is not at a leading edge, the program does nothing further and proceeds to a return in step 265. Consequently, the next time the program is executed, the period counter will again be incremented in step 251. The period counter will continue to be incremented until a leading edge is detected at step 253. In other words, the period counter is being used to measure the period between leading edges of the signal on line 30. Once a leading edge is detected at step 253, the contents of the period counter are then compared with a predetermined range to determine whether the period of the signal falls within a range assigned to a dial tone. If it does not, the microprocessor 55 proceeds to step 257, where it determines whether or not a value denominated DIAL is at a minimum value. It it is not, the DIAL value is decremented in step 259 and then the microprocessor proceeds to clear the period counter at step 264 and then return at step 265. If, on the other hand, the DIAL value is at its minimum value, then the microprocessor clears the period counter at step 264 and returns at step 265 and does not further decrement this value.

If, in step 255, the microprocessor 55 determines that the period was within a predetermined range, it then proceeds to step 263 where it tests whether the DIAL value has reached a maximum value or not. If not, it increments the DIAL value in step 261, clears the period counter at step 264 and returns at step 265, while if the DIAL value has reached its maximum value, the microprocessor 55 simply clears the period counter at step 264 and returns at step 265.

The program of FIG. 9 is designed to increment or decrement the value DIAL, which will be later used as a test value to determine whether dial tone is present. In order to eliminate the possibility of a spurious signal being on the line at the same frequency as dial tone, the program of FIG. 9 performs a statistical analysis, whereby the period of the applied signal is repeatedly checked to see whether it falls within the predetermined range corresponding to a dial tone. If it does, the DIAL value will be continuously incremented from its initialized value, at step 261, and eventually will reach a DIAL value which exceeds a threshold assigned for a determination that dial tone is present. If, on the other hand, a spurious signal is detected, the DIAL value will be decremented in step 259 and, if a sufficient number of spurious signals are found, the DIAL value will be decremented to a value below a threshold which indicates dial tone. The comparison of the value of DIAL with the threshold is done in the collect/return program discussed in detail below.

The sub-program executed by microprocessor 55, at step 123 of the task scheduler, is a coin tone filter program, which is designed to detect the presence of a coin tone pair and to properly increment a tone counter TC when a tone pair of the proper signal specifications has been recognized. The coin tone filter program is particularly adapted to recognize a valid coin tone, even if the same is subjected to minor dropouts therein. In addition, the coin tone filter program is adapted to detect multiple coin tones, each representing a nickel-equivalent unit, and to properly count the same and, while doing so, to ensure that proper gaps are present between successive tones of the tone burst for a single deposited coin and proper gaps are present between tone bursts of successively deposited coins. In addition, the coin tone filter program is designed to recognize certain fault conditions and either ignore tone signals which the microprocessor 55 judges to be invalid, or to force a recognition of a local call rate when a struck coin is detected, even if less than the requisite number of tone bursts have been received for that local rate.

Figure 7:
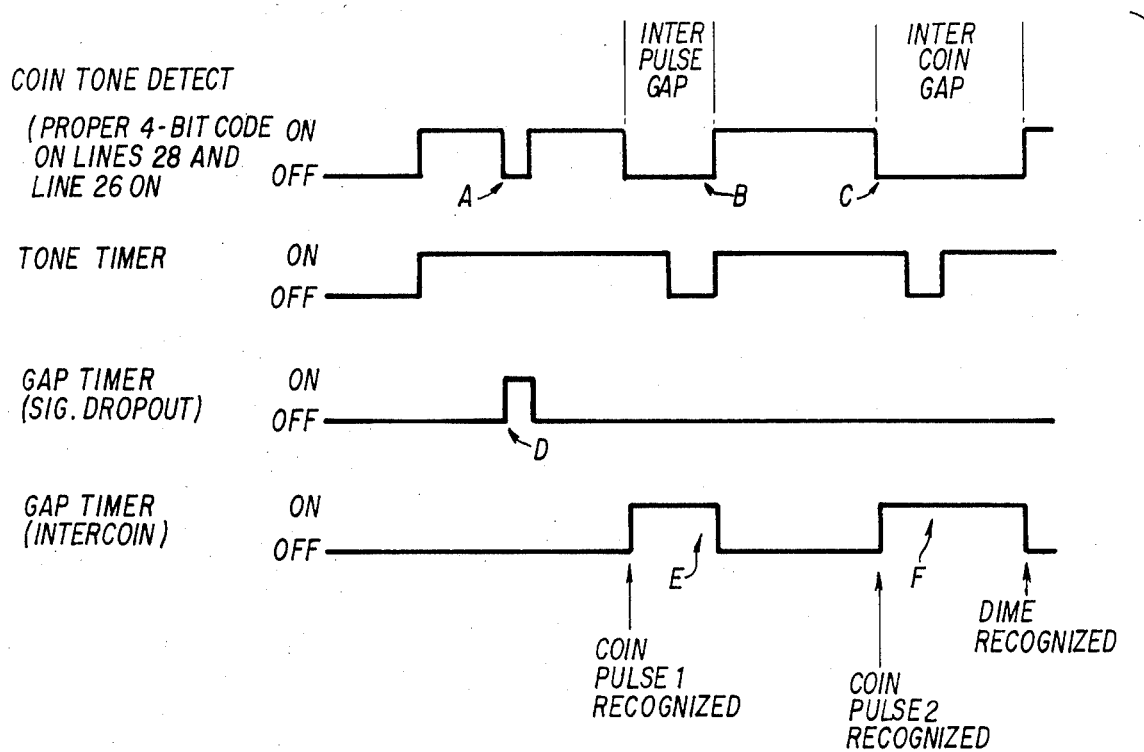
FIG. 7 is a pay telephone coin tone envelope signal diagram useful in explaining how a proper coin tone is detected in the invention.

The signal diagram of FIG. 7 illustrates various signal conditions either recognized or ignored by microprocessor 55. A coin tone detect signal is illustrated which is generated when microprocessor 55 detects the presence of a coin present signal on line 26 and the proper four-bit code for coin deposits on line 28. The coin tone detect signal illustrated represents the deposit of a dime.

Also illustrated in the coin tone detect signal is a signal dropout condition at A, which the microprocessor 55 ignores, provided it is of short enough duration. The interpulse gap, that is, the spacing between bursts for a deposited coin, is shown at B. This period is measured by the coin tone filter to ensure that it is within predetermined parameters. An inter-coin gap, that is, the tone gap between successively deposited coins, is also illustrated at C in FIG. 7, and this period is also measured in the coin tone filter of the invention to ensure it is within predetermined parameters.

The coin tone filter uses two timers, one labeled a tone timer and one labeled a gap timer, to assist in recognizing proper coin tone detect signals. The signal pattern for the tone timer is illustrated in FIG. 7, as are signal patterns for the gap timer, which is shown as used for two different gap timing functions. The tone timer is started when the coin detect signal goes high. It times out when the minimum continuous signal duration to qualify a tone as valid is reached. The gap timer starts whenever the coin detect signal disappears. If the coin detect signal is present for a sufficient duration and before the tone timer times out, and there were no signal dropouts or, if so, if they were of sufficiently short duration, such as shown at D, as measured on the gap timer, a valid tone signal is recognized and a tone counter TC is incremented. If thereafter the coin tone detector goes high again, after a predetermined interpulse gap B, and the conditions to detect a proper tone are present again, another tone will be recognized as part of the burst for a single deposited coin and the tone counter TC will be incremented again. If an inter-coin gap C is recognized, the next validated tone will be recognized as being the beginning of a new burst for a next deposited coin. Thus, in the coin filter portion of the invention, the tone timer is turned on and off, as is the gap timer, while the condition of the coin tone detect line is monitored to determine if an applied coin tone detect signal falls within predetermined characteristics to ensure that a proper coin tone detect signal has been identified. Once it has, the tone counter TC is incremented.

Figure 8:
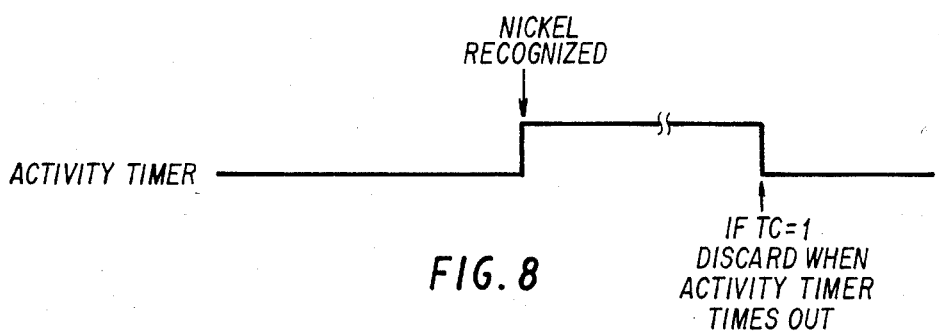
FIG. 8 is a signal diagram, also useful in explaining how a proper coin tone is detected in the invention.

An activity timer signal pattern is also illustrated in FIG. 8. This timer is used to check if any coins are deposited within a predetermined period, e.g., thirty seconds, after recognition of the last valid tone. If, for example, a single tone pulse is validated, but thereafter no tones are recognized, i.e., no coins recognized as being deposited, within this period, the activity timer times out and the microprocessor 55 will ignore the tone pulse first recognized, since it would represent a single nickel, which would be much less than the rate required for even a local telephone call. The isolated tone is thus considered a spurious signal and discarded by the system.

Figure 10A:
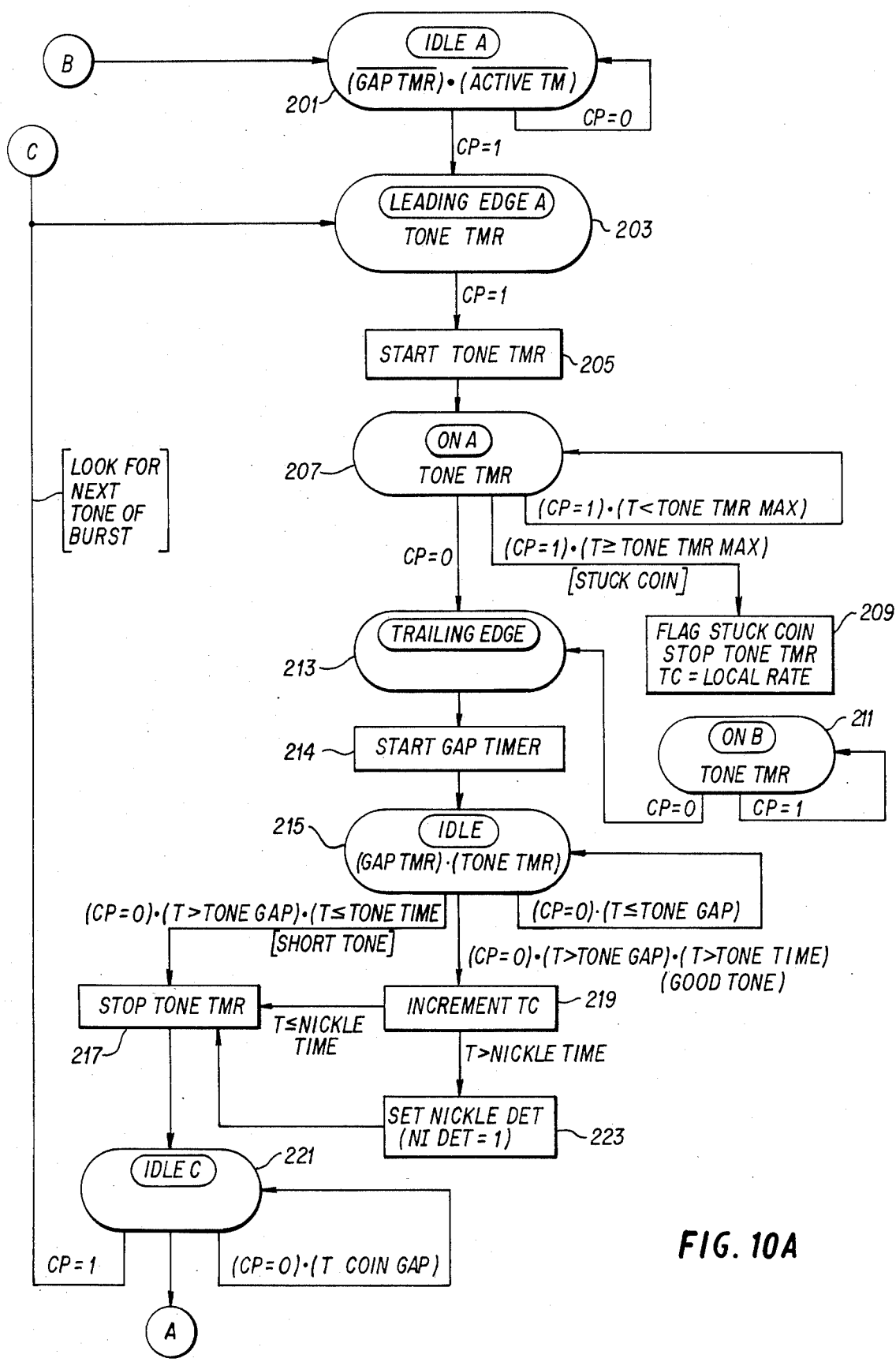
FIGS. 10A and 10B are state diagrams useful in explaining how the line monitor microprocessor detects and processes signals sent by a pay telephone to a central office.
Figure 10B:
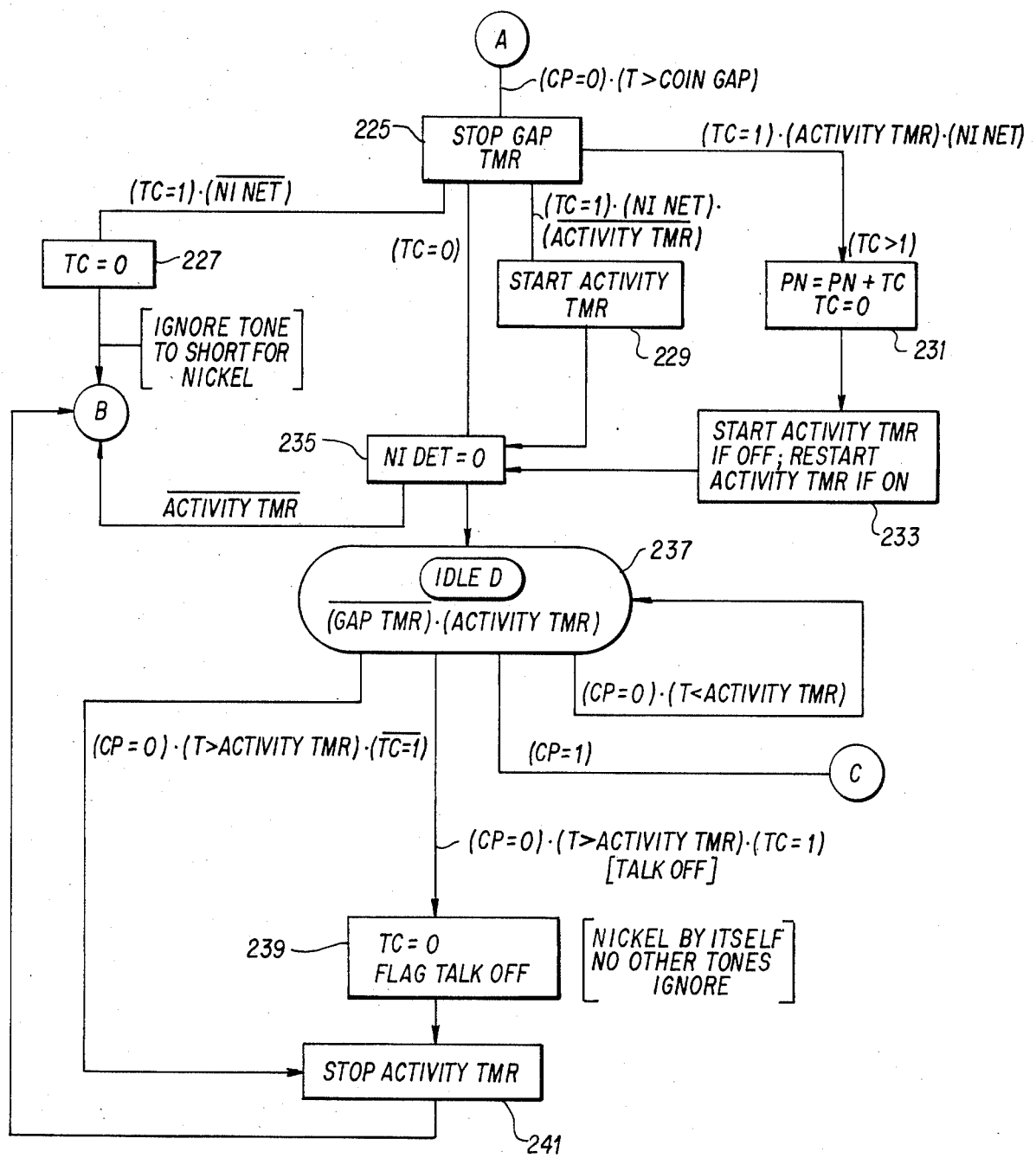

The state diagrams of FIGS. 10A and 10B illustrate in greater detail the operation of the microprocessor 55 in implementing the coin filter program. Upon power-up, or upon the occurrence of certain conditions discussed below, the first state that microprocessor 55 assumes in the coin tone filter program is an idle state 201. The microprocessor 55 will remain in state 201 as long as there is no coin present (CP) signal detected on the telephone line, that is, the coin tone detect signal in FIG. 7 is at a zero "0" level. This is illustrated by the return line CP=0, forming a closed loop in the idle state 201. When the coin filter program is called by the task scheduler and the microprocessor 55 is in idle state 201 and a coin present is detected (CP=1), by the microprocessor 55 detecting a signal on line 26 and the proper four-bit code for a touch-tone coin tone pair indicating a deposit on lines 28, then the microprocessor 55 transitions to state 203. It remains here until the next time the coin filter program is called from the task scheduler. At that time, assuming the coin present signal remains at 1, the microprocessor will then transition from state 203 to state 207, but, while doing so, it will turn on the tone timer (TONE TMR) at step 205.

Step 207 is an active state wherein the tone timer is on, and the microprocessor 55 will remain in this state as long as the time that the tone timer is on is less than a maximum tone timer time period (TONE TMR MAX), and the coin present signal still equals one. This is represented by the closed loop line exiting and then returning to step 207. If microprocessor 55 is in step 207 and, at the next time the coin filter program is called by the task scheduler the coin present signal disappears, as indicated by the line CP=0, then the microprocessor 55 will transition from state 207 to state 213, termed a "trailing edge" state. However, if while in state 207 the microprocessor still receives a coin present signal, CP=1, and now the tone timer has timed out by the time being greater than or equal to the maximum tone timer time, then microprocessor 55 exits state 207 and enters state 211, and in the process it flags a stuck coin, stops the tone timer and sets a tone counter TC to a local rate, e.g., the transition from state 207 to 211 is taken whenever the coin tone is present (CP=1) after the tone timer times out, thereby indicating a coin stuck in a deposit chute. In normal operation, as shown in FIG. 7, the coin tone detect signal will normally disappear before the tone timer times out. If it does not, then, as noted, the tone counter is set to a local rate which, for a 20-cent local rate call would be a value of 4 (a value of 5 for a 25-cent local rate), the tone timer is turned off and a stuck coin condition is noted.

The microprocessor 55 remains in step 211 during the next pass through the coin filter program called for by the scheduler program, as long as the coin present signal still equals one, that is, as long as the coin tone is still on the line. However, once it disappears, the microprocessor 55 then transitions from state 211 to state 213, where it remains until the next time the coin filter program is called for by the task scheduler. At that time, a transition occurs from the trailing edge state 213 to another idle state 215, but, in doing so, the microprocessor 55 now starts a gap timer at step 214. Microprocessor 55 remains in state 215 with the gap timer on as long as the coin present signal is zero, indicating that no coin tone is present, and the time of the gap timer is less than or equal to a predetermined tone gap time. At this point, the gap timer is measuring a possible signal dropout gap, illustrated at D in FIG. 7.

If the coin present signal still equals zero and the time of the tone gap has been exceeded, which is the maximum tone break which can be tolerated before two separate tones are recognized, the microprocessor 55 then transitions through steps 219 and 223 and 217 to an idle state C. In this transition, the microprocessor 55 also determines that the time of tone duration, with bridging of minor dropouts, has exceeded a minimum time (TONE TIME) established for a tone to be recognized as valid. In step 219, the microprocessor increments the tone counter TC and then, if the time of a detected tone was less than or equal to the tone duration for a nickel, the program proceeds to step 217 where it steps the tone timer. If, on the other hand, after incrementing the tone counter TC in step 219 the microprocessor determines that the tone time was greater than the nickel time, it sets a nickel detector NIDET to one in step 223 and then stops the tone timer in step 217. In either case, the microprocessor 55 then proceeds to the idle state C indicated at state 221.

In transitioning from state 215 to state 221, by means of the increment TC step 219, the microprocessor 55 has identified a good tone, that is, one indicating a monetary nickel-equivalent unit. In addition, it it has determined whether the tone was long enough to indicate a nickel (shorter tones are used for quarters).

On the next pass through the task scheduler program, the microprocessor 55 will remain in step 221 as long as the coin present signal is zero and the time measured by the gap timer is less than an inter-coin gap time (COIN GAP), shown in FIG. 7.

When, on a subsequent pass through the program schedule, the coin filter program is called and the coin present signal returns, indicated at line CP=1, the microprocessor 55 then returns to state 203 and begins the procedure described above once again to detect another tone. At this point, it has recognized the leading edge of the next tone burst. If, while in state 221, the coin present signal remains zero, but the time of the gap timer exceeds an inter-coin gap time (COIN GAP), the gap timer is then stopped in step 225 and the microprocessor 55 then proceeds by one of four different paths determined by the state of various counters and timers.

One path from step 225 is to step 231. This path is taken if the tone counter TC equals one, and an activity timer (ACTIVITY TMR) is on, and the nickel detect flag had been set in step 223, of if the tone counter TC value is greater than one. If either of these two conditions occurs, the microprocessor 55 proceeds to execute step 231, wherein a pending nickels PN counter is augmented by adding to its old value PN the number now present in the tone counter TC. It is here that the microprocessor 55 determines the amount of money deposited in nickel-equivalent units. In addition, the tone counter TC is reset to zero. The activity timer is then either started if it is off, or restarted if it is on, in step 233. Following this, the microprocessor 55 proceeds to step 235, where it resets the nickel detector NIDET to zero and, if the activity timer is on, preceeds to an idle state 237. If, after step 235, microprocessor 55 determines that the activity timer is off, it proceeds back to idle state 201 and now awaits the presence of a new coin present signal CP=1.

If, after stopping the gap timer in step 225, the microprocessor 55 determines that the tone counter TC equals one, and the nickel detector NIDET has been set (=1) and the activity timer is off, it then proceeds to start the activity timer in step 229, following which it executes step 235 and, since the activity timer is now on, proceeds directly to idle state 237. If, after turning the gap timer off in step 225, the microprocessor 55 determines that the tone counter TC equals zero, it proceeds directly from step 225 to step 235, where it resets the nickel detector NIDET to zero and then proceeds as described above, depending on whether the activity timer is on or off.

If, after stopping the gap timer in step 225, the microprocessor 55 determines that the tone counter TC equals one, but that the nickel detector NIDET has not been set, it then resets the tone counter TC to zero and ignores the tone, since it is too short to be recognized as a nickel. From here, microprocessor 55 then proceeds back to idle state 201 where it waits for the next coin present signal.

If microprocessor 55 is in state 237, it will remain there as long as a coin present CP signal equals zero and the activity timer has not timed out. However, if a coin present signal occurs while microprocessor 55 is at state 237, then the microprocessor transitions to state 203. If the microprocessor 55 is in state 237 when the coin filter program is next called by the task scheduler, and it determines that CP=0, and that the activity timer has timed out and that the tone counter TC equals one, this condition is recognized as a so-called "talk-off" condition, in which case a nickel is recognized by itself (no other tones detected). As a consequence, the microprocessor 55 then proceeds from state 237 to step 239 where it resets the tone counter TC to zero and flags a talk-off fault condition, following which it proceeds to step 241 where it stops the activity timer, and from there back to state 201 where it awaits the next coin present signal.

If, while in state 237, the microprocessor determines that the coin present CP signal is still off, that the activity timer has timed out and that the tone counter TC does not equal one, that is, some value greater than one is present in the tone counter, then it merely stops the activity timer in step 241 and proceeds to the idle state 201. Under this condition, since more than one tone has been detected and the activity timer has timed out, the microprocessor 55 will recognize the tones as valid tones.

It should be remembered that state transitions, illustrated in FIGS. 10A and 10B, only occur each time the coin filter program is called for from the task scheduler. At the time the program is called for, the microprocessor 55 determines whether a change of state is warranted based on monitored conditions at that time and, if so, executes whatever program steps are necessary while changing states.

The coin filter program operation depicted in the state diagrams of FIGS. 10A and 10B functions to recognize a valid tone, that is, one that has been on long enough to indicate a nickel-equivalent unit, it counts the tones by means of the tone counter TC in step 219, determines that proper gaps exist between tones by means of the gap timer, ignores tones which are too short to be a nickel-equivalent unit, ignores a tone count if only one has occurred within a predetermined period of time following its occurrence, sets the tone counter TC to a local rate count if a valid coin tone has been detected, and if detected as a stuck coin, and keeps a running tab by means of the pending nickels PN counter of the amount of money which has been deposited in the deposit chute of a pay telephone.

The microprocessor 55 operation of determining whether the deposited coins recorded in the pending nickels PN counter are collected or returned to a user will now be described with respect to the state diagram shown in FIG. 11.

Figure 11:
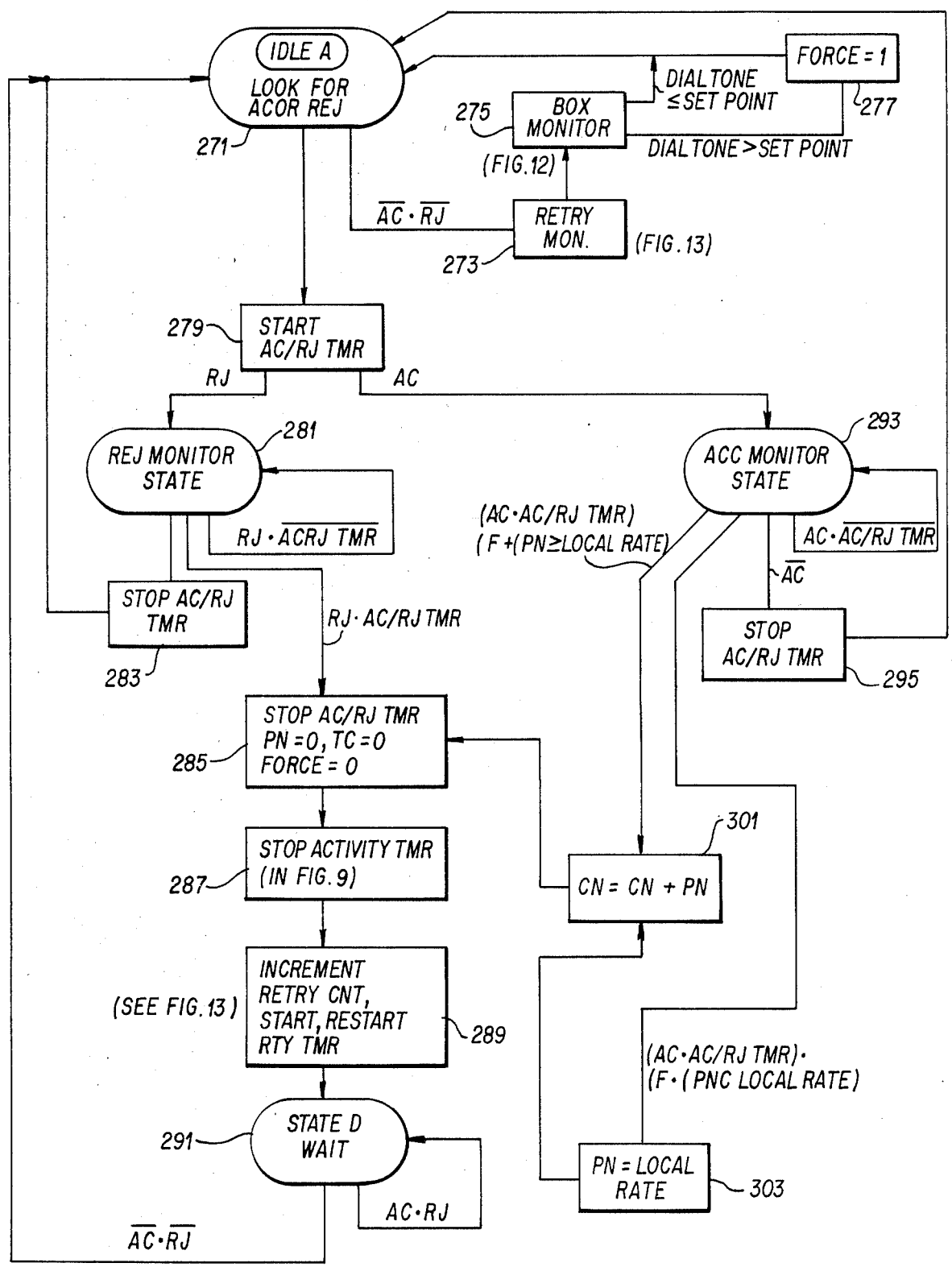
FIG. 11 is a state diagram useful in explaining how the line monitor microprocessor detects and processes collect or return signals sent by a central office to a pay telephone.

FIG. 11 illustrates the state diagram for the collect/return routine which is performed by microprocessor 55. As noted in the FIG. 6 flowchart of the task scheduler, the collect/return routine is executed for line 2(N) and then immediately thereafter is reexecuted for line 2(N)+1. The reason for this is that the collect/return routine can only be executed for two lines on each pass through the task scheduler, and therefore only two lines are processed at a time due to processing speed constraints. Once again, the microprocessor 55 will remain in a particular state when the collect/return routine is called for by the task scheduler program, unless state transition conditions exist.

The first state 271 in the collect/return routine is a state wherein the microprocessor 55 is looking for a collect or return signal sent from the central office to a pay telephone station. If neither a collect nor return signal is sensed, microprocessor 55 proceeds to step 273 where it executes a retry monitor routine, described below in connection with FIG. 13, and from there proceeds to execute a box monitor routine in step 275, which is described below with respect to FIG. 12. Upon finishing the box monitor routine in step 275, the microprocessor then will either return to idle state 271, if the dial tone counter value, which was incremented or deincremented in the FIG. 9 program, is less than or equal to a set point, indicating that no dial tone is present, or if dial tone is present (the dial tone counter set point), microprocessor 55 proceeds from step 275 to step 277 where it sets a force flag equal to one, following which it then returns to the idle state 271.

If, while in idle state 271, the microprocessor 55 senses that a collect or return signal has been sent from the central office to the pay telephone, it then proceeds to step 279 where it starts a collect/return timer, following which it takes one of two paths depending on whether a collect or return signal is detected. If a collect (AC) signal is detected, microprocessor 55 proceeds from step 279 into state 293, which is a collect monitor state. If a return (RJ) signal is detected, microprocessor 55 proceeds from step 279 to state 281, which is a return monitor state.

The microprocessor 55 will remain in the collect monitor state 293 as long as the collect signal is present and the collect/return timer has not yet timed out. If the collect signal disappears while the microprocessor is in state 293, then the microprocessor will stop the collect/return timer in step 295 and return to the idle state 271. If, when in state 293, microprocessor 55 determines that the collect signal is still present and that the collect/return timer has not yet timed out, and that either the force flag F has not been set or the pending nickels counter is greater than or equal to the local rate, then it proceeds from state 293 to step 301, wherein a cumulative nickels count CN is augmented by adding to the previous cumulative nickels count CN the pending nickels PN count. Thus, in step 301, the microprocessor is able to augment the amount of money in the collection box by the amount of money which was in the deposit chute, since it is now recognized that a valid collect signal has been transmitted and the money has been collected in the collection box.

Following execution of step 301, microprocessor 55 proceeds to step 285 where if stops the collect/return timer, initializes the pending nickels PN counter to zero and the tone counter TC to zero, and sets the force flag F equal to zero. Following this, it proceeds to step 287 where it stops the activity timer (started in FIG. 9), after which it proceeds to step 289 where it increments a retry counter and starts a retry timer, or restarts a retry timer if it is already on. The function of the retry count and retry timer will be described in greater detail below in connection with FIG. 13. The microprocessor then proceeds to a wait state 291. The microprocessor will remain in wait state 291 as long as a collect or return signal is present, and as soon as both signals disappear, microprocessor 55 proceeds from state 291 to idle state 271.

If, when in state 293, microprocessor 55 determines that the collect signal is present and the collect/return timer has timed out, and the force flag F has been (=1) and the pending nickels PN count is less than the local rate, it then sets, in step 303, the pending nickels PN count to the local rate. Thus, in step 303, the microprocessor has recognized a valid collect signal, and that the collect/return timer has not yet timed out and that dial tone is present (F=1), indicating that the central office has authorized the making of a telephone call. In this instance, the system assumes that even though the pending nickels PN count is less than the local rate, that a sufficient number of nickel-equivalent units have been detected to assume that a sufficient amount of money has been deposited to equal the local rate. This is why the pending nickels count is set at the local rate and thereafter, in step 301, microprocessor 55 updates the cumulative nickels CN count with the new pending nickels CN rate, following which the microprocessor proceeds to step 285 and executes that step and subsequent steps, as described above.

If microprocessor 55 is in the return monitor state 281, it will remain there as long as a return signal is present and the collect/return timer has not yet timed out. If the return signal is present and the collect/return timer times out, microprocessor 55 then exits state 281 and enters state 291, executing in the transition steps 285, 287 and 289 in the manner described above. In this case, a return signal emanating from the central office has been sensed, in which case the deposited coins have been returned to the user, thereby requiring a resetting of the pending nickels PN counter, the tone counter TC and the force flag F. If, while in state 281, the microprocessor 55 recognizes that the return signal has disappeared, it stops, in step 287, the collect/return timer and proceeds back to idle state 271. The purpose of the collect/return timer is to ensure that the collect or return signal is present for a predetermined period of time before it will be recognized as a valid signal by the system.

Figure 12:
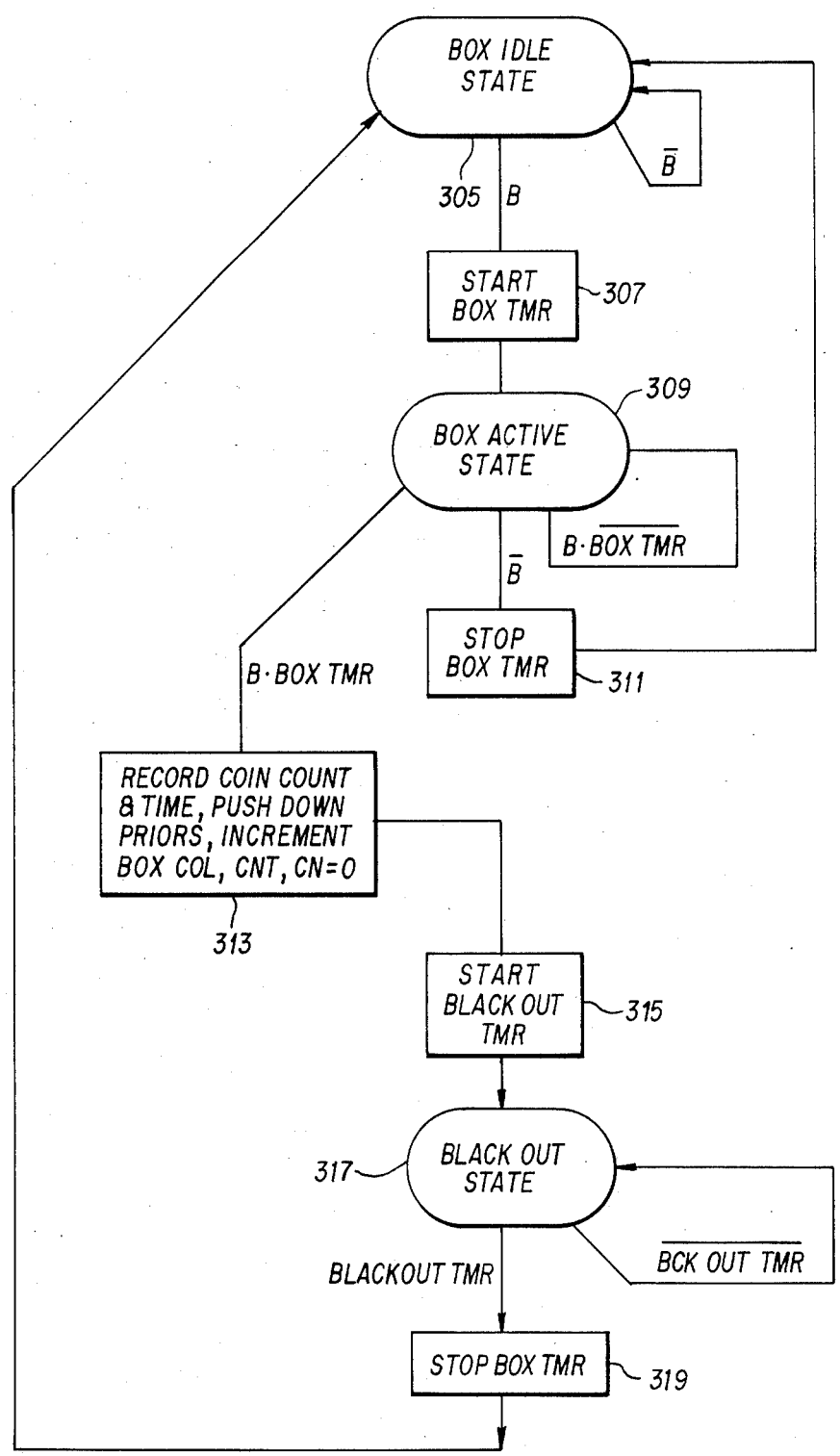
FIG. 12 is a state diagram useful in explaining how the line monitor microprocessor detects and processes a tone signal indicating that a coin box collection has occurred.

The box monitor program executed in step 275 is illustrated in greater detail in FIG. 12 by means of a state diagram. The box monitor program is designed to detect a valid beep tone on the line which is used by a collection agent, or the pay telephone itself, by, for example, a collection box switch, to signal the collection of a coin box. When the beep signal is recognized, the system takes, in effect, a snapshot of the amount of money in the cumulative nickels CN counter, as well as the time at which the beep, that is, collection, occured. In addition, a two minute blackout window is set wherein further beeps by a collector or pay telephone will not be recognized once a valid beep has been detected.

The first state 305 that the microprocessor 55 assumes in the box monitor program is an idle state 305. Microprocessor 55 will remain in this state as long as the beep signal is not detected. However, when a beep signal is detected, the microprocessor will start a box timer, in step 307, and then proceed to a box-active state 309. It will remain here as long as the beep tone is still present and a box timer has not timed out. If, when in state 309, microprocessor 55 detects that the beep signal has disappeared, it stops the box timer, in step 311, and then returns to the box idle state 305. The box timer is used to ensure that the box timer tone is on the line for a sufficient duration to be recognized as a valid tone. If, while in state 309, microprocessor 55 recognizes that the box timer has timed out and that the box signal is still present, it recognizes this as a valid coin box collection signal and, as a result, stores the cumulative nickels CN count in a coin collection CC counter, as well as the time of collection. Microprocessor 55 maintains the just-stored coin collection count and time together with the coin collection counts and times of collection for at least three previous collections by means of a pushdown register, wherein the oldest data is lost as new data is added. In addition, in step 313, microprocessor 55 increments a box collection counter, thereby keeping track of the number of collections which have occured, following which it proceeds to step 315 where it starts a blackout timer, and then to state 317 where it waits until the blackout timer has timed out. Once the blackout timer has timed out, microprocessor 55 exits state 317 and, in the process, stops the box timer in step 319 and then returns to the idle state 305.

As should be apparent, the beep signal, illustrated in FIG. 12, really represents the presence of a tone detect signal on line 26, and the proper four-bit code on lines 28 representing the tone pair of the generated beep signal. Also, in step 313, the cumulative nickels CN count, which is the amount of money then residing in the collection box, is placed in the coin collection CC counter and the cumulative nickels CN count is also reset.

Figure 13:
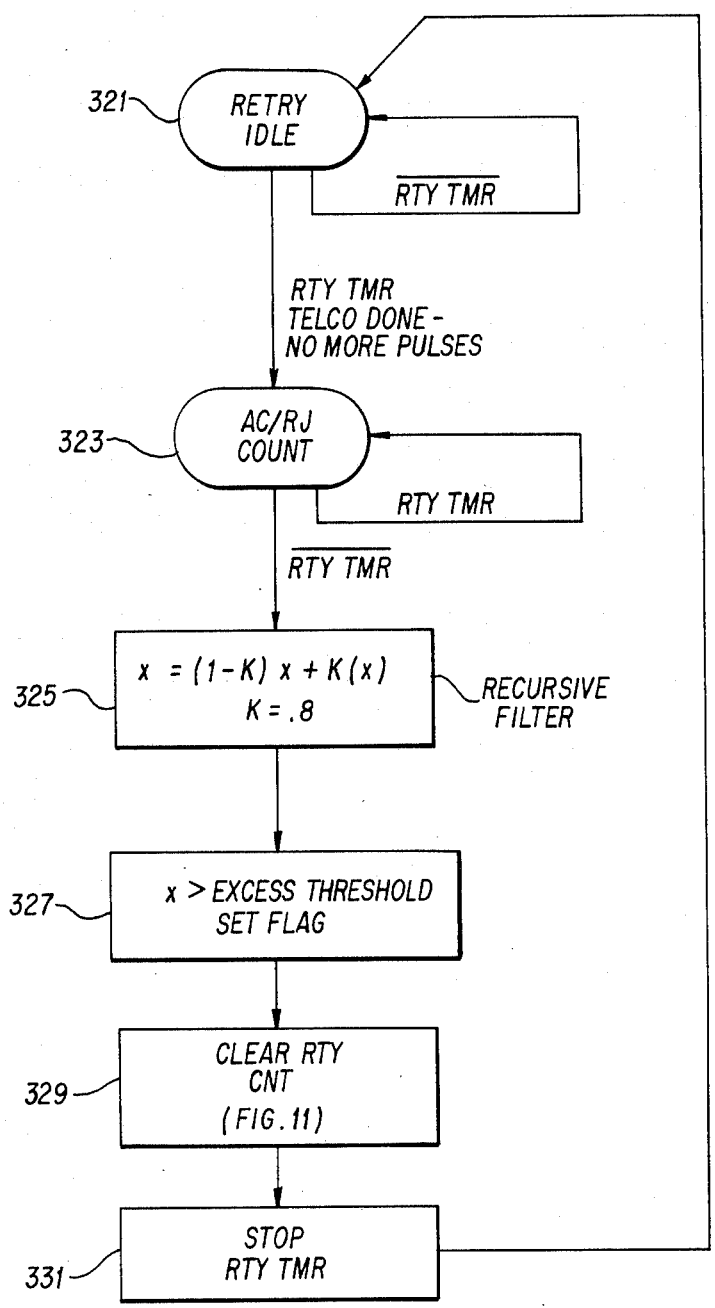
FIG. 13 is a state diagram useful in explaining how the line monitor microprocessor detects and processes repeated collect or return signals sent by a central office to a pay telephone.

FIG. 13 illustrates the retry monitor routine which is executed at step 273 in FIG. 11. The purpose of this routine is to keep track of the number of collect or return pulses which are required to have a collect or return operation take place at the pay telephone station. In some instances, due to malfunctioning or sticking components, it may be necessary for a central office to emit more than one collection or return pulse before the coins in the deposit chute are deposited in the collection box or returned to a customer. The retry monitor routine, illustrated by the FIG. 13 state diagram, is designed to keep track of the number of collect or return pulses required for each collection or return operation as a running average. This information is useful for fault monitoring purposes.

The first state 321 of the retry monitor is an idle state which microprocessor 55 remains in until a retry timer, set in FIG. 11, times out. Once the retry timer is activated, microprocessor 55 exits from state 321 into state 323, which is a collect/return count state. The microprocessor 55 will remain in this state as long as the retry timer is on. Once the retry timer times out, the microprocessor executes step 325 wherein it performs a recursive filtering of the retry count data, illustrated in step 325 as $X = (1-K)X + K(Y)$, where Y is the new value of the retry count and K is a constant. The value X is initialized at zero and, after repeated executions of the recursive filter in step 325, microprocessor 55 has a value which represents the average number of collect or return pulses which a central office must emit to effect either a collect or return operation at a pay telephone. After executing step 325, the microprocessor proceeds to step 327 where it determines whether the average value of collect or return pulses exceeds a threshold and, if it does, it sets a flag representing this. Thereafter, microprocessor 55 proceeds to step 329 where it clears a retry counter (incremented in FIG. 11), following which it proceeds to step 331 where it stops the retry timer and then proceeds back to idle state 321. Thus, with the retry monitor routine, the microprocessor creates and maintains a running average of collect or return pulses required to activate a collect or return operation at a pay telephone, and has also flagged a fault condition when this average exceeds a predetermined value.

An off-hook routine is also executed by microprocessor 55 at step 133 of the task scheduler program illustrated in FIG. 6. This off-hook routine is executed on each pass through the task scheduler for only one telephone line, so that four passes through the task scheduler are required for an off-hook routine to be executed for each of the four telephone lines. The off-hook routine is illustrated in greater detail by means of a state diagram in FIG. 14. The routine is used to detect an extended off-hook condition or extended on-hook condition. It also can be used to gather various statistical data on how frequently a phone goes off-hook or on-hook, etc., and other problems with the phone line. For the purpose of implementing the present invention, only extended off-hook or on-hook conditions are recognized and flagged to indicate potential fault conditions.

Figure 14A:
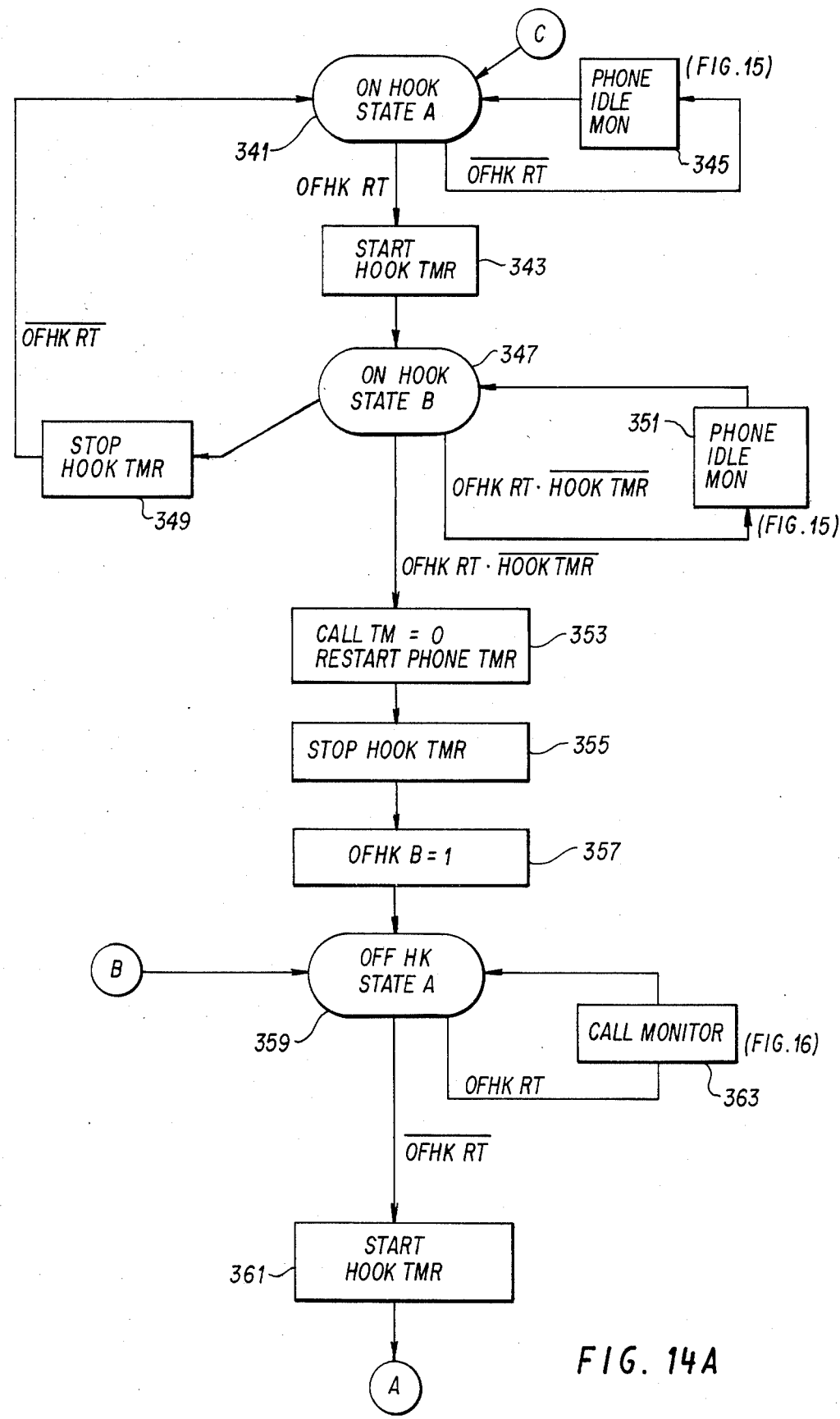
FIGS. 14A and 14B are state diagrams representing how the line monitor processor detects and processes an off-hook signal.
Figure 14B:
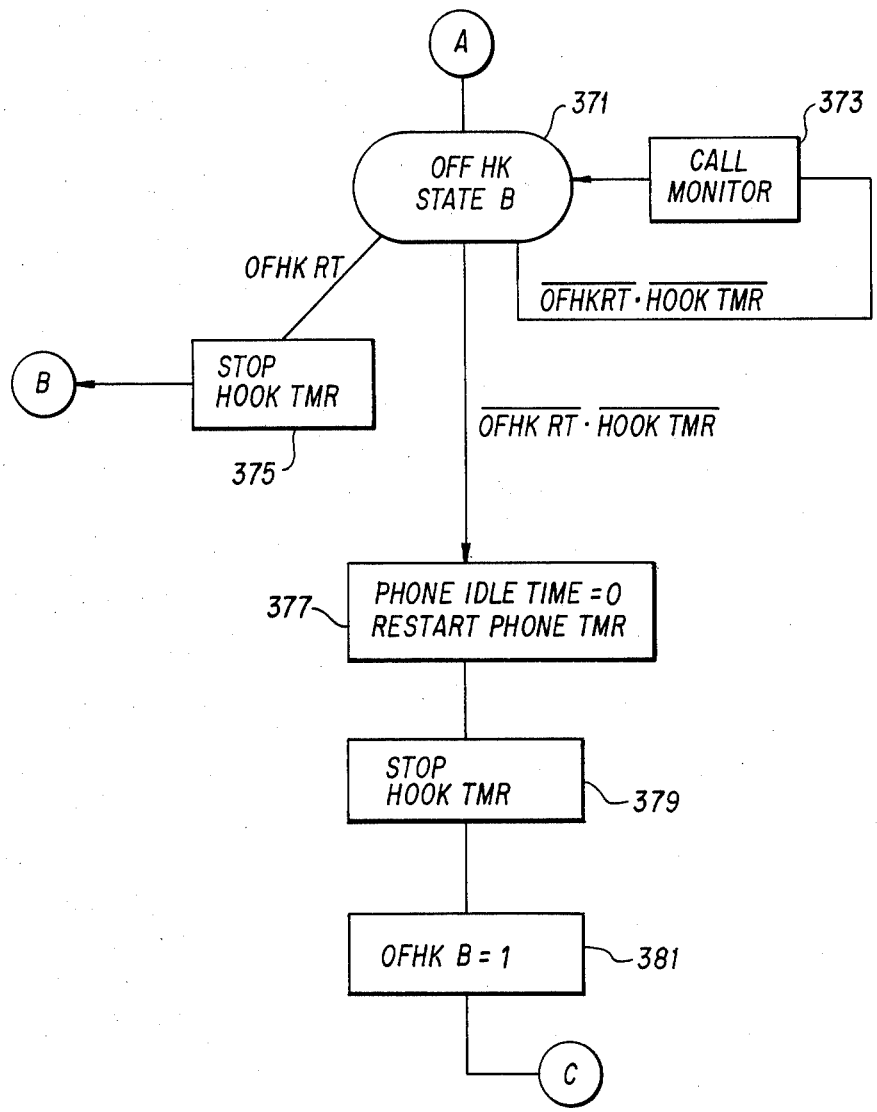

The first state the microprocessor assumes when in the off-hook routine illustrated in FIG. 14 is an idle state 341. Microprocessor 55 will remain in this state as long as it does not detect an off-hook signal OFHKRT at the output of line 32 of the line monitor. In addition, on each pass through the off-hook routine of FIG. 14, if an off-hook signal is not detected, the microprocessor will remain in the idle 341, but executing a phone idle monitor routine 345, which is discussed below with respect to FIG. 15. If, when in state 341, microprocessor 55 recognizes an off-hook signal OFHKRT, it starts a hook timer in step 343 and then proceeds to state 347, which is an on-hook state. Microprocessor 55, once in state 347, will remain there as long as an off-hook signal is present and the hook timer started in step 343 does not time out. However, it does execute, in step 351, the phone idle monitor routine, discussed above with respect to step 345, on each pass through the FIG. 14 routine if it is in state 347. If, while in state 347, the microprocessor 55 recognizes that an off-hook signal is still present and that the hook timer has timed out, it then sets a call time (CALL TM) counter equal to zero and restarts a phone timer (PHONE TMR), in step 353. It then proceeds to step 355, where it stops the hook timer and sets an off-hook flag OFHKB equal to one. It then proceeds to state 359, which is an off-hook state. The microprocessor 55 will remain in state 359 as long as the off-hook signal is still present, but will execute a call monitor routine in step 363 (FIG. 16) while it remains in state 359 on each pass through the FIG. 14 routine.

If, while in state 359, the microprocessor 55 recognizes than an off-hook signal OFHKRT has disappeared, it starts the hook timer in step 361 and proceeds to an off-hook state 371. Microprocessor 55 will remain in this state as long as there is no off-hook signal and the hook timer has not timed out, and it will execute a call monitor routine in step 373 on each call of the FIG. 14 routine while the microprocessor is in state 371. When, in state 371, if microprocessor 55 recognizes that the off-hook signal is absent, but the hook timer times out, it now proceeds to step 377 where it sets a phone idle time equal to zero and restarts the phone timer. It then proceeds to step 379 where it stops the hook timer, and from there to step 381 where it sets an off-hook flag OFHKB equal to one, following which it returns to state 341. If, while in state 371, the microprocessor recognizes that the off-hook signal appears, it stops the hook timer in step 375, and then proceeds to the off-hook state 359.

If, while in the on-hook state 347, the microprocessor detects that the off-hook signal disappears, it then stops the hook timer in step 349 and returns to state 341. The routine illustrated in FIG. 14 by the state diagram is designed to detent on-hook and off-hook conditions and start and stop various timers, the consequences of which will become more apparent by the discussion below of the phone idle monitor routine of FIG. 15 and the call monitor routine of FIG. 16, which are executed at steps 345 and 351 and 363 and 373 in FIG. 14.

Figure 15:
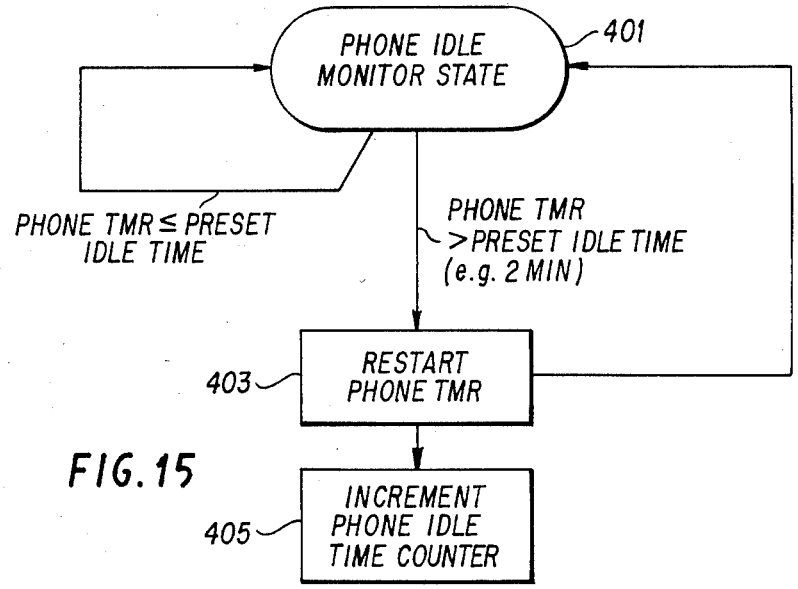
FIG. 15 is a state diagram representing how the line monitor processor detects and processes signals indicating an abnormal on-hook condition of a pay telephone station.

In the phone idle monitor routine of FIG. 15, the microprocessor 55 begins in a phone idle monitor state 401 and will remain there as long as the phone timer value is less than or equal to a predetermined idle time. When the phone timer value exceeds a predetermined idle time, for example, a two minute time period, microprocessor 55 exits from state 401 and proceeds to restart the phone timer in step 403, and then to step 405 where it increments the phone idle time counter, following which it returns to the idle state 401. By incrementing the phone idle time counter in step 405, the microprocessor is now keeping a running tally on the time that the phone is idle, as measured in two minute time increments. This value can be examined at any time to determine if the phone is idle and for how long to potentially flag a fault condition.

Figure 16:
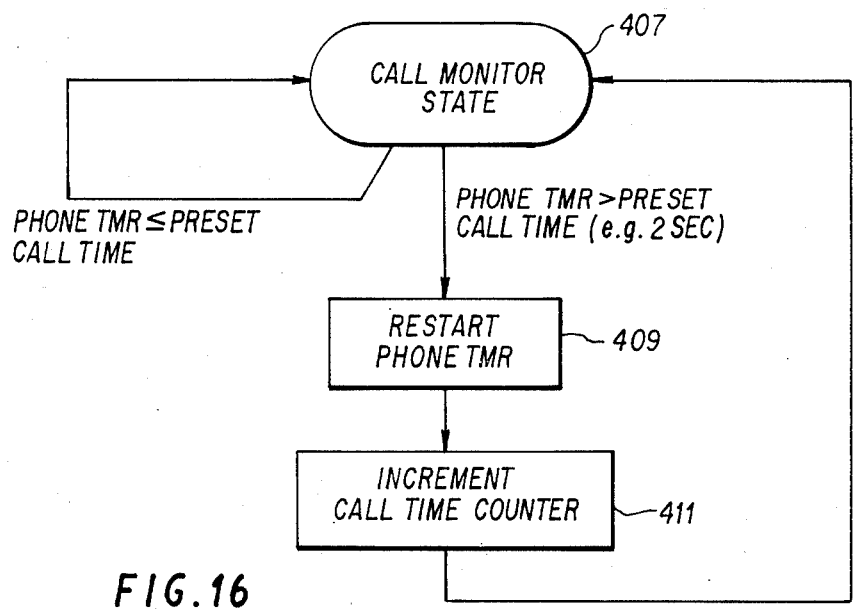
FIG. 16 is a state diagram representing how the line monitor processor detects and processes signals indicating an abnormal off-hook condition of a pay telephone station.
Figure 17:
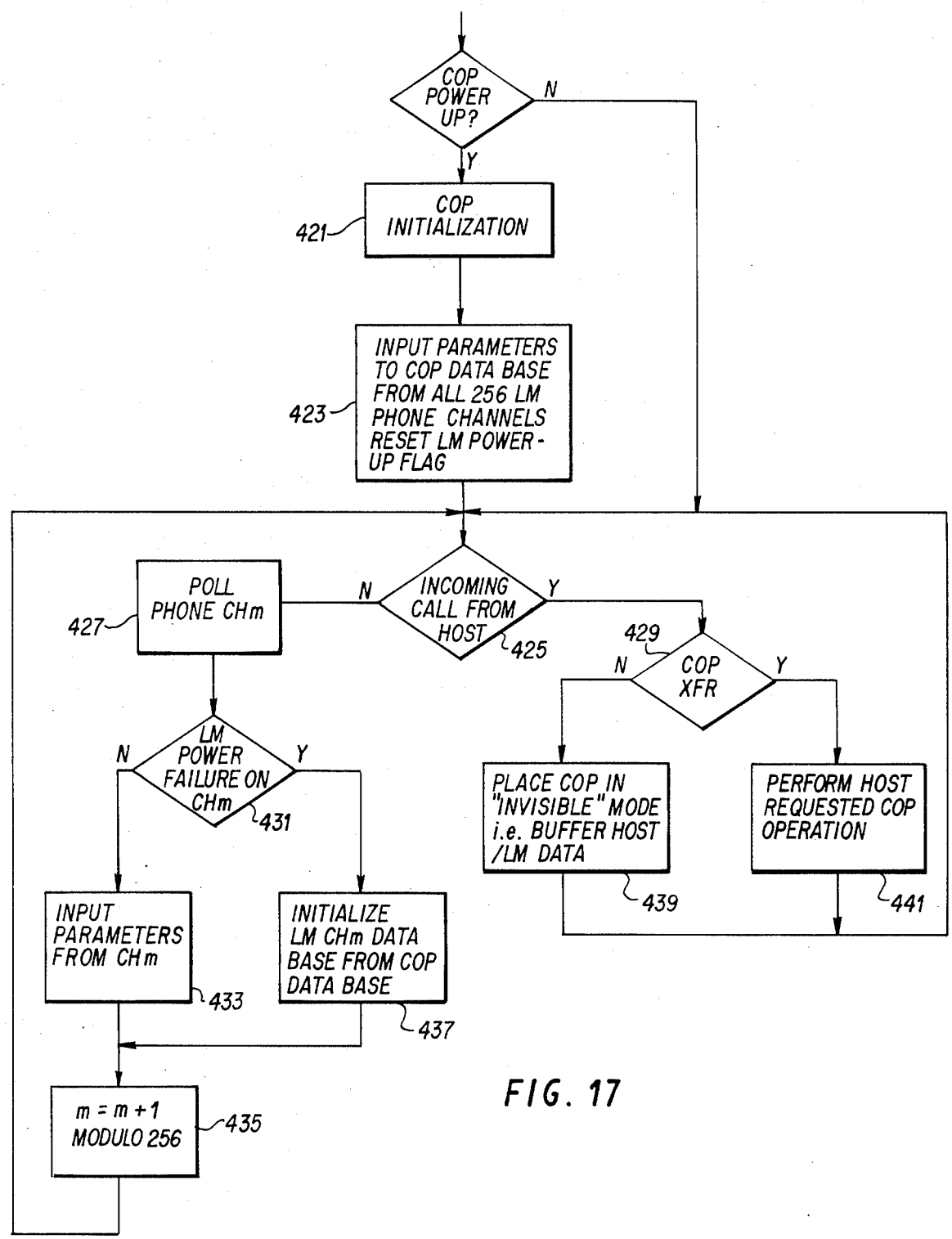
FIG. 17 is a flowchart representing the operations performed by the central office processor (COP) employed in the invention.

FIG. 16 illustrates a call monitoring routine, in which the first state 407 is a call monitor state. The microprocessor 55, once in this state, will remain there as long as the phone timer is less than or equal to a preset call time. When the phone timer is greater than the preset call time, which may, for example, be as little as two seconds, the microprocessor exits state 407 and restarts the phone timer in step 409, following which it increments the call time counter in step 411, following which it returns to the call monitor state 407. Thus, the call time counter incremented in step 411 will contain a running tally of the time of use of a phone, which is incremented in two second intervals. This too can be used to indicate how long a phone is used and can be monitored at various periods of time to obtain information on how long the phone is in use.

The final routine which is called by the task scheduler is a routine executed by the central office processor 30. It monitors the TF0 bit at step 125 of the task scheduler program and, when this bit is not equal to a one value, it executes a communications program at step 127.

The communications program for the central office processor 30 is best illustrated in flowchart form and is depicted in FIG. 17. The central office processor 30 executes the FIG. 17 program and, during execution thereof, communicates with the line monitor microprocessors to provide data thereto or receive data therefrom. During execution of the communication program at step 127 of the task scheduler of FIG. 6, the line monitor microprocessors 55 act on a data block received from the central office processor 30 and formulate an appropriate response to be returned to the central office processor 30.

In the first step 420 of the central office processor program, a determination is made if the central office processor has just been powered up. If it has, the central office processor 30 executes an initialization step 421 in which various flags and registers are set to predetermined initialized parameters. In the next step 423, input parameters from all line monitor microprocessors 55 are loaded into the central office processor 30 data base, and a line monitor power-up flag is reset. The parameters which are input from the line monitor microprocessor 55 include the current value of the cumulative nickels CN count, the cumulative coin CC count at most recent collection, the time of the most recent collection, the collection count representing the number of times a collection has occurred, the local rate, the collect/return threshold, cumulative phone usage data, cumulative phone idle data, a maximum call time threshold, and a maximum idle time threshold. Since these input parameters are loaded in step 423 each time the central office processor 30 is powered-up, should the central office processor 30 be replaced or removed from service, it will automatically have its data base restored with the most current line monitor microprocessor 55 data when powered-up.

If the central office processor 39 was not powered up, then the central office processor 30 proceeds from step 420 directly to step 425, wherein it determines whether or not there is an incoming call from host computer 37 at the telephone company business office. If there is no incoming call from the host computer, then the central office processor 30 begins its polling of the various channels of the line monitors to collect data concerning cumulative nickels CN, cumulative coin CC count at most recent collection, time of most recent collection, and collection count, cumulative phone usage and cumulative idle time.

After polling one channel n in step 427 for this data, the central office processor 30 then proceeds to step 431, where it determines whether a power failure flag in the line monitor microprocessor it is currently polling is on or not. The power failure flag will be set to a one state whenever a line monitor microprocessor is powered-up, and thus needs to have its data restored from the data base of the central office processor 30. If the line monitor power failure flag is not on, the various input parameters noted above are input from the polled channel of the line monitor microprocessor to the central office processor 30. After this, the central office processor 30 proceeds to execute step 435, where it increments the channel counter n so that on the next pass through step 427 the next channel of the line monitor microprocessor will be polled. Thereafter, the central office processor proceeds to step 425. If, in step 431, the central office processor 30 determines that the line monitor power failure flag has been set, it proceeds to step 437, where it initializes the line monitor microprocessor channel data from the data contained in the central office processor data base. This includes data concerning cumulative nickels CN count, the cumulative coin CC count at most recent collection, the time of most recent collection, the collection count, the local rate, collect/return threshold, the maximum call time threshold, the maximum idle threshold, the cumulative phone usage and the cumulative idle usage. After this data is downloaded from the central office processor 30 to the line monitor microprocessor 55 for the line then being polled, the central office processor 30 then proceeds to step 435, incrementing the next channel counter, and the proceeds back to step 425.

If, in step 425, central office processor 30 determines that there is an incoming call from the host computer 37, it then proceeds to examine whether there is a request from the host computer for a transfer of data in the central office processor 30 data base to the host computer. If no transfer request is found, the central office processor 30 proceeds to step 439, where it places itself in a so-called "invisible" mode where it merely buffers data to and from the host computer 33 and the line monitor microprocessors 55. If a request from the host computer for data from the central office processor is found in step 429, the central office processor 30 then transmits to the host computer the requested data, in step 441, after which it proceeds back to step 425.

The communications program is designed to upload data collected by the line monitor microprocessors 55 into the central office processor for retransmission to the host computer 37 upon request. In addition, if the central office processor loses data it is capable of requesting that the line monitor microprocessors update the central office processor 30 with all data which was lost. If, on the other hand, the line monitor microprocessors are taken out of service, the central office processor is capable of recognizing this by means of the power flag which is set in the line monitor microprocessors to download relevant data to the line monitor microprocessors. It is also possible for the central office processor 30 to be invisible and act as a buffer to allow direct communications from the host computer 37 to the line monitor microprocessors 55.

The host computer 37 is used to accumulate information on all the phone channels monitored by each central office processor 30 in the system. The host computer 37 also maintains a data base containing pertinent information on a phone channel and relates the accumulated data to the telephone number for that channel.

Figure 18A:
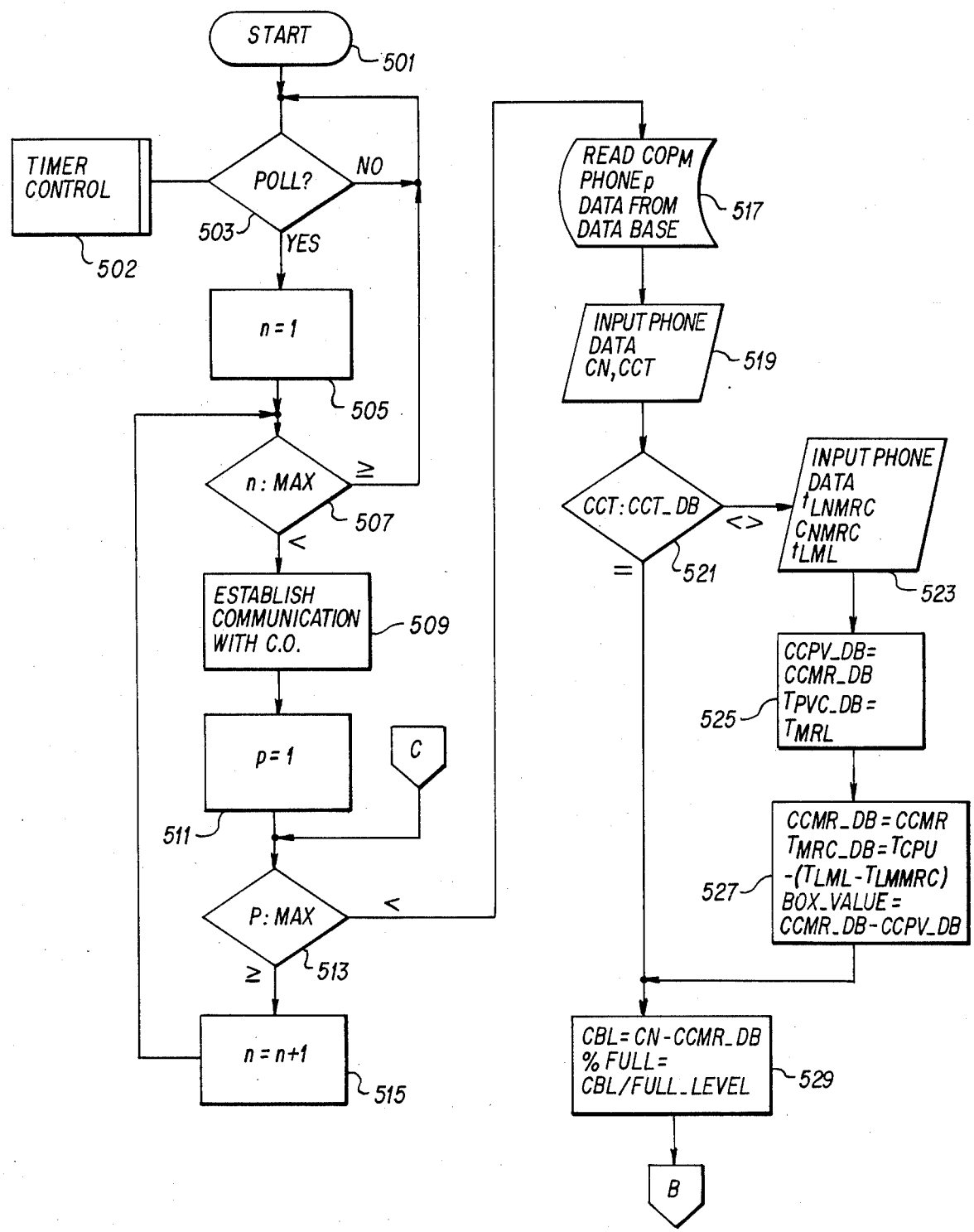
FIGS. 18A and 18B are flowcharts representing the operations performed by the host computer employed in the invention.
Figure 18B:
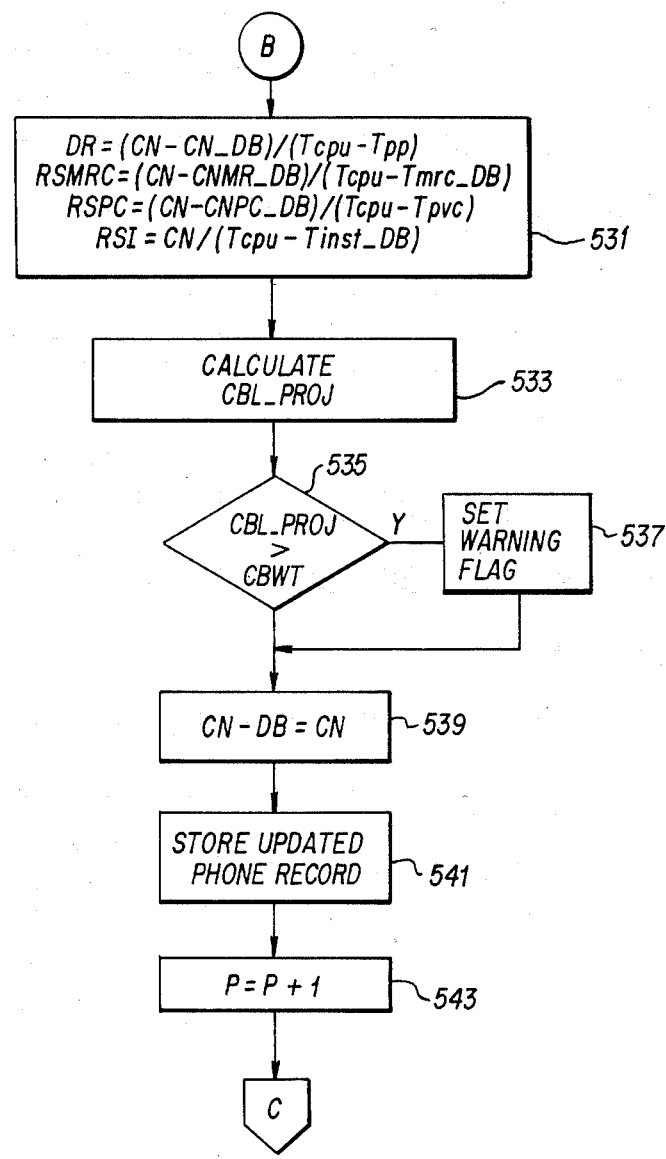

The host computer 37 executes the FIGS. 18A, 18B program beginning in step 501 and assumes an idle condition, awaiting the proper time to initiate a poll sequence for all central office processors 30 within the system. Thus, the host computer 37 waits in step 503 until it detects the time for polling from a timer control 502. Typically, the collection program is initiated daily. When it is time for a poll, computer 37 initializes a central office processor pointer (n) to the first central office processor to be polled in step 505. Thereafter, it checks, in step 507, whether the pointer has reached a maximum value. If not, computer 37 establishes a connection with central office processor (n) in step 509. If the pointer value (n) has exceeded a maximum value, indicating that all central office processors have been polled, computer 37 proceeds from step 507 to step 503 and awaits the next polling time.

Once computer 37 establishes a communications link with a central office processor, it then initializes the phone pointer (p) in step 511. It then proceeds to acquire and process data for each phone channel in turn, provided there are more phone channels to process, as determined in step 513 by the (p) value reaching a maximum. When phone data is processed and stored for all phone channels maintained by the central office processor (n), the pointer (n) is incremented in step 515 and the process then repeats until all central office processor information for all phone channels has been acquired and processed. When data for a phone channel is updated, a data base record for the phone PH REC (n,p) is accessed in step 517 which is entered from step 513. Data contained in the record is illustrated below:

DATA BASE ON PHONE (p,n)

CN_DB: Cumulative nickels collected by phone since installation

CNMR_DB: Cumulative nickels at time of most recent collection
Tmrc DB: Time of most recent collection
CNPC_DB: Cumulative nickels at time of collection previous to most recent one
Tpvc_DB: Time of collection previous to most recent one
CCT_DB: Count of number of collections made
Tinst_DB: Time of line monitor installation on phone.

The host computer also accesses data base information common to all phones associated with a central office processor, which is as follows:

DATA BASE ON CENTRAL OFFICE PROCESS (p)

CBWT_DB: Coin box warning level threshold set point
Tproj_DB: Projection time for full box test
Tpp_DB: Time of previous poll of central office processor.

The data for phone channel (p,n) is next retrieved in step 519. This data includes:

INITIAL PHONE DATA RETRIEVED

OCT: Present collection count
CN: Present cumulative nickels count

A check is then made in step 521 to see if the collection count CCT is the same as it was at the time of the last poll. If so, it is not necessary to collect the remainder of the information on the phone, since it has not changed since the time of the last poll. This method of checking for changes greatly reduces the communication overhead burden in the system, and enhances the time efficiency of communications. If the collection count CCT has changed, a flag is set to indicate that a collection has been made so that a report can be later generated, identifying collected phones together with the collection amount and the time of collection. If the data has changed, as determined in step 521, computer 37 then also collects the following data from the phone channel of the active central office processor:

ADDITIONAL PHONE DATA

CNMR: Coin count at time of most recent collection
Tlmmrc: Line monitor time at time of most recent collection
Tlml: Line monitor local time.

Once this information has been collected in step 523, all data is entered in the phone record. Thereafter, in step 525, the time and cummulative nickels CN count at the time of most recent collection is moved down to the previous collection data so that the newest, most recent collection information can be entered. That is,

CNPC_DB = CNMR_DB

Tpvc_DB = Tmrc_DB

Next, the new collection information is entered as follows:
CNMR DB = CNMR
BOX_VAL = CNMR DB − CNPC DB
 where BOX_VAL equals the amount of money in the coin box as collected
Tmrc_DB = Tcpu − (Tlml − Tlmlrc)
 where Tcpu equals computer 37 time in year, month, day, hour and minute
Tinst = Tcpu − Tlml.

The time of most recent collection (Tmrc DB) is calculated based on the present time of day utilized by the computer 37 and subtracting from that the difference between the two minute tick time that is presently in the line monitor and the line monitor tick time when the collection was identified. This difference, therefore, identifies how long ago the collection occurred in two-minute increments. Subtracting this from the present time, therefore, provides the time at which the collection was made. This is accomplished without having to load the line monitoring microprocessors 55 with the correct time and date, thereby lowering the complexity of initialization, line monitor time data storage, and communication overhead associated with time transmission.

The coin box level (CBL) and percentage of full box (% FULL) is thereafter calculated by computer 37, in step 529, as follows:
CBL = CN − CNMR_DB
 where CBL equals coin box level, i.e., the dollar value (in nickel counts) presently in the money box
% FULL = CBL/FULL LEVEL
 where FULL LEVEL is a dollar value at which the money box cannot hold additional coinage.

Since the dollar value which can be held differs between nickels, dimes and quarters, this value represents a statistical average of different coin denominations in determining the full box level. If there was no change detected in step 521 by computer 37, then the computer proceeds immediately to step 529.

A warning is issued if the projected money box level exceeds a predetermined threshold within the projected time interval. The projection formula is based on the present coin box level CBL, and weighting the following collection rates which can be derived from the data in the phone base and in the phone channel:

COLLECTION RATES

DR: Collection rate from the time of the previous poll, typically a daily rate
RSMRC: Rate since most recent collection
RSPC: Rate since previous collection
RSI: Rate since installation.

These rates are obtained in step 531 as follows:

DR = (CH − CN_DB)/Tcpu − Tpp)

RSMRC = (CN − CNMR_DB)/Tcpu − Tmrc_DB)

RSPC = (CN − CNPC_DB)/(Tcpu − Tpvc)

RSI = (CN/(Tcpu = Tinst_DB)

The projected coin box level CBL PROJ can then be calculated in step 533 as follows:

CBL_PROJ = CBL + (K1*RD + K2*RSMRC + K3*RSPC + K4*RSI)*Tproj where K1-K4 are weighting constants necessary to place the appropriate emphasis on the four rates available. These weights will change depending on the specific conditions of the phone company.

CBL_PROJ is then compared to a threshold value in step 535 to determine if the projected fullness level will exceed CBWT threshold. Since the calculated value CBL_PROJ includes a factor based on projected collection over time, the test in step 535 is one of whether the box will be full within Tproj hours. If so, a warning flag is issued in step 537 to indicate that the phone should be collected prior to Tproj.

Following the test and possible warning for CBL_PROJ, the value CN DB is updated, in step 539, as follows:

CN DB=CN

The updated phone record is then stored back in the data base in step 541, and thereafter the phone pointer (p) is incremented in step 543 and a determination is made in step 513 if more phones remain to be updated in the central office processor 30.

In summary, the host computer periodically polls for information on each phone channel in the system. A data base record for each phone is updated to reflect the newest values, and the other useful information is derived from the combination of data in the data base and obtained from the phone channel. This information includes: the amount of money presently in the coin box (CBL), the fullness percentage for the money box, a projection of whether the coin box will overflow within a projected time interval, a report on the money boxes projected to overflow, a report identifying phones collected since the last poll, together with the amount collected and the time of collection along with other archival data which can be used in phone studies.

As is evident from the foregoing description, the present invention is able to provide a system for monitoring the collection of coins at a pay telephone, for indicating the amount of money in the collection box, for noting the time and number of collections which have been made, for discriminating between false tones and valid tones for the purpose of coin counting, and for monitoring several fault conditions, including excessive on-hook or off-hook conditions. In addition, data concerning the amount of money which has been collected is maintained for later comparison with the amount of money returned by a collection agent. The system is also capable of being configured for various other optional fault sensing conditions by the use of additional call points in the task scheduler program which may be implemented.

While a preferred embodiment of the invention has been described and illustrated with respect to various figures of the application, it should be understood that many modifications can be made to the invention without departing from the spirit and scope thereof. Accordingly, the invention is not to be considered as limited by the foregoing description, but is only limited by the claims which are appended hereto.

```
ISIS-II MCS-51 MACRO ASSEMBLER V2.0
OBJECT MODULE PLACED IN :F0:INITAL.OBJ
ASSEMBLER INVOKED BY:  ASM51 INITAL.F16 NOSYMBOLS

LOC  OBJ           LINE      SOURCE

1              NAME    INITIALIZE
                     2       ;
                     3       ;****************************************************************;
                     4       ;       COIN DETECTOR COLD START INITIALIZATION
                     5       ;
                     6       ;****************************************************************;
                     7 +1    $INCLUDE(DEFINE.TXT)
            =1       8 +1    $NOLIST
                   365       PUBLIC  COLD_START,DIAG_RET
                   366       EXTRN   CODE(SCHED_RTN,ROM_HIT_TABLE,VECT_CODE,VECT_CODE_END,VECTOR_START)
                   367       EXTRN   CODE(XRAM,XDB_0,XDB_1,XDB_2,XDB_3,XRAM_PAR)
----               368               CSEG    AT 0H              ;RESET
0000 020000    F   369               LJMP    COLD_START
                   370       INITIAL SEGMENT CODE
----               371               RSEG    INITIAL
                   372       COLD_START:
0000 C2AF          373               CLR     EA
0002 7580FF        374               MOV     P0,#0FFH                   ;INITIALIZE PORTS
0005 7590FF        375               MOV     P1,#0FFH
0008 75A0FF        376               MOV     P2,#0FFH
000B 75B0F7        377               MOV     P3,#0F7H           ;DISABLE SERIAL DRIVER
000E 758145        378               MOV     SP,#STACKK-1       ;SET STACK POINTER
0011 7802          379               MOV     R0,#2              ;CLEAR ANY PENDING INTERRUPTS
0013 7400      F   380       IN_CLR: MOV     A,#LOW(RTRN)
0015 C0E0          381               PUSH    ACC
0017 7400      F   382               MOV     A,#HIGH(RTRN)
0019 C0E0          383               PUSH    ACC
001B 32            384               RETI
001C D8F5          385       RTRN:   DJNZ    R0,IN_CLR
                   386               USING   0
                   387       ;THIS IS A BASIC INTERNAL DATA RAM EVALUATION TEST
                   388       ;THE PROGRAM FLOW IS: WRITE FIELD ALL 1 AND VERIFY, WRITE THE FIELD ALL 0 AND
```

```
                    389     ;VERIFY, WRITE DATA AS FOLLOWS 1,2,3,4...FD,FE,FF,1 THEN VERIFY.
    00F0            390     STATUS      EQU     8
    00F1            391     RAM_FAIL            BIT     STATUS.1
    00F2            392     CXRAM_FAIL          BIT     STATUS.2
    00F4            393     ROM_FAIL            BIT     STATUS.4
    00F0            394     RAM_8K              BIT     STATUS.0    ;SET BIT FOR 8K
001E 7A04           395                 MOV     R2,#04H             ;LOW ADDRESS FOR TEST
0020 7380           396                 MOV     R3,#80H             ;HIGH ADDRESS
0022 A802           397                 MOV     R0,AR2              ;POINTER TO LOCATION UNDER TEST
0024 C2F1           398                 CLR     RAM_FAIL            ;CLEAR OLD STATUS
                    399     ;**TEST FOR ALL 1
0026 74FF           400                 MOV     A,#-1
0028 8001           401                 SJMP    START1_RAM
                    402     NXT1_RAM:
002A C8             403                 XCH     A,R0
                    404     START1_RAM:
002B F6             405                 MOV     @R0,A
002C 08             406                 INC     R0
LOC  OBJ            LINE    SOURCE

002D C8             407                 XCH     A,R0
002E B503F9         408                 CJNE    A,AR3,NXT1_RAM
0031 A802           409                 MOV     R0,AR2
                    410     TST1_RAM:
0033 E6             411                 MOV     A,@R0
0034 B4FF3D         412                 CJNE    A,#-1,RAM_ERR
0037 08             413                 INC     R0
0038 E8             414                 MOV     A,R0
0039 B503F7         415                 CJNE    A,AR3,TST1_RAM
003C A802           416                 MOV     R0,AR2
                    417     ;**TEST FOR 0
003E 7400           418                 MOV     A,#00
0040 8001           419                 SJMP    START0_RAM
                    420     CLRNXT_RAM:
0042 C8             421                 XCH     A,R0
                    422     START0_RAM:
0043 F6             423                 MOV     @R0,A
0044 08             424                 INC     R0
0045 C8             425                 XCH     A,R0
0046 B503F9         426                 CJNE    A,AR3,CLRNXT_RAM
0049 A802           427                 MOV     R0,AR2
                    428     TST0_RAM:
004B E6             429                 MOV     A,@R0
004C 7026           430                 JNZ     RAM_ERR
004E 08             431                 INC     R0
004F E8             432                 MOV     A,R0
0050 B503F8         433                 CJNE    A,AR3,TST0_RAM
0053 A802           434                 MOV     R0,AR2
                    435     ;**WRITE 255 DATA PATTERN
0055 7401           436                 MOV     A,#1
0057 8001           437                 SJMP    WRITENXT_RAM
                    438     NOTHERE_RAM:
0059 C8             439                 XCH     A,R0
                    440     WRITENXT_RAM:
005A F6             441                 MOV     @R0,A
005B 04             442                 INC     A
005C 08             443                 INC     R0
005D C8             444                 XCH     A,R0
005E B503F8         445                 CJNE    A,AR3,NOTHERE_RAM
                    446     ;**READ 255 DATA PATTERN
0061 A802           447                 MOV     R0,AR2
0063 7901           448                 MOV     R1,#1
                    449     RDNXT_RAM:
```

```
0065 E6          450         MOV     A,@R0
0066 B5010B      451         CJNE    A,AR1,RAM_ERR
0069 09          452         INC     R1
006A 08          453         INC     R0
006B E8          454         MOV     A,R0
006C B503F6      455         CJNE    A,AR3,RDNXT_RAM
006F 75F000      456         MOV     STATUS,#0
0072 8005        457         SJMP    ROMTST
                 458    RAM_ERR:
0074 75F000      459         MOV     STATUS,#0
0077 D2F1        460         SETB    RAM_FAIL        ;MARK ANY FAILURE
                 461    ;                  ROM CHECKSUM DIAGNOSTIC
                 462    ;  THE ROUTINE ADDS ALL ROM LOCATIONS AND EXPECTS THE RESULT TO BE 0
                 463    ;
                 464    ;THE FIRST TIME THIS CODE IS LOADED INTO THE EMULATOR BYTE ROMCK=0
                 465    ;THIS MUST BE SET TO THE PROPER VALUE AS FOLLOWS
                 466    ; 1. BURN A PROM WITH THE RAW CODE
                 467    ; 2. RUN THE EMULATOR SET FOR EXTERNAL CODE MEMORY
                 468    ; 3. SET A BREAKPOINT AT .DEFAULT_CXRAM
                 469    ; 4. EXECUTE G F 0
                 470    ; 5. WHEN THE BREAKPOINT TRIGGERS EXANIME THE R0
                 471    ; 6. STORE THE VALUE OF R0 AT CODE BYTE .ROMCK
                 472    ; 7. PUT THAT VALUE IN THE SOURCE CODE AT ROMCK AND REASSEMBLE
                 473    ; 8. BURN A PROM USING THE NEW VALUE AND ERASE THE OTHER PROM
                 474
                 475
                 476    ROMTST:
                 477    ;CLEAR THE RAM FIRST!!!!!!
0079 A802        478         MOV     R0,AR2
                 479    ;**TEST FOR 0
007B 7400        480         MOV     A,#00
007D 8001        481         SJMP    START01_RAM
                 482    CLRNXT1_RAM:
007F C8          483         XCH     A,R0
                 484    START01_RAM:
0080 B8F002      485         CJNE    R0,#STATUS,NO_SKIP
0083 8001        486         SJMP    STAT_SKIP
                 487    NO_SKIP:
0085 F6          488         MOV     @R0,A
                 489    STAT_SKIP:
0086 08          490         INC     R0
0087 C8          491         XCH     A,R0
0088 B503F4      492         CJNE    A,AR3,CLRNXT1_RAM
                 493    ;NOW TEST THE ROM
008B 900000      494         MOV     DPTR,#0
008E 7800        495         MOV     R0,#0
                 496    NXT_ROM:
0090 E583        497         MOV     A,DPH
0092 B40007   F  498         CJNE    A,#HIGH(ROMCK),SUMIT
0095 E582        499         MOV     A,DPL
0097 B40002   F  500         CJNE    A,#LOW(ROMCK),SUMIT
009A 8005        501         SJMP    NOSUMIT
                 502    SUMIT:
009C 7400        503         MOV     A,#0         ;PREPARE FOR CODE BYTE MOVE
009E 93          504         MOVC    A,@A+DPTR
009F 28          505         ADD     A,R0         ;ACCUMULATE CHECKSUM IN R0
00A0 F8          506         MOV     R0,A
                 507    NOSUMIT:
00A1 A3          508         INC     DPTR
00A2 7420        509         MOV     A,#20H       ;THIS IS THE HIGH BYTE OF THE 4K CODE SPACE ADDR+1
00A4 B583E9      510         CJNE    A,DPH,NXT_ROM
00A7 7400        511         MOV     A,#0         ;WE MUST BE THERE SO
00A9 900000   F  512         MOV     DPTR,#ROMCK  ;POINT TO THE CHECKSUM LOCATION
```

```
00AC 93              513           MOVC    A,@A+DPTR    ;AND GET IT FOR COMPARISON
00AD D2F4            514           SETB    ROM_FAIL
00AF B50006          515           CJNE    A,AR0,DEFAULT_CXRAM
00B2 C2F4            516           CLR     ROM_FAIL     ;ON PASS TEST CLEAR THE STATUS
LOC  OBJ             LINE  SOURCE

00B4 020000   F      517           JMP     DEFAULT_CXRAM ;JUMP OVER THE CHECKSUM LOCATION
                     518   ROMCK:
00B7 52              519           DB      052H         ;THIS WILL BE SET TO THE CKSUM OF THE REST OF THE
                     520                                ;CODE ROM BYTES UNDER EMULATOR CONTROL
                     521   ;THIS IS A BASIC XTERNAL CODE RAM EVALUATION TEST
                     522   ;THE PROGRAM FLOW IS: WRITE FIELD ALL 1 AND VERIFY, WRITE THE FIELD ALL 0 AND
                     523   ;VERIFY, WRITE DATA AS FOLLOWS 1,2,3,4...FD,FE,FF,1,2,3 ETC THEN VERIFY. NOTE
                     524   ;THAT THIS IS A 255 BYTE DATA PATTERN.
                     525
                     526   DEFAULT_CXRAM:
00B8 904000          527           MOV     DPTR,#4000H  ;BASE OF RAM
00BB 7400            528           MOV     A,#0
00BD F0              529           MOVX    @DPTR,A      ;WRITE AT BASE LOC
00BE 904800          530           MOV     DPTR,#4800H  ;POINT TO 2ND 2K
00C1 E555            531           MOV     A,55H
00C3 F0              532           MOVX    @DPTR,A      ;WRITE INTO THE 2ND 2K
00C4 904000          533           MOV     DPTR,#4000H  ;TEST BASE OF FIRST 2K
00C7 7400            534           MOV     A,#0
00C9 93              535           MOVC    A,@A+DPTR    ;FETCH THE BYTE
00CA 7848            536           MOV     R3,#48H      ;PREPARE FOR 2K BLOCK
00CC C2F0            537           CLR     RAM_8K
00CE 6004            538           JZ      NOT8K
00D0 7860            539           MOV     R3,#60H      ;SET 8K RAM LENGTH
00D2 D2F0            540           SETB    RAM_8K
                     541   NOT8K:
00D4 7A40            542           MOV     R2,#40H      ;HIGH BYTE OF THE LOWEST CODE RAM ADDRESS
00D6 8A83            543           MOV     DPH,R2
00D8 758200          544           MOV     DPL,#0
                     545   ;**TEST FOR ALL 1
00DB 74FF            546           MOV     A,#-1
00DD 8002            547           SJMP    START1_CXRAM
                     548   NXT1_CXRAM:
00DF C583            549           XCH     A,DPH
                     550   START1_CXRAM:
00E1 F0              551           MOVX    @DPTR,A
00E2 A3              552           INC     DPTR
00E3 C583            553           XCH     A,DPH
00E5 B503F7          554           CJNE    A,AR3,NXT1_CXRAM
00E8 8A83            555           MOV     DPH,R2
                     556   TST1_CXRAM:
00EA E4              557           CLR     A
00EB 93              558           MOVC    A,@A+DPTR
00EC D2F2            559           SETB    CXRAM_FAIL
00EE B4FF53          560           CJNE    A,#-1,DEFAULT_DXRAM
00F1 D2F2            561           SETB    CXRAM_FAIL
00F3 A3              562           INC     DPTR
00F4 E583            563           MOV     A,DPH
00F6 B503F1          564           CJNE    A,AR3,TST1_CXRAM
00F9 8A83            565           MOV     DPH,R2
                     566   ;**TEST FOR 0
00FB 7400            567           MOV     A,#00
00FD 8002            568           SJMP    START0_CXRAM
                     569   CLRNXT_CXRAM:
00FF C583            570           XCH     A,DPH
                     571   START0_CXRAM:
0101 F0              572           MOVX    @DPTR,A
0102 A3              573           INC     DPTR
```

```
0103 C583              574            XCH      A,DPH
0105 B503F7            575            CJNE     A,AR3,CLRNXT_CXRAM
0108 8A83              576            MOV      DPH,R2
                       577    TST0_CXRAM:
010A E4                578            CLR      A
010B 93                579            MOVC     A,@A+DPTR
010C D2F2              580            SETB     CXRAM_FAIL
010E 7034              581            JNZ      DEFAULT_DXRAM
0110 C2F2              582            CLR      CXRAM_FAIL
0112 A3                583            INC      DPTR
0113 E583              584            MOV      A,DPH
0115 B503F2            585            CJNE     A,AR3,TST0_CXRAM
0118 8A83              586            MOV      DPH,R2
                       587    ;**WRITE  255 DATA PATTERN
011A 7401              588            MOV      A,#1
011C 8002              589            SJMP     WRITENXT_CXRAM
                       590    NOTHERE_CXRAM:
011E C583              591            XCH      A,DPH
                       592    WRITENXT_CXRAM:
0120 F0                593            MOVX     @DPTR,A
                       594    Z1_CXRAM:
0121 04                595            INC      A
0122 60FD              596            JZ       Z1_CXRAM
0124 A3                597            INC      DPTR
0125 C583              598            XCH      A,DPH
0127 B503F4            599            CJNE     A,AR3,NOTHERE_CXRAM
                       600    ;**READ 255 DATA PATTERN
012A 8A83              601            MOV      DPH,R2
012C 7901              602            MOV      R1,#1
012E 8000              603            SJMP     RDNXT_CXRAM
                       604    RDNXT_CXRAM:
0130 E4                605            CLR      A
0131 93                606            MOVC     A,@A+DPTR
0132 D2F2              607            SETB     CXRAM_FAIL
0134 B5010D            608            CJNE     A,AR1,DEFAULT_DXRAM
0137 C2F2              609            CLR      CXRAM_FAIL
0139 09                610            INC      R1
013A B90001            611            CJNE     R1,#0,NOTZERO_CXRAM
013D 09                612            INC      R1
                       613    NOTZERO_CXRAM:
013E A3                614            INC      DPTR
013F E583              615            MOV      A,DPH
0141 B503EC            616            CJNE     A,AR3,RDNXT_CXRAM
                       617    DEFAULT_DXRAM:
0144 E5F0              618            MOV      A,B                   ;GET PARITY FLAGS
0146 A2E0              619            MOV      C,ACC.0               ;SAVE XRAM SIZE
0148 9215              620            MOV      XRAM_8K,C
014A D2E0              621            SETB     INI_PWR               ;SET POWER FAILED INITILIZATION
014C C0E0              622            PUSH     ACC
014E 900000     F      623    XSET:   MOV      DPTR,#(XRAM+02000H-1) ;SET UP TO CLEAR RAM
0151 7820              624            MOV      R0,#HIGH(02000H)
0153 E4                625    CL_RAM: CLR      A                     ;CLEAR XRAM
0154 F0                626    XRAMCL: MOVX     @DPTR,A
0155 D582FC            627            DJNZ     DPL,XRAMCL
0158 1583              628            DEC      DPH
015A D8F8              629            DJNZ     R0,XRAMCL
015C F0                630            MOVX     @DPTR,A
015D D0E0              631            POP      ACC                   ;SAVE DIAGNOSTIC BYTE 1
015F 900000     F      632            MOV      DPTR,#(XDB_0+XDIAG_FLAG1)
0162 F0                633            MOVX     @DPTR,A
0163 900000     F      634            MOV      DPTR,#(XDB_1+XDIAG_FLAG1)
0166 F0                635            MOVX     @DPTR,A
0167 900000     F      636            MOV      DPTR,#(XDB_2+XDIAG_FLAG1)
```

```
016A F0              637            MOVX    @DPTR,A
016B 900000    F     638            MOV     DPTR,#(XDB_3+XDIAG_FLAG1)
016E F0              639            MOVX    @DPTR,A
016F 75A000    F     640            MOV     P2,#HIGH(VECTOR_START)   ;LOAD RAM VECTORS
0172 7800      F     641            MOV     POINTER,#LOW(VECTOR_START)
0174 900000    F     642            MOV     DPTR,#VECT_CODE
0177 7400      F     643            MOV     A,#LOW(VECT_CODE_END)
0179 C3              644            CLR     C
017A 9400      F     645            SUBB    A,#LOW(VECT_CODE)
017C F502            646            MOV     GENR2,A                  ;LOAD VECTOR BLOCK LENGTH
017E E4              647    VECTLD: CLR     A
017F 93              648            MOVC    A,@A+DPTR
0180 A3              649            INC     DPTR
0181 F2              650            MOVX    @POINTER,A               ;STORE CODE IN XRAM
0182 08              651            INC     POINTER
0183 D502F8          652            DJNZ    GENR2,VECTLD
0186 750204          653            MOV     GENR2,#4                 ;STORE DEFAULT INITIALIZATION VALUES
0189 900000    F     654            MOV     DPTR,#XDB_0
018C 75A000    F     655            MOV     P2,#HIGH(XDB_0)
018F E582            656    THRLD:  MOV     A,DPL
0191 240E            657            ADD     A,#XAR_RETRY_THRESH
0193 F8              658            MOV     POINTER,A
0194 74F0            659            MOV     A,#0F0H                  ;SET THRESHOLDS TO VERY HIGH VALUE
0196 F2              660            MOVX    @POINTER,A
0197 E582            661            MOV     A,DPL
0199 241A            662            ADD     A,#XOFHK_IDLE_THRESH
019B F8              663            MOV     POINTER,A
019C 74F0            664            MOV     A,#0F0H
019E F2              665            MOVX    @POINTER,A
019F E582            666            MOV     A,DPL
01A1 241B            667            ADD     A,#XOFHK_CALL_THRESH
01A3 F8              668            MOV     POINTER,A
01A4 74F0            669            MOV     A,#0F0H
01A6 F2              670            MOVX    @POINTER,A
01A7 E582            671            MOV     A,DPL                    ;POINT TO NEXT PHONE BUFFER
01A9 2440            672            ADD     A,#X_BUF_SIZE
01AB F582            673            MOV     DPL,A
01AD D502DF          674            DJNZ    GENR2,THRLD
01B0 750204          675            MOV     GENR2,#4                 ;GENERATE PHONE BUFFER PARITY ON A
                     676                                             ;PER PHONE BASIS
01B3 75A000    F     677            MOV     P2,#HIGH(XDB_0+XPAR)     ;LOAD XDB ADR VECTOR
01B6 7800      F     678            MOV     POINTER,#LOW(XDB_0+XPAR)
01B8 900000    F     679            MOV     DPTR,#XDB_0              ;POINT TO PHONE BUFFER 0
01BB 750A00          680    NXT_PH: MOV     PAR,#0                   ;CLEAR PARITY BYTE
01BE 750340          681            MOV     GENR3,#X_BUF_SIZE        ;SET UP THE BUFFER LENGTH
01C1 E4              682    PH_PAR: CLR     A
01C2 93              683            MOVC    A,@A+DPTR
01C3 650A            684            XRL     A,PAR
01C5 F50A            685            MOV     PAR,A
01C7 A3              686            INC     DPTR
01C8 D503F6          687            DJNZ    GENR3,PH_PAR
01CB E50A            688            MOV     A,PAR
01CD F2              689            MOVX    @POINTER,A
01CE E8              690            MOV     A,POINTER                ;POINT TO NEXT PARITY BYTE
01CF 2440            691            ADD     A,#X_BUF_SIZE
01D1 F8              692            MOV     POINTER,A
01D2 D502E6          693            DJNZ    GENR2,NXT_PH
01D5 750A00          694            MOV     PAR,#0                   ;GET PARITY OF REST OF MEMORY
01D8 900000    F     695            MOV     DPTR,#XRAM               ;POINT TO START OF EXTERNAL RAM
01DB 750200          696            MOV     GENR2,#LOW(0800H)        ;LOAD RAM BLOCK SIZE
01DE 750308          697            MOV     GENR3,#HIGH(0800H)
01E1 301503          698            JNB     XRAM_8K,XRAMPR           ;IF 8K RAM SET GENR3 TO 02000H
01E4 750320          699            MOV     GENR3,#HIGH(02000H)
```

```
01E7 E4           700      XRAMPR: CLR    A
01E8 93           701              MOVC   A,@A+DPTR
01E9 650A         702              XRL    A,PAR
01EB F50A         703              MOV    PAR,A
01ED A3           704              INC    DPTR
01EE D502F6       705              DJNZ   GENR2,XRAMPR
01F1 D503F3       706              DJNZ   GENR3,XRAMPR
01F4 900000  F    707              MOV    DPTR,#XRAM_PAR
01F7 F4           708              CPL    A
01F8 F0           709              MOVX   @DPTR,A
01F9 7440         710              MOV    A,#MINDIALCT       ;INITIALIZE ANSITORY FILTER REGISTERS
01FB F506         711              MOV    DIALCT_0,A
01FD F50E         712              MOV    DIALCT_1,A
01FF F516         713              MOV    DIALCT_2,A
0201 F51E         714              MOV    DIALCT_3,A
0203 7476         715              MOV    A,#MINHUMCT
0205 F505         716              MOV    HUMCT_0,A
0207 F50D         717              MOV    HUMCT_1,A
0209 F515         718              MOV    HUMCT_2,A
020B F51D         719              MOV    HUMCT_3,A
020D 7476         720              MOV    A,#MINRINGCT
020F F504         721              MOV    RINGCT_0,A
0211 F50C         722              MOV    RINGCT_1,A
0213 F514         723              MOV    RINGCT_2,A
0215 F51C         724              MOV    RINGCT_3,A
0217 751000  F    725              MOV    HIT_TABLEL,#LOW(ROM_HIT_TABLE)   ;LOAD HIT TABLE VECTOR
021A 751100  F    726              MOV    HIT_TABLEH,#HIGH(ROM_HIT_TABLE)
021D 758923       727              MOV    TMOD,#23H          ;LOAD TIMER MODE REGISTER WITH
                  728                                        ;TIMER 0 MODE 3, TIMER 1 MODE 2
0220 758DFE       729              MOV    TH1,#-UART_CLOCK_RATE ;LOAD BAUD RATE
                  730      ;       MOV    PCON,#080H         ;SET UART TO DIV BY 16 MODE
0223 7598F0       731              MOV    SCON,#0F0H         ;UART MODE 3- 9 BIT CLOCK RATE
                  732                                        ; DETERMINED BY TIMER1, RECIEVE ONLY
                  733                                        ; ON RB8=1, ENABLE FOR RECEPTION
0226 792F         734              MOV    COMPTR,#COMBUF     ;INITIALIZE COMMUNICATIONS POINTER
0228 758808       735              MOV    IP,#08H            ;SET INTERRPUT PRIORITIES
                  736                                        ;SIGNAL DET TIMER=HI PRI, UART=LO PRI
022B 758850       737              MOV    TCON,#50H          ;SET TIMER CONTROL FOR TIMER1 RUN AND
                  738                                        ; TIMER 0 RUN
022E 758C02       739              MOV    TH0,#02H           ;START SIG DET TIMER AT 2 FOR INITIAL
0231 C29F         740              CLR    TF1
                  741      GET_SLOT:
0233 75A0F7       742              MOV    P2,#0F7H           ;RE-INITIALIZE PORT 2
                  743                                        ;SAVE 4 BIT SLOT ADDRESS
0236 E4           744              CLR    A
0237 A2B2         745              MOV    C,SLOTBIT0
0239 92E0         746              MOV    ACC.0,C
023B A2B4         747              MOV    C,SLOTBIT1
023D 92E1         748              MOV    ACC.1,C
023F A2B5         749              MOV    C,SLOTBIT2
0241 92E2         750              MOV    ACC.2,C
0243 020000  F    751              LJMP   GET3+02000H        ;SET ADDRESS BIT 13 SO THAT IT CAN BE
                  752                                        ;SAMPLED
0246 A2A5         753      GET3:   MOV    C,SLOTBIT3
0248 92E3         754              MOV    ACC.3,C
024A F509         755              MOV    SLOTAD,A
024C 75A898       756              MOV    IE,#098H           ;ENABLE INTERRUPTS- IE,TIMER 1,UART
024F 020000  F    757              LJMP   SCHED_RTN
                  758              END
```

REGISTER BANK(S) USED: 0, TARGET MACHINE(S): 8051

ASSEMBLY COMPLETE, NO ERRORS FOUND

```
ISIS-II MCS-51 MACRO ASSEMBLER V2.0
OBJECT MODULE PLACED IN :F0:SIGDET.OBJ
ASSEMBLER INVOKED BY:  ASM51 SIGDET.F16 NOSYMBOLS

LOC  OBJ          LINE    SOURCE

1     $TITLE (SIGNALING TONE DETECTOR)
                    2     ;*********************************************************************
                    3     ;*                                                                   **
                    4     ;*   PROC NAME :  SIGNALING TONE DETECTOR                            **
                    5     ;*                                                                   **
                    6     ;*                                                                   **
                    7     ;*                                                                   **
                    8     ;*                                                                   **
                    9     ;*                                                                   **
                   10     ;*   DURATION :  TYPICAL- 62 CYCLES / MAXIMUM - 144 CYCLES           **
                   11     ;*                                                                   **
                   12     ;*********************************************************************
                   13 +1  $NOLIST
                   64 +1  $INCLUDE (DEFINE.TXT)
            =1     65 +1  $NOLIST
                  422     PUBLIC  SIGDET,ROM_HIT_TABLE
                  423     CSIGDET SEGMENT         CODE
       ----       424             RSEG            CSIGDET
                  425 +1  $INCLUDE (TMCOMP.B17)
            =1    426 +1  $NOLIST
                  484     SIGDET:
                  485     ;
0000 C0E0         486             PUSH    ACC             ; SAVE THE ACCUMULATOR
0002 C0D0         487             PUSH    PSW             ; AND THE PROGRAM STATUS WORD
0004 C082         488             PUSH    DPL             ; SAVE DPTR
0006 C083         489             PUSH    DPH
                  490     ;
0008 052A         491     CONT:   INC     TFF             ; INCREMENT THE FAST CLOCK
                  492     NOSLOW:
                  493     ;
                  494     ;
                  495     ;*********************************************************************
                  496     ;*                                                                   **
                  497     ;*      CHECK FOR ANY CHANGE IN THE CURRENT LINE PAIR                **
                  498     ;*                                                                   **
                  499     ;*********************************************************************
                  500     ;
000A E590         501             MOV     A,LINES         ; GET THE CURRENT CHANNEL LINES
000C C508         502             XCH     A,LINESH        ; SAVE CURRENT AND GET OLD LINES
000E F4           503             CPL     A               ; COMPLEMENT OLD LINES VALUE
000F 4508         504             ORL     A,LINESH        ; OR WITH CURRENT VALUE TO GET NEG EDGE MARKS
0011 F520         505             MOV     EDGE,A          ; SAVE NEGATIVE EDGE MARKS
                  506     EDGE0:
0013 75D000       507             MOV     PSW,#0          ; POINT TO REGISTER BANK 0 FOR CH 0 VALUES
0016 30020E       508             JNB     EDGE_0,TIM0     ; IF -EDGE ON CH0 .. TIME IT
                  509                                     ; INC COUNT IF NOT MAX ALREADY
                  510     ;
0019 BF9707       511             CJNE    COUNT0,#CTMAX,INCCT0
                  512     ;
001C 1F           513             DEC     COUNT0          ; DEC TO NULL INC
001D E520         514             MOV     A,EDGE          ; SAVE EDGE
                  515                                     ; FORCE LINESH_I TO TOGGLE TO TRIGGER PROCESS
                  516                                     ; ON NEXT PASS
001F B202         517             CPL     EDGE_0
0021 F520         518             MOV     EDGE,A
                  519     INCCT0:
```

```
0023 0F           520              INC    COUNT0           ; ADD ANOTHER .5MS CLICK FOR CH0
0024 020000  F    521              LJMP   EDGE1            ; LOOK FOR EDGE ON NEXT CHANNEL
                  522       TIM0:
                  523 +1
0027 E4           524 +1           CLR    A                ; GET PERIOD COUNT FOR THIS TONE
0028 CF           525 +2           XCH    A,COUNT0         ; CLEAR THE PERIOD COUNT FOR THIS CH
                  526 +1  ;
0029 851082       527 +1           MOV    DPL,HIT_TABLEL   ; POINT TO HIT TABLE
002C 851183       528 +1           MOV    DPH,HIT_TABLEH
002F 93           529 +1           MOVC   A,@A+DPTR        ; GET POINTER TO POSSIBLE HIT
0030 900000  F    530 +2           MOV    DPTR,#NOHIT00    ; USE NOHIT AS BASE ADDRESS
0033 73           531 +1           JMP    @A+DPTR          ; GO TO THE SELECTED HIT ROUTINE
                  532 +1  ;
                  533 +1  ;************************************************************************
                  534 +1  ;*                                                                      **
                  535 +1  ;*     MARK ALL TONES AS LESS LIKELY SINCE NO HITS WERE FOUND           **
                  536 +1  ;*                                                                      **
                  537 +1  ;************************************************************************
                  538 +1  ;
                  539 +2  NOHIT00:
                  540 +2
                  541 +2                                   ; GET THE COUNT FOR THIS CH
                  542 +2                                   ; DONT DEC IF AT MINIMUM
                  543 +2  ;
0034 BC7601       544 +3           CJNE   RINGCT0,#MINRINGCT,DECIT04
                  545 +2  ;
0037 0C           546 +3           INC    RINGCT0          ; INC SO DEC IS NULLED
                  547 +3  DECIT04:
0038 1C           548 +3           DEC    RINGCT0          ; DECREMENT THE COUNT
                  549 +2                                   ; MARK RING AS LESS LIKELY FOR THIS CH
                  550 +2
                  551 +2                                   ; GET THE COUNT FOR THIS CH
                  552 +2                                   ; DONT DEC IF AT MINIMUM
                  553 +2  ;
0039 BD7601       554 +3           CJNE   HUMCT0,#MINHUMCT,DECIT05
                  555 +2  ;
003C 0D           556 +3           INC    HUMCT0           ; INC SO DEC IS NULLED
                  557 +3  DECIT05:
003D 1D           558 +3           DEC    HUMCT0           ; DECREMENT THE COUNT
                  559 +2                                   ; MARK HUM AS LESS LIKELY FOR THIS CH
                  560 +2
                  561 +2                                   ; GET THE COUNT FOR THIS CH
                  562 +2                                   ; DONT DEC IF AT MINIMUM
                  563 +2  ;
003E BE4001       564 +3           CJNE   DIALCT0,#MINDIALCT,DECIT06
                  565 +2  ;
0041 0E           566 +3           INC    DIALCT0          ; INC SO DEC IS NULLED
                  567 +3  DECIT06:
0042 1E           568 +3           DEC    DIALCT0          ; DECREMENT THE COUNT
                  569 +2                                   ; MARK DIAL AS LESS LIKELY FOR THIS CH
                  570 +1                                   ; LOOK AT NEXT EDGE
                  571 +1  ;
0043 020000  F    572 +2           LJMP   EDGE1+(EDGE1-EDGE0)*(0)
                  573 +1  ;
                  574 +1  ;************************************************************************
                  575 +1  ;*                                                                      **
                  576 +1  ;*     MARK DIAL TONE AS BEING MORE LIKELY AND OTHERS AS LESS LIKELY    **
                  577 +1  ;*                                                                      **
                  578 +1  ;************************************************************************
                  579 +1  ;
                  580 +2  DIALHIT01:
                  581 +2
                  582 +2                                   ; GET THE COUNT FOR THIS CH
```

```
                    583 +2                                      ; DONT INC IF AT MAXIMUM
                    584 +2 ;
0046 BE9801         585 +3          CJNE    DIALCTO,#MAXDIALCT,INCIT07
                    586 +2 ;
0049 1E             587 +3          DEC     DIALCTO             ; DEC TO NULL INC
                    588 +3 INCIT07:
004A 0E             589 +3          INC     DIALCTO             ; INCREMENT THE COUNT
                    590 +2                                      ; MARK DIAL AS MORE LIKELY
                    591 +2
                    592 +2                                      ; GET THE COUNT FOR THIS CH
                    593 +2                                      ; DONT DEC IF AT MINIMUM
                    594 +2 ;
004B BD7601         595 +3          CJNE    HUMCTO,#MINHUMCT,DECIT08
                    596 +2 ;
004E 0D             597 +3          INC     HUMCTO              ; INC SO DEC IS NULLED
                    598 +3 DECIT08:
004F 1D             599 +3          DEC     HUMCTO              ; DECREMENT THE COUNT
                    600 +2                                      ; MARK HUM AS LESS LIKELY
                    601 +2
                    602 +2                                      ; GET THE COUNT FOR THIS CH
                    603 +2                                      ; DONT DEC IF AT MINIMUM
                    604 +2 ;
0050 BC7601         605 +3          CJNE    RINGCTO,#MINRINGCT,DECIT09
                    606 +2 ;
0053 0C             607 +3          INC     RINGCTO             ; INC SO DEC IS NULLED
                    608 +3 DECIT09:
0054 1C             609 +3          DEC     RINGCTO             ; DECREMENT THE COUNT
                    610 +2                                      ; MARK RING AS LESS LIKELY
                    611 +1                                      ; LOOK AT NEXT EDGE
                    612 +1 ;
0055 020000   F     613 +2          LJMP    EDGE1+(EDGE1-EDGE0)*(0)
                    614 +1 ;
                    615 +1 ;************************************************************
                    616 +1 ;*                                                          **
                    617 +1 ;*    MARK HUM  AS BEING MORE LIKELY AND OTHERS AS LESS LIKELY  **
                    618 +1 ;*                                                          **
                    619 +1 ;************************************************************
                    620 +1 ;
                    621 +2 HUMHIT02:
                    622 +2
                    623 +2                                      ; GET THE COUNT FOR THIS CH
                    624 +2                                      ; DONT INC IF AT MAXIMUM
                    625 +2 ;
0058 BD8A01         626 +3          CJNE    HUMCTO,#MAXHUMCT,INCIT0A
                    627 +2 ;
0059 1D             628 +3          DEC     HUMCTO              ; DEC TO NULL INC
                    629 +3 INCIT0A:
005C 0D             630 +3          INC     HUMCTO              ; INCREMENT THE COUNT
                    631 +2                                      ; MARK HUM AS MORE LIKELY
                    632 +2
                    633 +2                                      ; GET THE COUNT FOR THIS CH
                    634 +2                                      ; DONT DEC IF AT MINIMUM
                    635 +2 ;
005D BE4001         636 +3          CJNE    DIALCTO,#MINDIALCT,DECIT0B
                    637 +2 ;
0060 0E             638 +3          INC     DIALCTO             ; INC SO DEC IS NULLED
                    639 +3 DECIT0B:
0061 1E             640 +3          DEC     DIALCTO             ; DECREMENT THE COUNT
                    641 +2                                      ; MARK DIAL AS LESS LIKELY
                    642 +2
                    643 +2                                      ; GET THE COUNT FOR THIS CH
                    644 +2                                      ; DONT DEC IF AT MINIMUM
                    645 +2 ;
```

```
0062 BC7601        646 +3        CJNE    RINGCTO,#MINRINGCT,DECITOC
                   647 +2  ;
0065 0C            648 +3        INC     RINGCTO              ; INC SO DEC IS NULLED
                   649 +3 DECITOC:
0066 1C            650 +3        DEC     RINGCTO              ; DECREMENT THE COUNT
                   651 +2                                     ; MARK RING AS LESS LIKELY
                   652 +1                                     ; LOOK AT NEXT EDGE
                   653 +1  ;
0067 020000    F   654 +2        LJMP    EDGE1+(EDGE1-EDGE0)*(0)
                   655 +1  ;
                   656 +1  ;****************************************************************
                   657 +1  ;*                                                              **
                   658 +1  ;*    MARK RING TONE AS BEING MORE LIKELY AND OTHERS AS LESS LIKELY  **
                   659 +1  ;*                                                              **
                   660 +1  ;****************************************************************
                   661 +1  ;
                   662 +2 RINGHIT03:
                   663 +2
                   664 +2                                     ; GET THE COUNT FOR THIS CH
                   665 +2                                     ; DONT INC IF AT MAXIMUM
                   666 +2  ;
006A BC8A01        667 +3        CJNE    RINGCTO,#MAXRINGCT,INCITOD
                   668 +2  ;
006D 1C            669 +3        DEC     RINGCTO              ; DEC TO NULL INC
                   670 +3 INCITOD:
006E 0C            671 +3        INC     RINGCTO              ; INCREMENT THE COUNT
                   672 +2                                     ; MARK RING AS MORE LIKELY
                   673 +2
                   674 +2                                     ; GET THE COUNT FOR THIS CH
                   675 +2                                     ; DONT DEC IF AT MINIMUM
                   676 +2  ;
006F BD7601        677 +3        CJNE    HUMCTO,#MINHUMCT,DECITOE
                   678 +2  ;
0072 0D            679 +3        INC     HUMCTO               ; INC SO DEC IS NULLED
                   680 +3 DECITOE:
0073 1D            681 +3        DEC     HUMCTO               ; DECREMENT THE COUNT
                   682 +2                                     ; MARK HUM AS LESS LIKELY
                   683 +2
                   684 +2                                     ; GET THE COUNT FOR THIS CH
                   685 +2                                     ; DONT DEC IF AT MINIMUM
                   686 +2  ;
0074 BE4001        687 +3        CJNE    DIALCTO,#MINDIALCT,DECITOF
                   688 +2  ;
0077 0E            689 +3        INC     DIALCTO              ; INC SO DEC IS NULLED
                   690 +3 DECITOF:
0078 1E            691 +3        DEC     DIALCTO              ; DECREMENT THE COUNT
                   692 +2                                     ; MARK DIAL AS LESS LIKELY
                   693 +1                                     ; LOOK AT NEXT EDGE
                   694 +1  ;
0079 020000    F   695 +2        LJMP    EDGE1+(EDGE1-EDGE0)*(0)
                   696 +1  ;
                   697 +1                                     ; DO TIME COMPARISON PHONE 0
                   698 +1  $NOGEN
                   699     EDGE1:
007C 75D008        700             MOV     PSW,#08H           ; POINT TO REGISTER BANK 1 FOR CH1 VALUES
007F 30040E        701             JNB     EDGE_1,TIM1        ; IF -EDGE ON CH1 .. TIME IT
                   702                                        ; INC COUNT IF NOT MAX ALREADY
                   703     ;
0082 BF9707        704             CJNE    COUNT1,#CTMAX,INCCT1
                   705     ;-
0085 1F            706             DEC     COUNT1             ; DEC TO NULL INC
0086 E520          707             MOV     A,EDGE             ; SAVE EDGE
0088 B204          708             CPL     EDGE_1
```

```
008A F520        709            MOV     EDGE,A
                 710    INCCT1:
008C 0F          711            INC     COUNT1          ; ADD ANOTHER .5MS CLICK FOR CH1
008D 020000  F   712            LJMP    EDGE2           ; LOOK FOR EDGE ON NEXT CHANNEL
                 713    TIM1:
                 714            %TIMECOMP(1)            ; DO TIME COMPARISON FOR PHONE 1
                 889    EDGE2:
00E5 75D010      890            MOV     PSW,#10H        ; POINT TO REGISTER BANK 2 FOR CH2 VALUES
00E8 30000E      891            JNB     EDGE_2,TIM2     ; IF -EDGE ON CH2 .. TIME IT
                 892                                    ; INC COUNT IF NOT MAX ALREADY
                 893    ;
00EB BF9707      894            CJNE    COUNT2,#CTMAX,INCCT2
                 895    ;
00EE 1F          896            DEC     COUNT2          ; DEC TO NULL INC
00EF E520        897            MOV     A,EDGE          ; SAVE EDGE
00F1 B200        898            CPL     EDGE_2
00F3 F520        899            MOV     EDGE,A
                 900    INCCT2:
00F5 0F          901            INC     COUNT2          ; ADD ANOTHER .5MS CLICK FOR CH2
00F6 020000  F   902            LJMP    EDGE3           ; LOOK FOR EDGE ON NEXT CHANNEL
                 903    TIM2:
                 904            %TIMECOMP(2)            ; DO TIME COMPARISON FOR PHONE 2
                 1079   EDGE3:
014E 75D018      1080           MOV     PSW,#18H        ; POINT TO REGISTER BANK 3 FOR CH3 VALUES
0151 30060E      1081           JNB     EDGE_3,TIM3     ; IF -EDGE ON CH3 .. TIME IT
                 1082                                   ; INC COUNT IF NOT MAX ALREADY
                 1083   ;
0154 BF9707      1084           CJNE    COUNT3,#CTMAX,INCCT3
                 1085   ;
0157 1F          1086           DEC     COUNT3          ; DEC TO NULL INC
0158 E520        1087           MOV     A,EDGE          ; SAVE EDGE
015A B206        1088           CPL     EDGE_3
015C F520        1089           MOV     EDGE,A
                 1090   INCCT3:
015E 0F          1091           INC     COUNT3          ; ADD ANOTHER .5MS CLICK FOR CH3
015F 020000  F   1092           LJMP    EDGE4           ; LOOK FOR EDGE ON NEXT CHANNEL
                 1093   TIM3:
                 1094           %TIMECOMP(3)            ; DO TIME COMPARISON FOR PHONE 3
                 1269   ;
                 1270   EDGE4:                          ; THERE IS NO 5TH EDGE.. WE'RE DONE
01B7 D083        1271           POP     DPH             ; RESTORE DPTR
01B9 D082        1272           POP     DPL
01BB D0D0        1273           POP     PSW             ; RESTORE PSW AND ACCUMULATOR
01BD D0E0        1274           POP     ACC
                 1275   ;
01BF 32          1276           RETI                    ; RETURN FROM INTERRUPT
                 1277   ;
                 1278   ;
                 1279   ;************************************************************
                 1280   ;*                                                          **
                 1281   ;*     L O O K U P   T A B L E   F O R   T O N E   H I T S **
                 1282   ;*                                                          **
                 1283   ;************************************************************
                 1284   ;
                 1285   ROM_HIT_TABLE:                  ; TABLE ENTRIES ARE OFFSETS TO THE CORRECT
                 1286                                   ; HIT ROUTINE FOR THE PERIOD USED TO ACCES
                 1287                                   ; THE TABLE.
                 1288   ;
                 1289                                   ; DIAL TONE- 326 TO 471 HZ
                 1290                                   ; HUM- 58.1 TO 61.45 HZ
                 1291                                   ; RING- 14.0 TO 22.2 HZ
                 1292                           ; ALGORITHM TO DETERMINE FREQUENCY CENTER IS
                 1293                           ; CLICKS= (2120.3/FREQ) -1
```

```
                1294            ; PASS BAND PER CLICK COUNT WILL BE
                1295            ; LOW FREQ CUT-OFF= 2120.3/(CLICKS+1.5)
                1296            ; HIGH FREQ CUT-OFF= 2120.3/(CLICKS+0.5)
                1297    ;
                1298    ;
01C0 00         1299            DB      NOHIT00-NOHIT00 ; 000 CLICKS ... NO HIT
01C1 00         1300            DB      NOHIT00-NOHIT00 ; 001 CLICKS ... TOUCH TONE DETECTOR
01C2 00         1301            DB      NOHIT00-NOHIT00 ; 002 CLICKS ... TOUCH TONE DETECTOR
01C3 00         1302            DB      NOHIT00-NOHIT00 ; 003 CLICKS ... NO HIT
                1303    ;
                1304    ;****************************************************************
                1305    ;*                                                              **
                1306    ;*      DIAL DETECT ( 326.2 TO 471.2 HZ )                       **
                1307    ;*                                                              **
                1308    ;****************************************************************
                1309    ;
01C4 12         1310            DB      DIALHIT01-NOHIT00       ; 004 CLICKS ... DIAL HIT
01C5 12         1311            DB      DIALHIT01-NOHIT00       ; 005 CLICKS ... DIAL HIT
                1312    ;
01C6 00         1313            DB      NOHIT00-NOHIT00 ; 006 CLICKS ... NO HIT
                1314    $NOLIST
01E1 00         1342            DB      NOHIT00-NOHIT00 ; 033 CLICKS ... NO HIT
                1343    ;****************************************************************
                1344    ;*                                                              *
                1345    ;*      HUM DETECTOR (58.09 TO 61.45 HZ )                       *
                1346    ;*                                                              *
                1347    ;****************************************************************
01E2 24         1348            DB      HUMHIT02-NOHIT00 ; 034 CLICKS ... 60 HZ DETECTOR
01E3 24         1349            DB      HUMHIT02-NOHIT00 ; 035 CLICKS ... 60 HZ DETECTOR
01E4 00         1350            DB      NOHIT00-NOHIT00 ; 036 CLICKS ... NO HIT
01E5 00         1351            DB      NOHIT00-NOHIT00 ; 037 CLICKS ... NO HIT
                1352    $NOLIST
0214 00         1400            DB      NOHIT00-NOHIT00 ; 084 CLICKS ... RING HIT
0215 36         1401            DB      RINGHIT03-NOHIT00       ; 085 CLICKS ... RING HIT
                1402    ;****************************************************************
                1403    ;*                                                              **
                1404    ;*      RING FREQUENCIES BETWEEN 14.0 AND 24.80 HZ              **
                1405    ;*                                                              **
                1406    ;****************************************************************
                1407    ;
0216 36         1408            DB      RINGHIT03-NOHIT00       ; 086 CLICKS ... RING HIT
0217 36         1409            DB      RINGHIT03-NOHIT00       ; 087 CLICKS ... RING HIT
                1410    $NOLIST
0256 36         1474            DB      RINGHIT03-NOHIT00       ; 150 CLICKS ... RING HIT
0257 00         1475            DB      NOHIT00-NOHIT00         ; >=151 CLICKS  ASSUME LOW FREQUENCY
                1476                                            ;  AND DECREMENT RING, HUM AND DIAL
                1477            END

REGISTER BANK(S) USED: 0, TARGET MACHINE(S): 8051

ASSEMBLY COMPLETE, NO ERRORS FOUND
ISIS-II MCS-51 MACRO ASSEMBLER V2.0
OBJECT MODULE PLACED IN :F0:SCHED.OBJ
ASSEMBLER INVOKED BY: ASM51 SCHED.F16 NOSYMBOLS DEBUG

LOC  OBJ        LINE    SOURCE

1       NAME    TASK_SCHEDULER
                2       ;THIS SCHEDULER OMMITS OFF HOOK AND FAULT MONITOR
                3       ;****************************************************************
                4       ;
                5       ; REAL TIME TASK SCHEDULING
```

```
  6  ;
  7  ;    ENTER- TF IN 1.887 MS TICK RESOLUTION
  8  ;           TASK_SOURCE- EACH BIT DEFINED BELOW: 0 FOR ROM, 1 FOR RAM
  9  ;                   RAM_TIMER0
 10  ;                   RAM_SCHED
 11  ;                   RAM_COIN
 12  ;                   RAM_COMM_SCHED
 13  ;                   RAM_COMM_INTR
 14  ;                   RAM_OFFHK
 15  ;                   RAM_ACCREJ
 16  ;                   RAM_UDEF1
 17  ;                   RAM_FAULT
 18  ;                   RAM_WATCHDOG
 19  ;                   RAM_UDEF2
 20  ;                   RAM_SIGDET
 21  ;
 22  ;    RETURN- TASKS ACTIVATED WITH THE FOLLOWING FREQUENCY (1.89 MS
 23  ;            ROUNDED TO 2MS)
 24  ;
 25  ;           PROCESS          FREQUENCY     CYCLES TO JMP (EXCLUDES COIN)
 26  ;
 27  ;           COIN DETECTOR POLL - 2 MS         -
 28  ;           COMMUNICATIONS -     4 MS        30
 29  ;           OFF HOOK -           8 MS        29
 30  ;           ACCEPT/REJECT -     16 MS        32
 31  ;           FAULT MONITOR -     64 MS        38
 32  ;           WATCHDOG TIMER-    128 MS        39
 33  ;
 34  ;*****************************************************************
 35 +1  $INCLUDE(DEFINE.TXT)
 36 +1  $NOLIST
393 +1  $INCLUDE(DFXRAM.TXT)
394     PUBLIC  XRAM,XDB_0,XDB_1,XDB_2,XDB_3,XRAM_PAR,VECT_CODE,VECT_CODE_END
395     PUBLIC  VECTOR_START,XCOM_VECT_TABLE,XCOP
396     PUBLIC  COM_VCT_12,COM_VCT_13,COM_VCT_14,COM_VCT_15,XCOMM_VECT_TABLE
397             CSEG    AT      0800H
398             DB      'LM VERSION 1.00 COPYRIGHT TEL-TECH DEVICES, INC., 1985'
399             CSEG    AT      0FFFH
400             DB      'X'
401     ;++++++++++ INITIALIZATION VECTOR CODE (NOT EXICUTED AT THESE LOCATIONS+++
402     ;++++++++++++++++ THESE VALUES ARE INSTALLED BY INITIALIZE +++++++++++++
403     VECT_CODE:
404     V0:     LJMP    TRET0
405     V1:     LJMP    ROM_SCHED
406     ;V2:    LJMP    ROM_COMM_INT
407     V2:     LJMP    SCHED_RTN
408     ;V3:    LJMP    COMM
409     V3:     LJMP    SCHED_RTN
410     V4:     LJMP    SIGDET
411     V5:     LJMP    COINFL
```

```
1012 020000  F =1  412   V6:   LJMP  OFFHK
1015 020000  F =1  413   V7:   LJMP  ACCREJ
1018 020000  F =1  414   V8:   LJMP  SCHED_RTN
             =1    415   ;V9:  LJMP  FAULT_MON
101B 020000  F =1  416   V9:   LJMP  SCHED_RTN
101E 020000  F =1  417   V10:  LJMP  WATCH1
1021 020000  F =1  418   V11:  LJMP  SCHED_RTN
1024 020000  F =1  419   V12:  LJMP  SCHED_RTN
1027 020000  F =1  420   V13:  LJMP  SCHED_RTN
102A 020000  F =1  421   V14:  LJMP  SCHED_RTN
102D 020000  F =1  422   V15:  LJMP  SCHED_RTN
1030 3D        =1  423   V16:  DB    X_BUF_SIZE-3      ;COMM XRAM DEFINED VECTORS
1031 00        =1  424         DB    0,1,2,3,4,5,6,7
1032 01
1033 02
1034 03
1035 04
1036 05
1037 06
1038 07
1039 08        =1  425         DB    8,9,10,11,12,13,14,15
103A 09
103B 0A
103C 0B
103D 0C
103E 0D
103F 0E
1040 0F
1041 10        =1  426         DB    16,17,18,19,20,21,22,23
1042 11
1043 12
1044 13
1045 14
1046 15
1047 16
1048 17
1049 18        =1  427         DB    24,25,26,27,28,29,30,31
104A 19
104B 1A
104C 1B
104D 1C
104E 1D
104F 1E
1050 1F
1051           =1  428   V17:  DS    X_BUF_SIZE-3      ;COP RESERVED DATA SPACE
               =1  429   ;NOTE- INSERT ADDITIONAL VECTORS HERE
               =1  430   VECT_CODE_END:
               =1  431
               =1  432   ;++++++++++++++++++++++++++++++++++++++++++++++++++++++++++
4000           =1  433   XRAM        EQU   04000H      ;EXTERNAL RAM START ADR
----           =1  434               CSEG  AT XRAM     ;WRITE AS RAM DATA, READ AS CODE
4000           =1  435   XDB_0:      DS    X_BUF_SIZE  ;EXTERNAL RAM DATA BUFFER FOR PHONE 0
4040           =1  436   XDB_1:      DS    X_BUF_SIZE
4080           =1  437   XDB_2:      DS    X_BUF_SIZE
40C0           =1  438   XDB_3:      DS    X_BUF_SIZE
               =1  439   ;
               =1  440   ;******************** XRAM DATA********************
               =1  441                                 ;VECTOR LOCATIONS
               =1  442   VECTOR_START:
4100           =1  443   TMR0_VCT:       DS    V1-V0
4103           =1  444   SCHED_VCT:      DS    V2-V1
4106           =1  445   COMM_INTR_VCT:  DS    V3-V2
4109           =1  446   COMM_SCHED_VCT: DS    V4-V3
```

```
410C    =1  447  TMR1_VCT:       DS    V5-V4
410F    =1  448  COIN_VCT:       DS    V6-V5
4112    =1  449  OFFHK_VCT:      DS    V7-V6
4115    =1  450  ACCREJ_VCT:     DS    V8-V7
4118    =1  451  UDEF1_VCT:      DS    V9-V8
411B    =1  452  FAULT_VCT:      DS    V10-V9
411E    =1  453  WATCHDOG_VCT:   DS    V11-V10
4121    =1  454  UDEF2_VCT:      DS    V12-V11
4124    =1  455  COM_VCT_12:     DS    V13-V12
4127    =1  456  COM_VCT_13:     DS    V14-V13
412A    =1  457  COM_VCT_14:     DS    V15-V14
412D    =1  458  COM_VCT_15:     DS    V16-V15
4130    =1  459  XCOMM_VECT_TABLE: DS  V17-V16
4151    =1  460  XCOP:           DS    VECT_CODE_END-V17
418E    =1  461  XRAM_PAR:       DS    1             ;EXTERNAL RAM TOTAL PARITY (INVERTED)
        =1  462 +1 $LIST
            463  PUBLIC  SCHED_RTN,ROM_SCHED,WATCH1,TRETO
            464  EXTRN   CODE(COINFL,ACCREJ,OFFHK,SIGDET)
            465  EXTRN   CODE(ROM_COMM_INT,COMM)
----        466          CSEG     AT 03H         ;EXTRN INTR 0- UNUSED, HARDWARE LIMITATION
0003 32     467  XINT0:  RETI
----        468          CSEG     AT 0BH         ;TIMER 0- UNUSED IN ROM CODE
000B 202301 469  TMR0:   JB       RAM_TMR0,RAM_T0 ;VECTOR TO RAM PROGRAM IF RAM BIT SET
000E 32     470  TRETO:  RETI
000F 024100 471  RAM_T0: LJMP     TMR0_VCT       ;RAM TIMER 0 VECTOR
----        472          CSEG     AT 013H        ;EXTRN INTR 1- UNUSED, HARDWARE LIMITATION
0013 32     473  XINT1:  RETI
----        474          CSEG     AT 01BH        ;TIMER 1 - SIGNALING TONE DETECT
001B 20220E 475  TMR1:   JB       RAM_SIGDET,RAM_T1
3FEF         3   ACRJBY           EQU   03FEFH   ;EXTERNAL ADR OF ACRJ SIGNAL BYTE (AR)
0000         4   AR_BOX_COLLECT_CODE EQU 00H     ;MONEY BOX COLLECTION TONE CODE (AR)
00FA         5   AR_BLACKOUT_TM   EQU   (120*100+48/2)/48
             6                                   ;2 MINUTE BLACKOUT TIME BEFORE ANOTHER
             7                                   ;DETECT TONE WILL BE ACCEPTED
0002         8   AR_BOX_COLLECT_TM EQU  (1*1000+483/2)/483 ;BOX TONE ACQUISITION TIME (AR)
0020         9   AR_IIR_TC        EQU   32       ;TIME CONSTANT
00FF        10   AR_POL           EQU   0FFH     ;ACRJ SIGNAL POLARITY CONTROL (AR)
000A        11   AR_RTY_INTERVAL  EQU   (5*1000+483/2)/483 ;INTERVAL USED TO ACCUMULATE COLLECT
            12                                   ;RETURN ATTEMPTS FOR RETRY AVERAGE (AR)
003F        13   AR_SIG_TIME      EQU   (119*100+189/2)/189
            14
            15                                   ;119 MS FOR MIN AC OR RJ SIG (AR)
0007        15   BIT_MASK         EQU   07H      ;MASK FOR BIT ADR IN COMM SET BIT ADR
003E        16   CF_ACTIVE_TIME   EQU   (30*1000+483/2)/483
            17                                   ;30 SEC NICKEL ACTIVITY TIME - DISQUALIFY A SINGLE
            18                                   ; NICKEL IF NO OTHER COINS WITHIN T+/- ACTIVE_TIME
0056        19   CF_COIN_GAP_TIME EQU   (162*100+189/2)/189
            20                                   ;INTER COIN TONE GAP -162 MSEC (CF)
0012        21   CF_NICKEL_DIME_TIME EQU (34*100+189/2)/189
            22                                   ;MINIMUM TIME FOR A NICKEL OR DIME TONE
000D        23   CF_STUCK_COIN_COUNT EQU 13      ;TC NUMBER WHEN STUCK COIN IS ASSUMED
0007        24   CF_TONE_GAP_TIME EQU   (14*100+189/2)/189
            25                                   ;INTER COIN GAP (CF)
0008        26   CF_TONE_TIME     EQU   (16*100+189/2)/189
            27                                   ;COIN TONE ACQUISITION INTERVAL (CF)
007F        28   CF_TONE_TIME_MAX EQU   (240*100+189/2)/189
            29                                   ;MAX DURATION FOR NICKEL OR DIME (CF)
000B        30   COIN_CODE        EQU   00BH     ;CODE FOR COIN FROM DETECTOR (CF)
000F        31   COIN_CODE_MASK   EQU   0FH      ;MASK FOR COIN BITS (CF)
3FF7        32   COIN_DET0        EQU   03FF7H   ;EXT DATA MEMORY ADR OF COIN DET 0 (CF)
7FF7        33   COIN_DET1        EQU   07FF7H
BFF7        34   COIN_DET2        EQU   0BFF7H
FFF7        35   COIN_DET3        EQU   0FFF7H
            36   ;NON_INI         EQU   0*(020H) ;NON-INITIALIZED CODE (FAULT_MON)
```

|        |     |                   |     |                      |                                              |
|--------|-----|-------------------|-----|----------------------|----------------------------------------------|
|        | 37  | ;COIN_FIRST_SVC   | EQU | 1*(020H)             | ;DIAL TONE FIRST SERVICE (FAULT_MON)         |
|        | 38  | ;DIAL_FIRST_SVC   | EQU | 2*(020H)             | ;COIN FIRST SERVICE (FAULT_MON)              |
|        | 39  | ;POST_PAY_SVC     | EQU | 3*(020H)             | ;POST PAY SERVICE (FAULT_MON)                |
| 0010   | 40  | COIN_MASK_0       | EQU | 010H                 | ;MASK FOR TONE ACTIVE BIT (CF)               |
| 0020   | 41  | COIN_MASK_1       | EQU | 020H                 |                                              |
| 0040   | 42  | COIN_MASK_2       | EQU | 040H                 |                                              |
| 0080   | 43  | COIN_MASK_3       | EQU | 080H                 |                                              |
|        | 44  | ;COIN_RET_TMAX    | EQU | 014H                 | ;MAX TIME FOR COLLECT OR RETURN ACTION       |
| 000F   | 45  | COMADR_MASK       | EQU | 00FH                 | ;MASK FOR SLOT ADDRESS (COMM)                |
| 003C   | 46  | COMM_CMD_MASK     | EQU | 03CH                 | ;MASK FOR COMMAND (COMM)                     |
|        | 47  | ;COIN_BYTE_MASK   | EQU | 09EH                 | ;MASK OUT IRRELEVANT COIN DET BITS           |
|        | 48  |                   |     |                      | ;IN COIN BYTE (CF)                           |
|        | 49  | ;CONVR_TMIN       | EQU | (14*1000+483/2)/483  |                                              |
|        | 50  |                   |     |                      | ;14 SECONDS OF CONVERSATION (FAULT_MON)      |
| 0097   | 51  | CTMAX             | EQU | 151                  | ;DONT INCREMENT COUNT_I > 71 MS PERIOD       |
|        | 52  |                   |     |                      | ;(SIG)                                       |
| 3FDF   | 53  | DDET0             | EQU | 03FDFH               | ;DTMF DETECTOR 0                             |
| 7FDF   | 54  | DDET1             | EQU | 07FDFH               |                                              |
| BFDF   | 55  | DDET2             | EQU | 0BFDFH               |                                              |
| FFDF   | 56  | DDET3             | EQU | 0FFDFH               |                                              |
|        | 57  | ;FAULT_STATE_MASK EQU | | 01FH                 | ;STATE FIELD OF FAULT STATE (FM)             |
|        | 58  | ;INITAL_MASK      | EQU | 060H                 | ;MASK INITIALIZATION FIELD                   |
| 000F   | 59  | LOCAL_RATE_MASK   | EQU | 00FH                 | ;4 BIT TOLL RATE MASK (COMM)                 |
| 0098   | 60  | MAXDIALCT         | EQU | 098H                 | ;MAXIMUM DIAL TONE HIT COUNT (SIG)           |
| 008A   | 61  | MAXHUMCT          | EQU | 08AH                 | ;MAXIMUM HUM TONE HIT COUNT (SIG)            |
| 008A   | 62  | MAXRINGCT         | EQU | 08AH                 | ;MAXIMUM RING HIT COUNT (SIG)                |
| 0040   | 63  | MINDIALCT         | EQU | 040H                 | ;MINIMUM DIAL TONE HIT COUNT (SIG)           |
| 0076   | 64  | MINHUMCT          | EQU | 076H                 | ;MINIMUM HUM (SIG)                           |
| 0076   | 65  | MINRINGCT         | EQU | 076H                 | ;MINIMUM RING (SIG)                          |
|        | 66  | ;N_TOLERNC        | EQU | (10*100+189/2)/189   |                                              |
|        | 67  |                   |     |                      | ;NICKEL TOLLERENCE ON COIN GAP               |
| 00FA   | 68  | OFHK_IDLE_TICK_TIME EQU | | (120*100+48/2)/48    |                                              |
|        | 69  |                   |     |                      | ;2 MINUTE TICK RATE OF IDLE TIMER            |
|        | 70  |                   |     |                      | ;(120.252 SEC/TICK)                          |
| 0004   | 71  | OFHK_CALL_TICK_TIME EQU | | (2*10000+4829/2)/4829 |                                             |
|        | 72  |                   |     |                      | ;2 SECOND TICK RATE OF CALL TIMER            |
|        | 73  |                   |     |                      | ;(1.93176 SEC/TICK)                          |
| 0011   | 74  | OFHK_DET_TIME     | EQU | (32*100+189/2)/189   |                                              |
|        | 75  |                   |     |                      | ;OFF HOOK DETECT TIME (INC BY 32 MS-TF)      |
| 000C   | 76  | ONHK_DET_TIME     | EQU | (6*10000+4829/2)/4829 |                                             |
|        | 77  |                   |     |                      | ;ON HOOK DETECT TIME USES TS (OFFHK)         |
| 00F0   | 78  | PHONE_TYPE_MASK   | EQU | 0F0H                 | ;PHONE TYPE FIELD (COMM, FM)                 |
|        | 79  | ;REG_BANK_MASK    | EQU | 030Q                 | ;REGISTER BANK MASK FOR PSW                  |
|        | 80  | ;RING_GAP         | EQU | (10*1000+483/2)/483  | ;10 SECONDS OF TS                            |
|        | 81  | ;SCHEDTM_MASK     | EQU | 01H                  | ;SCHEDULER TIME MASK                         |
|        | 82  | ;SERVICE_MASK     | EQU | 060H                 | ;SERVICE CODE VECTOR MASK                    |
|        | 83  | ;TM_DIAL_OFF      | EQU | (1*1000+ 500)/189    | ;1.5 SECONDS FOR MIN DIAL TONE OFF           |
| 0002   | 84  | UART_CLOCK_RATE   | EQU | 02H                  | ;SERIAL CLOCK SET TO 8.481KB (6.51364        |
|        | 85  |                   |     |                      | ;MHZ/12/32/2). NOTE- THIS GIVES AN INTR      |
|        | 86  |                   |     |                      | ;RATE OF 1.29 MS IE. 2 PER SCAN (INI)        |
|        | 87  | ;                 |     |                      |                                              |
|        | 88  | ;                 |     |                      |                                              |
|        | 89  | ;!!!!REGISTER BANK 0 IS USED EXCLUSIVELY FOR ALL BUT ANST FILTER !!!!!!!!!!!!!!! | | | | |
| REG    | 90  | POINTER           | EQU | R0                   | ;ADR=0, GENERAL INDIRECT POINTER             |
| 0000   | 91  | POINTER_DIRECT    | EQU | 0                    | ;     GENERAL POINTER DIRECT ADDRESS         |
| REG    | 92  | COMPTR            | EQU | R1                   | ;ADR=1, COMM BUFFER POINTER (COMM)           |
| 0001   | 93  | COMPTR_DIRECT     | EQU | 1                    | ;     COMM BUFFER POINTER DIRECT ADDRESS     |
| REG    | 94  | RING              | EQU | R4                   |                                              |
| REG    | 95  | RINGCT0           | EQU | R4                   |                                              |
| REG    | 96  | RINGCT1           | EQU | R4                   |                                              |
| REG    | 97  | RINGCT2           | EQU | R4                   |                                              |
| REG    | 98  | RINGCT3           | EQU | R4                   | ;RING COUNTER (REG BANK 0-3 ), (SIG)         |
| REG    | 99  | HUM               | EQU | R5                   |                                              |

```
REG         100   HUMCT0          EQU     R5
REG         101   HUMCT1          EQU     R5
REG         102   HUMCT2          EQU     R5
REG         103   HUMCT3          EQU     R5        ;HUM COUNTER (SIG)
REG         104   DIAL            EQU     R6
REG         105   DIALCT0         EQU     R6
REG         106   DIALCT1         EQU     R6
REG         107   DIALCT2         EQU     R6
REG         108   DIALCT3         EQU     R6        ;DIAL COUNTER (SIG)
REG         109   COUNT0          EQU     R7        ;CLOCK TICKS SINCE NEGATIVE EDGE (SIG)
REG         110   COUNT1          EQU     R7
REG         111   COUNT2          EQU     R7
REG         112   COUNT3          EQU     R7
----        113           DSEG    AT      02H
0002        114   GENR2:          DS      1         ;GENERAL USE REGISTER R2
0003        115   GENR3:          DS      1         ;GENERAL USE REGISTER R3
----        116           DSEG    AT      04Q
0004        117   RINGCT_0:       DS      1         ;RING FOR PHONE 0 (SIG), SEE REG DEF
0005        118   HUMCT_0:        DS      1         ;HUM FOR PHONE 0
0006        119   DIALCT_0:       DS      1         ;DIAL TONE FOR PHONE 0
0007        120   COUNT_0:        DS      1         ;PERIOD BETWEEN EDGES COUNT FOR PHONE 0
----        121           DSEG    AT      10Q
0008        122   LINESH:         DS      1         ;LAST SAMPLED STATE OF ANSITORY TONES
0009        123   SLOTAD:         DS      1         ;COMMUNICATIONS SLOT ADDRESS
000A        124   PAR:            DS      1         ;PARITY BYTE
000B        125   WATCHDOG:       DS      1         ;WATCHDOG TIMER CONTROL BYTE
----        126           DSEG    AT      14Q
000C        127   RINGCT_1:       DS      1
000D        128   HUMCT_1:        DS      1
000E        129   DIALCT_1:       DS      1
000F        130   COUNT_1:        DS      1
----        131           DSEG    AT      20Q
0010        132   HIT_TABLEL:     DS      1         ;VECTOR ADDRESS OR HIT TABLE (SIG)
0011        133   HIT_TABLEH:     DS      1         ;
            134   ;UNUSED         OPEN    2
----        135           DSEG    AT      24Q
0014        136   RINGCT_2:       DS      1
0015        137   HUMCT_2:        DS      1
0016        138   DIALCT_2:       DS      1
0017        139   COUNT_2:        DS      1
----        140           DSEG    AT      30Q
            141   ;UNUSED         OPEN    4
----        142           DSEG    AT      34Q
001C        143   RINGCT_3:       DS      1
001D        144   HUMCT_3:        DS      1
001E        145   DIALCT_3:       DS      1
001F        146   COUNT_3:        DS      1
            147   ;
            148   ;############### FLAG MEMORY ################
----        149           DSEG    AT      20H
            150   ;ACCUMULATOR
00E7        151   SGN             BIT     ACC.7     ;DEFINE SIGN AS ACCUM BIT 7
            152   ;FM_FLAG1 BIT DEFINITIONS
00E0        153   STUCK_COIN_CN BIT       ACC.0     ;STUCK COIN IN CHUTE(CF)
00E1        154   STUCK_COIN_CN_ABS BIT   ACC.1     ;ABSOLUTE STUCK COIN IN CHUTE (CF)
00E3        155   RETRY_ERR_AR BIT        ACC.3     ;SIGNAL ABOVE THRESH RETRY ERROR FLAG (AR)
00E4        156   CALL_ALARM_OFHK BIT     ACC.4     ;CALL EXCEEDED CALL THRESHOLD ALARM (OFHK)
00E5        157   IDLE_ALARM_OFHK BIT     ACC.5     ;PHONE IDLE EXCEEDED THRESHOLD ALARM (OFHK)
            158   ;DIAG_FLAG1 DEFINITIONS
00E0        159   INI_PWR         BIT     ACC.0     ;POWER FAILED FLAG (INI)
00E1        160   CPURAM_PAR_ERR BIT      ACC.1     ;CPU RAM PARITY ERROR
00E2        161   XRAM_PAR_ERR BIT        ACC.2     ;PARITY ERROR ANYWHERE IN EXTERNAL RAM (DIAG)
00E3        162   XRAM_BUF_ERR BIT        ACC.3     ;PARITY ERROR IN THIS DATA BLOCK (DIAG)
```

```
00E4        163      ROM_PAR_ERR    BIT     ACC.4       ;PARITY ERROR DETECTED IN ROM (DIAG)
            164    ;DIAG_FLAG2 BIT DEFINITIONS
00E0        165      TFF_OVF        BIT     ACC.0       ;TFF QUEUE OVERFOLW FLAG (SCHED)
00E1        166      WATCHDG_TMOUT  BIT     ACC.1       ;WATCHDOG TIMED OUT (SCHED/SIGDET)
00E5        167      COIN_DET_BAD   BIT     ACC.5       ;BROKEN COIN DETECTOR (DIAG)
00E6        168      OFF_HK_DET_BAD BIT     ACC.6       ;BROKEN OFF HOOK DETECTOR (DIAG)
00E7        169      ANST_BAD       BIT     ACC.7       ;BROKEN ANSITORY DETECTOR (DIAG)
            170    ;PORT1
            171
0090        172    LINES            DATA    P1          ;INCOMING ANSITORY AND OFF HOOK SIGNALS
0091        173      OFHK_IN_0      BIT     P1.1        ;OFF HOOK CHANNEL INPUT
0093        174      OFHK_IN_1      BIT     P1.3
0095        175      OFHK_IN_2      BIT     P1.5
0097        176      OFHK_IN_3      BIT     P1.7
            177    ;PORT2
            178    ;PORT3
00B3        179      TXEN           BIT     P3.3        ;SERIAL PORT DRIVER ENABLE
00B2        180      SLOTBIT0       BIT     P3.2        ;MUX SLOT BIT SELECT CODES (INI)
00B4        181      SLOTBIT1       BIT     P3.4
00B5        182      SLOTBIT2       BIT     P3.5
00A5        183      SLOTBIT3       BIT     P2.5        ;MUX SLOT BIT SELECT CODE BIT (INI)
            184    ;
0020        185    EDGE:            DS      1           ;NEGATIVE EDGE DETECTOR (SIG)
0002        186      EDGE_0         BIT     EDGE.2      ;PHONE 0 EDGE FLAG
0004        187      EDGE_1         BIT     EDGE.4
0000        188      EDGE_2         BIT     EDGE.0
0006        189      EDGE_3         BIT     EDGE.6
            190    ;
0021        191    FLAGSA:          DS      1           ;FLAG BITS GROUP A (CN,AR)
            192    ;                               ++++CF/(AR,INI)++++
0008        193      CN_CDL         BIT     FLAGSA.0    ;COIN DETECT DELAYED
0009        194      CN_ACTIVE_TMR_EN BIT   FLAGSA.1    ;COIN ACTIVITY TIMER ENABLE (CF,AR)
000A        195      CN_GAP_TMR_EN  BIT     FLAGSA.2    ;COIN GAP TIMER ENABLE- USED TO
            196                                         ;IDENTIFY INTERA AND INTER COIN PAUSES
000B        197      CN_TONE_TMR_EN BIT     FLAGSA.3    ;TONE DURATION TIMER ENABLE- USED TO
            198                                         ;QUALIFY COIN DETECTIONS AS A COIN
            199                                         ;SIGNAL AND IDENTIFY SIG DROP-OUTS
000C        200      CN_ND_DET      BIT     FLAGSA.4    ;NICKEL TIME TONE DURATION DETECT FLAG
0022        201    TEMP:            DS      1           ;MISCELANIOUS BIT STORAGE
            202    ;  CALLED_UP     BIT     TEMP.0      ;PHONE CALLED UP (FM)
0010        203      CN_CP          BIT     TEMP.0      ;COIN DETECTED SIGNAL INPUT (CF)
0010        204      AR_BOX_SIG_DET BIT     TEMP.0      ;COIN BOX COLLECTION SIGNAL DETECT FLAG(AR)
            205    ;
0011        206      CSAVE          BIT     TEMP.1      ;STORAGE OF CARRY (COMM_INTR)**RESERVED
            207    ;
0012        208      DIAL_TN_DET    BIT     TEMP.2      ;DIAL TONE DETECTION STATE (FM)
0012        209      REJECT         BIT     TEMP.2      ;REJECT INPUT SIGNAL (AR)
            210    ;
0013        211      ACCEPT         BIT     TEMP.3      ;PROCESSED ACCEPT SIGNAL (AR)
            212    ;
0014        213      OFHK_RT        BIT     TEMP.4      ;REAL TIME OFF HK INPUT (OFHK)
            214    ;
0015        215      XRAM_8K        BIT     TEMP.5      ;EXTERNAL RAM SIZE-
            216                                         ; 0= 2K, 1= 8K *** RESERVED
0016        217      CHOLD          BIT     TEMP.6      ;TEMP SAVE C (GENERAL)
            218    ;
0023        219    RV1:             DS      1           ;RAM/ROM VECTORS
            220                                         ;CODE SOURCE   0= ROM, 1= RAM
0018        221      RAM_SCHED      BIT     RV1.0
0019        222      RAM_COIN       BIT     RV1.1
001A        223      RAM_COMM_SCHED BIT     RV1.2
001B        224      RAM_COMM_INTR  BIT     RV1.3
001C        225      RAM_OFFHK      BIT     RV1.4
```

```
001D    226      RAM_ACCREJ    BIT    RV1.5
001E    227      RAM_UDEF1     BIT    RV1.6
001F    228      RAM_FAULT     BIT    RV1.7
0024    229  RV2:              DS     1                  ;MORE CODE SOURCE CONTROL
0020    230      RAM_WATCHDOG  BIT    RV2.0
0021    231      RAM_UDEF2     BIT    RV2.1
0022    232      RAM_SIGDET    BIT    RV2.2
0023    233      RAM_TMRO      BIT    RV2.3
0024    234      RAM_SIG_TABLE BIT    RV2.4
        235  ;STATE:                                     ;GENERAL STATE VECTOR
        236  AR_ST:
        237  OFHK_ST:
0025    238               DS     1
        239  ; STATE_VECTOR BITS      AR_ST.0-.1         ;ACC/REJ STATE
        240                                              ;.1,.0= 00   STATE A [IDLE]
        241                                              ;      = 01   STATE B [REJECT]
        242                                              ;      = 10   STATE C [ACCEPT]
        243                                              ;      = 11   STATE D [A/R ACTIVE]
002A    244      AR_RTY_TMR_EN BIT    AR_ST.2            ;SIGNAL ACTIVITY INTERVAL TIMER ENABLE
002B    245      AR_ACRJ_TMR_EN BIT   AR_ST.3            ;ACC/REJ SIGNAL ACQUISITOIN TIMER EN
002C    246      AR_TONE_DET   BIT    AR_ST.4            ;COLLECTION TONE DETECTION
002D    247      AR_BOX_TMR_EN BIT    AR_ST.5            ;COIN BOX COLLECTION TIMER ENABLE
002E    248      AR_BOX_COLLECTED BIT AR_ST.6            ;COIN BOX COLLECTED FLAG (TO LOCK OUT
        249                                              ;FURTHER COLLECTIONS FOR BLACKOUT TIME
002F    250      AR_FORCE      BIT    AR_ST.7            ;FORCE INITIAL RATE
0028    251      OFHK_PR       BIT    OFHK_ST.0          ;PROCESSED OFF HOOK SIGNAL
0029    252      OFHK_TMR_EN   BIT    OFHK_ST.1          ;OFF/ON HOOK ACQUISITION TIMER ENABLE
        253  MISC1:                                      ;TEMPORARY LOCATIONS
        254  AR_SIGNALS:                                 ;ACC/REJ SIGNALS
0026    255               DS     1
0036    256          ACC_0     BIT    AR_SIGNALS.6       ;ACCEPT SIGNALS
0034    257          ACC_1     BIT    AR_SIGNALS.4
0032    258          ACC_2     BIT    AR_SIGNALS.2
0030    259          ACC_3     BIT    AR_SIGNALS.0
0037    260          REJ_0     BIT    AR_SIGNALS.7       ;REJECT SIGNALS
0035    261          REJ_1     BIT    AR_SIGNALS.5
0033    262          REJ_2     BIT    AR_SIGNALS.3
0031    263          REJ_3     BIT    AR_SIGNALS.1
0027    264  MISC2:            DS     1
0028    265  MISC3:            DS     1
0029    266  MISC4:            DS     1
        267  ;###################### GENERAL REGISTERS #######################
        268  ;
002A    269  TFF:              DS     1                  ;FASTEST TIME- ANST FILTER INCREMENTS
        270                                              ;TIME AT 471.63 MICRO SECONDS/TICK I.E.
        271                                              ;1/651364*12*256
002B    272  TF:               DS     1                  ;FAST TIME REG (1 TICK PER 1.8865 MS)
        273                                              ;I.E. 1/651364*12*256*4 (GLOBAL) ROLL
        274                                              ;OVER OF TFF (MODULO 4 COUNTER)
002C    275  TS:               DS     1                  ;SLOW TIME REG (1 TICK PER 482.94 MS)
        276                                              ;I.E. ROLL OVER OF TF
        277                                              ;(GLOBAL)
002D    278  T_2MIN:           DS     1                  ;2 MINUTE TIME REG(1 TICK PER 123.634S)
        279                                              ;(GLOBAL)
002E    280  T_9HRS:           DS     1                  ;9 HOUR TIME RES(1 TICK PER 31650.3S OR
        281                                              ;APPROX 527.5 MINUTES=* 8.8 HOURS)
        282                                              ;(GLOBAL)
        283  ;TXEBL:           DS     1                  ;SERIAL CONTROL BYTEXXXXXXXXXXXXXXXXX
0016    284  COM_BUF_SIZE      EQU    22                 ;LENGTH OF COMMUNICATIONS BUFFER
002F    285  COMBUF:           DS     COM_BUF_SIZE       ;COMMUNICATIONS BUFFER
002F    286      COM_CMD       EQU    COMBUF+0           ;COMMAND BYTE IN BUFFER
0030    287      COM_LENGTH    EQU    COMBUF+1           ;LENGTH OF BUFFER
0031    288      COM_DATA      EQU    COMBUF+2           ;DATA PARAMATERS START HERE
0045    289  BUF_OVRFLO:       DS     1                  ;IF ANY BITS SET, EITHER COMM OR
```

```
                290                                         ;STACK OVERFLOW
0046            291    STACKK:        DS    080H-$          ;STACK TAKES REMAINDER OF RAM
0040            292    X_BUF_SIZE     EQU   040H            ;PHONE CHANNEL EXTRNAL DATA BUFFER SIZE
0004            293    XCOL_REC_LEN   EQU   04H             ;LENGHT OF COLLECTION RECORD
0004            294    XCOL_REC_NUM   EQU   04H             ;NUMBER OF RECORDS IN CIRCULAR BUFFER
0010            295    XCIRCLE_SIZE   EQU   XCOL_REC_LEN*XCOL_REC_NUM ;SIZE OF CIRCULAR BUFFER
                296    ;************************************************************
                297    ;                    REGISTER RELATIVE OFFSETS
0000            298    XPAR           EQU   0               ;PHONE_I XRAM PARITY
0001            299    XFLAGSA        EQU   XPAR+1          ;GENERAL FLAG BYTE (CF,AR,OFHK)
                300    ;                          +++++++ COIN FILTER SPECIFIC +++++++
0002            301    XCN_TONE_TMR   EQU   XFLAGSA+1       ;COIN TONE DURATION TIMER
0003            302    XCN_GAP_TMR    EQU   XCN_TONE_TMR+1  ;COIN GAP TIMER (SET AT COIN TONE END)
0004            303    XCN_ACTIVE_TMR EQU   XCN_GAP_TMR+1   ;COIN DETECTION ACTIVITY TMR (CF,AR)
0005            304    XCN_TALK_OFF   EQU   XCN_ACTIVE_TMR+1 ;TALK OFF COUNT (CF)
0006            305    XTC            EQU   XCN_TALK_OFF+1  ;COIN TONE PULSE COUNT (CF,AR)
                306    ;                          ++++++COIN FILTER AND ACRJ++++++
0007            307    XPN            EQU   XTC+1           ;PENDING NICKELS COUNT (CF,AR)
                308    ;                          ++++++ACRJ SPECIFIC+++++++++++
0008            309    XAR_ST         EQU   XPN+1           ;ACC/REJ STATE
0009            310    XAR_ACRJ_TMR   EQU   XAR_ST+1        ;ACC/REJ ACTIVITY TIMER
000A            311    XAR_BOX_TMR    EQU   XAR_ACRJ_TMR+1  ;MONEY BOX COLLECTION TIMER
000B            312    XLOCAL_RATE    EQU   XAR_BOX_TMR+1   ;LOCAL TOLL CALL RATE (ACRJ)
000C            313    XAR_RTY_TMR    EQU   XLOCAL_RATE+1   ;COLLECT/RETURN SIGNAL WINDOW TMR
000D            314    XAR_RTY_COUNT  EQU   XAR_RTY_TMR+1   ;COL/RET IN SIGNAL WINDOW FOR AVG THRSH
000E            315    XAR_RETRY_THRESH EQU XAR_RTY_COUNT+1 ;RETRY RATE THRESHOLD
000F            316    XAR_RETRY_AVG  EQU   XAR_RETRY_THRESH+1 ;RETRY AVERAGE
0010            317    XCNL           EQU   XAR_RETRY_AVG+1 ;CUMULATIVE NICKEL COUNT-LSB
0011            318    XCNH           EQU   XCNL+1          ;CUMULATIVE NICKEL COUNT-MSB
0012            319    XCCT           EQU   XCNH+1          ;COLLECTION COUNTER-INCREMENTS PER
                320                                         ;COLLECTION
                321    ;                          +++++OFF HOOK SPECIFIC+++++++
0013            322    XOFHK_ST       EQU   XCCT+1          ;OFF HOOK STATE BYTE
0014            323    XOFHK_TMR      EQU   XOFHK_ST+1      ;OFF HOOK TIMER
0015            324    XOFHK_INTVL_TMR EQU  XOFHK_TMR+1     ;OFF HOOK INTERVAL TIMER FOR CALL MON
0016            325    XOFHK_IDLE_TIME_L EQU XOFHK_INTVL_TMR+1 ;PHONE IDLE TIME
0017            326    XOFHK_IDLE_TIME_H EQU XOFHK_IDLE_TIME_L+1
0018            327    XOFHK_CALL_TIME_L EQU XOFHK_IDLE_TIME_H+1 ;DURATION OF MOST RECENT CALL
0019            328    XOFHK_CALL_TIME_H EQU XOFHK_CALL_TIME_L+1
001A            329    XOFHK_IDLE_THRESH EQU XOFHK_CALL_TIME_H+1 ;IDLE ALARM TIME THRESHOLD
001B            330    XOFHK_CALL_THRESH EQU XOFHK_IDLE_THRESH+1
001C            331    XOFHK_USAGE_T_2SEC EQU XOFHK_CALL_THRESH+1 ;CUMULATIVE PHONE USAGE IN 2 SEC TICKS
001D            332    XOFHK_USAGE_T_2MIN EQU XOFHK_USAGE_T_2SEC+1
001E            333    XOFHK_USAGE_T_9HRS EQU XOFHK_USAGE_T_2MIN+1
                334    ;                          ++++++FAULT MONITOR SPECIFIC+++++
001F            335    XFM_ST         EQU   XOFHK_USAGE_T_9HRS+1 ;FAULT MONITOR STATE
0020            336    XFM_FLAG1      EQU   XFM_ST+1        ;FAULT MONITOR FLAGS
0021            337    XFM_FLAG2      EQU   XFM_FLAG1+1     ;           *
0022            338    XFM_PHONE_TYPE EQU   XFM_FLAG2+1     ;PHONE TYPE-
                339                                         ;     0- NON-INITIALIZED
                340                                         ;     1- DIAL TONE FIRST SERVICE
                341                                         ;     2- COIN FIRST SERVICE
                342                                         ;     3- POST PAR SERVICE
0023            343    XFM_TMR        EQU   XFM_PHONE_TYPE+1 ;FAULT MONITOR TIMER
0024            344    XFM_NODIAL     EQU   XFM_TMR+1       ;NO DIAL TONE COUNTER
0025            345    XFM_SUCCESS_L  EQU   XFM_NODIAL+1    ;SUCCESSFUL CALLS
0026            346    XFM_SUCCESS_H  EQU   XFM_SUCCESS_L+1
0027            347    XFM_FAIL       EQU   XFM_SUCCESS_H+1 ;UNSUCCESSFUL CALL COUNT
0028            348    XDIAG_FLAG1    EQU   XFM_FAIL+1      ;DIAGNOSTIC FLAG BYTE     *
0029            349    XDIAG_FLAG2    EQU   XDIAG_FLAG1+1
002A            350    XUNUSED_THRESH EQU   XDIAG_FLAG2+1   ;UNUSED THRESHOLD
002F            351    XCOL_HEAD      EQU   X_BUF_SIZE-XCIRCLE_SIZE-1 ;HEAD OF CIRCULAR BUF
0030            352    XCOL_CIRCLE_BUF EQU  X_BUF_SIZE-XCIRCLE_SIZE
```

```
353    ; CCL       EQU    0        ;CNL AT COLLECTION TIME
354    ; CCH       EQU    1        ;CNH       "
355    ; T_2MIN    EQU    2        ;2 MINUTE CLOCK SNAP SHOT AT COLLECTION
356    ; T_9HRS    EQU    3        ;9 HOUR    "
357    ;*************************************************************
358 +1 $LIST
359    END
```

REGISTER BANK(S) USED: 0, TARGET MACHINE(S): 8051

ASSEMBLY COMPLETE, NO ERRORS FOUND

```
001E D5B0E       476         DJNZ    WATCHDOG,ROM_SIGDET
0021 80DD        477         SJMP    RESET
----             478         CSEG    AT 023H     ;SERIAL I/O
0023 301B03      479    SER: JNB     RAM_COMM_INTR,ROM_COMM  ;GO TO RAM COMMUNICATIONS PROGRAM
0026 024106      480         LJMP    COMM_INTR_VCT
                 481    ROM_COMM:
0029 020000  F   482         LJMP    ROM_COMM_INT
002C 024100C     483    RAM_T1: LJMP TMR1_VCT
                 484    ROM_SIGDET:
002F 020000  F   485         LJMP    SIGDET
                 486    SCHEDULER   SEGMENT CODE
----             487         RSEG    SCHEDULER
                 488    SCHED_RTN:              ;TASK SCHEDULER
                 489    UNUSED:
0000 301803      490    ?SC1:   JNB    RAM_SCHED,ROM_SCHED
                 491                      ;GO TO RAM AT LOC 1000H IF BIT SET ELSE ROM
                 492                      ;VECTOR TO RAM SCHEDULER
0003 024103      493         LJMP    SCHED_VCT   ;RAM START LOC
                 494    ROM_SCHED:
0006 E52A        495    ?SC2:   MOV    A,TFF      ;WAIT TILL TFF>=4
0008 24FC        496         ADD     A,#-4
000A 50FA        497    ?SC2A:  JNC    ROM_SCHED
000C 2408        498         ADD     A,#-(0FCH-4)
000E 5023        499    ?SC2B:  JNC    SCAN       ;IF FC > TFF >= 4 THEN SCAN
0010 750204      500         MOV     GENR2,#4    ;ELSE SET TFF_OVERFLOWED BIT IN EACH BUFFER
0013 904000      501         MOV     DPTR,#XDB_0
0016 E4          502    TFF_LP: CLR    A
0017 93          503         MOVC    A,@A+DPTR
0018 B2E0        504         CPL     TFF_OVF
001A F0          505         MOVX    @DPTR,A      ;UPDATE PARITY
001B E582        506         MOV     A,DPL
001D 2429        507         ADD     A,#XDIAG_FLAG2  ;UPDATE DIAGNOSTIC FLAG
001F F582        508         MOV     DPL,A
0021 E4          509         CLR     A
0022 93          510         MOVC    A,@A+DPTR
0023 B2E0        511         CPL     TFF_OVF
0025 F0          512         MOVX    @DPTR,A
0026 E582        513         MOV     A,DPL
0028 2417        514         ADD     A,#(X_BUF_SIZE-XDIAG_FLAG2)
002A F582        515         MOV     DPL,A
002C D502E7      516         DJNZ    GENR2,TFF_LP  ;REPEAT FOR ALL PHONE BUFFERS
002F 7404        517         MOV     A,#4         ;ROLL OVER TFF
0031 8002        518         SJMP    SCAN1
0033 E52A        519    SCAN:   MOV    A,TFF
0035 24FC        520    SCAN1:  ADD    A,#-4        ;REMOVE A TICK FROM TFF.2 UP
0037 F52A        521         MOV     TFF,A
0039 E52B        522         MOV     A,TF         ;IF TFF=4 THEN SCAN TF FOR PROCESS (1.887 MS)
003B 052B        523         INC     TF
003D 2401        524         ADD     A,#01H
003F 5012        525    ?SC3:   JNC    COIN         ;ONLY INC TS IF TF OVERFLOWS
0041 E52C        526         MOV     A,TS
0043 052C        527         INC     TS
```

```
0045 2401              528            ADD     A,#01H
0047 500A              529   ?SC3A:   JNC     COIN        ;ONLY INC T_2MIN IF TS OVERFLOWS
0049 E52D              530            MOV     A,T_2MIN
004B 052D              531            INC     T_2MIN
004D 2401            - 532            ADD     A,#01H
004F 5002              533   ?SC3B:   JNC     COIN        ;ONLY INC T_9HRS IF T_2MIN OVERFLOWS
0051 052E              534            INC     T_9HRS
                       535   COIN:
0053 301905            536   ?SC4:    JNB     RAM_COIN,COIN1 ;POLL ALL COIN DETECT CHANNELS
0056 12410F            537            LCALL   COIN_VCT
0059 8003              538            SJMP    GETSCH
005B 120000  F         539   COIN1:   LCALL   COINFL
005E 750B00            540   GETSCH:  MOV     WATCHDOG,#0  ;RESET WATCHDOG TIMER
0061 E52B              541            MOV     A,TF         ;SELECT SCHEDULED TASK
0063 13                542            RRC     A
0064 400F              543   ?SC5:    JC      TD8
0066 301A03            544   ?SC6:    JNB     RAM_COMM_SCHED,COMM1 ;COMMUNICATIONS
0069 024109            545            LJMP    COMM_SCHED_VCT
006C E52A              546   COMM1:   MOV     A,TFF        ;IF TFF>=4 THEN SKIP COMM
006E 54FC              547            ANL     A,#0FCH
0070 7003              548   ?SC6A:   JNZ     TD8
0072 020000  F         549            LJMP    COMM
0075 13                550   TD8:     RRC     A
0076 4009              551   ?SC7:    JC      TD16
0078 301C03            552   ?SC8:    JNB     RAM_OFFHK,OFFHK1 ;OFF HOOK
007B 024112            553            LJMP    OFFHK_VCT
007E 020000  F         554   OFFHK1:  LJMP    OFFHK
0081 13                555   TD16:    RRC     A
0082 4009              556   ?SC9:    JC      TD32
0084 301D03            557   ?SC10:   JNB     RAM_ACCREJ,ACRJ1 ;ACCEPT/REJECT
0087 024115            558            LJMP    ACCREJ_VCT
008A 020000  F         559   ACRJ1:   LJMP    ACCREJ
008D 13                560   TD32:    RRC     A
008E 4008              561   ?SC11:   JC      TD64
0090 301E03            562   ?SC12:   JNB     RAM_UDEF1,UDEF11 ;UNDEFINED SLOT @30 MS RATE
0093 024118            563            LJMP    UDEF1_VCT
0096 0100    F         564   UDEF11:  AJMP    UNUSED
0098 13                565   TD64:    RRC     A
0099 4008              566   ?SC13:   JC      TD128
009B 301F03            567   ?SC14:   JNB     RAM_FAULT,FAULT1 ;FAULT MONITOR
009E 02411B            568            LJMP    FAULT_VCT
                       569   FAULT1:
                       570   ;        LJMP    FAULT_MON
00A1 0100    F         571            AJMP    SCHED_RTN
00A3 13                572   TD128:   RRC     A
00A4 4008              573   ?SC15:   JC      TD256
00A6 302003            574   ?SC16:   JNB     RAM_WATCHDOG,WATCH1 ;WATCHDOG TIMER SLOT
00A9 02411E            575            LJMP    WATCHDOG_VCT
                       576   WATCH1:
00AC 0100    F         577   SRTN_1:  AJMP    SCHED_RTN
                       578   TD256:
00AE 3021FB            579   ?SC17:   JNB     RAM_UDEF2,SRTN_1 ;UNDEFINED SLOT AT 120 MS AND UP
00B1 024121            580            LJMP    UDEF2_VCT
                       581            END
```

REGISTER BANK(S) USED: 0, TARGET MACHINE(S): 8051

ASSEMBLY COMPLETE, NO ERRORS FOUND

```
ISIS-II MCS-51 MACRO ASSEMBLER V2.0
NO OBJECT MODULE REQUESTED
ASSEMBLER INVOKED BY: ASM51 COINFL.F16 NOOBJECT NOSYMBOLS

LOC  OBJ          LINE    SOURCE

1              NAME    COIN_COUNTER
                    2     ;COIN FILTER MODIFIED TO INCLUDE MANY MORE FLAGS
                    3     ;***********************************************************************;   COIN
                          FILTER AND DETECTOR
                    4     ;
                    5     ;       ENTER- REQUIRED TO ENTER AT 1.89 MS INTERVALS
                    6     ;
                    7     ;       RETURN- COIN FILTER BYTES UPDATED
                    8     ;
                    9     ;       STACK DEPTH- 2
                   10     ;
                   11     ;       EXTERNAL EFFECTS- PN AND TC ARE UPDATED IN RESPONSE TO COIN TONES,
                   12     ;                         COIN FLAGS ARE UPDATED
                   13     ;
                   14     ;       SAMPLING RATE (EACH PHONE)-   2 MS
                   15     ;
                   16     ;       DURATION (ALL CHANNELS INCLUDED)- 232 CYCLES TYP/476 ABSOLUTE WORST
                   17     ;                         WORST ONLY HAPPENS IF ALL 4 OPERATE IN PARALLEL AND
                   18     ;                         THEN ONLY ONCE/0.5 SEC.  ONLY LONG TIMES WHEN UPDATING
                   19     ;                         PN.
                   20     ;
                   21     ;***********************************************************************;
                   22 +1  $INCLUDE(DEFINE.TXT)
           =1      23 +1  $NOLIST
                  383     COIN_FILTER     SEGMENT CODE
    ----          384              RSEG    COIN_FILTER
                  385     PUBLIC  COINFL
                  386     EXTRN   CODE(XRAM,XDB_0,XDB_1,XDB_2,XDB_3)
                  387
0000 75A000  F    388     COINFL: MOV     P2,#HIGH(XDB_0) ;SET PAGE ADDRESS FOR XRAM POINTER ACCESS
                  389 +1
                  390 +2  COINFL0:
0003 C210         391 +1          CLR     CN_CP
                  392 +2  SIG_CK0:
0005 903FF7       393 +2          MOV     DPTR,#COIN_DET0
                  394 +1                                  ;SET COIN PENDING IF COIN PRESENT
0008 E0           395 +1          MOVX    A,@DPTR
0009 541F         396 +2          ANL     A,#(COIN_MASK_0+COIN_CODE_MASK)
                  397 +2                                  ;MASK TO ONLY COIN_0 BIT FIELD
000B B40402       398 +2  ?CF0_0: CJNE    A,#(NOT(COIN_CODE)AND(COIN_CODE_MASK)),SKIP_0
                  399 +1                                  ;COMPARE WITH INVERTED INPUT CODE
000E D210         400 +1          SETB    CN_CP           ;IF COIN TONE ACTIVE, SET COIN PRESENT BIT
0010 900000  F    401 +2  SKIP_0: MOV     DPTR,#XDB_0     ;LOAD COIN DATA
0013 1100    F    402 +1          ACALL   CNFIL           ;CALL COIN FILTER
                  403 +1
                  404 +1  $NOGEN
                  405             %COINFL(1)
                  420             %COINFL(2)
                  435             %COINFL(3)
----  --          ---     ---
004C 7401         451     CNFIL:  MOV     A,#XFLAGSA      ;LOAD FLAGSA IN INT RAM
004E 93           452             MOVC    A,@A+DPTR
004F F521         453             MOV     FLAGSA,A
0051 7400         454             MOV     A,#XPAR
0053 93           455             MOVC    A,@A+DPTR
0054 F50A         456             MOV     PAR,A
```

```
0056 201005           457            JB       CN_CP,CK_CDL      ;GO TO PROPER PROCESS-
                      458                                        ;BASED UPON (CD,CDL)
0059 300850           459   ?CFS2:   JNB      CN_CDL,COIN_IDLE  ; CD,CDL=00  -DETECTOR IDLE
005C 0100      F      460            AJMP     COIN_TE           ; CD,CDL=01  -TRAILING EDGE
                      461   CK_CDL:
005E 300B02           462   ?CSF3:   JNB      CN_CDL,COIN_LE    ; CD,CDL=10  -LEADING EDGE
0061 0100      F      463            AJMP     COIN_ON           ; CD,CDL=11  -COIN DETECTOR ON
                      464   COIN_LE:
0063 200B42           465   ?CF10B:  JB       CN_TONE_TMR_EN,SET_DL
0066 7406             466            MOV      A,#XTC
0068 93               467            MOVC     A,@A+DPTR
0069 B40D16           468   ?CF10A:  CJNE     A,#CF_STUCK_COIN_COUNT,SET14 ;IF TC=STUCK_COIN_COUNT THEN
                      469                                        ;TOGGLE STUCK COIN ELSE CHECK FOR >COUNT
006C 7420             470            MOV      A,#XFM_FLAG1      ;ACTIVATE STUCK COIN FLAGS
006E 93               471            MOVC     A,@A+DPTR
006F B2E0             472            CPL      STUCK_COIN_CN
0071 D2E1             473            SETB     STUCK_COIN_CN_ABS
                      474            XXMOV(XFM_FLAG1)
                      488   SET14:
0082 4011             489   ?CF16:   JC       SET_TN_TMR        ;IF TC>=STUCK_COIN_COUNT,
                      490                                       ; SET TC=STUCK_COIN COUNT+1 TO DISABLE TC
0084 740E             491            MOV      A,#CF_STUCK_COIN_COUNT+1
                      492            XXMOV(XTC)
                      506   SET_TN_TMR:
0095 E52B             507            MOV      A,TF              ;START TONE DURATION TIMER
                      508            XXMOV(XCN_TONE_TMR)
00A6 D20B             522            SETB     CN_TONE_TMR_EN
00A8 D208             523   SET_DL:  SETB     CN_CDL            ;SET COIN DELAYED BIT TO 1
00AA 0100      F      524   EXT4:    AJMP     CF_EX
                      525   COIN_IDLE:                          ;###### NO COIN TONE ############
00AC 300A38           526   ?CF2:    JNB      CN_GAP_TMR_EN,CHECK_ACT ;IF GAP TIMER ACTIVE CHECK
                      527                                       ;BURST GAP ELSE PROCESS COUNT
00AF 200B02           528   ?CF3A:   JB       CN_TONE_TMR_EN,CK_GAP ;IF TONE TMR ENABLED THEN CHECK GAP TIME
00B2 0100      F      529            AJMP     GET_TC
                      530   CK_GAP:
                      531   $GEN
                      532     %TIME(TF,XCN_GAP_TMR,CF_TONE_GAP_TIME)
                      533 +1
                      534 +1    MOV A,#%TM_START
00B4 7403             535 +2          XCN_GAP_TMR  ;SET C IF TIME DURATION >= THRESHOLD
00B6 93               536 +1    MOVC A,@A+DPTR  ;LOAD TM_START
00B7 F4               537 +1    CPL A  ;ACC= -TM_START (TWOS COMPLEMENT)
00B8 04               538 +1    INC A
                      539 +1    ADD A,%CLOCK
00B9 252B             540 +2         TF ;ACC= (TM_PRESENT-TM_START)
                      541 +1       ;   = DELTA_T
                      542 +1    ADD A,#-%THRESHOLD
00BB 24F9             543 +2         CF_TONE_GAP_TIME ;ACC= DELTA_T- THRESHOLD
                      544 +1
                      545 +1  $NOGEN
00BD 507B             546   ?CF3:    JNC      EXT1              ;IF GAP > MIN GAP CHECK TONE ACTIVITY TMR
00BF C20B             547            CLR      CN_TONE_TMR_EN    ;RESET TONE DURATION TIMER
                      548            %TIME(TF,XCN_TONE_TMR,(CF_TONE_TIME+CF_TONE_GAP_TIME))
00CA 506E             557   ?CF4:    JNC      EXT1              ;DISCARD TONE IF TOO SHORT
                      558                                       ;ELSE CHECK IF TONE OF NICKEL DURATION PRESENT
00CC 24F6             559            ADD      A,#-(CF_NICKEL_DIME_TIME-CF_TONE_TIME)
00CE 5002             560   ?CF5:    JNC      INC_TC            ;IF TONE> NICKEL TIME THEN SET NICKEL FLAG
00D0 D20C             561            SETB     CN_ND_DET
00D2 7406             562   INC_TC:  MOV      A,#XTC
00D4 93               563            MOVC     A,@A+DPTR         ;INCREMENT TONE COUNT
00D5 04               564            INC      A
                      565   $GEN
                      566   XXMOV(XTC)
```

```
                 567 +1
00D6 F8          568 +1      MOV POINTER,A ;MOVE (A) TO XRAM AND UPDATE PAR.  NOTE-
                 569 +1        ;DPH MUST BE SET TO XDB_I HI BYTE !!!!!!!!!!
                 570 +1        ;TEMPORARLY STOR A
                 571 +1      MOV A,#%DEST
00D7 7406        572 +2            XTC ;REMOVE OLD XRAM DATA FROM PARITY
00D9 93          573 +1      MOVC A,@A+DPTR
00DA 650A        574 +1      XRL A,PAR
00DC 68          575 +1      XRL A,POINTER ;INCLUDE NEW DATA IN PARITY AND STORE
00DD F50A        576 +1      MOV PAR,A
00DF E582        577 +1      MOV A,DPL ;GENERATE DESTINATION POINTER
                 578 +1      ADD A,#%DEST
00E1 2406        579 +2            XTC
00E3 C8          580 +1      XCH A,POINTER ;STORE NEW DATA
00E4 F2          581 +1      MOVX @POINTER,A
                 582 +1
                 583 +1 $NOGEN
00E5 0100    F   584              AJMP   CF_EX
                 585      CHECK_ACT:
00E7 7420        586              MOV    A,#XFM_FLAG1     ;LOAD STUCK COIN FLAG
00E9 93          587              MOVC   A,@A+DPTR
00EA 30E111      588              JNB    STUCK_COIN_CN_ABS,CHECK ;IF STUCK ABSOLUTE NOT SET THEN EXIT
00ED C2E1        589              CLR    STUCK_COIN_CN_ABS ;ELSE CLEAR IT
                 590              %XMOV(XFM_FLAG1)
                 604      CHECK:
00FE 200902      605      ?CF7:   JB     CN_ACTIVE_TMR_EN,CHECK_AC
                 606                        ;SHUT DOWN ACTIVITY TIMER AFTER TIME-OUT INTVL
0101 0100    F   607              AJMP   CF_EX
                 608      CHECK_AC:
                 609              %TIME(TS,XCN_ACTIVE_TMR,CF_ACTIVE_TIME)
                 618
010C 502C        619      ?CF8:   JNC    EXT1         ;IF ACTIVE LONGER THAN T_ACTIVITY THEN SHUTDOWN
010E C209        620              CLR    CN_ACTIVE_TMR_EN
0110 7406        621              MOV    A,#XTC
0112 93          622              MOVC   A,@A+DPTR
0113 B40124      623      ?CF9:   CJNE   A,#01,EXT1   ;EXIT IF TC <> 1
0116 7400        624              MOV    A,#0
                 625              %XMOV(XTC)          ;IF NICKEL AND TIME OUT THEN CLEAR TC
0127 7405        639              MOV    A,#XCN_TALK_OFF ;INCREMENT TALK OFF COUNT
0129 93          640              MOVC   A,@A+DPTR
012A 04          641              INC    A
                 642              %XMOV(XCN_TALK_OFF)
013A 0100    F   656      EXT1:   AJMP   CF_EX
                 657      GET_TC:
                 658              %TIME(TF,XCN_GAP_TMR,CF_COIN_GAP_TIME)
0145 501C        667      ?CF12:  JNC    EXT3         ;IF MORE THAN GAP TIME STOP TIMER ELSE
0147 C20A        668              CLR    CN_GAP_TMR_EN ;STOP GAP TIMER
0149 7406        669              MOV    A,#XTC       ;GET TONE COUNT
014B 93          670              MOVC   A,@A+DPTR
014C B4011B      671      ?CF13:  CJNE   A,#01H,TC_GE2 ;IF TC=1 THEN TEST FOR TRUE PEND NICKEL
                 672                                  ;ELSE PROCESS COUNT
014F 200C13      673      ?CF13A: JB     CN_ND_DET,ACT_CK ;IF TONE OF NICKEL DURATION DETECTED START
                 674                                  ;ACTIVITY TIMER
0152 7400        675              MOV    A,#0         ;ELSE DISCARD TALK_OFF ERROR
                 676              %XMOV(XTC)
0163 0100    F   690      EXT3:   AJMP   CF_EX
                 691      ACT_CK:
0165 300938      692      ?CF14:  JNB    CN_ACTIVE_TMR_EN,SET_ACTIVE ;IF ACTIVE THEN INCREMENT PN
                 693                                  ; ELSE SET ACTIVITY TIMER
0168 0100    F   694              AJMP   UPD_PN
                 695      TC_GE2:
016A 24F2        696              ADD    A,#-(CF_STUCK_COIN_COUNT+1) ;IF TC>STUCK LEVEL THEN FORCE TC TO
                 697                                  ;LOCAL RATE
016C 5005        698      ?CF15:  JNC    UPD_PN       ;ELSE UPDATE PENDING
```

```
016E 7408        699            MOV    A,#XLOCAL_RATE   ;FORCE TC TO LOCAL RATE
0170 93          700            MOVC   A,@A+DPTR        ;LOAD LOCAL RATE
0171 8008        701            SJMP   UPD_1
0173 7406        702    UPD_PN: MOV    A,#XTC           ;GET TONE COUNT
0175 93          703            MOVC   A,@A+DPTR
0176 603B        704    ?CF10:  JZ     CLR_ND           ;IF TC=0 THEN CLEAR NICKEL DETECTOR
0178 7406        705            MOV    A,#XTC           ;A=TC
017A 93          706            MOVC   A,@A+DPTR
017B F8          707    UPD_1:  MOV    POINTER,A        ;TEMP SAVE TC
017C 7407        708            MOV    A,#XPN
017E 93          709            MOVC   A,@A+DPTR
017F 28          710            ADD    A,POINTER        ;A= PN +TC
                 711            XXMOV(XPN)
018F 7400        725    TCZERO: MOV    A,#0             ;XTC=0
                 726            XXMOV(XTC)
                 740    SET_ACTIVE:
01A0 E52C        741            MOV    A,TS             ;INITIALIZE ACTIVETY TIMER
                 742            XXMOV(XCN_ACTIVE_TMR)
01B1 D209        756            SETB   CN_ACTIVE_TMR_EN ;SET ACTIVITY FLAG
01B3 C20C        757    CLR_ND: CLR    CN_ND_DET        ;CLEAR NICKEL DETECTOR
01B5 0100   F    758            AJMP   CF_EX
                 759    COIN_TE:
01B7 E52B        760            MOV    A,TF
                 761            XXMOV(XCN_GAP_TMR)      ;START COIN GAP TIMER
01C8 D20A        775            SETB   CN_GAP_TMR_EN
01CA C208        776            CLR    CN_CDL           ;SET COIN DELAYED BIT TO 0
01CC 0100   F    777            AJMP   CF_EX
                 778    COIN_ON:
01CE 300835      779    ?CF17:  JNB    CN_TONE_TMR_EN,CF_EX ;IF TONE TIMER ACTIVE, CHECK TC
                 780            XTIME(TF,XCN_TONE_TMR,CF_TONE_TIME_MAX)
01DA 502A        789    ?CF18:  JNC    CF_EX            ;IF TONE TIME TO LONG SET STUCK COIN FLAG
01DC 740B        790            MOV    A,#XLOCAL_RATE
01DE 93          791            MOVC   A,@A+DPTR
                 792            XXMOV(XTC)
01EE 7420        806            MOV    A,#XFM_FLAG1     ;ACTIVATE COIN_STUCK FLAGS
01F0 93          807            MOVC   A,@A+DPTR
01F1 B2E0        808            CPL    STUCK_COIN_CN
01F3 D2E1        809            SETB   STUCK_COIN_CN_ABS
                 810            XXMOV(XFM_FLAG1)
0204 C20B        824            CLR    CN_TONE_TMR_EN   ;DISABLE COIN TONE TIMER
0206 7401        825    CF_EX:  MOV    A,#XFLAGSA
0208 93          826            MOVC   A,@A+DPTR        ;CHECK FLAGSA FOR CHANGES
0209 6521        827            XRL    A,FLAGSA
020B 600C        828            JZ     PAR_CK           ;IF CHANGED THEN UPDATE PARITY AND XFLAGSA
020D 650A        829            XRL    A,PAR
020F F50A        830            MOV    PAR,A
0211 E582        831            MOV    A,DPL
0213 2401        832            ADD    A,#XFLAGSA
0215 F8          833            MOV    POINTER,A
0216 E521        834            MOV    A,FLAGSA         ;STORE NEW FLAGSA
0218 F2          835            MOVX   @POINTER,A
0219 7400        836    PAR_CK: MOV    A,#XPAR          ;CHECK FOR PARITY CHANGES
021B 93          837            MOVC   A,@A+DPTR
021C 650A        838            XRL    A,PAR
021E 6003        839            JZ     EXT              ;IF CHANGED THEN UPDATE XPARITY
0220 E50A        840    PAR_UP: MOV    A,PAR
0222 F0          841            MOVX   @DPTR,A
0223 22          842    EXT:    RET
                 843            END
```

REGISTER BANK(S) USED: 0, TARGET MACHINE(S): 8051

ASSEMBLY COMPLETE, NO ERRORS FOUND

```
ISIS-II MCS-51 MACRO ASSEMBLER V2.0
OBJECT MODULE PLACED IN :F0:ACCREJ.OBJ
ASSEMBLER INVOKED BY: ASM51 ACCREJ.F16 NOSYMBOLS

LOC  OBJ           LINE     SOURCE

1             NAME    ACCEPT_REJECT
                     2      ;NORMAL ACCEPT_REJECT PROCESSING
                     3      ;*********************************************************************
                     4      ;
                     5      ;   ACCEPT_REJECT FILTER
                     6      ;
                     7      ;       ENTER- ACC.0= VECTOR TO CHANNELS TO BE PROCESSED
                     8      ;                       0- PHONE0/1, 1- PHONE2/3
                     9      ;
                    10      ;       RETURN- ACCEPT/REJECT STATE VECTOR UPDATED, PN(I),CN(I) MAY BE UPDATED
                    11      ;
                    12      ;       EXTERNAL EFFECTS- CN(I), I.E. CNH AND CNL AND PN MAY BE CHANGED
                    13      ;
                    14      ;       SAMPLING RATE (EACH PHONE)-      32 MS
                    15      ;
                    16      ;       MAX DURATION- TYPICAL/WORST  STATE A=221/333 B=-/306 C=-/306 D=-/184
                    17      ;                       NUMBERS ARE FOR DUAL CHANNEL SAMPLE
                    18      ;
                    19      ;*********************************************************************
                    20 +1   $INCLUDE(DEFINE.TXT)
            =1      21 +1   $NOLIST
                   381      ACCEPT_REJ      SEGMENT CODE
    ----           382                      RSEG    ACCEPT_REJ
                   383      PUBLIC  ACCREJ
                   384      EXTRN   CODE(SCHED_RTN,XRAM,XDB_0,XDB_1,XDB_2,XDB_3)
                   385
0000 A2E0          386      ACCREJ: MOV     C,ACC.0         ;SAVE SCHEDULE TIME VECTOR
0002 903FEF        387              MOV     DPTR,#ACRJBY    ;GET ACCEPT/REJECT SIGS FROM EXT MEMORY
0005 E0            388              MOVX    A,@DPTR         ;LOAD ACCEPT/REJECT BYTE
0006 64FF          389              XRL     A,#AR_POL       ;SET TRUE=1 POLARITY
0008 F526          390              MOV     AR_SIGNALS,A    ;TEMP STORE COLLECT/RETURN SIGNALS
000A 75A000   F    391              MOV     P2,#HIGH(XDB_0) ;SET PAGE ADDRESS FOR XRAM POINTER ACCESS
000D 4045          392      ?AR0:   JC      AR23            ;PROCESS PHONE0 AND 1 IF EVEN SCHEDULED
                   393                                      ;TIME ELSE PROCESS PHONE2 AND 3
                   394      AR01:   ;ACRJ(0)
                   395 +1
                   396 +2   ACCREJ0:
000F A237          397 +2           MOV     C,REJ_0 ;SET L_IN_BY ACC AND REJ BITS
0011 9212          398 +1           MOV     REJECT,C
0013 A236          399 +2           MOV     C,ACC_0
0015 9213          400 +1           MOV     ACCEPT,C
0017 903FF7        401 +2           MOV     DPTR,#COIN_DET0 ;GET BOX COLLECT DET SIGNAL
001A E0            402 +1           MOVX    A,@DPTR
001B 541F          403 +2           ANL     A,#(COIN_MASK_0+COIN_CODE_MASK)
001D C210          404 +1           CLR     AR_BOX_SIG_DET
001F B40302        405 +2   ?AR0_0: CJNE    A,#(NOT(AR_BOX_COLLECT_CODE) AND (COIN_CODE_MASK)),LXBUF0
0022 D210          406 +1           SETB    AR_BOX_SIG_DET
0024 900000   F    407 +2   LXBUF0: MOV     DPTR,#XDB_0     ;LOAD DATA BUFFER POINTER
0027 E506          408 +2           MOV     A,DIALCT_0      ;CHECK FOR DIAL TONE
0029 30E702        409 +2   ?AR1_0: JNB     SSN,FRCEX0      ;OR DIAL TONE PRESENT TO FORCE
002C D22F          409 +1           SETB    AR_FORCE
002E 1100     F    410 +2   FRCEX0: ACALL   ARPROC
                   411 +1
                   412 +1   $NOGEN
                   413              %ACRJ(1)
0051 020000   F    431              LJMP    SCHED_RTN
```

```
                    432
                    433     AR23:
                    434             %ACRJ(2)
                    452             %ACRJ(3)
0096 020000    F    470             LJMP    SCHED_RTN
0099 7400           471     ARPROC:         MOV     A,#XPAR         ;LOAD PARITY AND PARAMATERS
009B 93             472                     MOVC    A,@A+DPTR
009C F50A           473                     MOV     PAR,A
009E 7408           474                     MOV     A,#XAR_ST
00A0 93             475                     MOVC    A,@A+DPTR       ;STATE VECTOR
00A1 F525           476                     MOV     AR_ST,A
00A3 7401           477                     MOV     A,#XFLAGSA      ;LOAD FLAG BYTE
00A5 93             478                     MOVC    A,@A+DPTR
00A6 F521           479                     MOV     FLAGSA,A
00A8 202905         480     ?AR1:   JB      AR_ST.1,AR_ST_BC
00AB 302809         481     ?AR2:   JNB     AR_ST.0,AR_STA          ;STATE A= XXXXXX00
00AE 802A           482             SJMP    AR_STB                  ;STATE B= XXXXXX01
                    483     AR_ST_BC:
00B0 302802         484     ?AR3:   JNB     AR_ST.0,G_STC           ;STATE C= XXXXXX10
00B3 0100      F    485             AJMP    AR_STD                  ;STATE D= XXXXXX11
00B5 0100      F    486     G_STC:  AJMP    AR_STC
                    487     AR_STA:                                 ;STATE A - IDLE LOOP UNTIL AC OR RJ ACTIVE
00B7 201205         488     ?AR4:   JB      REJECT,ARA_SETB         ;SET UP STATE B IF REJECT ACTIVE
00BA 201319         489     ?AR5:   JB      ACCEPT,ARA_SETC         ;SET UP STATE C IF ACCEPT ACTIVE
                    490     ;                                       ;CHECK FOR COIN BOX COLLECTION
00BD 0100      F    491             AJMP    BOX_COL_CK              ;CHECK FOR BOX COLLECTIONS
                    492     ARA_SETB:
00BF D22B           493             SETB    AR_ST.0                 ;SET TO STATE B=XXXXXX01
00C1 E52B           494     TMR_ST: MOV     A,TF                    ;START ACCREJ AQUISITION TIMER
                    495     $GEN    ;XMOV(XAR_ACRJ_TMR)
                    496      %XMOV(XAR_ACRJ_TMR)
                    497 +1
00C3 F8             498 +1   MOV POINTER,A ;MOVE (A) TO XRAM AND UPDATE PAR.  NOTE-
                    499 +1       ;DPH MUST BE SET TO XDB_I HI BYTE !!!!!!!!!!
                    500 +1       ;TEMPORARLY STOR A
                    501 +1   MOV A,#XDEST
00C4 7409           502 +2         XAR_ACRJ_TMR ;REMOVE OLD XRAM DATA FROM PARITY
00C6 93             503 +1   MOVC A,@A+DPTR
00C7 650A           504 +1   XRL A,PAR
00C9 68             505 +1   XRL A,POINTER ;INCLUDE NEW DATA IN PARITY AND STORE
00CA F50A           506 +1   MOV PAR,A
00CC E582           507 +1   MOV A,DPL  ;GENERATE DESTINATION POINTER
                    508 +1   ADD A,#XDEST
00CE 2409           509 +2         XAR_ACRJ_TMR
00D0 C8             510 +1   XCH A,POINTER ;STORE NEW DATA
00D1 F2             511 +1   MOVX @POINTER,A
                    512 +1
                    513 +1  $NOGEN
00D2 D22B           514             SETB    AR_ACRJ_TMR_EN
00D4 0100      F    515             AJMP    AR_EXIT
                    516     ARA_SETC:
00D6 D229           517             SETB    AR_ST.1                 ;SET TO STATE C=XXXXXX10
00D8 80E7           518             SJMP    TMR_ST
                    519     AR_STB:                                 ;REJECT LOOP - CLEAR PENDING COIN COUNTERS IF
                    520                                             ;REJECT_I EXCEEDS  AR_SIG_TIME
00DA 201206         521     ?AR6:   JB      REJECT,AR_STB1          ;EXIT TO STATE A IF REJ TIME TO SHORT ELSE
                    522                                             ;CHECK TIMER VALUE
00DD C228           523             CLR     AR_ST.0                 ;SET TO STATE A=XXXXXX00
00DF C22B           524             CLR     AR_ACRJ_TMR_EN          ;STOP ACQUISITION TIMER
00E1 0100      F    525             AJMP    AR_EXIT
                    526     AR_STB1:                                ;CHECK ACCEPT/REJECT SIGNAL DURATION
                    527     $GEN
                    528      %TIME(TF,XAR_ACRJ_TMR,AR_SIG_TIME)
                    529 +1
```

```
                          530 +1      MOV    A,#%TM_START
00E3 7409                 531 +2             %AR_ACRJ_TMR  ;SET C IF TIME DURATION >= THRESHOLD
00E5 93                   532 +1      MOVC   A,@A+DPTR  ;LOAD TM_START
00E6 F4                   533 +1      CPL    A          ;ACC= -TM_START [TWOS COMPLEMENT]
00E7 04                   534 +1      INC    A
                          535 +1      ADD    A,%CLOCK
00E8 252B                 536 +2             TF  ;ACC= (TM_PRESENT-TM_START)
                          537 +1         ;    = DELTA_T
                          538 +1      ADD    A,#-%THRESHOLD
00EA 24C1                 539 +2             AR_SIG_TIME  ;ACC= DELTA_T- THRESHOLD
                          540 +1
                          541 +1  $NOGEN
00EC 4002                 542     ?AR7:  JC     AR_STBC_CLR   ;IF DURATION LONG ENOUGH THEN CLEAR PENDING
00EE 0100      F          543            AJMP   AR_EXIT        ;ELSE EXIT
                          544     AR_STBC_CLR:                 ;CLEAR PENDING NICKELS AND TONE COUNT
00F0 C22B                 545            CLR    AR_ACRJ_TMR_EN ;STOP ACQUISITION TIMER
00F2 7400                 546            MOV    A,#0
                          547            %XMOV(%PN)
0103 7400                 561            MOV    A,#0
                          562            %XMOV(%TC)
0114 C22F                 576            CLR    AR_FORCE
0116 C209                 577            CLR    CN_ACTIVE_TMR_EN
0118 740D                 578            MOV    A,#%AR_RTY_COUNT ;INCREMENT RETRY COUNT AND SET RTY INTVL TMR
011A 93                   579            MOVC   A,@A+DPTR
011B 04                   580            INC    A
                          581            %XMOV(%AR_RTY_COUNT)
012B D22A                 595            SETB   AR_RTY_TMR_EN
012D E52C                 596            MOV    A,TS
                          597            %XMOV(%AR_RTY_TMR)
013E E525                 611            MOV    A,AR_ST
0140 4403                 612            ORL    A,#00000011B   ;SET TO STATE D=XXXXXX11
0142 F525                 613            MOV    AR_ST,A
0144 0100      F          614            AJMP   AR_EXIT
                          615     AR_STC:
0146 201306               616     ?AR8:  JB     ACCEPT,AR_STC1 ;EXIT TO STATE A IF ACCEPT DURATION TO SHORT
0149 C22B                 617            CLR    AR_ACRJ_TMR_EN ;STOP ACQUISITION TIMER
014B C229                 618            CLR    AR_ST.1        ;SET TO STATE A=XXXXXX00
014D 0100      F          619            AJMP   AR_EXIT
                          620     AR_STC1:                     ;CHECK ACCEPT TIME DURATION
                          621            %TIME(TF,%AR_ACRJ_TMR,AR_SIG_TIME)
0158 4002                 630     ?AR9:  JC     AR_STC2        ;UPDATE CUMULATIVE COUNTS AND CLEAR PENDING IF
                          631                                  ;TIME> MIN SIG_TIME ELSE
015A 0100      F          632            AJMP   AR_EXIT        ;EXIT IF TIME TO SHORT
                          633     AR_STC2:
015C 302F0C               634     ?AR10: JNB    AR_FORCE,UPD_CUM ;IF FORCE NOT SET THEN CN=CN+PN+TC ELSE
                          635                                  ;CN=CN+[GREATER OF PN OR LOCAL RATE]
015F 740B                 636            MOV    A,#%LOCAL_RATE ;INSURE PENDING>= LOCAL TOLL RATE
0161 93                   637            MOVC   A,@A+DPTR
0162 F8                   638            MOV    POINTER,A
0163 7407                 639            MOV    A,#%PN
0165 93                   640            MOVC   A,@A+DPTR
0166 C3                   641            CLR    C
0167 9B                   642            SUBB   A,POINTER      ;A= PENDING NICKELS - LOCAL_RATE
0168 20E70A               643     ?AR11: JB     SGN,PN_CN      ;IF PN<LOCAL_RATE THEN FORCE TO LOCAL_RATE
                          644     UPD_CUM:
016B 7407                 645            MOV    A,#%PN         ;GET PN
016D 93                   646            MOVC   A,@A+DPTR
016E F8                   647            MOV    POINTER,A      ;TEMP STORE
016F 7406                 648            MOV    A,#%TC         ;GET TC
0171 93                   649            MOVC   A,@A+DPTR
0172 6001                 650     ?AR11A: JZ    PN_CN          ;IF TC>0 THEN PN=PN+TC
0174 08                   651            INC    POINTER
0175 7410                 652     PN_CN: MOV    A,#%CNL        ;GET LOW BYTE OF CUMULATIVE NICKELS
```

```
0177 93              653            MOVC    A,@A+DPTR      ;GET CUMULATIVE NICKELS
0178 28              654            ADD     A,POINTER      ;A= CN(LSB) +PN
0179 9216            655            MOV     CHOLD,C
                     656            ZXMOV(XCNL)
018A 201602          670    ?AR12:  JB      CHOLD,CNH_I    ;IF NO OVERFLOW THEN EXIT
018D 0100     F      671            AJMP    AR_STBC_CLR
018F 7411            672    CNH_I:  MOV     A,#XCNH        ;ELSE INCREMENT CUMULATIVE NICKELS (MSB)
0191 93              673            MOVC    A,@A+DPTR
0192 04              674            INC     A
                     675            ZXMOV(XCNH)
01A2 0100     F      689            AJMP    AR_STBC_CLR
                     690    AR_STD:                        ;STATE D WAIT FOR AC/RJ DE-ASSERTION
01A4 201209          691    ?AR15:  JB      REJECT,AR_RTN
01A7 201306          692    ?AR16:  JB      ACCEPT,AR_RTN
01AA E525            693            MOV     A,AR_ST        ;SET TO STATE A=XXXXXX00
01AC 54FC            694            ANL     A,#NOT(00000011B)
01AE F525            695            MOV     AR_ST,A
01B0 0100     F      696    AR_RTN: AJMP    AR_EXIT
                     697    BOX_COL_CK:                    ;BOX COLLECTION CHECK
01B2 202D18          698    ?ARA1:  JB      AR_BOX_TMR_EN,CK_COL ;IF TIMER NOT ACTIVE THEN CHECK FOR SIG
01B5 301013          699    ?ARA2:  JNB     AR_BOX_SIG_DET,G_RTY_CK ;EXIT IF NO BOX COLLECTION SIGNAL
01B8 E52C            700            MOV     A,TS           ;START BOX TIMER
                     701            ZXMOV(XAR_BOX_TMR)
01C9 D22D            715            SETB    AR_BOX_TMR_EN
                     716    G_RTY_CK:
01CB 0100     F      717            AJMP    RETRY_CK
                     718    CK_COL:
01CD 302E11          719    ?ARA3:  JNB     AR_BOX_COLLECTED,BOX_TM ;IF BOX COLLECTED CHECK BLACKOUT WINDOW
                     720            ZTIME(TS,XAR_BOX_TMR,AR_BLACKOUT_TM)
01D9 50F0            729    ?ARA5:  JNC     G_RTY_CK       ;EXIT IF NOT YET TIMED OUT
01DB C22E            730            CLR     AR_BOX_COLLECTED ;SHUT OFF BOX COLLECT AND BOX TIMER
01DD C22D            731            CLR     AR_BOX_TMR_EN
01DF 0100     F      732            AJMP    RETRY_CK
                     733    BOX_TM: ZTIME(TS,XAR_BOX_TMR,AR_BOX_COLLECT_TM)
01EA 4007            742    ?ARA4:  JC      HEAD           ;EXIT IF DURATION STILL TO SHORT
01EC 201074          743            JB      AR_BOX_SIG_DET,RETRY_CK
01EF C22D            744            CLR     AR_BOX_TMR_EN
01F1 0100     F      745            AJMP    RETRY_CK
01F3 742F            746    HEAD:   MOV     A,#XCOL_HEAD   ;GET BOX COLLECT POINTER
01F5 93              747            MOVC    A,@A+DPTR
01F6 24F4            748            ADD     A,#((1-XCOL_REC_NUM)*XCOL_REC_LEN)
01F8 4002            749    ?ARA4A: JC      SAV_CP         ;IF HEAD>=TOP OF BUFFER THEN ROLL HEAD OVER
01FA 2410            750            ADD     A,#XCOL_REC_NUM*XCOL_REC_LEN
                     751    SAV_CP: ZXMOV(XCOL_HEAD)       ;SAVE NEW COLLECTION HEAD POINTER
020B 2430            765            ADD     A,#XCOL_CIRCLE_BUF ;LOAD INITIAL CIRCULAR BUFFER POINTER
020D F503            766            MOV     GENR3,A        ;TEMP STORE POINTER VALUE
020F 7412            767            MOV     A,#XCCT        ;INCREMENT BOX COLLECTION COUNT
0211 93              768            MOVC    A,@A+DPTR
0212 04              769            INC     A
                     770            ZXMOV(XCCT)
0222 7411            784            MOV     A,#XCNH
0224 93              785            MOVC    A,@A+DPTR      ;PUSH CNH
0225 C0E0            786            PUSH    ACC
0227 7410            787            MOV     A,#XCNL        ;PUSH CNL
0229 93              788            MOVC    A,@A+DPTR
022A C0E0            789            PUSH    ACC
022C 750204          790            MOV     GENR2,#XCOL_REC_NUM ;LOAD NUMBER OF PARAMATERS
022F A803            791            MOV     POINTER,GENR3
0231 E8              792    AR_LP1: MOV     A,POINTER
0232 93              793            MOVC    A,@A+DPTR
0233 650A            794            XRL     A,PAR          ;REMOVE FROM PARITY
0235 F50A            795            MOV     PAR,A
0237 08              796            INC     POINTER
```

| | | | | | |
|---|---|---|---|---|---|
| 0238 D502F6 | | 797 | DJNZ | GENR2,AR_LP1 | |
| 023B E503 | | 798 | MOV | A,GENR3 | ;GET DESTINATION START LOCATION |
| 023D 2582 | | 799 | ADD | A,DPL | |
| 023F F8 | | 800 | MOV | POINTER,A | |
| 0240 D0E0 | | 801 | POP | ACC | ;STORE CNL |
| 0242 F2 | | 802 | MOVX | @POINTER,A | |
| 0243 650A | | 803 | XRL | A,PAR | |
| 0245 F50A | | 804 | MOV | PAR,A | |
| 0247 D0E0 | | 805 | POP | ACC | ;STORE CNH |
| 0249 08 | | 806 | INC | POINTER | |
| 024A F2 | | 807 | MOVX | @POINTER,A | |
| 024B 650A | | 808 | XRL | A,PAR | |
| 024D F50A | | 809 | MOV | PAR,A | |
| 024F 08 | | 810 | INC | POINTER | |
| 0250 E52D | | 811 | MOV | A,T_2MIN | ;STORE 2 MINUTE CLOCK |
| 0252 F2 | | 812 | MOVX | @POINTER,A | |
| 0253 650A | | 813 | XRL | A,PAR | |
| 0255 F50A | | 814 | MOV | PAR,A | |
| 0257 08 | | 815 | INC | POINTER | |
| 0258 E52E | | 816 | MOV | A,T_9HRS | ;STORE 9 HOUR CLOCK |
| 025A F2 | | 817 | MOVX | @POINTER,A | |
| 025B 650A | | 818 | XRL | A,PAR | |
| 025D F50A | | 819 | MOV | PAR,A | |
| 025F D22E | | 820 | SETB | AR_BOX_COLLECTED | ;SET BOX COLLECTED FLAG |
| 0261 0100 | F | 821 | AJMP | AR_EXIT | |
| | | 822 | RETRY_CK: | | |
| 0263 302A68 | | 823 | ?ARA6: JNB | AR_RTY_TMR_EN,AR_EXIT | ;IF SIGNAL DETECTED THEN CHECK TIMER |
| | | 824 | %TIME(TS,XAR_RTY_TMR,AR_RTY_INTERVAL) | | |
| 026F 505D | | 833 | ?ARA7: JNC | AR_EXIT | |
| 0271 740F | | 834 | MOV | A,#XAR_RETRY_AVG | ;GET NEW AVERAGE (USING IIR FILTER) |
| 0273 93 | | 835 | MOVC | A,@A+DPTR | |
| 0274 C0E0 | | 836 | PUSH | ACC | |
| 0276 75F020 | | 837 | MOV | B,#AR_IIR_TC | ;LOAD INFINITE IMPULSE RESPONSE FILTER TIME |
| | | 838 | | | ;CONSTANT |
| 0279 84 | | 839 | DIV | AB | ;A= INT(AVG/IIR) NOTE- AVG= 32*ACTUAL_AVERAGE |
| 027A F5F0 | | 840 | MOV | B,A | |
| 027C 740D | | 841 | MOV | A,#XAR_RTY_COUNT | |
| 027E 93 | | 842 | MOVC | A,@A+DPTR | ;AVERAGE IN 32*(RETRY_COUNT) |
| 027F C3 | | 843 | CLR | C | |
| 0280 95F0 | | 844 | SUBB | A,B | ;B= RTY_COUNT- INT (AVG) |
| 0282 7001 | | 845 | JNZ | NO_DEC | ;IF AVERAGE REACHED, OSCILLATE AROUND IT |
| 0284 14 | | 846 | DEC | A | |
| 0285 D0F0 | | 847 | NO_DEC: POP | B | |
| 0287 25F0 | | 848 | ADD | A,B | ;A= 32*OLD_AVG + DELTA_NEW_COUNT_FROM_AVG |
| 0289 F5F0 | | 849 | MOV | B,A | |
| 028B 740E | | 850 | MOV | A,#XAR_RETRY_THRESH | |
| 028D 93 | | 851 | MOVC | A,@A+DPTR | |
| 028E C3 | | 852 | CLR | C | |
| 028F 95F0 | | 853 | SUBB | A,B | |
| 0291 20E717 | | 854 | ?ARA8: JB | SGN,CLR_TMR | |
| 0294 7420 | | 855 | MOV | A,#XFM_FLAG1 | ;COMPLEMENT RETRY ERROR FLAG |
| 0296 93 | | 856 | MOVC | A,@A+DPTR | |
| 0297 B2E3 | | 857 | CPL | RETRY_ERR_AR | ;TOGGLE COLLECT RETURN FLAG |
| | | 858 | %XMOV(XFM_FLAG1) | | |
| 02A8 75F040 | | 872 | MOV | B,#(2*32) | ;SET TO AN AVERAGE OF 2 SIGNALS PER ACRJ ACTION |
| | | 873 | CLR_TMR: | | |
| 02AB C22A | | 874 | CLR | AR_RTY_TMR_EN | |
| 02AD E5F0 | | 875 | MOV | A,B | ;SAVE NEW AVERAGE |
| | | 876 | %XMOV(XAR_RETRY_AVG) | | |
| 02BE E4 | | 890 | CLR | A | |
| | | 891 | %XMOV(XAR_RTY_COUNT) | | |
| | | 905 | AR_EXIT: | | |
| 02CE 7408 | | 906 | MOV | A,#XAR_ST | ·CHECK FOR CHANGES IN AR_ST OR FLAGSA |

```
02D0 93        907                        ;WHICH WILL CHANGE PARITY
               908           MOVC  A,@A+DPTR
02D1 6525      909           XRL   A,AR_ST
02D3 600C      910           JZ    FLAG_CK    ;IF STATE CHANGED THEN UPDATE PARITY AND SAVE NEW STATE
02D5 650A      911           XRL   A,PAR
02D7 F50A      912           MOV   PAR,A
02D9 E582      913           MOV   A,DPL
02DB 2408      914           ADD   A,#XAR_ST
02DD F8        915           MOV   POINTER,A
02DE E525      916           MOV   A,AR_ST
02E0 F2        917           MOVX  @POINTER,A
               918    FLAG_CK:
02E1 7401      919           MOV   A,#XFLAGSA
02E3 93        920           MOVC  A,@A+DPTR
02E4 6521      921           XRL   A,FLAGSA
02E6 600C      922           JZ    PAR_CK
02E8 650A      923           XRL   A,PAR
02EA F50A      924           MOV   PAR,A
02EC E582      925           MOV   A,DPL
02EE 2401      926           ADD   A,#XFLAGSA
02F0 F8        927           MOV   POINTER,A
02F1 E521      928           MOV   A,FLAGSA
02F3 F2        929           MOVX  @POINTER,A
02F4 7400      930    PAR_CK: MOV  A,#XPAR
02F6 93        931           MOVC  A,@A+DPTR
02F7 650A      932           XRL   A,PAR
02F9 6003      933           JZ    RET1
02FB E50A      934           MOV   A,PAR
02FD F0        935           MOVX  @DPTR,A
02FE 22        936    RET1:  RET
               937           END
```

REGISTER BANK(S) USED: 0, TARGET MACHINE(S): 8051

ASSEMBLY COMPLETE, NO ERRORS FOUND

ISIS-II MCS-51 MACRO ASSEMBLER V2.0
OBJECT MODULE PLACED IN :F0:OFFHK.OBJ
ASSEMBLER INVOKED BY: ASM51 OFFHK.J21 NOSYMBOLS

```
LOC  OBJ       LINE    SOURCE

1              NAME   OFF_HOOK_FILTER
               2       ;****************************************************************
               3       ;
               4       ; OFF HOOK FILTER TO BRIDGE ROTARY PULSES AND GLITCHES
               5       ;
               6       ;      ENTER- SCHEDULER VECTOR IN ACC, OFHK_RT IN INPUT PORT
               7       ;
               8
               9       ;      RETURN- OFHK_PR (PROCESSED/FILTERED OFF HOOK), CALL TIME AND IDLE
               10      ;              TIME UPDATED, IDLE AND CALL INACTIVITY FLAGS TOGGLED
               11      ;
               12      ;      SAMPLING RATE (EACH PHONE) -   32 MS
               13      ;
               14      ;      DURATION- 60 CYCLES TYPICAL/113 WORST CASE [EXCLUDES SCHEDULER TIME]
               15      ;
               16      ;****************************************************************
               17 +1   $INCLUDE(DEFINE.TXT)
          =1   18 +1   $NOLIST
               378     PUBLIC  OFFHK
               379     EXTRN   CODE(SCHED_RTN,XDB_0,XDB_1,XDB_2,XDB_3)
               380     OFF_HOOK_SEG    SEGMENT CODE
```

```
                         381              RSEG    OFF_HOOK_SEG
                         382
0000 75A000    F         383     OFFHK:   MOV     P2,#HIGH(XDB_0)      ;SET PAGE ADR FOR INDIR POINTER ACCESS
0003 20E117              384     ?OFHS0:  JB      ACC.1,OFHK23         ;GO TO PROPER STATE
0006 20E00A              385     ?OFHS1:  JB      ACC.0,OFFHK1
                         386     OFFHK0:                               ;SCHED VECTOR XXXXXX00 PHONE CHANNEL 0
                         387 +1
0009 900000    F         388 +2           MOV     DPTR,#XDB_0
000C A291                389 +2           MOV     C,OFHK_IN_0
000E B3                  390 +1           CPL     C                    ;INVERT NEGATIVE INPUT POLARITY
000F 9214                391 +1           MOV     OFHK_RT,C
0011 0100      F         392 +1           AJMP    OFHK_PROCS
                         393 +1
                         394 +1  $NOGEN
                         395     OFFHK1:                               ;XXXXXX01 -PHONE 1
                         396              %PHONE(1)
                         403     OFHK23:
001D 20E00A              404     ?OFHS2:  JB      ACC.0,OFFHK3
                         405     OFFHK2:                               ;XXXXXX10 -PHONE 2
                         406              %PHONE(2)
                         413     OFFHK3:                               ;XXXXXX11 -PHONE 3
                         414              %PHONE(3)
                         421     OFHK_PROCS:                  ;GENERATE DE-GLITCHED OFF_HOOK SIGNAL
0034 7400                422              MOV     A,#%PAR              ;LOAD PARITY, STATE, AND FLAGS
0036 93                  423              MOVC    A,@A+DPTR
0037 F50A                424              MOV     PAR,A
0039 7413                425              MOV     A,#%OFHK_ST
003B 93                  426              MOVC    A,@A+DPTR
003C F525                427              MOV     OFHK_ST,A
003E 302302              428     ?OFH1:   JNB     OFHK_PR,CK_TMR       ;IF OFF HOOK THEN GOTO OFHK CHECK
0041 0100      F         429              AJMP    OFHK_PROC
                         430     CK_TMR:
0043 202976              431     ?OFH2:   JB      OFHK_TMR_EN,RT_ACT   ;IF TIMER ACTIVE THEN CHECK TIME
0046 301413              432     ?OFH3:   JNB     OFHK_RT,IDLE_MON     ;IF ON HOOK GOTO IDLE MONITOR
0049 E52B                433              MOV     A,TF                 ;START OFF HOOK ACQUISITION TIMER
                         434     $GEN
                         435              %XMOV(XOFHK_TMR)
                         436 +1
004B F8                  437 +1           MOV POINTER,A ;MOVE (A) TO XRAM AND UPDATE PAR. NOTE-
                         438 +1              ;DPH MUST BE SET TO XDB_I HI BYTE !!!!!!!!!!
                         439 +1              ;TEMPORARLY STOR A
                         440 +1           MOV A,#%DEST
004C 7414                441 +2              XOFHK_TMR ;REMOVE OLD XRAM DATA FROM PARITY
004E 93                  442 +1           MOVC A,@A+DPTR
004F 650A                443 +1           XRL A,PAR
0051 68                  444 +1           XRL A,POINTER ;INCLUDE NEW DATA IN PARITY AND STORE
0052 F50A                445 +1           MOV PAR,A
0054 E582                446 +1           MOV A,DPL ;GENERATE DESTINATION POINTER
                         447 +1           ADD A,#%DEST
0056 2414                448 +2              XOFHK_TMR
0058 C8                  449 +1           XCH A,POINTER ;STORE NEW DATA
0059 F2                  450 +1           MOVX @POINTER,A
                         451 +1
                         452 +1  $NOGEN
005A D229                453              SETB    OFHK_TMR_EN
                         454     IDLE_MON:
                         455     $GEN
                         456              %TIME(TS,XOFHK_INTVL_TMR,OFHK_IDLE_TICK_TIME)
                         457 +1
                         458 +1           MOV A,#%TM_START
005C 7415                459 +2              XOFHK_INTVL_TMR ;SET C IF TIME DURATION >= THRESHOLD
005E 93                  460 +1           MOVC A,@A+DPTR ;LOAD TM_START
005F F4                  461 +1           CPL A ;ACC= -TM_START [TWOS COMPLEMENT]
```

```
0060 04        462 +1   INC    A
               463 +1   ADD    A,%CLOCK
0061 252C      464 +2          TS ;ACC= (TM_PRESENT-TM_START)
               465 +1          ;  = DELTA_T
               466 +1   ADD    A,#-%THRESHOLD
0063 2406      467 +2          OFHK_IDLE_TICK_TIME ;ACC= DELTA_T- THRESHOLD
               468 +1
               469 +1   $NOGEN
0065 4002      470      ?OFH4: JC     TICKCK              ;IF TICK OCCURS THEN INCREMENT PHONE
               471                                        ;IDLE TIME
0067 0100   F  472             AJMP   RET1
0069 7416      473      TICKCK: MOV   A,#XOFHK_IDLE_TIME_L
006B 93        474             MOVC   A,@A+DPTR
006C 2401      475             ADD    A,#01H
006E 9216      476             MOV    CHOLD,C             ;SAVE CARRY
               477             %XMOV(XOFHK_IDLE_TIME_L)
007F 301670    491      ?OFH5: JNB    CHOLD,TM_RESTART    ;IF LSB OVERFLOW THEN INCREMENT MSB
0082 741A      492             MOV    A,#XOFHK_IDLE_THRESH
0084 93        493             MOVC   A,@A+DPTR
0085 F502      494             MOV    GENR2,A
0087 7417      495             MOV    A,#XOFHK_IDLE_TIME_H
0089 93        496             MOVC   A,@A+DPTR
008A B50202    497      ?OFH5A: CJNE  A,GENR2,HI_CK       ;IF CALL TIME= CALL ALARM THRESH THEN
               498                                        ;EXIT
008D 8063      499             SJMP   TM_RESTART
008F 04        500      HI_CK: INC    A
0090 B50218    501      ?OFH5B: CJNE  A,GENR2,SAV_II      ;IF CALL TIME BECOMES ALARM LEVEL THEN
               502                                        ;FLAG ALARM
0093 C0E0      503             PUSH   ACC
0095 7420      504             MOV    A,#XFM_FLAG1
0097 93        505             MOVC   A,@A+DPTR
0098 B2E5      506             CPL    IDLE_ALARM_OFHK
               507             %XMOV(XFM_FLAG1)
00A9 D0E0      521             POP    ACC
               522      SAV_II:
               523             %XMOV(XOFHK_IDLE_TIME_H)
00BA 0100   F  537             AJMP   TM_RESTART
               538      RT_ACT:
00BC 201404    539      ?OFH8: JB     OFHK_RT,OFT_CK      ;IF REAL TIME OFHK THEN CHECK TIME
00BF C229      540             CLR    OFHK_TMR_EN         ;ELSE STOP TIMER
00C1 8099      541             SJMP   IDLE_MON
               542      OFT_CK:
               543             %TIME(TF,XOFHK_TMR,OFHK_DET_TIME)
00CC 508E      552      ?OFH9: JNC    IDLE_MON            ;IF T<ACQUISITION TIME THEN EXIT
00CE E4        553             CLR    A                   ;RESET CALL TIME
               554             %XMOV(XOFHK_CALL_TIME_L)
00DE E4        568             CLR    A
               569             %XMOV(XOFHK_CALL_TIME_H)
00EE C229      583             CLR    OFHK_TMR_EN
00F0 D228      584             SETB   OFHK_PR
               585      TM_RESTART:                       ;RESTART IDLE/CONVERSATION TIMER
00F2 E52C      586             MOV    A,TS
               587             %XMOV(XOFHK_INTVL_TMR)
0103 7413      601      RET1:  MOV    A,#XOFHK_ST         ;CHECK FOR CHANGES
0105 93        602             MOVC   A,@A+DPTR
0106 6525      603             XRL    A,OFHK_ST
0108 6011      604             JZ     CK_PAR
010A E525      605             MOV    A,OFHK_ST
               606             %XMOV(XOFHK_ST)
011B 7400      620      CK_PAR: MOV   A,#XPAR
011D 93        621             MOVC   A,@A+DPTR
011E 650A      622             XRL    A,PAR
0120 6003      623             JZ     EXT
```

```
0122 E50A       624            MOV     A,PAR
0124 F0         625            MOVX    @DPTR,A
0125 020000  F  626     EXT:   LJMP    SCHED_RTN
                627     OFHK_PROC:
0128 202974     628     ?OFH10: JB     OFHK_TMR_EN,CK_OF    ;IF ACQUISITION TIMER ACTIVE CHECK TIME
012B 201413     629     ?OFH11: JB     OFHK_RT,CALL_MON     ;IF OFHK_RT=0 THEN START ACQUISTN TIMER
012E E52C       630            MOV     A,TS
                631            %XMOV(XOFHK_TMR)
013F D229       645            SETB    OFHK_TMR_EN
                646     CALL_MON:
                647            %TIME(TS,XOFHK_INTVL_TMR,OFHK_CALL_TICK_TIME)
014A 50B7       656     ?OFH12: JNC    RET1                 ;IF TICK OCCURS THEN INCREMENT PHONE
                657                                         ;CALL TIME
014C 7418       658            MOV     A,#XOFHK_CALL_TIME_L
014E 93         659            MOVC    A,@A+DPTR
014F 2401       660            ADD     A,#01H
0151 9216       661            MOV     CHOLD,C              ;SAVE CARRY
                662            %XMOV(XOFHK_CALL_TIME_L)
0162 30168D     676     ?OFH13: JNB    CHOLD,TM_RESTART     ;IF LSB OVERFLOW THEN INCREMENT MSB
0165 741B       677            MOV     A,#XOFHK_CALL_THRESH
0167 93         678            MOVC    A,@A+DPTR
0168 F502       679            MOV     GENR2,A
016A 7419       680            MOV     A,#XOFHK_CALL_TIME_H
016C 93         681            MOVC    A,@A+DPTR
016D B50202     682     ?OFH14: CJNE   A,GENR2,HI_CK1       ;IF CALL TIME= CALL ALARM THRESH THEN
                683                                         ;EXIT
0170 8080       684            SJMP    TM_RESTART
                685     HI_CK1:
0172 04         686            INC     A
0173 B50218     687     ?OFH14A: CJNE  A,GENR2,SAV_HI       ;IF CALL TIME BECOMES ALARM LEVEL THEN
                688                                         ;FLAG ALARM
0176 C0E0       689            PUSH    ACC
0178 7420       690            MOV     A,#XFM_FLAG1
017A 93         691            MOVC    A,@A+DPTR
017B B2E4       692            CPL     CALL_ALARM_OFHK
                693            %XMOV(XFM_FLAG1)
018C D0E0       707            POP     ACC
                708     SAV_HI:
                709            %XMOV(XOFHK_CALL_TIME_H)
019D 0100    F  723            AJMP    TM_RESTART
                724     CK_OF:
019F 301404     725     ?OFH16: JNB    OFHK_RT,ON_TCK       ;IF OFHK_RT THEN CHECK ACQUS TIME
01A2 C229       726            CLR     OFHK_TMR_EN          ;ELSE STOP ACQUISITION TIMER
01A4 809B       727            SJMP    CALL_MON
                728     ON_TCK:
                729            %TIME(TS,XOFHK_TMR,ONHK_DET_TIME)
01AF 5090       738     ?OFH17: JNC    CALL_MON             ;IF T<ACQUISITION TIME GOTO CALL MON
01B1 E4         739            CLR     A
                740            %XMOV(XOFHK_IDLE_TIME_L)     ;RESET IDLE TIME
01C1 E4         754            CLR     A
                755            %XMOV(XOFHK_IDLE_TIME_H)
01D1 C229       769            CLR     OFHK_TMR_EN          ;STOP ACQUISITION TIMER
01D3 C228       770            CLR     OFHK_PR              ;SET PROCESSED OFF HOOK TO ON-HOOK
01D5 0100    F  771            AJMP    TM_RESTART
                772            END
```

REGISTER BANK(S) USED: 0, TARGET MACHINE(S): 8051

ASSEMBLY COMPLETE, NO ERRORS FOUND

```
ISIS-II MCS-51 MACRO ASSEMBLER V2.0
NO OBJECT MODULE REQUESTED
ASSEMBLER INVOKED BY: ASM51 COMM.F16 NOSYMBOLS NOOBJECT

LOC  OBJ           LINE    SOURCE

1              NAME    COMMUNICATIONS
                    2 +1   $INCLUDE(DEFINE.TXT)
            =1      3 +1   $NOLIST
                  363      ;****************************************************************
                  364      ;
                  365      ;   DATA COMMUNICATIONS
                  366      ;
                  367      ;       ENTER- SERIAL INPUT/OUTPUT PROCESSOR BY INTERRUPT
                  368      ;              COMM DATA PROCESSOR BY SCHEDULER
                  369      ;
                  370      ;       RETURN-DATA BLOCK TRANSFERED TO OR FROM COP IN FOLLOWING FORM
                  371      ;              SLOT ADR
                  372      ;              COMMAND (RECIEVE ONLY)
                  373      ;              DATA PARAMATERS
                  374      ;              VERTICAL PARITY
                  375      ;
                  376      ;       SAMPLE RATE -   4 MS
                  377      ;
                  378      ;       DURATION - COLLECT POLL -     278 CYCLES
                  379      ;                  PARAMATER POLL -   191
                  380      ;                  FAULT POLL -       178
                  381      ;                  INITIALIZE         731
                  382      ;                  WRITE XRAM         512
                  383      ;                  READ BLOCK         450
                  384      ;
                  385      ;****************************************************************
                  386      ;
                  387
                  388
                  389      ;
                  390      SERIAL_COMM    SEGMENT CODE
    ----          391              RSEG    SERIAL_COMM
                  392      PUBLIC  COMM,ROM_COMM_INT,INVEX
                  393      EXTRN   CODE(SCHED_RTN,COM_VCT_12,COM_VCT_13,COM_VCT_14,COM_VCT_15)
                  394      EXTRN   CODE(XRAM,XDB_0,XDB_1,XDB_2,XDB_3,XRAM_PAR,XCOMM_VECT_TABLE)
                  395      EXTRN   CODE(XCOP)
                  396      ROM_COMM_INT:
0000 20991E       397      ?COM1:  JB      TI,TXPROC         ;IF TX INTR, GO TO TX PROCESS
0003 309A15       398      ?COM2:  JNB     RB8,RXDTAIN       ;IF DATA BYTE RECIEVED, INPUT AS NEXT BYTE
0006 C0E0         399              PUSH    ACC               ;ELSE SAVE A AND
0008 E599         400              MOV     A,SBUF            ;CHECK FOR DESIRED ADDRESS
000A 6509         401              XRL     A,SLOTAD
000C 540F         402              ANL     A,#COMADR_MASK
000E D29D         403              SETB    GM2               ;IF NOT ADDRESSED THEN DISABLE SERIAL BLOCK IN
0010 7004         404      ?COM3:  JNZ     RXIN_DISABLE      ; ELSE SET UP FOR INPUT BLOCK
0012 C29D         405              CLR     GM2
0014 792F         406              MOV     COMPTR,#COMBUF
                  407      RXIN_DISABLE:
0016 D0E0         408              POP     ACC
0018 C298         409              CLR     RI
001A 32           410              RETI
                  411      RXDTAIN:
001B A759         412              MOV     @COMPTR,SBUF      ;PASS DATA TO COMMUNICATIONS BUFFER
001D 09           413              INC     COMPTR
001E C298         414              CLR     RI                ;CLEAR INTERRUPT FLAG
0020 32           415              RETI
                  416      TXPROC:
```

```
0021 9211           417           MOV     CSAVE,C         ;SAVE C
0023 B92E07         418  ?COM4:   CJNE    COMPTR,#COMBUF-1,TXNEXT
                    419                                   ;BUFFER DEPLETED- SHUT DOWN TRANSMIT CHNL
0026 A211           420           MOV     C,CSAVE         ;RESTORE A
0028 C2B3           421           CLR     TXEN            ;DISABLE SERIAL CHANNEL
002A C299           422           CLR     TI              ;CLEAR INTERUPT FLAG
002C 32             423           RETI
                    424  TXNEXT:                          ;TRANSMIT NEXT BYTE
002D A211           425           MOV     C,CSAVE         ;RESTORE C
002F C299           426           CLR     TI              ;CLEAR INTERUPT FLAG
0031 8799           427           MOV     SBUF,@COMPTR    ;OUTPUT NEXT BYTE
0033 C52F           428           XCH     A,COMBUF        ;SAVE A
0035 67             429           XRL     A,@COMPTR       ;INCLUDE IN PARITY BYTE
0036 C52F           430           XCH     A,COMBUF        ;RESTORE A AND UPDATE PARITY BYTE
0038 19             431           DEC     COMPTR          ;POINT TO NEXT BYTE TO BE XMITTED
0039 32             432           RETI
                    433   ;
                    434   COMM:
003A 209D03         435  ?COM5:   JB      SM2,EXIT        ;EXIT IF NOT RECEIVING DATA BLOCK
003D B93103         436  ?COM6:   CJNE    COMPTR,#COM_LENGTH+1,NO_RX_CHK
                    437                                   ;IF LENGTH BYTE HAS BEEN RECEIVED CHECK LIMITS
0040 020000   F     438   EXIT:   LJMP    SCHED_RTN
                    439   NO_RX_CHK:
0043 40FB           440  ?COM6A:  JC      EXIT
0045 E530           441           MOV     A,COM_LENGTH
0047 24E8           442           ADD     A,#-(COM_BUF_SIZE+2)
0049 20E704         443  ?COM7:   JB      SGN,BUF_CK      ;IF BLOCK TO LARGE THEN ABORT
                    444   INVEX:
004C D29D           445   ABORT:  SETB    SM2             ;DISABLE FURTHER SERIAL INPUT
004E 80F0           446           SJMP    EXIT
                    447   BUF_CK:
0050 E9             448           MOV     A,COMPTR
0051 24D2           449           ADD     A,#-(COMBUF-1)
0053 C3             450           CLR     C
0054 9530           451           SUBB    A,COM_LENGTH
0056 20E7E7         452  ?COM8:   JB      SGN,EXIT        ;IF BLOCK LENGTH HAS NOT BEEN RECEIVED EXIT
0059 853002         453           MOV     GENR2,COM_LENGTH ;CHECK VERTICAL PARITY
005C 1502           454           DEC     GENR2
005E 782F           455           MOV     POINTER,#COMBUF
0060 E509           456           MOV     A,SLOTAD
0062 66             457   PAR_GN: XRL     A,@POINTER
0063 08             458           INC     POINTER
0064 D502FB         459           DJNZ    GENR2,PAR_GN
0067 70E3           460  ?COM9:   JNZ     ABORT           ;IF PARITY ERROR THEN ABORT
0069 E52F           461           MOV     A,COM_CMD       ;CHECK COMMAND PARITY
006B 30D00E         462  ?COM10:  JNB     P,ABORT         ;IF COMMAND PARITY ERROR THEN ABORT
                    463                                   ;POSITION AND MASK COMMAND FIELD FOR VECTOR
006E D29D           464           SETB    SM2             ;DISABLE SERIAL INPUT
0070 543C           465           ANL     A,#COMM_CMD_MASK
0072 03             466           RR      A
0073 900000   F     467           MOV     DPTR,#COMM_CMD_TABLE
0076 73             468  ?CMVCT:  JMP     @A+DPTR
                    469   COMM_CMD_TABLE:
0077 0100     F     470           AJMP    COLLECT_POLL    ;CMD=0-3  PHONE XX COLLECTION POLL
                    471                                   ;         0= PHONE 0
                    472                                   ;         1= PHONE 1
                    473                                   ;         2= PHONE 2
                    474                                   ;         3= PHONE 3
0079 0100     F     475           AJMP    PARAM_POL       ;CMD=4-7  PHONE XX PARAMATER POLL
                    476                                   ;         4= PHONE 0
                    477                                   ;         5= PHONE 1
                    478                                   ;         6= PHONE 2
                    479                                   ;         7= PHONE 3
```

```
007B 0100    F     480          AJMP    FAULT_POL         ;CMD=8-0BH PHONE XX FAULT POLL
                   481                                    ;      8= PHONE 0
                   482                                    ;      9= PHONE 1
                   483                                    ;      A= PHONE 2
                   484                                    ;      B= PHONE 3
007D 0100    F     485          AJMP    INITIALIZE        ;CMD=0CH-0FH INITIALIZE PHONE XX
                   486                                    ;      0CH= PHONE 0
                   487                                    ;      0DH= PHONE 1
                   488                                    ;      0EH= PHONE 2
                   489                                    ;      0FH= PHONE 3
007F 0100    F     490          AJMP    WRITE_XRAM        ;CMD=010H WRITE CODE OR DATA BYTES INTO XRAM
                   491                                    ;         WITHOUT DISABLING INTERRUPTS
                   492                                    ;CMD=011H SAME AS CMD 010H BUT DISABLES
                   493                                    ;         INTERRUPTS DURING LOAD OPERATION
                   494                                    ;CMD=012H WRITE COMM READ VECTOR BLOCK
                   495                                    ;CMD=013H WRITE COP RESERVED DATA
0081 0100    F     496          AJMP    READ_XROM_XRAM    ;CMD=014H- READ CODE OR DATA BYTES FROM XRAM
                   497                                    ;CMD=015H- READ COP RESERVED DATA
                   498                                    ;CMD=016H- READ EXTERNAL DATA PORTS
0083 0100    F     499          AJMP    WRITE_CPU_DATA    ;CMD=018H WRITE BYTES INTO PROCESSOR INTERNAL
                   500                                    ;         RAM WITHOUT DISABLING INTERRUPTS
                   501                                    ;CMD=019H WRITE BYTES INTO PROCESSOR INTERNAL
                   502                                    ;         RAM. DISABLE INTERUPTS WHILE WRITING
                   503                                    ;CMD=01AH-01BH REPEAT OF 018H AND 019H
0085 0100    F     504          AJMP    READ_CPU_DATA     ;CMD=01CH-01FH READ BYTES FROM PROCESSOR INTERNAL RAM
0087 0100    F     505          AJMP    LOAD_PC           ;CMD=020H-023H LOAD PROGRAM COUNTER
0089 0100    F     506          AJMP    WRITE_CPU_BIT     ;CMD=024H-027H WRITE BIT TO PROCESSOR INTERNAL RAM
008B 0100    F     507          AJMP    READ_CPU_BIT      ;CMD=028H-02BH READ BIT FROM PROCESSOR INTERNAL RAM
008D 0100    F     508          AJMP    READ_BLOCK        ;CMD=02CH-02FH READ PHONE XX XRAM BUFFER
                   509                                    ;      02CH= PHONE 0
                   510                                    ;      02DH= PHONE 1
                   511                                    ;      02EH= PHONE 2
                   512                                    ;      02FH= PHONE 3
008F 0100    F     513          AJMP    COM_V_12          ;CMD=030H-033H PROCESS IN XRAM ENTERED BY VECTOR
0091 0100    F     514          AJMP    COM_V_13          ;CMD=034H-037H     "
0093 0100    F     515          AJMP    COM_V_14          ;CMD=038H-03BH     "
0095 0100    F     516          AJMP    COM_V_15          ;CMD=03CH-03FH     "
                   517    COM_V_12:
0097 020000  F     518          LJMP    COM_VCT_12
                   519    COM_V_13:
009A 020000  F     520          LJMP    COM_VCT_13
                   521    COM_V_14:
009D 020000  F     522          LJMP    COM_VCT_14
                   523    COM_V_15:
00A0 020000  F     524          LJMP    COM_VCT_15
                   525    COLLECT_POLL:                   ;PHONE XX COLLECTION POLL
                   526                                    ;ENTER- PHONE # IN COMMAND.1,COMMAND.0
                   527                                    ;RETURN- COMBUF LOADED AND XMISSION STARTED
                   528                                    ;      PARAM 1= T_2MIN
                   529                                    ;      PARAM 2= T_9HRS
                   530                                    ;      PARAM 3= NICKEL COUNT (LSB) AT TIME
                   531                                    ;              OF MOST RECENT COLLECTION
                   532                                    ;      PARAM 4= NICKEL COUNT (MSB)     "
                   533                                    ;      PARAM 5= T_2MIN                 "
                   534                                    ;      PARAM 6= T_9HRS                 "
                   535                                    ;      PARAM 7-10= REPEAT OF 3-6 FOR 2ND MOST RECENT
                   536                                    ;      PARAM 11-14=       "        3RD   "
                   537                                    ;      PARAM 15-18=       "        4TH   "
                   538                                    ;      PARAM 19= COLLECTION COUNT
0016               539    RSP_LEN SET    22               ;RSP LEN = DATA BLOCK LENGTH+3
00A3 1100    F     540          ACALL   GET_PHONE         ;GET PHONE BUFFER POINTER   "
00A5 7942          541          MOV     COMPTR,#(COMBUF+RSP_LEN-3)
00A7 E52D          542          MOV     A,T_2MIN
```

```
00A9 F7         543           MOV    @COMPTR,A
00AA 19         544           DEC    COMPTR
00AB E52E       545           MOV    A,T_9HRS
00AD F7         546           MOV    @COMPTR,A
00AE 19         547           DEC    COMPTR
00AF 742F       548           MOV    A,#XCOL_HEAD    ;LOAD MOST RECENT COLLECTION COUNT AND TIME
00B1 93         549           MOVC   A,@A+DPTR
00B2 2430       550           ADD    A,#XCOL_CIRCLE_BUF
00B4 F502       551           MOV    GENR2,A
00B6 750310     552           MOV    GENR3,#16       ;16 TRANSFERS IN THIS GROUP- CCL,CCH,CT_2MIN,CT_9HRS X 4
00B9 E502       553   LLOOP:  MOV    A,GENR2
00BB 93         554           MOVC   A,@A+DPTR
00BC F7         555           MOV    @COMPTR,A
00BD 19         556           DEC    COMPTR
00BE 0502       557           INC    GENR2
00C0 BA4003     558           CJNE   R2,#(XCOL_CIRCLE_BUF+XCIRCLE_SIZE),CK_NXT
00C3 750230     559           MOV    GENR2,#XCOL_CIRCLE_BUF  ;IF BUFFER EXCEEDS MAX THEN ROLL IT OVER
00C6 D503F0     560   CK_NXT: DJNZ   GENR3,LLOOP
                561 +1 $NOGEN
                562    $GEN
                563    %LOAD_CB(XCCT)
                564 +1
                565 +1    MOV A,#%SOURCE
00C9 7412       566 +2       XCCT
00CB 93         567 +1    MOVC A,@A+DPTR
00CC F7         568 +1    MOV @COMPTR,A
00CD 19         569 +1    DEC COMPTR
                570 +1
                571 +1 $NOGEN
00CE 754316     572           MOV    COMBUF+RSP_LEN-2,#RSP_LEN  ;LOAD CCM BLOCK LENGTH
00D1 7943       573           MOV    COMPTR,#COMBUF+RSP_LEN-2   ;LOAD COM POINTER
                574   START_TX:
00D3 D2B3       575           SETB   TXEN            ;ENABLE SERIAL CHANNEL
00D5 85092F     576           MOV    COMBUF,SLOTAD   ;LOAD ADDRESS FOR VERTICAL PARITY GEN
00D8 850999     577           MOV    SBUF,SLOTAD     ;INITIATE TRANSMISSION WITH SLOT ADDRESS
00DB 020000  F  578           LJMP   SCHED_RTN
                579   PARAM_POL:                     ;PHONE XX PARAMATER POLL
                580                                  ;ENTER- PHONE # IN COMMAND.1,COMMAND.0
                581                                  ;RETURN- COMBUF LOADED AND XMISSION STARTED
                582                                  ;    PARAM 1= CUMULATIVE NICKELS (LSB)
                583                                  ;    PARAM 2=      "       NICKELS (MSB)
                584                                  ;    PARAM 3= NICKEL COUNT (LSB) AT TIME
                585                                  ;             OF MOST RECENT COLLECTION
                586                                  ;    PARAM 4= NICKEL COUNT (MSB)      "
                587                                  ;    PARAM 5= T_2MIN                  "
                588                                  ;    PARAM 6= T_9HRS                  "
                589                                  ;    PARAM 7= COLLECTION COUNT
                590                                  ;    PARAM 8= FAULT MONITOR BYTE 1
                591                                  ;    PARAM 9= FAULT MONITOR BYTE 2
                592                                  ;    PARAM 10=DIAGNOSTIC BYTE 1
                593                                  ;           PARAM10.0= POWER FAILED
                594                                  ;    PARAM 11=DIAGNOSTIC BYTE 2
                595                                  ;    PARAM 12=LOCAL_RATE AND PHONE TYPE
                596                                  ;           PARAM12.7-.5= PHONE TYPE
                597                                  ;           PARAM12.4-.0= LOCAL RATE
                598                                  ;    PARAM 13=COLLECT/RETURN RETRY THRESHOLD
                599                                  ;    PARAM 14=MAX CALL TIME WARNING THRESH
                600                                  ;    PARAM 15=MAX IDLE TIME WARNING THRESH
                601                                  ;    PARAM 16=UNUSED THRESHOLD
                602                                  ;    PARAM 17=CUMULATIVE PHONE USAGE 2 MIN TICKS
                603                                  ;    PARAM 18=     "                 9 HR TICKS
                604                                  ;    PARAM 19=T_2MIN
                605                                  ;    PARAM 20=T_9HRS
```

```
 0017           606      RSP_LEN  SET    23              ;RSP LEN = DATA BLOCK LENGTH+3
 00DE 1100    F 607               ACALL  GET_PHONE       ;GET PHONE BUFFER POINTER
 00E0 7943      608               MOV    COMPTR,#(COMBUF+RSP_LEN-3)
                609               %LOAD_CB(XCNL)
                615               %LOAD_CB(XCNH)
 00EC 742F      621               MOV    A,#XCOL_HEAD    ;LOAD MOST RECENT COLLECTION COUNT AND TIME
 00EE 93        622               MOVC   A,@A+DPTR
 00EF 2430      623               ADD    A,#XCOL_CIRCLE_BUF
 00F1 F502      624               MOV    GENR2,A
 00F3 750304    625               MOV    GENR3,#4        ;4 TRANSFERS IN THIS GROUP- COL,CCH,CT_2MIN,CT_9HRS
 00F6 E502      626      PLOOP:   MOV    A,GENR2
 00F8 93        627               MOVC   A,@A+DPTR
 00F9 F7        628               MOV    @COMPTR,A
 00FA 19        629               DEC    COMPTR
 00FB 0502      630               INC    GENR2
 00FD D503F6    631               DJNZ   GENR3,PLOOP
                632               %LOAD_CB(XCCT)
                638               %LOAD_CB(XFM_FLAG1)
                644               %LOAD_CB(XFM_FLAG2)
                650               %LOAD_CB(XDIAG_FLAG1)
                656               %LOAD_CB(XDIAG_FLAG2)
 0119 740B      662               MOV    A,#XLOCAL_RATE
 011B 93        663               MOVC   A,@A+DPTR
 011C F502      664               MOV    GENR2,A
 011E 7422      665               MOV    A,#XFM_PHONE_TYPE
 0120 93        666               MOVC   A,@A+DPTR
 0121 4502      667               ORL    A,GENR2         ;LOAD LOCAL RATE AND PHONE TYPE
 0123 F7        668               MOV    @COMPTR,A
 0124 19        669               DEC    COMPTR
                670               %LOAD_CB(XAR_RETRY_THRESH)
                676               %LOAD_CB(XOFHK_CALL_THRESH)
                682               %LOAD_CB(XOFHK_IDLE_THRESH)
                688               %LOAD_CB(XUNUSED_THRESH)
                694               %LOAD_CB(XOFHK_USAGE_T_2MIN)
                700               %LOAD_CB(XOFHK_USAGE_T_9HRS)
 0143 E52D      706               MOV    A,T_2MIN
 0145 F7        707               MOV    @COMPTR,A
 0146 19        708               DEC    COMPTR
 0147 E52E      709               MOV    A,T_9HRS
 0149 F7        710               MOV    @COMPTR,A
 014A 754417    711               MOV    COMBUF+RSP_LEN-2,#RSP_LEN ;LOAD BLOCK LENGTH
 014D 7944      712               MOV    COMPTR,#COMBUF+RSP_LEN-2 ;LOAD COM POINTER
 014F 0100    F 713               AJMP   START_TX
                714      FAULT_POL:                      ;PHONE XX FAULT MONITOR POLL
                715                                      ;ENTER- PHONE # IN COMMAND.1,COMMAND.0
                716                                      ;RETURN- COMBUF LOADED AND XMISSION STARTED
                717                                      ;   PARAM 1= CALL TIME (LSB)
                718                                      ;   PARAM 2=    "     (MSB)
                719                                      ;   PARAM 3= IDLE TIME (LSB)
                720                                      ;   PARAM 4= IDLE TIME (MSB)
                721                                      ;   PARAM 5= PENDING NICKELS
                722                                      ;   PARAM 6= SUCCESSFUL CALLS (LSB)
                723                                      ;   PARAM 7=    "     (MSB)
                724                                      ;   PARAM 8= UNSUCCESSFUL CALLS
                725                                      ;   PARAM 9= NO DIAL TONE COUNT
                726                                      ;   PARAM 10=ABSOLUTE FLAGS
                727                                      ;       10.7=DIAL DETECT
                728                                      ;       10.6=RING DETECT
                729                                      ;       10.5=HUM DETECT
                730                                      ;       10.4=OFF HOOK
                731                                      ;       10.3=BOX COLLECTED
                732                                      ;       10.2=ACTIVE TIMER
                733                                      ;       10.1=FORCE
```

```
                              734                     ;       PARAM 11=RETRY AVERAGE
                              735                     ;       PARAM 12=FAULT STATE
       000F                   736    RSP_LEN SET  15         ;RSP LEN = DATA BLOCK LENGTH+3
       0151 1100    F         737          ACALL GET_PHONE   ;GET PHONE BUFFER POINTER-
                              738                            ; NOTE GET PHONE RETURNS COM_CMD IN ACC
       0153 C0D0              739          PUSH  PSW
       0155 A2E0              740          MOV   C,ACC.0     ;POINT TO PROPER SIGNAL DETECT BUFFER
       0157 92D3              741          MOV   RS0,C
       0159 A2E1              742          MOV   C,ACC.1
       015B 92D4              743          MOV   RS1,C
       015D 752600            744          MOV   MISC1,#0
       0160 7401              745          MOV   A,#XFLAGSA
       0162 93                746          MOVC  A,@A+DPTR
       0163 F521              747          MOV   FLAGSA,A
       0165 A209              748          MOV   C,CN_ACTIVE_TMR_EN
       0167 9232              749          MOV   MISC1.2,C
       0169 7408              750          MOV   A,#XAR_ST
       016B 93                751          MOVC  A,@A+DPTR
       016C F525              752          MOV   AR_ST,A
       016E A22F              753          MOV   C,AR_FORCE
       0170 9231              754          MOV   MISC1.1,C
       0172 A22E              755          MOV   C,AR_BOX_COLLECTED
       0174 9233              756          MOV   MISC1.3,C
       0176 7413              757          MOV   A,#XOFHK_ST
       0178 93                758          MOVC  A,@A+DPTR
       0179 F525              759          MOV   OFHK_ST,A
       017B A22B              760          MOV   C,OFHK_PR
       017D 9234              761          MOV   MISC1.4,C
       017F EC                762          MOV   A,RING
       0180 A2E7              763          MOV   C,ACC.7
       0182 9235              764          MOV   MISC1.5,C
       0184 ED                765          MOV   A,HUM
       0185 A2E7              766          MOV   C,ACC.7
       0187 9236              767          MOV   MISC1.6,C
       0189 EE                768          MOV   A,DIAL
       018A A2E7              769          MOV   C,ACC.7
       018C 9237              770          MOV   MISC1.7,C
       018E D0D0              771          POP   PSW
       0190 793B              772          MOV   COMPTR,#(COMBUF+RSP_LEN-3)
                              773          %LOAD_CB(XOFHK_CALL_TIME_L)
                              779          %LOAD_CB(XOFHK_CALL_TIME_H)
                              785          %LOAD_CB(XOFHK_IDLE_TIME_L)
                              791          %LOAD_CB(XOFHK_IDLE_TIME_H)
                              797          %LOAD_CB(XPN)
                              803          %LOAD_CB(XFM_SUCCESS_L)
                              809          %LOAD_CB(XFM_SUCCESS_H)
                              815          %LOAD_CB(XFM_FAIL)
                              821          %LOAD_CB(XFM_NODIAL)
       01BF E526              827          MOV   A,MISC1
       01C1 F7                828          MOV   @COMPTR,A
       01C2 19                829          DEC   COMPTR
                              830          %LOAD_CB(XAR_RETRY_AVG)
                              836          %LOAD_CB(XFM_ST)
       01CB 753C0F            842          MOV   COMBUF+RSP_LEN-2,#RSP_LEN ;LOAD BLOCK LENGTH
       01D0 793C              843          MOV   COMPTR,#COMBUF+RSP_LEN-2
       01D2 0100    F         844          AJMP  START_TX
                              845    INITIALIZE:              ;PHONE XX INITIALIZATION
                              846                             ;ENTER- PHONE # IN COMMAND.1,COMMAND.0
                              847                             ;RETURN- XDB_I ZEROED EXCEPT FOR THE FOLLOWING
                              848                             ;   VALUES.  XDB_PARITY SET
                              849                             ;   PARAM 1= CUMULATIVE NICKELS (LSB)
                              850                             ;   PARAM 2=     "     NICKELS (MSB)
                              851                             ;   PARAM 3= NICKEL COUNT (LSB) AT TIME
```

```
                        852     ;              OF MOST RECENT COLLECTION
                        853     ;       PARAM 4= NICKEL COUNT (MSB)    "
                        854     ;       PARAM 5= T_2MIN                "
                        855     ;       PARAM 6= T_9HRS                "
                        856     ;       PARAM 7= COLLECTION COUNT
                        857     ;       PARAM 8= FAULT MONITOR BYTE 1
                        858     ;       PARAM 9= FAULT MONITOR BYTE 2
                        859     ;       PARAM 10=DIAGNOSTIC BYTE 1
                        860     ;           PARAM10.0= POWER FAILED
                        861     ;       PARAM 11=DIAGNOSTIC BYTE 2
                        862     ;       PARAM 12=LOCAL_RATE AND PHONE TYPE
                        863     ;            PARAM12.7-.5= PHONE TYPE
                        864     ;            PARAM12.4-.0= LOCAL RATE
                        865     ;       PARAM 13=COLLECT/RETURN RETRY THRESHOLD
                        866     ;       PARAM 14=MAX CALL TIME WARNING THRESH
                        867     ;       PARAM 15=MAX IDLE TIME WARNING THRESH
                        868     ;       PARAM 16=UNUSED THRESHOLD
                        869     ;       PARAM 17=CUMULATIVE PHONE USAGE 2 MIN TICKS
                        870     ;       PARAM 18=      "              9 HR TICKS
01D4 1100     F         871         ACALL   GET_PHONE
01D6 8583A0             872         MOV     P2,DPH                 ;SET UP WRITE XRAM VECTOR
01D9 7931               873         MOV     COMPTR,#COM_DATA
                        874     $GEN
                        875         %SAVE(XCNL)
                      876 +1
01DB 8700             877 +1        MOV     POINTER_DIRECT,@COMPTR
01DD E582             878 +1        MOV     A,DPL
                      879 +1        ADD     A,#XDEST
01DF 2410             880 +2            XCNL
01E1 C8               881 +1        XCH     A,POINTER
01E2 F2               882 +1        MOVX    @POINTER,A
01E3 09               883 +1        INC     COMPTR
                      884 +1
                      885 +1    $NOGEN
                        886         %SAVE(XCNH)
                        894         %SAVE(XCOL_CIRCLE_BUF)       ;COLLECTED NICKELS (LSB)
                        902         %SAVE(XCOL_CIRCLE_BUF+1)     ;COLLECTED NICKELS (MSB)
                        910         %SAVE(XCOL_CIRCLE_BUF+2)     ;COLLECTION TIME T_2MIN
                        918         %SAVE(XCOL_CIRCLE_BUF+3)     ;COLLECTION TIME T_9HRS
                        926         %SAVE(XCCT)
                        934         %SAVE(XFM_FLAG1)
                        942         %SAVE(XFM_FLAG2)
                        950         %SAVE(XDIAG_FLAG1)
                        958         %SAVE(XDIAG_FLAG2)
023E E7                 966         MOV     A,@COMPTR
023F 540F               967         ANL     A,#LOCAL_RATE_MASK
0241 F8                 968         MOV     POINTER,A
0242 E582               969         MOV     A,DPL
0244 240B               970         ADD     A,#XLOCAL_RATE
0246 C8                 971         XCH     A,POINTER
0247 F2                 972         MOVX    @POINTER,A
0248 E7                 973         MOV     A,@COMPTR
0249 54F0               974         ANL     A,#PHONE_TYPE_MASK
024B F8                 975         MOV     POINTER,A
024C E582               976         MOV     A,DPL
024E 2422               977         ADD     A,#XFM_PHONE_TYPE
0250 C8                 978         XCH     A,POINTER
0251 F2                 979         MOVX    @POINTER,A
0252 09                 980         INC     COMPTR
                        981         %SAVE(XAR_RETRY_THRESH)
                        989         %SAVE(XOFHK_CALL_THRESH)
                        997         %SAVE(XOFHK_IDLE_THRESH)
                       1005         %SAVE(XUNUSED_THRESH)
```

```
                    1013              XSAVE(XCFHK_USAGE_T_1MIN)
                    1021              XSAVE(XCFHK_USAGE_T_9HRS)
0289 750A00         1027              MOV    PAR,#0           ;GET NEW PHONE BLOCK PARITY
028C 75023F         1030              MOV    GENR2,#X_BUF_SIZE-1
028F E502           1031    GET_PR:   MOV    A,GENR2
0291 93             1032              MOVC   A,@A+DPTR
0292 650A           1033              XRL    A,PAR
0294 F50A           1034              MOV    PAR,A
0296 D502F6         1035              DJNZ   GENR2,GET_PR
0299 F0             1036              MOVX   @DPTR,A          ;SAVE NEW PARITY BYTE
                    1037    NULL_RSP:                         ;RETURN A NULL DATA BLOCK
     0003           1038    RSP_LEN SET    3+0                ;NULL DATA TRANSFER
029A 753003         1039              MOV    COMBUF+RSP_LEN-2,#RSP_LEN ;LOAD RESPONSE LENGTH
029D 7930           1040              MOV    COMPTR,#(COMBUF+RSP_LEN-2) ;LOAD COM POINTER
029F 0100    F      1041              AJMP   START_TX
                    1042    WRITE_XRAM:                       ;WRITE BYTES OF EXTERNAL RAM
                    1043                     ;ENTER- COM_CMD .1,.0= 0,0 IF INTERRUPTS ARE NOT TO
                    1044                     ;                           BE DISABLED DURING LOAD
                    1045                     ;                     = 0,1 IF INTR ARE TO BE DISABLED
                    1046                     ;                     = 1,0 IF WRITE READ VECTOR BLOCK
                    1047                     ;                     = 1,1 IF WRITE TO RESERVED COP BUF
                    1048                     ;         PARAM 0= NUMBER OF DATA BYTES TO BE WRITTEN
                    1049                     ;               1= START ADR (LSB)
                    1050                     ;               2=    "       (MSB)
                    1051                     ;               3 TO N= DATA BYTES TO BE WRITTEN
                    1052                     ;RETURN-RESONSE IS ONLY A LENGTH BYTE
02A1 E52F           1053              MOV    A,COM_CMD
02A3 30E113         1054              JNB    ACC.1,DIS_CK ;IF COM LS BITS=0X THEN PROCESS BLOCK
02A6 20E008         1055              JB     ACC.0,COM_LD ;ELSE IF CMD=00 THEN LOAD XCOMM VECTOR
                    1056                     ;           ELSE (CMD=01) WRITE TO COMP RESERVED SPAACE
02A9 753200  F      1057              MOV    COM_DATA+1,#LOW(XCOMM_VECT_TABLE)
02AC 753300  F      1058              MOV    COM_DATA+2,#HIGH(XCOMM_VECT_TABLE)
02AF 8008           1059              SJMP   DIS_CK
02B1 753200  F      1060    COM_LD:   MOV    COM_DATA+1,#LOW(XCOP)
02B4 753300  F      1061              MOV    COM_DATA+2,#HIGH(XCOP)
02B7 C2E0           1062              CLR    ACC.0
02B9 853102         1063    DIS_CK:   MOV    GENR2,COM_DATA ;GET DATA BLOCK LENGTH
02BC 853282         1064              MOV    DPL,COM_DATA+1 ;SET XRAM POINTER TO DATA START ADR
02BF 853383         1065              MOV    DPH,COM_DATA+2
02C2 7834           1066              MOV    POINTER,#COM_DATA+3 ;LOAD COMBUF POINTER DATA START ADR
02C4 750A00         1067              MOV    PAR,#0
02C7 30E002         1068              JNB    ACC.0,XWR
02CA C2AF           1069              CLR    EA               ;IF COM_CMD.0=1 THEN INHIBIT INTR
02CC E4             1070    XWR:      CLR    A                ;GET OLD DATA TO REMOVE FROM PARITY
02CD 93             1071              MOVC   A,@A+DPTR
02CE 66             1072              XRL    A,@POINTER
02CF 650A           1073              XRL    A,PAR            ;INCLUDE NEW BYTE PARITY
02D1 F50A           1074              MOV    PAR,A
02D3 E6             1075              MOV    A,@POINTER
02D4 F0             1076              MOVX   @DPTR,A          ;UPDATE XRAM
02D5 A3             1077              INC    DPTR
02D6 08             1078              INC    POINTER
02D7 D502F2         1079              DJNZ   GENR2,XWR
02DA D2AF           1080              SETB   EA
02DC E582           1081              MOV    A,DPL
02DE 24FF           1082              ADD    A,#-1
02E0 F582           1083              MOV    DPL,A
02E2 4002           1084              JC     JDPH
02E4 1583           1085              DEC    DPH
02E6 E583           1086    JDPH:     MOV    A,DPH
02E8 B45000         1087              CJNE   A,#80,PAR_UP
02EB E582           1088              MOV    A,DPL
02ED 54C0           1089              ANL    A,#0C0H          ;GET PHONE BUFFER BLOCK
```

```
02EF F582            1090            MOV     DPL,A           ;AND UPDATE BUFFER PARITY
02F1 E4              1091            CLR     A
02F2 93              1092            MOVC    A,@A+DPTR
02F3 650A            1093            XRL     A,PAR
02F5 F0              1094            MOVX    @DPTR,A
02F6 F50A            1095            MOV     PAR,A
02F8 900000   F      1096    PAR_UP: MOV     DPTR,#XRAM_PAR
02FB E4              1097            CLR     A               ;UPDATE XRAM PARITY
02FC 93              1098            MOVC    A,@A+DPTR
02FD 650A            1099            XRL     A,PAR
02FF F0              1100            MOVX    @DPTR,A
0300 0100     F      1101            AJMP    NULL_RSP
                     1102    READ_XROM_XRAM:                 ;READ BYTES OF EXTERNAL MEMORY
                     1103                                    ;COM_CMD.1,0=0,0 FOR NORMAL READ
                     1104                    ;                        =0,1 FOR READ RESERVED COP BLOCK
                     1105                    ;                        =1,0 FOR EXTERNAL DATA PORTS
                     1106                                    ;ENTER_PARAM 0= NUMBER OF DATA BYTES TO
                     1107                    ;                           BE RETURNED (BLOCK LEN-6)
                     1108                    ;                        1= START ADR (LSB)
                     1109                    ;                        2= START ADR (MSB)
                     1110                                    ;RETURN_PARAM 0-N= DATA BYTES IN ASCENDING
                     1111                    ;                           ADR ORDER ATARTING AT
                     1112                    ;                           START ADR
0302 853102          1113            MOV     GENR2,COM_DATA  ;GET RETURN BLOCK LENGTH
0305 3A1500          1114            CJNE    R2,#(COM_BUF_SIZE-1),$+3 ;CHECK THAT RETURN BLOCK WITHIN LIMITS
0308 4002            1115            JC      SRC_LD          ;IF LENGTH < BLOCK SIZE CONTINUE ELSE ABORT
030A 0100     F      1116            AJMP    INVEX
030C 853282          1117    SRC_LD: MOV     DPL,COM_DATA+1  ;LOAD EXTERNAL DATA POINTER
030F 853383          1118            MOV     DPH,COM_DATA+2
0312 E52F            1119            MOV     A,COM_CMD       ;LOAD COMMAND
0314 30E006          1120            JNB     ACC.0,RXLOAD    ;IF READ COP RESERVED THEN FORCE ADDRESS
0317 758200   F      1121            MOV     DPL,#LOW(XCOP)
031A 758300   F      1122            MOV     DPH,#HIGH(XCOP)
031D E531            1123    RXLOAD: MOV     A,COM_DATA
031F 2403            1124            ADD     A,#3            ;GET RETURN BLOCK LENGTH
0321 F9              1125            MOV     COMPTR,A
0322 242D            1126            ADD     A,#(COMBUF-2)   ;GET COMPTR STARTING ADDRESS
0324 C0E0            1127            PUSH    ACC
0326 C9              1128            XCH     A,COMPTR
0327 F7              1129            MOV     @COMPTR,A       ;SAVE LENGTH
0328 19              1130            DEC     COMPTR
0329 E52F            1131            MOV     A,COM_CMD
032B 30E10B          1132            JNB     ACC.1,RDX
032E E0              1133    RXDX:   MOVX    A,@DPTR         ;LOAD EXTERNAL DATA
032F F7              1134            MOV     @COMPTR,A
0330 A3              1135            INC     DPTR
0331 19              1136            DEC     COMPTR
0332 D502F9          1137            DJNZ    GENR2,RXDX      ;CONTINUE UNTIL BLOCK FULL
0335 D001            1138            POP     COMPTR_DIRECT
0337 0100     F      1139            AJMP    START_TX
0339 E4              1140    RDX:    CLR     A               ;LOAD COMM BUFFER
033A 93              1141            MOVC    A,@A+DPTR
033B F7              1142            MOV     @COMPTR,A
033C A3              1143            INC     DPTR
033D 19              1144            DEC     COMPTR
033E D502F8          1145            DJNZ    GENR2,RDX       ;CONTINUE UNTIL BLOCK FULL
0341 D001            1146            POP     COMPTR_DIRECT
0343 0100     F      1147            AJMP    START_TX
                     1148    WRITE_CPU_DATA:                 ;WRITE BYTES OF CPU DATA MEMORY
                     1149                                    ;ENTER- COM_CMD.0= 0 IF INTERRUPTS ARE NOT TO
                     1150                    ;                           BE DISABLED DURING LOAD
                     1151                    ;                        1 IF INTR ARE TO BE DISABLED
                     1152                    ;        PARM 0= NUMBER OF DATA BTES TO BE
```

```
                  1153                            ;           WRITTEN (= BLOCK LEN-6)
                  1154                            ;       PARAM 1= START ADR
                  1155                            ;       PARAM 2-N= DATA BYTES TO BE WRITTEN
                  1156                            ;               IN ASCENDING ADR ORDER
                  1157                            ;RETURN-RESPONSE IS ONLY A LENGTH BYTE
0345 853102       1158           MOV    GENR2,COM_DATA   ;LOAD DATA LENGTH
0348 A832         1159           MOV    POINTER,COM_DATA+1 ;LOAD DESTINATION ADDRESS
034A 7933         1160           MOV    COMPTR,#COM_DATA+2 ;LOAD DATA START ADR IN INPUT BLOCK
034C E52F         1161           MOV    A,COM_CMD        ;LOAD COMMAND
034E 30E002       1162           JNB    ACC.0,WRC
0351 C2AF         1163           CLR    EA
0353 E7           1164   WRC:    MOV    A,@COMPTR        ;LOAD DATA
0354 F6           1165           MOV    @POINTER,A       ;STORE DATA
0355 08           1166           INC    POINTER
0356 09           1167           INC    COMPTR
0357 D502F9       1168           DJNZ   GENR2,WRC        ;LOOP UNTIL DONE
035A D2AF         1169           SETB   EA
035C 0100    F    1170           AJMP   NULL_RSP
                  1171   READ_CPU_DATA:                  ;READ BYTES OF CPU MEMORY
                  1172                            ;ENTER- PARAM 0= NUMBER OF BYTES TO TRANSFER
                  1173                            ;       PARAM 1= START ADR
                  1174                            ;RETURN-PARAM 1-N=DATA BYTES READ
035E 853102       1175           MOV    GENR2,COM_DATA   ;GET RETURN BLOCK LENGTH
0361 BA1500       1176           CJNE   R2,#COM_BUF_SIZE-1,$+3 ;CHECK THAT RETURN BLOCK WITHIN LIMITS
0364 4002         1177           JC     RCLOAD           ;IF LENGH<BLOCK SIZE THEN CONTINUE ELSE ABORT
0366 0100    F    1178           AJMP   INVEX
0368 A832         1179   RCLOAD: MOV    POINTER,COM_DATA+1 ;LOAD START ADR
036A E531         1180           MOV    A,COM_DATA
036C 2403         1181           ADD    A,#3             ;GET RETURN BLOCK LENGTH
036E F9           1182           MOV    COMPTR,A
036F 242D         1183           ADD    A,#(COMBUF-2)    ;GET COMPTR STARTING ADDRESS
0371 C0E0         1184           PUSH   ACC              ;TEMP SAVE STARTING POINTER
0373 C9           1185           XCH    A,COMPTR
0374 F7           1186           MOV    @COMPTR,A        ;SAVE LENGTH
0375 19           1187           DEC    COMPTR
0376 E6           1188   RCX:    MOV    A,@POINTER       ;LOAD CMM BUFFER
0377 F7           1189           MOV    @COMPTR,A
0378 08           1190           INC    POINTER
0379 19           1191           DEC    COMPTR
037A D502F9       1192           DJNZ   GENR2,RCX        ;CONTINUE UNTIL BLOCK FULL
037D D001         1193           POP    COMPTR_DIRECT
037F 0100    F    1194           AJMP   START_TX
                  1195   LOAD_PC:                        ;LOAD PROGRAM COUNTER
                  1196                            ;ENTER- PARAM 0= LS BYTE OF NEW PC
                  1197                            ;       1= MS BYTE OF NEW PC
                  1198                            ;RETURN-PARAM 0= LS BYTE OF PC TO BE LOADED
                  1199                            ;       1= MS BYTE OF PC TO BE LOADED
                  1200                            ;     VECTOR TO NEW PROGRAM COUNT
0381 E531         1201           MOV    A,COM_DATA       ;LS BYTE ON NEW PC
0383 C0E0         1202           PUSH   ACC
0385 E532         1203           MOV    A,COM_DATA+1
0387 C0E0         1204           PUSH   ACC              ;PUSH NEW PC
0003              1205   RSP_LEN SET    3
0389 7930         1206           MOV    COMPTR,#(COMBUF+RSP_LEN-2)
038B 7703         1207           MOV    @COMPTR,#RSP_LEN ;SET RESPONSE LENGTH IN BUFFER
038D D2B3         1208           SETB   TXEN             ;ENABLE SERIAL CHANNEL
038F 85092F       1209           MOV    COMBUF,SLOTAD
0392 850999       1210           MOV    SBUF,SLOTAD
0395 22           1211           RET
                  1212   WRITE_CPU_BIT:                  ;WRITE A BIT TO DATA MEMORY
                  1213                            ;ENTER- PARAM 0= BIT ADR
                  1214                            ;       PARAM 1.0=DATA BIT TO BE WRITTEN
                  1215                            ;RETURN-NULL DATA RESPONSE
```

```
0396 1100    F   1216           ACALL   GET_BIT
0398 E532        1217           MOV     A,COM_DATA+1    ;GET DATA BIT
039A 20E007      1218           JB      ACC.0,SET_BIT   ;IF WITE BIT=1 GOTO SET BIT PROCESS
039D E52F        1219           MOV     A,COMBUF        ;ELSE WRITE 0
039F F4          1220           CPL     A
03A0 57          1221           ANL     A,@COMPTR       ;UPDATE BIT
03A1 F7          1222           MOV     @COMPTR,A
03A2 0100    F   1223           AJMP    NULL_RSP
                 1224   SET_BIT:
03A4 E52F        1225           MOV     A,COMBUF        ;WRITE 1
03A6 47          1226           ORL     A,@COMPTR
03A7 F7          1227           MOV     @COMPTR,A
03A8 0100    F   1228           AJMP    NULL_RSP
                 1229   READ_CPU_BIT:                   ;READ A BIT IN BIT MEMORY
                 1230                                   ;ENTER- PARAM 0= BIT ADR
                 1231                                   ;RETURN-PARAM 0= BIT ADR
                 1232                                   ;       PARAM 1.0=BIT READ AT ADR
03AA 1100    F   1233           ACALL   GET_BIT
03AC E7          1234           MOV     A,@COMPTR       ;READ BYTE IN WHICH BIT RESIDED
03AD 552F        1235           ANL     A,COMBUF        ;MASK TO ONLY BIT OF INTEREST
0004             1236   RSP_LEN SET     3+1             ;1 BYTE RESPONSE
03AF 753104      1237           MOV     COMBUF+RSP_LEN-2,#RSP_LEN ;LOAD RESPONSE LENGTH
03B2 753000      1238           MOV     COMBUF+RSP_LEN-(2+1),#0
03B5 6003        1239           JZ      READ_END        ;IF CPU BIT=0 THEN SET RESPONSE TO 0 ELSE
                 1240                                   ;SET IT OT 1
03B7 753001      1241           MOV     COMBUF+RSP_LEN-(2+1),#1
                 1242   READ_END:
03BA 7931        1243           MOV     COMPTR,#(COMBUF+RSP_LEN-2)
03BC 0100    F   1244           AJMP    START_TX
                 1245   GET_BIT:
03BE E531        1246           MOV     A,COM_DATA      ;FIND BIT WITHIN BYTE
                 1247                                   ;ENTER- BIT ADR IN COM_DATA
                 1248                                   ;RETURN-COMPTR=BYTE ADR OF BIT
                 1249                                   ;       COMBUF=BIT MASK
                 1250                                   ;CHANGES_ ACCUMULATOR DESTROYED
03C0 5407        1251           ANL     A,#BIT_MASK     ;GET BIT LOCATION IN BYTE
03C2 2410        1252           ADD     A,#(BIT_MASK_TABLE-REFAD)
                 1253                                   ;POSITION TO START OF TABLE
03C4 83          1254           MOVC    A,@A+PC
03C5 F52F        1255   REFAD:  MOV     COMBUF,A        ;SAVE BIT MASK
03C7 E531        1256           MOV     A,COM_DATA      ;GET BYTE ADR
03C9 54F8        1257           ANL     A,#NOT(BIT_MASK);REMOBE BIT VECTOR
03CB 20E705      1258           JB      SGN,OMIT        ;IF REGISTER BIT, OMIT 20+N/8 OFFSET
03CE 03          1259           RR      A
03CF 03          1260           RR      A
03D0 03          1261           RR      A
03D1 2420        1262           ADD     A,#020H         ;ADD    BYTE_BITS OFFSET
03D3 F9          1263   OMIT:   MOV     COMPTR,A
03D4 22          1264   RET1:   RET
                 1265   BIT_MASK_TABLE:
03D5 01          1266           DB      1,2,4,8,10H,20H,40H,80H
03D6 02
03D7 04
03D8 08
03D9 10
03DA 20
03DB 40
03DC 80
                 1267   READ_BLOCK:                     ;PHONE XX BLOCK READ USING RAM DATA VECTORS
                 1268                                   ;ENTER- PHONE # IN COM_CMD.1,.0
                 1269                                   ;       XCOMM_VECT_TABLE BYTE 0=DATA LENGTH
                 1270                                   ;       BIT OFFSET FROM XDB_XX IN
                 1271                                   ;       XCOMM_VECT_TABLE BYTE 1 THRU (LEN-1)
```

```
                                                    ;      NOTE- TABLE INITIALLY SET TO 32 SEQ
                                 1273               ;             BYTES
                                 1274               ;RETURN-(LEN) DATA BYTES SPECIFIED OFFSET
                                 1275               ;      PASSED
03DD 1100    F   1276            ACALL   GET_PHONE
03DF 858226      1277   RDBLK:   MOV     MISC1,DPL
03E2 858327      1278            MOV     MISC2,DPH
03E5 750200      1279            MOV     GENR2,#0
03E8 900000  F   1280            MOV     DPTR,#XCOMM_VECT_TABLE ;GET START ADR FROM TABLE
03EB E502        1281            MOV     A,GENR2
03ED 93          1282            MOVC    A,@A+DPTR
03EE B41500      1283            CJNE    A,#(COM_BUF_SIZE-1),$+3 ;CHECK THAT RETURN BLOCK WITHIN LIMITS
03F1 4002        1284            JC      RBLOAD          ;IF LENGTH< BUF SIZE THEN CONTINUE ELSE ABORT
03F3 0100    F   1285            AJMP    INVEX
03F5 F503        1286   RBLOAD:  MOV     GENR3,A
03F7 2403        1287            ADD     A,#3            ;GET TRANSMISSION BUFFER LENGTH
03F9 F9          1288            MOV     COMPTR,A
03FA 242D        1289            ADD     A,#(COMBUF-2)   ;GET START OF COMM BUFFER
03FC C0E0        1290            PUSH    ACC             ;TEMP SAVE STARTING POINTER
03FE C9          1291            XCH     A,COMPTR
03FF F7          1292            MOV     @COMPTR,A       ;SAVE LENGTH
0400 19          1293            DEC     COMPTR
0401 0502        1294   RBX:     INC     GENR2
0403 900000  F   1295            MOV     DPTR,#XCOMM_VECT_TABLE ;GET POINTER
0406 E502        1296            MOV     A,GENR2
0408 93          1297            MOVC    A,@A+DPTR
0409 852682      1298            MOV     DPL,MISC1
040C 852783      1299            MOV     DPH,MISC2
040F 93          1300            MOVC    A,@A+DPTR
0410 F7          1301            MOV     @COMPTR,A
0411 19          1302            DEC     COMPTR
0412 D503EC      1303            DJNZ    GENR3,RBX
0415 D001        1304            POP     COMPTR_DIRECT
0417 0100    F   1305            AJMP    START_TX
                 1306   GET_PHONE:
0419 E52F        1307            MOV     A,COM_CMD       ;GET PHONE EXTERNAL DATA BUFFER POINTER
                 1308                                    ; ENTER- PHONE POINTER IN COM_CMD.1,.0
                 1309                                    ; RETURN-DPTR SET TO PHONE XDB_I
                 1310                                    ; EFFECTS- ACCUMULATOR DESTROYED
041B 20E10B      1311            JB      ACC.1,PHONE23
041E 20E004      1312            JB      ACC.0,PHONE1
0421 900000  F   1313            MOV     DPTR,#XDB_0     ;CMD 00- PHONE 0
0424 22          1314            RET
0425 900000  F   1315   PHONE1:  MOV     DPTR,#XDB_1     ;CMD 01- PHONE 1
0428 22          1316            RET
                 1317   PHONE23:
0429 20E004      1318            JB      ACC.0,PHONE3
042C 900000  F   1319            MOV     DPTR,#XDB_2     ;CMD 10- PHONE 2
042F 22          1320            RET
0430 900000  F   1321   PHONE3:  MOV     DPTR,#XDB_3     ;CMD11- PHONE 3
0433 22          1322            RET
                 1323            END
```

REGISTER BANK(S) USED: 0, TARGET MACHINE(S): 8051

ASSEMBLY COMPLETE, NO ERRORS FOUND

```
ISIS-II MCS-51 MACRO ASSEMBLER V2.0
NO OBJECT MODULE REQUESTED
ASSEMBLER INVOKED BY: ASM51 COP.F16 NOSYMBOLS NOOBJECT PRINT(:LP:)

LOC  OBJ            LINE   SOURCE

1     $INCLUDE(ALLDAT.256)
             =1      2
----         =1      3              CSEG   AT 800H ;THIS NOTICE IS REQUIRED AT THIS LOC TO FAKE
             =1      4                             ;OUT THE LINKER
             =1      5     ;        DB    'COP REV 1.00 2/18/85 COPYWRIGHT TEL TECH DEVICES'
0800 434F5020 =1     6              DB    'COP REV 1.10 2/18/85 COPYWRIGHT TEL TECH DEVICES'
0804 52455620
0808 312E3130
080C 20322F31
0810 382F3835
0814 20434F50
0818 59575249
081C 47485420
0820 54454C20
0824 54454348
0828 20444556
082C 49434553
             =1      7                      ;CHANGES FOR REV1.1
             =1      8                      ;ANY NAK FROM IBM CAUSES THE LAST MESSAGE TO THE HOST
             =1      9                      ;TO REPEAT.
             =1     10                      ;THE RETRY COUNT SET IN DATA_SEND: WAS MOVED DOWN 1 LINE TO
             =1     11                      ;PUT IT INSIDE THE BLOCK SEND LOOP.
             =1     12                      ;THE DATA_SEND: SENT 1 TO MANY BLOCKS.
             =1     13                      ;TIMEOUT DURING DATA SEND WAS INCREASED FROM 3 SEC.
             =1     14                      ;GOOD_COUNT WAS ADDED SO THAT THE NO_COM STATUS BIT WORKS
             =1     15 +1  $EJECT
             =1     16
             =1     17
             =1     18
             =1     19     ;*****************************
             =1     20     ; ONLY THIS SET NEED BE      **
             =1     21     ; CHANGED TO CHANGE THE      **
             =1     22     ; #CHANNELS PER COP!!        **
             =1     23     ;                            **
             =1     24     ;*
0100         =1     25     CHAN_QTY   EQU   256         ;**
             =1     26     ;*
             =1     27     ;                            **
             =1     28     ;*****************************
             =1     29
             =1     30     EXTERNAL_DATA    segment    XDATA
----         =1     31         rseg  EXTERNAL_DATA  ;start data definitions for external RAM
6000         =1     32         org   6000H
             =1     33     COP_TO_HOST_BUFF:          ;data buffer for communications from
6000         =1     34         ds    256             ;COP to IBM    PORT2 index=0
             =1     35     HOST_TO_COP_BUFF:          ;data buffer for communications from
6100         =1     36         ds    256             ;IBM to COP    PORT2 index=1
             =1     37     LM_TO_COP_BUFF:            ;data buffer for communications from
6200         =1     38         ds    128             ;LMs to COP    PORT2 index=2, offset=0
             =1     39     COP_TO_LM_BUFF:            ;data buffer for communications from
6280         =1     40         ds    128             ;COP to LMs    PORT2 index=2, offset=128
             =1     41
0040         =1     42     LM_QTY     EQU   CHAN_QTY/4    ;4 CHANNELS PER LM
             =1     43
             =1     44 +1  $EJECT
```

```
        =1   45
        =1   46   ;*******************************
        =1 - 47   ;*
        =1   48   ;*  THIS IS THE INTERNAL
        =1   49   ;*    RAM DEFINITIONS
        =1   50   ;*
        =1   51   ;*******************************
        =1   52
        =1   53   INSIDE_DATA SEGMENT DATA
----    =1   54            RSEG    INSIDE_DATA
        =1   55
        =1   56   MOD_SEQ:
0000    =1   57            DS  1          ;MODEM TRANSMISSION SEQUENCE NUMBER
        =1   58   CMD:
0001    =1   59            DS  1          ;TEMP FOR DECODING
        =1   60   BUFF_IDX:
0002    =1   61            DS  1          ;STORE CHAN/8 FOR DATA DUMP
        =1   62   LM_CURRENT:
0003    =1   63            DS  1          ;PRETTY OBVIOUS
        =1   64   LM_POLL:
0004    =1   65            DS  1          ;LM FROM WHICH THE NEXT POLL WILL COME
        =1   66   POLL_RPT:
0005    =1   67            DS  1          ;REPEAT COUNTER FOR POLLS DURING IBM COMMANDS
        =1   68   TRANSP_LM:
0006    =1   69            DS  1          ;CHAN ALL TRANSPARENT COMMANDS 60 TO. CHAN 80=COP
        =1   70   RETRY_CNT:
0007    =1   71            DS  1          ;# OF TRANSMIT RETRYS COUNTER
        =1   72   LM_LIMIT:
0008    =1   73            DS  1          ;# OF CHANNELS ACTIVATED ON COP BY IBM INIT CMD
        =1   74   TIME_OUT_CNT:
0009    =1   75            DS      1      ;REPEATS BEFORE ABORT FOR TIMEOUT
        =1   76
        =1   77   TIMOUT_CLK:
000A    =1   78            DS      1      ;TIME OUT LEAST SIGNIFICANT EXTEND FOR TO LOW
        =1   79
        =1   80   TFF:
000B    =1   81            DS      1      ;FAST TIMER MODULO 4 ROLLOVER OF TO HIGH TICS
        =1   82   TF:
000C    =1   83            DS      1      ;CLOCK FOR TICS FROM TFF
        =1   84   TS:
000D    =1   85            DS      1      ;CLOCK FOR TICS FROM TF
        =1   86   T_2MIN:
000E    =1   87            DS      1      ;CLOCK FOR TICS FROM TS
        =1   88   T_9HR:
000F    =1   89            DS      1      ;CLOCK FOR TICS FROM T_2MIN
        =1   90   T_9HR_OLD:
0010    =1   91            DS      1      ;HISTORY LOCATION FOR USE WITH LM CLOCK SYNC
        =1   92   GOOD_COUNT:
0011    =1   93            DS      1      ;KEEPS TRACK OF THE NUMBER OF CHANNELS THAT
        =1   94                           ;RESPOND TO A POLL DURING A PASS
        =1   95
        =1   96   STACKS   SEGMENT IDATA
----    =1   97            RSEG    STACKS
        =1   98   STACK:
0000    =1   99            DS  1          ;POINTS TO THE HEAD OF THE STACK
        =1  100 +1 $EJECT
        =1  101
        =1  102  ;*******************************
        =1  103  ;*
        =1  104  ;*   BIT ADDRESSABLE
        =1  105  ;*     RAM AREA
        =1  106  ;*
        =1  107  ;*******************************
```

```
             =1  108
             =1  109        BIT_DEF SEGMENT DATA  BITADDRESSABLE
----         =1  110                RSEG    BIT_DEF
             =1  111        ;START OF THE BIT AREA
             =1  112        PH_CURRENT:
0000         =1  113                DS      1               ;CURRENT PHONE OF CURRENT LM.  0 TO 3
             =1  114        PH_POLL:
0001         =1  115                DS      1               ;PHONE BEING POLLED ON THE POLLED LM
             =1  116        CD_FLAG:
0002         =1  117                DS      1               ;FLAGS FOR THE CARRIER DETECT MANAGMENT
             =1  118        INIT_BITS:
0003         =1  119                DS      1               ;DISASSEMBLY AREA FOR COP INIT BITS
             =1  120        STATUS:
0004         =1  121                DS      1        ;COP STATUS BYTE
  0027       =1  122        POWER       BIT    STATUS.7   ;COP POWER FAILED AND RECOVERED
  0026       =1  123        NO_COM      BIT    STATUS.6   ;1 OR MORE ACTIVATED LMS DONT RESPOND
  0025       =1  124        ROM_FAIL    BIT    STATUS.5   ;ROM DIAGNOSTIC FAILED
  0024       =1  125        CXRAM_FAIL  BIT    STATUS.4   ;THE CODE RAM IS BAD
  0023       =1  126        RAM_FAIL    BIT    STATUS.3   ;THE INTERNAL DATA RAM FAILED TEST
  0022       =1  127        DXRAM_FAIL  BIT    STATUS.2   ;THE EXTERNAL DATA RAM IS BAD
  0021       =1  128        MODEM_BAD   BIT    STATUS.1   ;MODEM FAILED TO SEND "OK" ON COMMAND
  0020       =1  129        CXRAM8K     BIT    STATUS.0   ;SET IF 8K CODE RAM INSTALLED ELSE CLR=2K
             =1  130
             =1  131
             =1  132        SYNC:
0005         =1  133                DS      1
  0028       =1  134        INSYNC  BIT   SYNC.0   ;SYNC.0=COP TO HOST IN SYNC
  0029       =1  135        CHAR1   BIT   SYNC.1   ;SYNC.1=FLAG FOR 1CHAR MSG EXPECTED
  002A       =1  136        STALLED BIT   SYNC.2   ;SYNC.2=FLAG FOR NO INCOMMING HOST MSG TIMEOUT
  002B       =1  137        REQINIT BIT   SYNC.3   ;SYNC.3=REQUEST LM INIT ON NEXT POLL SEQUENCE
  002C       =1  138        INITNOW BIT   SYNC.4   ;SYNC.4=THIS IS AN INIT LM POLL IN PROGRESS
  002D       =1  139        RECOVER BIT   SYNC.5   ;SYNC.5=INIT THIS CHAN DUE TO POWER FAIL DETECT
  002E       =1  140        SYNCCLK BIT   SYNC.6   ;SYNC.6=TIME TO RESYNC THE LMS TO THE COP CLOCK
  002F       =1  141        PWRUP   BIT   SYNC.7   ;SYNC.7=FIRST POLL OF LMS AFTER COP PWR UP
             =1  142
            143 +1  $EJECT
            144
            145    ;*************************************************
            146    ;*
            147    ;*   MACROS
            148    ;*
            149    ;*************************************************
            150
            151 +1  $GEN
            152    %*DEFINE (SET_REG_BANK(BANK)) (
            153        %IF(%BANK EQ 0) THEN (
            154            USING 0
            155            CLR RS0
            156            CLR RS1
            157        )ELSE (%IF (%BANK EQ 1) THEN (
            158            USING 1
            159            SETB RS0
            160            CLR  RS1
            161            )ELSE (%IF (%BANK EQ 2) THEN (
            162            USING 2
            163            CLR  RS0
            164            SETB RS1
            165                )ELSE (%IF (%BANK EQ 3) THEN (
            166            USING 3
            167            SETB RS0
            168            SETB RS1
            169            )ELSE(          )FI
            170                        )FI
```

```
                    171                )FI
                    172           )FI
                    173       )
                    174
                    175   ;************END MACRO CODE DEFINITIONS*************
                    176
                    177
----                178       CSEG    AT 0
                    179   ;***************************
                    180       EXTRN   DATA(COMBUF)
                    181       EXTRN   CODE(COMM)
                    182   ;***************************
                    183   EXTRN   DATA(PCON)
0003                184   T10  EQU 3              ;MODE OF TIMER 0 NIBBLE OF TMOD
0002                185   TI1  EQU 2              ;MODE OF TIMER 1 NIBBLE OF TMOD
0000                186   M0   EQU 0              ;OFFSET TO MODE 0 BIT OF TIMER NIBBLE
0001                187   M1   EQU 1              ;OFFSET TO MODE 1 BIT OF TIMER NIBBLE
0002                188   C_T  EQU 2              ;OFFSET TO COUNT/TIMER BIT OF NIBBLE
0003                189   GATE EQU 3              ;OFFSET TO GATE BIT OF TIMER NIBBLE
FF8F                190   BAUD_MOD EQU -113       ;**I HOPE THIS IS THE COUNT FOR 300 BAUD AT X16
FFFC                191   BAUD_LM  EQU -4         ;BAUD RATE COUNT FOR LM AT X16
000D                192   CR   EQU 0DH            ;ASCII CARRIAGE RETURN
                    193 +1 $EJECT
                    194 +1 $GENONLY
                    195   ZERO:
0000 02004E         196       JMP     START
                    197   ROMCK:
0003 00             198       DB      0                   ;CHECKSUM LOCATION FOR ROM TEST
                    199
000B                200       ORG     0BH                 ;TIMER 0 LOW INTERRUPT VECTOR LOCATION
000B D5003F   F     201       DJNZ    TIMOUT_CLK,IGNORE_INT ;THIS IS A AN EXTENDER FOR 8BITS TO 16BITS
000E 020036         202       JMP     TIME0
                    203
                    204
                    205   ;*****************************************************************
                    206   ;*                                                               *
                    207   ;* THIS IS THE DUPLICATION OF THE LM REALTIME CLOCK              *
                    208   ;*   IT USES TIMER 0 HIGH IN 8 BIT MODE AND IS CONTROLLED BY T1 BITS *
                    209   ;*                                                               *
                    210   ;*****************************************************************
001B                211       ORG     1BH                 ;TIMER 0 HIGH INTERRUPT VECTOR LOCATION *
001B D5002F   F     212       DJNZ    TFF,IGNORE_INT      ;                                       *
001E 750004   F     213       MOV     TFF,#4              ;ADJUST TFF MODULUS TO 4                *
0021 D50029   F     214       DJNZ    TF,IGNORE_INT       ;                                       *
0024 D50026   F     215       DJNZ    TS,IGNORE_INT       ;                                       *
0027 0500     F     216       INC     T_2MIN                                                      ;*
0029 C0E0           217       PUSH    ACC                                                         ;*
002B E500     F     218       MOV     A,T_2MIN            ;PREPARE FOR ROLLOVER TEST              ;*
002D 7004           219       JNZ     NOT_9HR             ;CHECK ROLLOVER FOR 9HR TIC EXIT IF NOT ;*
002F D200     F     220       SETB    SYNCCLK             ;ON A 9HR TIC REQUEST LM CLOCK RECYNC TO COP
0031 0500     F     221       INC     T_9HR               ;AND ADVANCE THE CLOCK                  ;*
                    222   NOT_9HR:                                                                ;*
0033 D0E0           223       POP     ACC                 ;RESTORE THE ACC TO THE VALUE AT ENTRY  *
0035 32             224       RETI                        ;AND THEN EXIT                          ;*
                    225   ;*****************************************************************
                    226
                    227
                    228
                    229
                    230   ;*****************************************************************
                    231   ;                                                                *
                    232   ; TIME OUT ROUTINE IT USES TIMER 0 LOW IN 8 BIT MODE             *
                    233   ;                                                                *
```

```
                234   ;      IT DECREMENTS THE TIME OUT COUNT UNLESS IT = 255            *
                235   ;      IF THE RESULTING VALUE IS NOT 0 THEN RETURN TO THE ROUTINE   *
                236   ;      THAT TIMED OUT                                               *
                237   ;      IF THE RESULT WAS 0 THEN POP THE PSW (BANK SELECT) OF THE    *
                238   ;      CALLING ROUTINE AND RETURN TO THAT ROUTINE WITH THE ACC=5    *
                239   ;                                                                   *
                240   ;************************************************************************
                241   TIME0:                                                              ;*
0036 C28C       242          CLR    TR0              ;STOP THE COUNTER                    *
0038 E500   F   243          MOV    A,TIME_OUT_CNT                                        ;*
003A 64FF       244          XRL    A,#-1            ;-1 MEANS CONTINUE IGNORING TIME OUTS *
003C 600F       245          JZ     IGNORE_INT       ;NEVER ABORT                         *
003E D5000C F   246          DJNZ   TIME_OUT_CNT,IGNORE_INT   ;RET UNTIL EXHAUSTED        *
0041 D0E0       247          POP    ACC              ;THROW AWAY THE HIGH BYTE OF THE RETURN ADDRESS *
0043 D0E0       248          POP    ACC              ;THROW AWAY THE OTHER BYTE           *
0045 D0D0       249          POP    PSW              ;THIS EXPOSES THE CALLER OF THE ROUTINE THAT TIMED
0047 C29C       250          CLR    REN              ;DISABLE RECIEVERS TO PREVENT GARBAGE RECEPTION *
0049 C2A9       251          CLR    ET0              ;AND TIMER INT                       *
004B 7405       252          MOV    A,#5             ;MARK STATUS AS TIMED OUT            *
                253   ;************************************************************************
                254
                255   IGNORE_INT:
004D 32         256          RETI
                257 +1 $EJECT
                258
                259   START:
                260 +1
                261 +2
                262 +2        USING  0
004E C2D3       263 +2        CLR    RS0
0050 C2D4       264 +2        CLR    RS1
                265 +2
                266 +1
                267   ;** THE EA COMMAND IS NOT SENT UNTIL THE SERIAL CHAN DIAG
0052 758100 F   268          MOV    SP,#STACK
0055 D2BE       269          SETB   TR1              ;START THE MASTER TOD LM EMULATION CLOCK
0057 D2AB       270          SETB   ET1              ;
0059 750080 F   271          MOV    PCON,#80H        ;THIS SETS THE BAUD PRESCALER TO /32
005C 758923     272          MOV    TMOD,#(T11 SHL 4)+T10  ;SET TIMER 1 MODE=2 TIMER 0 MODE=3 FOR
                273                                   ;BAUD RATE GENERATOR FOR SERIAL PORT
                274                                   ;ENABLE TIMER MODE NOT COUNTER
                275
                276 +1 $INCLUDE(DIAG.256)
             =1 277   ;THIS IS A BASIC INTERNAL DATA RAM EVALUATION TEST
             =1 278   ;THE PROGRAM FLOW IS: WRITE FIELD ALL 1 AND VERIFY, WRITE THE FIELD ALL 0 AND
             =1 279   ;VERIFY, WRITE DATA AS FOLLOWS 1,2,3,4...FD,FE,FF,1 THEN VERIFY.
             =1 280   RAM_TESTS:
             =1 281          USING  0
005F 7A04    =1 282          MOV    R2,#04H          ;LOW ADDRESS FOR TEST
0061 7B80    =1 283          MOV    R3,#80H          ;HIGH ADDRESS
0063 A802    =1 284          MOV    R0,AR2           ;POINTER TO LOCATION UNDER TEST
0065 C200  F =1 285          CLR    RAM_FAIL         ;CLEAR OLD STATUS
             =1 286   ;**TEST FOR ALL 1
0067 74FF    =1 287          MOV    A,#-1
0069 8001    =1 288          SJMP   START1_RAM
             =1 289   NXT1_RAM:
006B CB      =1 290          XCH    A,R0
             =1 291   START1_RAM:
006C F6      =1 292          MOV    @R0,A
006D 08      =1 293          INC    R0
006E CB      =1 294          XCH    A,R0
006F B503F9  =1 295          CJNE   A,AR3,NXT1_RAM
0072 A802    =1 296          MOV    R0,AR2
```

```
                =1  297       TST1_RAM:
0074 E6         =1  298           MOV     A,@R0
0075 B4FF3D     =1  299           CJNE    A,#-1,RAM_ERR
0078 08         =1  300           INC     R0
0079 E8         =1  301           MOV     A,R0
007A B503F7     =1  302           CJNE    A,AR3,TST1_RAM
007D A802       =1  303           MOV     R0,AR2
                =1  304       ;**TEST FOR 0
007F 7400       =1  305           MOV     A,#00
0081 8001       =1  306           SJMP    STAR T0_RAM
                =1  307       CLRNXT_RAM:
0083 C8         =1  308           XCH     A,R0
                =1  309       STAR T0_RAM:
0084 F6         =1  310           MOV     @R0,A
0085 08         =1  311           INC     R0
0086 C8         =1  312           XCH     A,R0
0087 B503F9     =1  313           CJNE    A,AR3,CLRNXT_RAM
008A A802       =1  314           MOV     R0,AR2
                =1  315       TST0_RAM:
008C E6         =1  316           MOV     A,@R0
008D 7026       =1  317           JNZ     RAM_ERR
008F 08         =1  318           INC     R0
0090 E8         =1  319           MOV     A,R0
0091 B503F8     =1  320           CJNE    A,AR3,TST0_RAM
0094 A802       =1  321           MOV     R0,AR2
                =1  322       ;**WRITE 255 DATA PATTERN
0096 7401       =1  323           MOV     A,#1
0098 8001       =1  324           SJMP    WRITENXT_RAM
                =1  325       NOTHERE_RAM:
009A C8         =1  326           XCH     A,R0
                =1  327       WRITENXT_RAM:
009B F6         =1  328           MOV     @R0,A
009C 04         =1  329           INC     A
009D 08         =1  330           INC     R0
009E C8         =1  331           XCH     A,R0
009F B503F8     =1  332           CJNE    A,AR3,NOTHERE_RAM
                =1  333       ;**READ 255 DATA PATTERN
00A2 A802       =1  334           MOV     R0,AR2
00A4 7901       =1  335           MOV     R1,#1
                =1  336       RDNXT_RAM:
00A6 E6         =1  337           MOV     A,@R0
00A7 B5010B     =1  338           CJNE    A,AR1,RAM_ERR
00AA 09         =1  339           INC     R1
00AB 08         =1  340           INC     R0
00AC E8         =1  341           MOV     A,R0
00AD B503F6     =1  342           CJNE    A,AR3,RDNXT_RAM
00B0 750000  F  =1  343           MOV     STATUS,#0
00B3 8005       =1  344           SJMP    ROMTST
                =1  345       RAM_ERR:
00B5 750000  F  =1  346           MOV     STATUS,#0
00B8 D200    F  =1  347           SETB    RAM_FAIL           ;MARK ANY FAILURE
                =1  348 +1    $EJECT
                =1  349       ;                    ROM CHECKSUM DIAGNOSTIC
                =1  350       ;  THE ROUTINE ADDS ALL ROM LOCATIONS AND EXPECTS THE RESULT TO BE 0
                =1  351       ;
                =1  352       ;THE FIRST TIME THIS CODE IS LOADED INTO THE EMULATOR BYTE ROMCK=0
                =1  353       ;THIS MUST BE SET TO THE PROPER VALUE AS FOLLOWS
                =1  354       ; 1. BURN A PROM WITH THE RAW CODE
                =1  355       ; 2. RUN THE EMULATOR SET FOR EXTERNAL CODE MEMORY
                =1  356       ; 3. SET A BREAKPOINT AT .DEFAULT_CXRAM
                =1  357       ; 4. EXECUTE G F 0
                =1  358       ; 5. WHEN THE BREAKPOINT TRIGGERS EXAMINE THE R0
                =1  359       ; 6. STORE THE VALUE OF R0 AT CODE BYTE .ROMCK
```

```
                    =1   360   ; 7. PUT THAT VALUE IN THE SOURCE CODE AT ROMCK AND REASSEMBLE
                    =1   361   ; 8. BURN A PROM USING THE NEW VALUE AND ERASE THE OTHER PROM
                    =1   362
                    =1   363
                    =1   364   ROMTST:
                    =1   365   ;CLEAR THE RAM FIRST!!!!!!
00BA A802           =1   366           MOV     R0,AR2
                    =1   367   ;**TEST FOR 0
00BC 7400           =1   368           MOV     A,#00
00BE 8001           =1   369           SJMP    START01_RAM
                    =1   370   CLRNXT1_RAM:
00C0 C8             =1   371           XCH     A,R0
                    =1   372   START01_RAM:
00C1 B80002    F =1  373           CJNE    R0,#STATUS,NO_SKIP
00C4 8001           =1   374           SJMP    STAT_SKIP
                    =1   375   NO_SKIP:
00C6 F6             =1   376           MOV     @R0,A
                    =1   377   STAT_SKIP:
00C7 08             =1   378           INC     R0
00C8 C8             =1   379           XCH     A,R0
00C9 B503F4         =1   380           CJNE    A,AR3,CLRNXT1_RAM
                    =1   381   ;NOW TEST THE ROM
00CC 900004         =1   382           MOV     DPTR,#4
00CF 7800           =1   383           MOV     R0,#0
                    =1   384   NXT_ROM:
00D1 7400           =1   385           MOV     A,#0        ;PREPARE FOR CODE BYTE MOVE
00D3 93             =1   386           MOVC    A,@A+DPTR
00D4 28             =1   387           ADD     A,R0        ;ACCUMULATE CHECKSUM IN R0
00D5 F8             =1   388           MOV     R0,A
00D6 A3             =1   389           INC     DPTR
00D7 7410           =1   390           MOV     A,#10H      ;THIS IS THE HIGH BYTE OF THE 4K CODE SPACE ADDR+1
00D9 B583F5         =1   391           CJNE    A,DPH,NXT_ROM
00DC 7400           =1   392           MOV     A,#0        ;WE MUST BE THERE SO
00DE 900003         =1   393           MOV     DPTR,#ROMCK ;POINT TO THE CHECKSUM LOCATION
00E1 93             =1   394           MOVC    A,@A+DPTR   ;AND GET IT FOR COMPARISON
00E2 D200      F =1  395           SETB    ROM_FAIL
00E4 B50005         =1   396           CJNE    A,AR0,DEFAULT_CXRAM
00E7 C200      F =1  397           CLR     ROM_FAIL    ;ON PASS TEST CLEAR THE STATUS
00E9 0200EC         =1   398           JMP     DEFAULT_CXRAM ;JUMP OVER THE CHECKSUM LOCATION
                    =1   399 +1 $EJECT
                    =1   400   ;THIS IS A BASIC XTERNAL CODE RAM EVALUATION TEST
                    =1   401   ;THE PROGRAM FLOW IS: WRITE FIELD ALL 1 AND VERIFY, WRITE THE FIELD ALL 0 AND
                    =1   402   ;VERIFY, WRITE DATA AS FOLLOWS 1,2,3,4...FD,FE,FF,1,2,3 ETC THEN VERIFY. NOTE
                    =1   403   ;THAT THIS IS A 255 BYTE DATA PATTERN.
                    =1   404
                    =1   405   DEFAULT_CXRAM:
00EC 7A40           =1   406           MOV     R2,#40H     ;HIGH BYTE OF THE LOWEST CODE RAM ADDRESS
00EE 7B48           =1   407           MOV     R3,#48H     ;HIGH BYTE OF THE HIGHEST CODE RAM ADDRESS+1
00F0 8AB3           =1   408           MOV     DPH,R2
00F2 758200         =1   409           MOV     DPL,#0
                    =1   410   ;**TEST FOR ALL 1
00F5 74FF           =1   411           MOV     A,#-1
00F7 8002           =1   412           SJMP    START1_CXRAM
                    =1   413   NXT1_CXRAM:
00F9 C583           =1   414           XCH     A,DPH
                    =1   415   START1_CXRAM:
00FB F0             =1   416           MOVX    @DPTR,A
00FC A3             =1   417           INC     DPTR
00FD C583           =1   418           XCH     A,DPH
00FF B503F7         =1   419           CJNE    A,AR3,NXT1_CXRAM
0102 8AB3           =1   420           MOV     DPH,R2
                    =1   421   TST1_CXRAM:
0104 E4             =1   422           CLR     A
```

```
0105 93        =1  423         MOVC   A,@A+DPTR
0106 D200   F  =1  424         SETB   CXRAM_FAIL
0108 B4FF53    =1  425         CJNE   A,#-1,DEFAULT_DXRAM
010B D200   F  =1  426         SETB   CXRAM_FAIL
010D A3        =1  427         INC    DPTR
010E E583      =1  428         MOV    A,DPH
0110 B503F1    =1  429         CJNE   A,AR3,TST1_CXRAM
0113 8AB3      =1  430         MOV    DPH,R2
               =1  431    ;**TEST FOR 0
0115 7400      =1  432         MOV    A,#00
0117 8002      =1  433         SJMP   START0_CXRAM
               =1  434    CLRNXT_CXRAM:
0119 C583      =1  435         XCH    A,DPH
               =1  436    START0_CXRAM:
011B F0        =1  437         MOVX   @DPTR,A
011C A3        =1  438         INC    DPTR
011D C583      =1  439         XCH    A,DPH
011F B503F7    =1  440         CJNE   A,AR3,CLRNXT_CXRAM
0122 8AB3      =1  441         MOV    DPH,R2
               =1  442    TST0_CXRAM:
0124 E4        =1  443         CLR    A
0125 93        =1  444         MOVC   A,@A+DPTR
0126 D200   F  =1  445         SETB   CXRAM_FAIL
0128 7034      =1  446         JNZ    DEFAULT_DXRAM
012A C200   F  =1  447         CLR    CXRAM_FAIL
012C A3        =1  448         INC    DPTR
012D E583      =1  449         MOV    A,DPH
012F B503F2    =1  450         CJNE   A,AR3,TST0_CXRAM
0132 8AB3      =1  451         MOV    DPH,R2
               =1  452    ;**WRITE 255 DATA PATTERN
0134 7401      =1  453         MOV    A,#1
0136 8002      =1  454         SJMP   WRITENXT_CXRAM
               =1  455    NOTHERE_CXRAM:
0138 C583      =1  456         XCH    A,DPH
               =1  457    WRITENXT_CXRAM:
013A F0        =1  458         MOVX   @DPTR,A
               =1  459    Z1_CXRAM:
013B 04        =1  460         INC    A
013C 60FD      =1  461         JZ     Z1_CXRAM
013E A3        =1  462         INC    DPTR
013F C583      =1  463         XCH    A,DPH
0141 B503F4    =1  464         CJNE   A,AR3,NOTHERE_CXRAM
               =1  465    ;**READ 255 DATA PATTERN
0144 8A83      =1  466         MOV    DPH,R2
0146 7901      =1  467         MOV    R1,#1
0148 8000      =1  468         SJMP   RDNXT_CXRAM
               =1  469    RDNXT_CXRAM:
014A E4        =1  470         CLR    A
014B 93        =1  471         MOVC   A,@A+DPTR
014C D200   F  =1  472         SETB   CXRAM_FAIL
014E B5010D    =1  473         CJNE   A,AR1,DEFAULT_DXRAM
0151 C200   F  =1  474         CLR    CXRAM_FAIL
0153 09        =1  475         INC    R1
0154 B90001    =1  476         CJNE   R1,#0,NOTZERO_CXRAM
0157 09        =1  477         INC    R1
               =1  478    NOTZERO_CXRAM:
0158 A3        =1  479         INC    DPTR
0159 E583      =1  480         MOV    A,DPH
015B B503EC    =1  481         CJNE   A,AR3,RDNXT_CXRAM
               =1  482 +1 $EJECT
               =1  483    ;THIS IS A BASIC XTERNAL DATA RAM EVALUATION TEST
               =1  484    ;THE PROGRAM FLOW IS: WRITE FIELD ALL 1 AND VERIFY, WRITE THE FIELD ALL 0 AND
               =1  485    ;VERIFY, WRITE DATA AS FOLLOWS 1,2,3,4...FD,FE,FF,1,2,3 ETC THEN VERIFY. NOTE
```

```
                    =1   486    ;THAT THIS IS A 255 BYTE DATA PATTERN.
                    =1   487
                    =1   488    DEFAULT_DXRAM:
015E 7A60           =1   489            MOV     R2,#60H         ;HIGH BYTE OF THE LOWEST EXTERNAL DATA RAM ADDR
0160 7B80           =1   490            MOV     R3,#80H         ;HIGH BYTE OF THE HIGHEST EXTERNAL DATA RAM ADDR+1
0162 7C01           =1   491            MOV     R4,#1
                    =1   492    START_DXRAM:
0164 8AB3           =1   493            MOV     DPH,R2
0166 758200         =1   494            MOV     DPL,#0
                    =1   495    ;**TEST FOR ALL 1
0169 74FF           =1   496            MOV     A,#-1
016B 8002           =1   497            SJMP    START1_DXRAM
                    =1   498    NXT1_DXRAM:
016D C583           =1   499            XCH     A,DPH
                    =1   500    START1_DXRAM:
016F F0             =1   501            MOVX    @DPTR,A
0170 A3             =1   502            INC     DPTR
0171 C583           =1   503            XCH     A,DPH
0173 B503F7         =1   504            CJNE    A,AR3,NXT1_DXRAM
0176 8AB3           =1   505            MOV     DPH,R2
                    =1   506    TST1_DXRAM:
0178 E0             =1   507            MOVX    A,@DPTR
0179 D200       F   =1   508            SETB    DXRAM_FAIL
017B B4FF4F         =1   509            CJNE    A,#-1,RAMTST_EXIT
017E C200       F   =1   510            CLR     DXRAM_FAIL
0180 A3             =1   511            INC     DPTR
0181 E583           =1   512            MOV     A,DPH
0183 B503F2         =1   513            CJNE    A,AR3,TST1_DXRAM
0186 8AB3           =1   514            MOV     DPH,R2
                    =1   515    ;**TEST FOR 0
0188 7400           =1   516            MOV     A,#00
018A 8002           =1   517            SJMP    START0_DXRAM
                    =1   518    CLRNXT_DXRAM:
018C C583           =1   519            XCH     A,DPH
                    =1   520    START0_DXRAM:
018E F0             =1   521            MOVX    @DPTR,A
018F A3             =1   522            INC     DPTR
0190 C583           =1   523            XCH     A,DPH
0192 B503F7         =1   524            CJNE    A,AR3,CLRNXT_DXRAM
0195 8AB3           =1   525            MOV     DPH,R2
                    =1   526    TST0_DXRAM:
0197 E0             =1   527            MOVX    A,@DPTR
0198 D200       F   =1   528            SETB    DXRAM_FAIL
019A 7031           =1   529            JNZ     RAMTST_EXIT
019C C200       F   =1   530            CLR     DXRAM_FAIL
019E A3             =1   531            INC     DPTR
019F E583           =1   532            MOV     A,DPH
01A1 B503F3         =1   533            CJNE    A,AR3,TST0_DXRAM
01A4 8AB3           =1   534            MOV     DPH,R2
                    =1   535    ;**WRITE 255 DATA PATTERN
01A6 7401           =1   536            MOV     A,#1
01A8 8002           =1   537            SJMP    WRITENXT_DXRAM
                    =1   538    NOTHERE_DXRAM:
01AA C583           =1   539            XCH     A,DPH
                    =1   540    WRITENXT_DXRAM:
01AC F0             =1   541            MOVX    @DPTR,A
                    =1   542    Z1_DXRAM:
01AD 04             =1   543            INC     A
01AE 60FD           =1   544            JZ      Z1_DXRAM
01B0 A3             =1   545            INC     DPTR
01B1 C583           =1   546            XCH     A,DPH
01B3 B503F4         =1   547            CJNE    A,AR3,NOTHERE_DXRAM
                    =1   548    ;**READ 255 DATA PATTERN
```

```
01B6 8AB3      =1 549              MOV     DPH,R2
01B8 7901      =1 550              MOV     R1,#1
               =1 551    RDNXT_DXRAM:
01BA E0        =1 552              MOVX    A,@DPTR
01BB D200   F  =1 553              SETB    DXRAM_FAIL
01BD B5010D    =1 554              CJNE    A,AR1,RAMTST_EXIT
01C0 C200   F  =1 555              CLR     DXRAM_FAIL
01C2 09        =1 556              INC     R1
01C3 B90001    =1 557              CJNE    R1,#0,NOTZERO_DXRAM
01C6 09        =1 558              INC     R1
               =1 559    NOTZERO_DXRAM:
01C7 A3        =1 560              INC     DPTR
01C8 E583      =1 561              MOV     A,DPH
01CA B503ED    =1 562              CJNE    A,AR3,RDNXT_DXRAM
               =1 563    RAMTST_EXIT:
               =1 564 +1 $EJECT
               =1 565    ;    LM FILE SERIAL COMMUNICATIONS TEST
               =1 566    ;ECHOS 5 BYTES ON EACH A SERIAL LINE OF THE COP
01CD 750004 F  =1 567              MOV     CMD,#4              ;SET A TEMP COUNTER FOR 4 FILES TO TEST
01D0 750000 F  =1 568              MOV     LM_CURRENT,#0       ;POINT TO THE FIRST FILE
01D3 D2AF      =1 569              SETB    EA                  ;**** TURN ON ALL INTERRUPTS*****
               =1 570    NXT_FILE:
01D5 1201E5    =1 571              CALL    ECHO_TEST           ;TEST 1 FILE
01D8 7006      =1 572              JNZ     SER_FAIL            ;IF ACC=1 THEN THIS FILE FAILED
01DA D500FB F  =1 573              DJNZ    CMD,NXT_FILE        ;IF ALL FILES PASS EXIT WITH ACC=0
01DD 02022D    =1 574              JMP     DIAG_EXIT
               =1 575    SER_FAIL:
01E0 D200   F  =1 576              SETB    NO_COM              ;ELSE MARK A FAIL
01E2 02022D    =1 577              JMP     DIAG_EXIT           ;AND EXIT
               =1 578
               =1 579    ECHO_TEST:
01E5 C0D0      =1 580              PUSH    PSW                 ;SAVE BANK SEL ALTHOUGH NOT CHANGED AS
               =1 581                                          ;REQUIRED BY THE TIMEOUT INTERRUPT
01E7 D29F      =1 582              SETB    SM0                 ; INTERRUPT ROUTINES REQUIRE THE RESTORE
01E9 D29E      =1 583              SETB    SM1
01EB 750080 F  =1 584              MOV     PCON,#80H
01EE 758DFC    =1 585              MOV     TH1,#BAUD_LM
01F1 D2D5      =1 586              SETB    F0                  ;SET TRANSMIT MODE
               =1 587    ECHOTST_FILE:
01F3 120000 F  =1 588              CALL    FILE_SEL            ;ENABLE TRANSMITTERS FOR SELECTED FILE
01F6 C290      =1 589              CLR     P1.0                ;ENABLE RECIEVERS ALSO FOR ECHO
01F8 7801      =1 590              MOV     R0,#1               ;SET DATA PATTERN
               =1 591    NXT_ECHO:
01FA 750001 F  =1 592              MOV     TIME_OUT_CNT,#1     ;SET THE FAIL TIMERS FOR ABOUT
01FD 75000A F  =1 593              MOV     TIMOUT_CLK,#10      ;5MS
0200 758A00    =1 594              MOV     TL0,#0
0203 D2A9      =1 595              SETB    ET0                 ;ENABLE TIMEOUTS
0205 D29C      =1 596              SETB    REN                 ;ENABLE RECIEVERS
0207 C298      =1 597              CLR     RI                  ;THROW AWAY OLD DATA
0209 C299      =1 598              CLR     TI                  ;THROW AWAY EXTRAMEOUS INDICATIONS
020B E8        =1 599              MOV     A,R0                ;GET THE PATTERN TO SEND
020C D28C      =1 600              SETB    TR0                 ;START THE ERROR TIMER
020E F599      =1 601              MOV     SBUF,A              ;SEND THE CHAR
               =1 602    SEND_ECHO:
0210 3099FD    =1 603              JNB     TI,SEND_ECHO        ;WAIT TIL GONE
               =1 604    WAIT_ECHO:
0213 3098FD    =1 605              JNB     RI,WAIT_ECHO        ;WAIT TIL RECIEVED OR TIMEOUT OCCURS
0216 E599      =1 606              MOV     A,SBUF              ;GET IT WHEN RECIEVED
0218 C28C      =1 607              CLR     TR0                 ;SHUT OFF EVERYTHING!!
021A C2A9      =1 608              CLR     ET0
021C C29C      =1 609              CLR     REN
021E D200   F  =1 610              SETB    NO_COM              ;PREMARK A FAILURE
0220 B50007    =1 611              CJNE    A,AR0,ECHOTST_END   ;TEST FOR FAILURE EXIT
```

```
0223 C200   F =1  612           CLR    NO_COM              ;REMOVE FAIL MARK ON PASS
0225 25E0     =1  613           ADD    A,ACC               ;DOUBLE THE INDEX
0227 F8       =1  614           MOV    R0,A                ;RESTORE THE NEW INDEX
0228 70D0     =1  615           JNZ    NXT_ECHO            ;THE #8 DOUBLE=256 OR 0+CARRY
              =1  616   ECHOTST_END:
022A D0D0     =1  617           POP    PSW                 ;RESTORE THE BANK SELECT
022C 22       =1  618           RET
              =1  619 +1 $EJECT
              =1  620   DIAG_EXIT:
022D D200   F =1  621           SETB   POWER               ;MARK A POWER UP RECOVER STATUS THIS IS
              =1  622                                      ;CLEARED ON THE FIRST STAT READ OF IBM
022F D200   F =1  623           SETB   PWRUP               ;MARK FOR THE FIRST POLL OF LMS
              =1  624
                  625 +1
                  626 +5
                  627 +5           USING 3
0231 D2D3         628 +5           SETB RS0
0233 D2D4         629 +5           SETB RS1
                  630 +5
                  631 +4
                  632 +3
                  633 +2
                  634 +1
                  635   INIT_PORTS:
0235 75A0FF       636           MOV    P2,#-1              ;SET ALL PORTS TO PASSIVE CONDITIOERS
                  637
                  638
                  639   ;CLEAR THE LM DATA BASE TO THE DEFAULT VALUES
0238 7800     F   640           MOV    R0,#LOW(CHAN00)     ;P2+R0=THE BASE OF THE DATA
023A 75A000   F   641           MOV    P2,#HIGH(CHAN00)
023D 7A00         642           MOV    R2,#0               ;SET UP FOR 0(ACTUALLY 256) REPEATS
                  643   REP_CHAN:
023F 900000   F   644           MOV    DPTR,#CHAN_PATTERN  ;POINT TO THE PATTERN TO REPLICATE
0242 7B14         645           MOV    R3,#BYTES_PER_CHAN  ;LOAD THE LENGTH OF THE PATTERN
                  646   REP_PATTERN:
0244 E4           647           CLR    A                   ;PREPARE FOR CODE FETCH
0245 93           648           MOVC   A,@A+DPTR           ;FETCH PATTERN BYTE
0246 F2           649           MOVX   @R0,A               ;PUT IT IN THE DATABASE
0247 A3           650           INC    DPTR                ;POINT TO NEXT PATTERN BYTE
0248 08           651           INC    R0                  ;POINT TO THE NEXT DATABASE LOCATION
0249 E8           652           MOV    A,R0                ;PREPARE TO TEST R0 VALUE IN ACC
024A 7002         653           JNZ    NOROLL              ;IF R0<>0 THEN IN SAME 256 BYTE BLOCK
024C 05A0         654           INC    P2                  ; ELSE ADVANCE BLOCK POINTER
                  655   NOROLL:
024E DBF4         656           DJNZ   R3,REP_PATTERN      ;FINISH THE PATTERN
0250 DAED         657           DJNZ   R2,REP_CHAN         ;DO THE NEXT CHANNEL BUFFER
                  658
                  659 +1 $EJECT
                  660   ;*** REENTRY POINT WHEN THE IBM HANGS UP
                  661   INIT_MODEM:                        ;THIS INITITS THE MODEM FOR COMMUNICATIONS
0252 75D8BF       662           MOV    TH1,#BAUD_MOD       ;SET THE RELOAD VALUE INTO TIMER 1 HIGH
0255 C29F         663           CLR    SM0                 ;SET SERIAL
0257 D29E         664           SETB   SM1                 ;MODE TO 1
0259 7500C8   F   665           MOV    TIME_OUT_CNT,#200   ;WAIT FOR ABOUT 30 SEC THEN SEND IT ANYWAY
025C 120000   F   666           CALL   RECIEVE_OK          ;UNLESS "OK" IS RECIEVED FIRST
                  667   ;SEND THE MODEM INIT MESSAGE
025F 900000   F   668           MOV    DPTR,#MODEM_INIT_MSG ;POINT TO INITIALIZATION MESSAGE
0262 75A000   F   669           MOV    P2,#HIGH(COP_TO_HOST_BUFF) ;PAGE POINTER TO COP>HOST COM BUFF
0265 7B0A         670           MOV    R3,#MODEM_INIT_MSG_E-MODEM_INIT_MSG+1  ; LENGTH > R3 COUNTER
0267 7800         671           MOV    R0,#0               ;INIT BUFFER INDEX FOR COP > HOST COM BUFF
                  672   NXT_INIT_CHAR:
0269 E8           673           MOV    A,R0                ;MOVE BUFF INDEX TO ACC
026A 93           674           MOVC   A,@A+DPTR           ;FETCH MESSAGE CHARACTER
```

```
026B F2           675         MOVX  @R0,A                   ;SEND CHAR TO BUFFER
026C 08           676         INC   R0                      ;BUMP THE INDEX
026D D51BF9       677         DJNZ  AR3,NXT_INIT_CHAR       ;DECREMENT R3 AND REPEAT IF NOT=0
0270 7480         678         MOV   A,#80H                  ;PREPARE FOR MODEM SELECT
0272 7800         679         MOV   R0,#0                   ;POINT TO MESSAGE IN BUFFER
0274 7A0A         680         MOV   R2,#MODEM_INIT_MSG_E-MODEM_INIT_MSG+1
0276 120000   F   681         CALL  SND_MOD_INIT            ;SEND IT
0279 020000   F   682         JMP   CK_CD                   ;GO TO THE MAIN SCHEDULER
                  683
                  684     CONSTANTS   SEGMENT CODE
----              685         RSEG  CONSTANTS
                  686     MODEM_INIT_MSG:                   ;80H SIMULATES 7 BIT MARK PARITY
0000 A5           687 +1      DB    'Z'+80H                 ;MODEM COMMAND INTRODUCER ESCAPED FROM MACRO PROC
0001 C6           688         DB    'F'+80H,' '+80H
0002 A0
0003 B4           689         DB    '4'+80H                 ;DATA FORMAT TO 8 BITS NO PARITY
0004 8D           690 +1      DB    CR+80H,'Z'              ;DELIMITER
0005 25
0006 432031       691         DB    'C 1'                   ;MODEM TO ANSWER PHONE ON FIRST RING
                  692      ;* DB   CR,'
                  693 +1   ;* DB   'ZU       0'             ;SHUT OFF MODEM COMMAND MODE TO ALLOW
                  694     MODEM_INIT_MSG_E:                 ;TRANSPARENT BINARY DATA TRANSMISSION
0009 0D           695         DB    CR                      ;EXECUTE THE COMMAND
                  696 +1  $EJECT
                  697     ;*****************************************************************
                  698     ;
                  699     ;             THIS IS THE MAIN DISPATCH ROUTINE
                  700     ;             IT HANDLES MODEM REQUESTS AND
                  701     ;             IT SCHEDULES POLLING
                  702     ;             THE CLEAN ENTER POINT TO THE PROGRAM
                  703     ;             AFTER INITIALIZATION IS
                  704     ;                 CK_CD
                  705     ;
                  706     ;*****************************************************************
                  707
                  708     DISPATCH  SEGMENT  CODE
----              709         RSEG  DISPATCH
                  710
000C              711     INIT_TOKEN  EQU    0CH            ;INITIALIZE COMMAND FORM TOKEN
0004              712     POLL_REQ0   EQU    04H            ;DATA REQ TOKEN
00B3              713     CD          BIT    P3.3           ;CARRIER DETECT BIT
                  714
                  715     REC_TAB:                          ;THIS IS THE JMP TAB FOR MODEM RECV STAT
0000 8064         716         SJMP  GOOD_CMD                ;0= GOOD MESSAGE RECIEVED SO PROCESS IT
0002 8037         717         SJMP  RTS_RECV                ;1=RTS RECIEVED
0004 8040         718         SJMP  ACK_RECV                ;2=GOT AN ACK
0006 8040         719         SJMP  NAK_RECV                ;3=NAK RECIEVED
0008 8051         720         SJMP  CK_RECV                 ;4=GOT A CHECK SUM ERROR
000A 8047         721         SJMP  TIM_RECV                ;5=SAW A TIMEOUT
000C 8002         722         SJMP  CK_CD                   ;6=NOT IN SYNC
000E 8000         723         SJMP  CK_CD                   ;ABORT MESSAGE MISC PROBLEMS
                  724
                  725     CK_CD:                            ;THIS IS THE ENTRY POINT CHECK FOR CD FIRST
                  726 +1
                  727 +5
                  728 +5       USING 3
0010 D2D3         729 +5       SETB  RS0
0012 D2D4         730 +5       SETB  RS1
                  731 +5
                  732 +4
                  733 +3
                  734 +2
                  735 +1
```

```
0014 7A10            736         MOV     R2,#16              ;CLEAR 16 BYTES OF THE MODEM IN BUFF
0016 900000   F      737         MOV     DPTR,#HOST_TO_COP_BUFF
0019 E4              738         CLR     A                   ;CLEAR OUT ANY OLD MESSAGE
                     739 CK_CD1:
001A F0              740         MOVX    @DPTR,A
001B A3              741         INC     DPTR
001C DAFC            742         DJNZ    R2,CK_CD1
001E 20B345          743         JB      CD,LOCAL            ;IF NO MODEM CARRIER START POLLING
0021 D200     F      744         SETB    CD_FLAG.1           ;MARK A RECIEVED CARRIER DETECT
0023 200006   F      745         JB      CD_FLAG.2,CALLING   ;FIRST TIME AFTER IBM CALLS WILL=0
0026 C200     F      746         CLR     SYNC.0              ;MARK THE NEED TO RECIEVE RTS
0028 0500     F      747         INC     MOD_SEQ             ;SO INCR THE SESSION SEQUENCE COUNT
002A D200     F      748         SETB    CD_FLAG.2           ;THEN SET IT FOR THE NEXT PASS
                     749 +1 $EJECT
                     750 ;****************************************************************
                     751 ;
                     752 ;   WHEN CARRIER DETECT IS ACTIVE (LOW) THEN THE PROGRAM
                     753 ;   ALWAYS WAITS IN THIS ROUTINE UNTIL A MESSAGE IS RECIEVED
                     754 ;   FROM THE IBM
                     755 ;
                     756 ;****************************************************************
                     757 CALLING:
002C 900000   F      758         MOV     DPTR,#REC_TAB       ;POINT TO DISPATCH TABLE
002F 7500FE   F      759         MOV     TIME_OUT_CNT,#254   ;GO FOR A LONG TIME
0032 C200     F      760         CLR     SYNC.2              ;CLR LONG TIMEOUT FLAG
0034 C200     F      761         CLR     SYNC.1              ;CLR 1CHAR FLAG
0036 120000   F      762         CALL    MODEM_IN            ;GET ANY MESSAGE
0039 23              763         RL      A                   ;ON RET DOUBLE STAT FOR 2 BYTE ENTRYS IN
003A 73              764         JMP     @A+DPTR             ;DISPATCH TABLE AND DO IT
                     765 ;****************************************************************
                     766
                     767 RTS_RECV:
003B 900000   F      768         MOV     DPTR,#COP_TO_HOST_BUFF ;POINT TO THE MODEM OUT BUFFER
003E 7403            769         MOV     A,#CTS              ;SET THE RESPONSE
0040 F0              770         MOVX    @DPTR,A             ;PUT IT IN BUFFER
0041 120000   F      771         CALL    MODEM_OUT           ;SEND IT
0044 80CA            772         JMP     CK_CD               ;GET NEXT MESSAGE
                     773
0046 80C8            774 ACK_RECV: JMP   CK_CD
0048 900000   F      775 NAK_RECV: MOV   DPTR,#COP_TO_HOST_BUFF ;POINT TO ANY OLD MESSAGE
004B 750001   F      776         MOV     RETRY_CNT,#1        ;ONLY SEND IT ONCE
004E 120000   F      777         CALL    MODEM_OUT
0051 80BD            778         JMP     CK_CD               ;THEN ABORT
0053 D200     F      779 TIM_RECV: SETB  SYNC.2              ;MARK AS A LONG TIME OUT
0055 850100   F      780         MOV     POLL_RPT,1
0058 020000   F      781         JMP     LOCAL               ;POLL 1 CHANNEL
                     782
                     783 CK_RECV:
005B 900000   F      784         MOV     DPTR,#COP_TO_HOST_BUFF
005E 7415            785         MOV     A,#NAK              ;BAD CHECKSUM SO SEND NAK
0060 F0              786         MOVX    @DPTR,A
0061 120000   F      787         CALL    MODEM_OUT
0064 80AA            788         JMP     CK_CD
                     789 +1 $EJECT
                     790 ;****************************************************************
                     791 ;
                     792 ; THIS IS THE MAIN LM POLLING ROUTINE
                     793 ; IF THE CARRIER DETECT IS INACTIVE (HIGH) THEN THIS ROUTINE IS
                     794 ; CONTINUOUSLY EXECUTED
                     795
                     796 ;** IF THE CARRIER DETECT IS ACTVE THEN THIS ROUTINE IS EXECUTED
                     797 ;** ONCE BEFORE THE ACK IS SENT TO ANY IBM MESSAGE
                     798 ;
```

```
                            799  ; IT POLLS 16
                            800  ;CHANNELS STARTING AT THE VALUE OF LM_POLL+PH_POLL
                            801  ; AND ADVANCES THOSE COUNTERS AS IT GOES
                            802  ;
                            803  ; POLL MESSAGES TO THE LM ARE SENT THROUG THE COP_TO_LM_BUFF
                            804  ; RESPONSES ARE RECIEVED THROUGH THE LM_TO_COP_BUFF
                            805  ;
                            806  ;**********************************************************************
                            807  GOOD_CMD:
                            808  LOCAL:                              ;THIS STARTS THE POLLING SEQUENCE
0066 120000   F             809      CALL    POLL16
0069 20B312                 810      JB      CD,HUNG_UP              ;IF CARRIER IS ON CHECK FOR MESSAGES
                            811  ;******FINALLY DECODE ANY COMMAND RECIEVED FROM THE IBM***************
006C 200003   F             812      JB      SYNC.2,OVERDECODE       ;IF HERE DUE TO TIME OUT NO CMD IS PENDING
006F 120000   F             813      CALL    DECODE_CMD              ;RECIEVED COMMAND SO EXECUTE IT
                            814  OVERDECODE:
0072 809C                   815      JMP     CK_CD
                            816
                            817  POLL16:
0074 750010   F             818      MOV     POLL_RPT,#16            ;DO 16 POLLS AFTER DOING AN IBM COMMAND
                            819  POLL16A:
0077 120000   F             820      CALL    POLL                    ;DO 1 CHAN POLL
007A D500FA   F             821      DJNZ    POLL_RPT,POLL16A        ;REPEAT BEFORE GETTING NEXT IBM COMMAND
007D 22                     822      RET
                            823
                            824  HUNG_UP:
007E D200     F             825      SETB    CD_FLAG.0               ;SET FLAG TO SAY CARRIER GONE
                            826  ;**********************************************************************
                            827  ;************THIS SENDS THE CHANNEL INITIALIZERS WHEN MODEM HANGS UP*****
                            828  ;**********************************************************************
                            829  INIT_CHAN:
0080 E500     F             830      MOV     A,CD_FLAG
0082 B4070C                 831      CJNE    A,#7,NO_DO              ;ON 7 THE CD PIN WENT FROM HIGH TO LOW
0085 750000   F             832      MOV     CD_FLAG,#0              ;RETURN TO NORMAL POLLING OF THE LMS
0088 75002B   F             833      MOV     TIME_OUT_CNT,#40        ;WAIT FOR HANGUP
008B 120000   F             834      CALL    WAIT
008E 020252                 835      JMP     INIT_MODEM              ;REINITIALIZE MODEM ON HANG UP
                            836  NO_DO:
0091 020000   F             837      JMP     CK_CD                   ;OTHERWISE CONTINUE POLLING
                            838 +1 $EJECT
                            839
                            840
                            841  ;**********************************************************************
                            842  ;*
                            843  ;*      MASTER LM POLLING ROUTINE
                            844  ;*
                            845  ;**********************************************************************
                            846  POLL:
0094 7F00                   847      MOV     R7,#0                   ;CLEAR THE CHECKSUM
0096 900000   F             848      MOV     DPTR,#COP_TO_LM_BUFF
0099 850000   F             849      MOV     LM_CURRENT,LM_POLL      ;GET THE VALUE OF THE LM TO POLL
009C 850000   F             850      MOV     PH_CURRENT,PH_POLL      ;GET THE VAL OF THE PHONE ON THIS LM
009F E500     F             851      MOV     A,LM_CURRENT            ;
00A1 540F                   852      ANL     A,#0FH                  ;EXTRACT THE LM# WITHIN THIS CARD FILE
00A3 F0                     853      MOVX    @DPTR,A                 ;PUT IN BYTE 0
00A4 621F                   854      XRL     AR7,A                   ;CHECKSUM IT
00A6 A3                     855      INC     DPTR                    ;POINT TO BYTE 1
00A7 E500     F             856      MOV     A,PH_CURRENT            ;GET BITS 0 AND 1 OF THE COMMAND
00A9 2404                   857      ADD     A,#POLL_REQ0            ;ATTACH THE BASIC POLL CMD TOKEN
00AB A2D0                   858      MOV     C,P                     ;GET THE PARITY OF ABOVE
00AD B3                     859      CPL     C                       ;HIGH MEANS NEED TO SET BYTE FOR ODD
00AE 92E7                   860      MOV     ACC.7,C                 ;ATTACH THE PARITY BIT
00B0 F0                     861      MOVX    @DPTR,A                 ;BUFFER COMPLETED COMMAND BYTE
```

```
00B1 621F              862        XRL     AR7,A           ;INCLUDE IT IN THE CHECKSUM .
00B3 A3                863        INC     DPTR            ;POINT TO THE LENGTH BYTE
00B4 7404              864        MOV     A,#4            ;CMD IS 4 BYTES LONG
00B6 F0                865        MOVX    @DPTR,A         ;PUT LENGTH IN BYTE 3
00B7 621F              866        XRL     AR7,A           ;CHECKSUM IT
00B9 A3                867        INC     DPTR            ;POINT TO CHECKSUM LOCATION
00BA EF                868        MOV     A,R7            ;GET THE CHECKSUM
00BB F0                869        MOVX    @DPTR,A         ;PUT IT AT THE END OF THE MESSAGE
00BC 120000    F       870    -   CALL    SEND_LM_BUF     ;SEND THE CMD TO THE LM
00BF 750001    F       871        MOV     TIME_OUT_CNT,#1 ;DONT REPEAT IF NO RESPONSE
                       872    SENDX1:
00C2 120000    F       873        CALL    LM_RECIEVE      ;BUFFER THE RESPONSE
                       874    SENDX2:
00C5 6005              875        JZ      GOOD_POLL       ;ON ERROR SKIP IT
00C7 020000    F       876        JMP     NXT_POLL
00CA 80C8              877    MID_JMP: JMP POLL           ;THIS IS A REL JMP EXTENDER
                       878    GOOD_POLL:
00CC 0500      F       879        INC     GOOD_COUNT      ;COUNT THE NUMBER OF CHANNELS RESPONDING
00CE 120000    F       880        CALL    POLL_DECODE1    ;DECODE RESPONSE INTO THE DATABASE
                       881    NXT_POLL:
00D1 0500      F       882        INC     PH_POLL         ;ADV PHONE ON THIS PH
00D3 E500      F       883        MOV     A,PH_POLL
00D5 B4042C            884        CJNE    A,#4,NOT_OVER   ;NOT MORE ON THIS PH
00D8 750000    F       885        MOV     PH_POLL,#0      ;SO RESET TO 0 AND
00DB 0500      F       886        INC     LM_POLL         ;INC THE LM #
00DD 7440              887        MOV     A,#LM_QTY
00DF B50022    F       888        CJNE    A,LM_POLL,NOT_OVER
                       889    PASS_COMPLETE:
00E2 25E0              890        ADD     A,ACC           ;DOUBLE THE LM_QTY VALUE
00E4 25E0              891        ADD     A,ACC           ;DOUBLE IT AGAIN
00E6 C200      F       892        CLR     NO_COM
00E8 B50002    F       893        CJNE    A,GOOD_COUNT,NO_LM ;CHECK THAT 4*LM_QTY CHANS RESPONDED
00EB D200      F       894        SETB    NO_COM          ;MARK A FAILURE IF COUNT IS DIFFERENT
                       895    NO_LM:
00ED 750000    F       896        MOV     GOOD_COUNT,#0   ;PREPARE COUNTER FOR NEXT PASS
00F0 750000    F       897        MOV     LM_POLL,#0
00F3 C200      F       898        CLR     PWRUP
00F5 C200      F       899        CLR     REQINIT         ;INIT PASS COMPLETED
00F7 C200      F       900        CLR     SYNCCLK         ;REMOVE SYNC PASS REQUEST
00F9 E500      F       901        MOV     A,T_9HR         ;GET 9HR TIC TO COMPARE FOR CLK SYNC PASS
00FB 6500      F       902        XRL     A,T_9HR_OLD     ;CHECK FOR NEW TIC TO OLD
00FD 6005              903        JZ      NOT_OVER        ;IF THE SAME DONT SET CLOCK
00FF D200      F       904        SETB    SYNCCLK         ;MARK A SYNC PASS
0101 850000    F       905        MOV     T_9HR_OLD,T_9HR ;ON A CHANGE UPDATE THE OLD VALUE
                       906    NOT_OVER:
0104 22                907        RET
                       908    ;****************************************************************
                       909
                       910
                       911    INIT_1CHAN:
0105 7A12              912        MOV     R2,#BYTES_PER_CHAN-2 ;GET THE BYTES PER CHANNEL TO SEND
0107 75A000    F       913        MOV     P2,#HIGH(COP_TO_LM_BUFF)
010A 7800      F       914        MOV     R0,#LOW(COP_TO_LM_BUFF+3) ;POINT TO 1ST PARM BYTE
010C 7F00              915        MOV     R7,#0           ;CLEAR CHECKSUM
                       916    RPT_INIT_PARM:
010E E0                917        MOVX    A,@DPTR         ;GET THE PARAMETER FROM THE TABLE
010F F2                918        MOVX    @R0,A           ;STORE CODE AT PARM BYTE
0110 A3                919        INC     DPTR
0111 08                920        INC     R0
0112 621F              921        XRL     AR7,A
0114 D51AF7            922        DJNZ    AR2,RPT_INIT_PARM
                       923
0117 7800      F       924        MOV     R0,#LOW(COP_TO_LM_BUFF) ;POINT TO THE ADDRESS BYTE
```

```
0119 E500    F    925         MOV    A,LM_CURRENT        ;SET THE LM# TO USE
011B 540F         926         ANL    A,#0FH              ;MASK OFF THE FILE # LEAVING SLOT
011D F2           927         MOVX   @R0,A               ;AND PUT IT IN THE FIRST BYTE
011E 621F         928         XRL    AR7,A               ;CHECK SUM IT
0120 08           929         INC    R0                  ;POINT TO CMD BYTE
0121 E500    F    930         MOV    A,PH_CURRENT        ;ASSEMBLE THE COMMAND TO INITIALIZE
0123 240C         931         ADD    A,#INIT_TOKEN       ;APPEND THE BASIC COMMAND
0125 A2D0         932         MOV    C,P                 ;FORCE PARITY TO BE ODD
0127 B3           933         CPL    C
0128 92E7         934         MOV    ACC.7,C
012A 621F         935         XRL    AR7,A               ;CHECKSUM THE RESULT
012C F2           936         MOVX   @R0,A               ;AND BUFFER IT IN BYTE 1
012D 08           937         INC    R0                  ;POINT TO THE LENGTH BYTE
012E 7412         938         MOV    A,#BYTES_PER_CHAN-2 ;LENGTH OF DATA FIELD
0130 2404         939         ADD    A,#LM_OVRHD+2       ;CALC THE MESSAGE LENGTH
0132 621F         940         XRL    AR7,A               ;CHECK SUM IT
0134 F2           941         MOVX   @R0,A               ;AND PUT IN BYTE 3
0135 2400    F    942         ADD    A,#LOW(COP_TO_LM_BUFF) ;A=LENGTH+BASE_OF_BUFFER
0137 F8           943         MOV    R0,A                ;POINT TO THE CHECKSUM LOC+1
0138 18           944         DEC    R0                  ;CHECKSUM IS THE LENGTH BYTES FROM 0
0139 EF           945         MOV    A,R7                ;GET THE CHECKSUM
013A F2           946         MOVX   @R0,A               ;INTO THE LAST BYTE OF THE MSG
013B 120000  F    947         CALL   SEND_LM_BUF         ;SEND INIT COMMAND
013E 750001  F    948         MOV    TIME_OUT_CNT,#1     ;DO NOT REPEAT
                  949     SENDX3:
0141 120000  F    950         CALL   LM_RECIEVE          ;VERIFY RESPONSE
0144 C200    F    951         CLR    INITNOW             ;MARK IT DONE REGARDLESS OF LM RESPONSE
                  952     SENDX4:
0146 7001         953         JNZ    BAD_INIT            ;SKIP IF NOT RESPONDING
0148 22           954         RET                        ;IF GOOD
                  955     BAD_INIT:
0149 D200    F    956         SETB   NO_COM              ;MARK COP STATUS THAT A CHAN HAS FAILED
014B 22           957         RET
                  958
                  959 +1 $EJECT
                  960     ;***************************************************************
                  961     ;*
                  962     ;*      THIS ROUTINE WILL RESYNC THE LM CLOCK T_2MIN,T_9HR
                  963     ;*      TO THE COP CLOCK AT 9HR TICS AND AT INITIALIZE COMMANDS
                  964     ;*
                  965     ;***************************************************************
                  966
                  967     SET_LMCLOCK:
                  968
014C E500    F    969         MOV    A,LM_CURRENT        ;POINT TO THE CHAN TO TALK TO
014E 25E0         970         ADD    A,ACC               ;DOUBLE FOR CHAN INDEX
0150 A200    F    971         MOV    C,PH_CURRENT.1      ;ADD IN THE PHONE ON THE CARD
0152 92E0         972         MOV    ACC.0,C
0154 A200    F    973         MOV    C,PH_CURRENT.0
0156 120000  F    974         CALL   LOC_CHAN            ;DPTR=BASE OF CHAN TO SYNC
0159 75A000  F    975         MOV    P2,#HIGH(COP_TO_LM_BUFF) ;P2+R0=XMIT MSG BUFF
015C 7800    F    976         MOV    R0,#LOW(COP_TO_LM_BUFF)
015E 7412         977         MOV    A,#CLOCK            ;OFFSET DPTR TO CLOCK BYTES OF CHAN
0160 2582         978         ADD    A,DPL
0162 F582         979         MOV    DPL,A
0164 7400         980         MOV    A,#0
0166 3583         981         ADDC   A,DPH
0168 F583         982         MOV    DPH,A
016A 7F00         983         MOV    R7,#0               ;CLR THE CHECKSUM
016C E500    F    984         MOV    A,LM_CURRENT        ;GET THE ADDRESS BYTE OF THE MSG
016E 540F         985         ANL    A,#0FH              ;16 LM / FILE
0170 F2           986         MOVX   @R0,A               ;STORE THE ADDRESS AT LOC 0
0171 621F         987         XRL    AR7,A               ;CHECK SUM IT
```

```
0173 08          988            INC    R0              ;POINT TO CMD BYTE
0174 7498        989            MOV    A,#98H          ;CMD WITH PARITY SET TO WRITE DATA BLK
0176 F2          990            MOVX   @R0,A           ;BUFFER COMMAND BYTE
0177 621F        991            XRL    AR7,A           ;CHECK SUM COMMAND
0179 08          992            INC    R0              ;POINT TO MSG LENGTH BYTE
017A 7408        993            MOV    A,#8            ;MSG IS 8 BYTES LONG
017C F2          994            MOVX   @R0,A           ;BUFFER MSG LENGTH
017D 621F        995            XRL    AR7,A           ;CHECK SUM LENGTH
017F 08          996            INC    R0              ;POINT TO DATA LENGTH FIELD
0180 7402        997            MOV    A,#2            ;2 DATA BYTES TO BE MOVED
0182 F2          998            MOVX   @R0,A           ;BUFFER THE DATA LENGTH FIELD
0183 621F        999            XRL    AR7,A           ;CHECKSUM DATA LENGTH FIELD
0185 08         1000            INC    R0              ;POINT TO DATA ADDRESS FIELD
0186 742D       1001            MOV    A,#2DH          ;2D=ADDRESS OF T_2MIN
0188 F2         1002            MOVX   @R0,A           ;MOV DATA ADDRESS TO BUFF
0189 621F       1003            XRL    AR7,A           ;CHECKSUM DATA ADDRESS
018B 08         1004            INC    R0              ;POINT TO FIRST DATA BYTE LOC
018C E500    F  1005            MOV    A,T_2MIN        ;GET THE T_2MIN VALUE FROM COP
018E F2         1006            MOVX   @R0,A           ;PUT T_2MIN IN THE BUFFER
018F 621F       1007            XRL    AR7,A           ;CHECKSUM T_2MIN
0191 08         1008            INC    R0              ;POINT TO T_9HR BUFFER LOC
0192 E500    F  1009            MOV    A,T_9HR         ;GET THE COP T_9HR VALUE
0194 F2         1010            MOVX   @R0,A           ;BUFFER THE T_9HR VALUE
0195 621F       1011            XRL    AR7,A           ;CHECKSUM THE T_9HR VALUE
0197 08         1012            INC    R0              ;POINT TO THE CKSUM BUFFER LOC
0198 EF         1013            MOV    A,R7            ;FETCH THE CHECKSUM TO ACC
0199 F2         1014            MOVX   @R0,A           ;BUFFER THE CHECK SUM
019A 120000  F  1015            CALL   SEND_LM_BUF
019D 750001  F  1016            MOV    TIME_OUT_CNT,#1
01A0 120000  F  1017            CALL   LM_RECIEVE
01A3 22         1018            RET
                1019 +1 $EJECT
                1020 ;************************************************************
                1021 ;
                1022 ;        THIS MODULE DECODES AND DISPATCHES COMMANDS
                1023 ;               RECIEVED FROM THE IBM.
                1024 ;
                1025 ;        THE COMMAND IS CONTAINED IN THE HOST_TO_COP_BUFF
                1026 ;        EACH COMMAND IS RESPONSIBLE FOR SENDING THE ACK
                1027 ;        AND ANY OTHER RESPONSES REQUIRED TO THE HOST
                1028 ;        THOSE REPLYS CAN BE FOUND IN THE COP_TO_HOST_BUFF
                1029 ;
                1030 ;************************************************************
                1031
                1032 ;*******THESE ARE COMMAND TOKEN SETS******************
000E            1033    CMDSTAT   EQU  0EH
0016            1034    REQCOPS   EQU  16H
0017            1035    REQCOPD   EQU  17H
0018            1036    REQLMS    EQU  18H
0019            1037    CLRLMS    EQU  19H
0005            1038    SPY_CHAN  EQU  5
00E0            1039    COPINIT   EQU  0E0H
0016            1040    COPSTAT   EQU  16H
0018            1041    LMSTAT    EQU  18H
0009            1042    MON_RPLY  EQU  9
00C0            1043    CHINITO   EQU  0C0H
0080            1044    DATA0     EQU  80H
0019            1045    TRANSPARENT EQU 19H
001A            1046    LM_SELECT EQU  1AH
                1047 ;***********END TOKENS*********************
                1048
0008            1049    PH_STAT_CMD EQU 8
000F            1050    DATAX     EQU  0FH
```

```
                            1051     HOST_CMD  SEGMENT CODE
                            1052 +1  $GENONLY
  ----                      1053              RSEG     HOST_CMD
                            1054     DECODE_CMD:
  0000 75A000    F          1055              MOV      P2,#HIGH(HOST_TO_COP_BUFF)
  0003 7800                 1056              MOV      R0,#0           ;POINT TO IN COMMING IBM MSG
  0005 E2                   1057              MOVX     A,@R0           ;GET THE FIRST CHAR
  0006 B40F7E               1058              CJNE     A,#DATAX,CK_CMDSTAT ;CHECK FOR DATA TOKEN
  0009 08                   1059              INC      R0              ;GET THE LENGTH BYTE
  000A E2                   1060              MOVX     A,@R0           ;NUMBER OF DATA BYTES LEFT IN BUFF
  000B FA                   1061              MOV      R2,A            ;SET A COUNTER
  000C 08                   1062              INC      R0              ;POINT TO OPCODE TOKEN
  000D 1A                   1063              DEC      R2              ;DEC FOR REMOVED TOKEN
  000E E2                   1064              MOVX     A,@R0           ;FETCH OPCODE
  000F F500      F          1065              MOV      CMD,A           ;SAVE IN A TEMP
  0011 54F0                 1066              ANL      A,#0F0H         ;MASK FOR INITCHAN CMD ALLOWING 16 COMBOS
  0013 B4C061               1067              CJNE     A,#CHINITO,WHAT_ELSE ;CHECK FOR CHAN INIT COMMAND
                            1068
                            1069
                            1070
                            1071
                            1072     ;*****************************************************************
                            1073     ;
                            1074     ; INITIALIZE 16 CHANNELS POINTED TO BY THE MESSAGE
                            1075     ;          ACK IS SENT AFTER THE INITIALIZATIONS ARE DONE
                            1076     ;
                            1077     ;*****************************************************************
                            1078     INITCHAN_CMD:
  0016 900000    F          1079              MOV      DPTR,#CHAN00    ;POINT TO THE DATA BASE
  0019 E500      F          1080              MOV      A,CMD           ;GET THE COMMAND BACK
  001B 540F                 1081              ANL      A,#0FH          ;EXTRACT THE INDEX
  001D 75F010               1082              MOV      B,#16
  0020 A4                   1083              MUL      AB              ;ACC CONTAINS CHANS/XMIT*INDEX<256
  0021 75F014               1084              MOV      B,#BYTES_PER_CHAN ;
  0024 A4                   1085              MUL      AB              ;AB CONTAINS OFFSET TO FIRST CHAN THIS INDX
  0025 2582                 1086              ADD      A,DPL           ;ADD THE INDX TO THE DPTR BASE
  0027 F582                 1087              MOV      DPL,A
  0029 E5F0                 1088              MOV      A,B             ;GET MSB
  002B 3583                 1089              ADDC     A,DPH
  002D F583                 1090              MOV      DPH,A           ;POINTING TO THE FIRST CHAN
  002F 740B                 1091              MOV      A,#RATE_TYPE    ;OFFSET TO THE FIRST INIT BYTE OF THE CHAN STRUCT
  0031 2582                 1092              ADD      A,DPL           ;ADD IT IN TO THE POINTER
  0033 F582                 1093              MOV      DPL,A
  0035 E4                   1094              CLR      A
  0036 3583                 1095              ADDC     A,DPH
  0038 F583                 1096              MOV      DPH,A           ;FINALLY POINTING WHERE WE WANT
  003A 7A10                 1097              MOV      R2,#16          ;REPEAT CHANNEL MOVE 16 TIMES
  003C 08                   1098              INC      R0              ;POINT TO THE FIRST BUFFER VALUE.
                            1099     NXT_CHINIT:
  003D 7905                 1100              MOV      R1,#USAGE-RATE_TYPE ;COUNTER FOR # OF INIT BYTES TO STORE
                            1101     NXT_INBYTE:
  003F E2                   1102              MOVX     A,@R0           ;GET THE INITILIZATION 5 BYTES FOR THIS CHAN
  0040 F0                   1103              MOVX     @DPTR,A         ;AND PUT IT AWAY
  0041 A3                   1104              INC      DPTR
  0042 08                   1105              INC      R0
  0043 D9FA                 1106              DJNZ     R1,NXT_INBYTE   ;PUT THEM AWAY
                            1107     NOT_INIT:
  0045 7414                 1108              MOV      A,#BYTES_PER_CHAN
  0047 C3                   1109              CLR      C
  0048 9405                 1110              SUBB     A,#USAGE-RATE_TYPE ;ADJ BECAUSE POINTERS MOVED DURING TRANSFER
  004A 2582                 1111              ADD      A,DPL           ;POINT TO THE NEXT CHANNEL
  004C F582                 1112              MOV      DPL,A
  004E E4                   1113              CLR      A
```

```
004F 35B3        1114         ADDC    A,DPH
0051 F583        1115         MOV     DPH,A
0053 DAE8        1116         DJNZ    R2,NXT_CHINIT
0055 E500    F   1117         MOV     A,CMD           ;RECOVER A COPY OF THE COMMAND
0057 540F        1118         ANL     A,#0FH          ;RECOVER INDEX
0059 23          1119         RL      A               ;DOUBLE INDEX
005A 23          1120         RL      A               ;DOUBLE AGAIN FOR 4X= LM# FOR START
005B F500    F   1121         MOV     LM_POLL,A       ;POINT TO THE LM TO POLL
005D 750000  F   1122         MOV     PH_POLL,#0      ;FORCE TO THE FIRST PHONE ON THE CARD
0060 750010  F   1123         MOV     POLL_RPT,#16    ;SET FOR 16 CHANS / MSG
                 1124 INIT16:
0063 D200    F   1125         SETB    INITNOW         ;FORCE INITIALIZATION NOW
0065 120000  F   1126         CALL    POLL            ;FORCE AN INIT POLL OF NEXT CHAN
0068 C200    F   1127         CLR     INITNOW         ;REMOVE INIT COMMAND DEMAND
006A D500F6  F   1128         DJNZ    POLL_RPT,INIT16
                 1129
006D 900000  F   1130         MOV     DPTR,#COP_TO_HOST_BUFF
0070 7406        1131         MOV     A,#ACK
0072 F0          1132         MOVX    @DPTR,A         ;SEND ACK TO GOOD MSG
0073 120000  F   1133         CALL    MODEM_OUT
0076 22          1134         RET
                 1135 ;********END OF INITIALIZE CHANNEL COMMAND******************
                 1136 +1 $EJECT
                 1137 ;********THIS IS THE EXIT IF THE COMMAND CANNOT BE DECODED*************
                 1138 WHAT_ELSE:                      ;MUST NOT BE A VALID MESSAGE
0077 900000  F   1139         MOV     DPTR,#COP_TO_HOST_BUFF
007A 7415        1140         MOV     A,#NAK
007C F0          1141         MOVX    @DPTR,A
007D 120000  F   1142         CALL    MODEM_OUT
0080 22          1143         RET
                 1144
                 1145
                 1146
                 1147
                 1148
                 1149
                 1150 ;***********************************************************************
                 1151 ;**********MAIN COMMAND DECODING****************************************
                 1152 ;***********************************************************************
                 1153 CK_TRANSP:
0081 B419F3      1154         CJNE    A,#TRANSPARENT,WHAT_ELSE
0084 020000  F   1155         JMP     TRANSP
                 1156
                 1157 CK_CMDSTAT:
0087 B40EF7      1158         CJNE    A,#CMDSTAT,CK_TRANSP   ;MUST BE ERROR IF NOT CMDSTAT TOKEN
008A 08          1159         INC     R0
008B 08          1160         INC     R0              ;BYPASS LENGTH AND POINT TO COMMAND
008C E2          1161         MOVX    A,@R0           ;AND GET IT
008D B41603      1162         CJNE    A,#REQCOPS,CMD1 ;COP STATUS REQUEST?
0090 020000  F   1163         JMP     COP_STAT        ;YES SEND IT
                 1164
                 1165 CMD1:
0093 B41703      1166         CJNE    A,#REQCOPD,CMD2 ;CHANNEL DATA DUMP REQUEST?
0096 020000  F   1167         JMP     DATA_SEND       ;YES SEND THE CHANNEL DATA BUFFERS
                 1168
                 1169 CMD2:
0099 54E0        1170         ANL     A,#0E0H         ;MASK OF THE BITS FOR A COP INIT REQ
009B B4E0D9      1171         CJNE    A,#COPINIT,WHAT_ELSE ;IF IT IS WRONG THIS IS A BAD COMMAND
                 1172 +1 $EJECT
                 1173 ;***********************************************************************
                 1174 ;                                                                      *
                 1175 ; COP INITIALIZATION COMMAND                                           *
                 1176 ;                                                                      *
```

```
                   1177  ;     DECODES THE INITIALIZATION BITS                          *
                   1178  ;     SENDS ACK AFTER DOING ALL THE COMMAND                    *
                   1179  ;                                                               *
                   1180  ;********************************************************************
009E A3            1181       INC     DPTR                  ;POINT TO 1ST PARAMETER      *
009F E0            1182       MOVX    A,@DPTR               ;GET THE NUMBER OF ACTIVATED CHANS *
00A0 F500    F     1183       MOV     LM_LIMIT,A            ;STORE THE # OF ACTIVATED CHANNS *
00A2 900000  F     1184       MOV     DPTR,#COP_TO_HOST_BUFF                            ;*
00A5 7406          1185       MOV     A,#ACK                ;SEND ACK TO GOOD MSG        *
00A7 F0            1186       MOVX    @DPTR,A                                            ;*
00A8 120000  F     1187       CALL    MODEM_OUT                                          ;*
00AB 22            1188       RET                                                        ;*
                   1189  ;*****END OF CDP INITIALIZE COMMAND**********************************
                   1190 +1 $EJECT
                   1191  ;********************************************************************
                   1192  ;                                                               *
                   1193  ;    CHANNEL DATA SEND COMMAND                                  *
                   1194  ;                                                               *
                   1195  ;       SENDS ACK THEN SENDS THE DATA DUMP 8 CHANNELS AT A TIME *
                   1196  ;                                                               *
                   1197  ;********************************************************************
                   1198       DATA_SEND:                                                 ;*
00AC 750000  F     1199       MOV     LM_CURRENT,#0         ;PUT THE POINTERS TO THE FIRST CHAN
00AF 750000  F     1200       MOV     PH_CURRENT,#0                                      ;*
00B2 900000  F     1201       MOV     DPTR,#COP_TO_HOST_BUFF                            ;*
00B5 7406          1202       MOV     A,#ACK                ;SEND ACK TO GOOD MSG        *
00B7 F0            1203       MOVX    @DPTR,A                                            ;*
00B8 120000  F     1204       CALL    MODEM_OUT                                          ;*
00BB 750000  F     1205       MOV     BUFF_IDX,#0           ;THIS IS # OF 8 CHAN BUFFERS SENT
00BE 900000  F     1206       MOV     DPTR,#CHAN00                                       ;*
                   1207       SND_NXT_BUFF:                                              ;*
00C1 750003  F     1208       MOV     RETRY_CNT,#3                                       ;*
00C4 75A000  F     1209       MOV     P2,#HIGH(COP_TO_HOST_BUFF)                         ;*
00C7 7800          1210       MOV     R0,#0                 ;POINT TO XMIT BUFFER        *
00C9 740F          1211       MOV     A,#DATAX              ;GET THE DATA TOKEN          *
00CB F2            1212       MOVX    @R0,A                 ;STORE IT IN THE FIRST LOCATION*
00CC 08            1213       INC     R0                                                 ;*
00CD 7411          1214       MOV     A,#17                 ;GET A COUNT OF BYTES TO SEND *
00CF F2            1215       MOVX    @R0,A                 ;STORE IT IN THE LENGTH BYTE *
00D0 E500    F     1216       MOV     A,BUFF_IDX            ;GET THE CURRENT BASE        *
00D2 2480          1217       ADD     A,#DATA0              ;ADD THE BASE MSG TOKEN      *
00D4 08            1218       INC     R0                    ;POINT TO DESCRIPTOR LOC     *
00D5 F2            1219       MOVX    @R0,A                 ;SEND DESCRIPTOR TOKEN       *
00D6 7A08          1220       MOV     R2,#8                 ;R2=#CHANELS/MSG COUNTER     *
00D8 08            1221       INC     R0                                                 ;*
                   1222       SND_NXT_CH:                                                ;*
00D9 120000  F     1223       CALL    MON_SEND              ;THIS IS THE LOC OF THE SEG IN POLDEC
                   1224                                     ;THAT DESCRIBES THE DATABASE TO IBM XLAT
00DC DAFB          1225       DJNZ    R2,SND_NXT_CH         ;AQUIRE DATA OVER 8 CHANNELS *
                   1226       DATA_REPT:                                                 ;*
00DE 120000  F     1227       CALL    MODEM_OUT             ;SEND 8 CHANNELS             *
00E1 75001E  F     1228       MOV     TIME_OUT_CNT,#30      ; 3 SEC TIME OUT             *
00E4 D240    F     1229       SETB    SYNC.1                ;MARK FOR 1 CHAR MSG FLAG    *
00E6 120000  F     1230       CALL    MODEM_IN              ;HOPE FOR ACK                *
00E9 C200    F     1231       CLR     SYNC.1                                             ;*
00EB B4020E        1232       CJNE    A,#2,RECV_ERR         ;IF ANYTHING BUT 2 THEN NOT ACK*
00EE 0500    F     1233       INC     BUFF_IDX              ;ADVANCE COUNTER             *
                   1234  ;    MOV     A,LM_LIMIT            ;GET THE # ACTIVE LMS        *
00F0 7440          1235       MOV     A,#64    ;MAX PRESET ;GET THE # ACTIVE LMS     *
00F2 14            1236       DEC     A                     ;CHANGE TO BASED 0 COUNT     *
00F3 C3            1237       CLR     C                                                  ;*
00F4 13            1238       RRC     A                     ;1/2 BECAUSE 2LMS/MSG        *
00F5 5001          1239       JNC     NOT_ODD               ;IF THE LIMIT IS ODD         *
```

```
00F7 04              1240          INC     A                       ;CHECK FOR NEXT BLOCK SENT
                     1241  NOT_ODD:                                 ;ELSE THIS BLOCK IS ENOUGH
00F8 B500C6    F     1242          CJNE    A,BUFF_IDX,SND_NXT_BUFF  ;REPEAT UNTIL ALL BLOCKS SENT
00FB 22              1243          RET                              ;*
                     1244  RECV_ERR:                                ;*
00FC D500DF    F     1245          DJNZ    RETRY_CNT,DATA_REPT      ;REPEAT THE MESSAGE
00FF C200      F     1246          CLR     SYNC.0                   ;RECIEVE SYNC MSG ONLY AFTER THIS
0101 22              1247          RET                              ;*
                     1248  ;***********END DATA SEND COMMAND*********************************
                     1249 +1 $EJECT
                     1250  ;****************************************************************
                     1251  ;
                     1252  ; COP STATUS SEND COMMAND
                     1253  ;
                     1254  ;       THIS SENDS THE ACK TO THE COMMAND REQUEST
                     1255  ;       THEN IT ASSEMBLES THE STATUS AND SEQUENCE #
                     1256  ;       SENDS THEM TO THE HOST AND WAITS FOR THE ACK
                     1257  ;
                     1258  ;****************************************************************
                     1259  COP_STAT:
0102 750003    F     1260          MOV     RETRY_CNT,#3
0105 900000    F     1261          MOV     DPTR,#COP_TO_HOST_BUFF
0108 7406            1262          MOV     A,#ACK                   ;SEND ACK TO GOOD MSG
010A F0              1263          MOVX    @DPTR,A
010B 120000    F     1264          CALL    MODEM_OUT
                     1265  COP_STAT1:
010E 75A000    F     1266          MOV     P2,#HIGH(COP_TO_HOST_BUFF)
0111 7800            1267          MOV     R0,#0                    ;POINT TO COMM BUFF
0113 740F            1268          MOV     A,#DATAX                 ;PUT THE DATA TOKEN IN THE BUFFER
0115 F2              1269          MOVX    @R0,A
0116 08              1270          INC     R0
0117 7405            1271          MOV     A,#5                     ;LENGTH OF DATA FIELD
0119 F2              1272          MOVX    @R0,A                    ;BUFFER IT
011A 08              1273          INC     R0
011B 7416            1274          MOV     A,#COPSTAT               ;GET TOKEN FOR COP STATUS MSG
011D F2              1275          MOVX    @R0,A                    ;BUFFER IT
011E 08              1276          INC     R0
011F E500      F     1277          MOV     A,STATUS                 ;GET COP STATUS
0121 F2              1278          MOVX    @R0,A                    ;STORE IT IN THE BUFFER
0122 08              1279          INC     R0
0123 E500      F     1280          MOV     A,MOD_SEQ                ;GET THE SEQUENCE NUMBER
0125 F2              1281          MOVX    @R0,A                    ;SEND IT TO THE BUFFER
0126 08              1282          INC     R0
0127 E500      F     1283          MOV     A,T_2MIN                 ;GET COP 2MIN CLOCK
0129 F2              1284          MOVX    @R0,A                    ;STORE IT IN THE BUFFER
012A 08              1285          INC     R0
012B E500      F     1286          MOV     A,T_9HR                  ;GET THE 9 HR COP CLOCK
012D F2              1287          MOVX    @R0,A                    ;SEND IT TO THE BUFFER
012E 120000    F     1288          CALL    MODEM_OUT                ;SEND IT
0131 75001E    F     1289          MOV     TIME_OUT_CNT,#30         ;3 SEC
0134 D200      F     1290          SETB    SYNC.1                   ;1CHAR MSG FLAG
0136 120000    F     1291          CALL    MODEM_IN                 ;GET THE ACK
0139 C200      F     1292          CLR     SYNC.1
013B B40203          1293          CJNE    A,#2,SND_STAT_ERR        ;2=ACK RECIEVED ELSE ERROR
013E C200      F     1294          CLR     POWER                    ;REMOVE PWR FAIL INDICATOR
0140 22              1295          RET
                     1296
                     1297  SND_STAT_ERR:
0141 D500CA    F     1298          DJNZ    RETRY_CNT,COP_STAT1      ;SEND IT AGAIN FOR NOW
0144 22              1299          RET
                     1300  ;****** END COP STATUS SEND COMMAND******************************
                     1301 +1 $EJECT
```

```
                        1302    ;*****************************************************************
                        1303    ;************ TRANSPARENT COMMANDS SECTION ***********************
                        1304    ;*****************************************************************
                        1305    MONITOR SEGMENT CODE
   ----                 1306       RSEG    MONITOR
                        1307    TRANSP:
0000 08                 1308       INC     R0                      ;POINT TO THE NEXT BUFFER LOC
0001 E2                 1309       MOVX    A,@R0                   ;EXTRACT THE LENGTH
0002 FB                 1310       MOV     R3,A                    ;STORE IT AS A COUNT
0003 08                 1311       INC     R0
0004 E2                 1312       MOVX    A,@R0                   ;GET THE COMMAND TOKEN
0005 B41A0E             1313       CJNE    A,#LM_SELECT,TRANSP1    ;IS IT SETTING THE LM# OR A REAL COMMAND
                        1314
                        1315
                        1316
                        1317    ;********** THIS IS THE SELECT LM FOR FOLLOWING TRANSPARENT COMMANDS *****
0008 08                 1318       INC     R0                      ;POINT TO THE LM#
0009 E2                 1319       MOVX    A,@R0                   ;FETCH IT
000A F500       F       1320       MOV     TRANSP_LM,A             ;AND PUT IT AWAY
000C 900000     F       1321       MOV     DPTR,#COP_TO_HOST_BUFF
000F 7406               1322       MOV     A,#ACK                  ;SEND ACK TO GOOD MSG
0011 F0                 1323       MOVX    @DPTR,A
0012 120000     F       1324       CALL    MODEM_OUT
0015 22                 1325       RET
                        1326    ;***** END OF COMMAND TO SELECT THE LM ***************************
                        1327 +1 $EJECT
                        1328    ;*****************************************************************
                        1329    ;
                        1330    ; TRANSPARENT COMMAND EXECUTER
                        1331    ;
                        1332    ;       THE ACK IS SENT TO THE HOST COMMAND THEN
                        1333    ;       IF THE SELECTED LM IN LM_TRANSP=80H THEN THIS IS
                        1334    ;       REALLY A COMMAND FOR THE COP SO THE MESSAGE RECIEVED
                        1335    ;       FROM THE HOST IS MOVED FROM THE HOST_TO_COP_BUFF TO
                        1336    ;       COMBUF AND BOBS ROUTINES ARE CALLED AND THE RESPONSE
                        1337    ;       IS MOVED FROM COMBUF TO LM_TO_COP_BUFF.
                        1338    ;       IF THE SELECTED LM IS NOT 80H THEN THE MESSAGE IS
                        1339    ;       TRANSFERED TO THE COP_TO_LM_BUFF AND SENT TO THE
                        1340    ;       PROPER LM  THE RESPONSE IS IN THE LM_TO_COP_BUFF
                        1341    ;
                        1342    ;       IN EITHER CASE THE RESPONSE IS MOVED FROM THE LM_TO_COP_BUFF
                        1343    ;       TO THE COP_TO_HOST_BUFF AND FORMATED TO SEND TO THE IBM
                        1344    ;
                        1345    ;*****************************************************************
                        1346    TRANSP1:
0016 E500       F       1347       MOV     A,TRANSP_LM             ;GET THE LM#
0018 F500       F       1348       MOV     LM_CURRENT,A            ;MARK IT AS IN USE
001A 75A000     F       1349       MOV     P2,#HIGH(COP_TO_LM_BUFF)
001D 7900       F       1350       MOV     R1,#LOW(COP_TO_LM_BUFF) ;POINT FOR LM XMISSION
001F 7E00               1351       MOV     R6,#0                   ;CLEAR CHECK SUM
0021 E500       F       1352       MOV     A,LM_CURRENT            ;RECOVER THE LM IMAGE
0023 540F               1353       ANL     A,#0FH                  ;GATHER SLOT ONLY
0025 F3                 1354       MOVX    @R1,A                   ;AND PUT IT IN THE FIRST BYTE
0026 621E               1355       XRL     AR6,A                   ;CHECKSUM IT
0028 09                 1356       INC     R1
0029 09                 1357       INC     R1                      ;SKIP LENGTH FOR NOW
                        1358    NXT_TRANS_BYTE:
002A 75A000     F       1359       MOV     P2,#HIGH(HOST_TO_COP_BUFF)
002D E2                 1360       MOVX    A,@R0                   ;GET THE MESSAGE BYTE
002E 75A000     F       1361       MOV     P2,#HIGH(COP_TO_LM_BUFF)
0031 F3                 1362       MOVX    @R1,A                   ;FINALLY PUT IT IN
0032 621E               1363       XRL     AR6,A
0034 09                 1364       INC     R1
```

```
0035 08              1365        INC     R0
0036 DBF2            1366        DJNZ    R3,NXT_TRANS_BYTE
0038 09              1367        INC     R1
0039 E9              1368        MOV     A,R1                        ;GET THE LENGTH
003A C3              1369        CLR     C
003B 9400   F        1370        SUBB    A,#LOW(COP_TO_LM_BUFF)      ;CALC LEN FROM POINTER
003D 6E              1371        XRL     A,R6                        ;CHECK SUM IN THE LENGTH
003E 19              1372        DEC     R1
003F F3              1373        MOVX    @R1,A                       ;BUFFER CHECKSUM
0040 E9              1374        MOV     A,R1                        ;STORE THE LENGTH IN THE MESSAGE
0041 04              1375        INC     A
0042 C3              1376        CLR     C
0043 9400   F        1377        SUBB    A,#LOW(COP_TO_LM_BUFF)      ;CALC LEN FROM POINTER
0045 F500   F        1378        MOV     CMD,A                       ;SAVE TMP
0047 7900   F        1379        MOV     R1,#LOW(COP_TO_LM_BUFF+2)
0049 E3              1380        MOVX    A,@R1
004A 19              1381        DEC     R1
004B F3              1382        MOVX    @R1,A                       ;MOVE COMMAND
                     1383        INC     R1                          ;POINT TO LENGTH
                     1384        MOV     A,CMD                       ;RECOVER LENGTH
                     1385        MOVX    @R1,A                       ;RESTORE IT TO THE MESSAGE
                     1386        MOV     DPTR,#COP_TO_HOST_BUFF
                     1387        MOV     A,#ACK                      ;SEND ACK TO GOOD MSG
                     1388        MOVX    @DPTR,A
                     1389        CALL    MODEM_OUT
                     1390        MOV     RETRY_CNT,#3
                     1391 RPT_SEND:
                     1392        MOV     A,LM_CURRENT
                     1393        CJNE    A,#80H,LEGAL_LM             ;80 IS INVAL LM# SO MUST MEAN COP
                     1394 ;***** THIS IS REALLY A COP MESSAGE****************************
                     1395        MOV     DPTR,#COP_TO_LM_BUFF
                     1396        MOV     R1,#COMBUF                  ;9BYTE BUFFER USED BY BOB
                     1397        MOV     R4,#22
                     1398 MOVE_BOB:
                     1399        MOVX    A,@DPTR
                     1400        MOV     @R1,A
                     1401        INC     R1
                     1402        INC     DPTR
                     1403        DJNZ    R4,MOVE_BOB
                     1404        CALL    COMM
                     1405        MOV     DPTR,#LM_TO_COP_BUFF
                     1406        MOV     R1,#COMBUF                  ;9BYTE BUFFER USED BY BOB
                     1407        MOV     R4,#22
                     1408 MOVE_BACK_BOB:
                     1409        MOV     A,@R1
                     1410        MOVX    @DPTR,A
                     1411        INC     R1
                     1412        INC     DPTR
                     1413        DJNZ    R4,MOVE_BACK_BOB
                     1414        JMP     OVER_LEGAL
                     1415 ;***** THIS IS THE END OF THE COP HANDLER**********************
                     1416
                     1417 ;***** THIS ALSO STARTS THE LM HANDLER ************************
                     1418 LEGAL_LM:
                     1419        CALL    SEND_LM_BUF                 ;SEND THE STATUS REQUEST TO THE LM
                     1420        MOV     TIME_OUT_CNT,#1
                     1421        CALL    LM_RECIEVE                  ;COLLECT THE RESPONSE
                     1422 ;***** THIS IS THE END OF THE LM HANDLER **********************
                     1423
                     1424
                     1425        CJNE    A,#0,LMR_ERR                ;IF NOT GOOD REPEAT FOR EMPHASIS
                     1426        SJMP    OVER_LEGAL                  ;GOODMESSAGE
                     1427 LMR_ERR:
```

```
                    1428        DJNZ    RETRY_CNT,LEGAL_LM
                    1429        MOV     DPTR,#LM_TO_COP_BUFF
                    1430        MOVX    @DPTR,A                 ;PUT THE REASON WHY AS BYTE 1
                    1431        MOV     A,#3
                    1432        INC     DPTR
                    1433        MOVX    @DPTR,A                 ;DUMMY FAILED MESSAGE
                    1434    OVER_LEGAL:
                    1435        MOV     P2,#HIGH(LM_TO_COP_BUFF) ;POINT TO THE BUFFER
                    1436        MOV     R1,#LOW(LM_TO_COP_BUFF+1) ;POINT TO THE LENGTH COUNTER
                    1437        MOVX    A,@R1                   ;GET THE LENGTH
                    1473    SUBROUTINES SEGMENT CODE
----                1474        RSEG    SUBROUTINES
                    1475    ;****************************************************************
                    1476    ;
                    1477    ; LOCATE CHANEL DATA BLOCK SUBROUTINE
                    1478    ;
                    1479    ;           ENTER THIS ROUTINE WITH THE 5 MSB OF THE CHANNEL TO
                    1480    ;           POINT TO CONTAINED IN THE ACC AND THE LSB (9 BITS TOTAL)
                    1481    ;           IN THE CARRY BIT
                    1482    ;           AT EXIT THE DPTR POINTS TO THE BASE OF THE BLOCK OF
                    1483    ;           DATA FOR THE CHANNEL
                    1484    ;
                    1485    ;****************************************************************
                    1486    LOC_CHAN:
0000 C0D0           1487        PUSH    PSW                     ;SAVE CARRY. A CONTAINS UPPER 8 BITS
0002 C0E0           1488        PUSH    ACC
0004 7414           1489        MOV     A,#BYTES_PER_CHAN       ;THE *2 MAKES IT POSSIBLE TO DO THE
0006 25E0           1490        ADD     A,ACC
0008 F5F0           1491        MOV     B,A                     ;MOVE PARTIAL PRODUCT TO B
000A D0E0           1492        POP     ACC                     ;IN 8 BITS.  UPPER 8 BITS
000C A4             1493        MUL     AB                      ;GET THE FINAL PRODUCT
000D D0D0           1494        POP     PSW                     ;RECOVER CARRY
000F C2D5           1495        CLR     F0                      ;CLR XTRA CARRY
0011 5004           1496        JNC     EVEN                    ;IF EVEN SKIP ODD ADDITION
0013 2414           1497        ADD     A,#BYTES_PER_CHAN       ;ADD IF ODD
0015 92D5           1498        MOV     F0,C                    ;MAY HAVE GEN A CY SO SAVE IT
                    1499    EVEN:
0017 900000    F    1500        MOV     DPTR,#CHAN00            ;POINT TO BASE
001A 2582           1501        ADD     A,DPL                   ;ADD OFFSET TO BASE
001C F582           1502        MOV     DPL,A
001E C5F0           1503        XCH     A,B                     ;GET THE MSB OF OFFSET
0020 3583           1504        ADDC    A,DPH                   ;ADD TO HIGH BASE
0022 A2D5           1505        MOV     C,F0                    ;GET THAT ODD CARRY
0024 3400           1506        ADDC    A,#0                    ;ADD IT IN
0026 F583           1507        MOV     DPH,A                   ;RESTORE HIGH BYTE
0028 22             1508        RET
                    1509 +1 $EJECT
                    1510 +1 $INCLUDE(POLCOM.256)
              =1    1511    ;****************************************************************
              =1    1512    ;
              =1    1513    ;               THIS MODULE DECODES DATA RETURNED
              =1    1514    ;               FROM A POLL OF THE LMS INTO THE
              =1    1515    ;               DATA STRUCTURE OF THE COP. IT ALSO
              =1    1516    ;               DEFINES THAT STRUCTURE AND  DEFINES
              =1    1517    ;               THE TRANSLATION FROM THE DATA BASE TO
              =1    1518    ;               THE BUFFER FOR SENDING TO THE IEM.
              =1    1519    ;
              =1    1520    ;****************************************************************
              =1    1521 +1 $GENONLY
              =1    1522
              =1    1523    POLL_DECODE SEGMENT CODE
              =1    1524
0002          =1    1525    LM_OVRHD    EQU 2       ;THE NUMBER OF OVERHEAD BYTES ON A LM MSG
```

```
                    =1  1526
----                =1  1527         RSEG    POLL_DECODE
                    =1  1528  POLL_DECODE1:
0000 75A000   F =1  1529         MOV     P2,#HIGH(LM_TO_COP_BUFF) ;POINT TO THE BUFFER
0003 7801       =1  1530         MOV     R0,#1                   ;POINT TO LENGTH BYTE OF MESSAGE
0005 E2         =1  1531         MOVX    A,@R0                   ;GET LENGTH
0006 08         =1  1532         INC     R0                      ;POINT TO FIRST DATA BYTE
0007 24FD       =1  1533         ADD     A,#-(LM_OVRHD+1)        ;FIND # BYTES TO STORE *
0009 FA         =1  1534         MOV     R2,A                    ;SAVE A REPEAT COUNT
000A E500     F =1  1535         MOV     A,LM_CURRENT    ; GET THE CURRENT CHAN# TO ACC AND CARRY
000C 25E0       =1  1536         ADD     A,ACC                   ;DOUBLE THE LM#
000E A200     F =1  1537         MOV     C,PH_CURRENT.1  ;GET THE MSB OF THE PHONE IDX FOR THIS LM
0010 92E0       =1  1538         MOV     ACC.0,C                 ;ADD IT TO THE CHAN#
0012 A200     F =1  1539         MOV     C,PH_CURRENT.0  ;PUT THE LSB OF CHAN# IN CARRY
0014 120000   F =1  1540         CALL    LOC_CHAN                ;CALC THE INDEX TO THIS CHAN DATA LOCATION
0017 780B       =1  1541         MOV     R0,#DIAG1+LM_OVRHD ;LOCATE THE POWER FAIL BIT
0019 E2         =1  1542         MOVX    A,@R0                   ;GET THE PWR BIT
001A A2E0       =1  1543         MOV     C,ACC.0                 ;SAVE THE CURRENT POWER BIT CONDITION
001C C2E0       =1  1544         CLR     ACC.0                   ;REMOVE THE PWR FAIL INDICATION
001E F2         =1  1545         MOVX    @R0,A                   ;PUT THE DIAG BYTE BACK IN THE MESSAGE
001F 92E0       =1  1546         MOV     ACC.0,C                 ;RESTORE THE OLD VALUE OF THE PWR BIT
0021 7802       =1  1547         MOV     R0,#2                   ;RESTORE POINTER FOR FUTURE MOVES
0023 30E008     =1  1548         JNB     ACC.0,NXT_PARM          ;TEST FOR POWER FAIL
0026 200005   F =1  1549         JB      PWRUP,NXT_PARM          ;IF LM AND COP POWER FAIL THEN DONT INIT
0029 D200     F =1  1550         SETB    INITNOW                 ;MARK FOR A LM POWER FAIL INIT
002B 020000   F =1  1551         JMP     SND_INIT_CHAN           ;DONT DECODE IF LM POWER RECOVERED
                    =1  1552
                    =1  1553  NXT_PARM:
002E E2         =1  1554         MOVX    A,@R0                   ;GET A BYTE TO STORE
002F F0         =1  1555         MOVX    @DPTR,A                 ;STORE IT IN THE DATA TABLE
0030 30000A   F =1  1556         JNB     PWRUP,NOTCOPCLK         ;ONLY SET COP CLOCK ON POWER UP
0033 BA0202     =1  1557         CJNE    R2,#2,NOTCLK2           ;IF PWRUP PASS AND NOT T_2MIN BYTE SKIP
0036 F500     F =1  1558         MOV     T_2MIN,A                ;IF PWUP PASS AND T_2MIN BYTE SET COP T_2M
                    =1  1559  NOTCLK2:
0038 BA0102     =1  1560         CJNE    R2,#1,NOTCOPCLK         ;IF PWRUP SET AND NOT T_9HR BYTE SKIP
003B F500     F =1  1561         MOV     T_9HR,A                 ;IF PWRUP SET AND T_9HR BYTE SET COP T_9HR
                    =1  1562  NOTCOPCLK:
003D 0E         =1  1563         INC     R0                      ;ADVANCE POINTERS
003E A3         =1  1564         INC     DPTR
003F 1A         =1  1565         DEC     R2                      ;MARK 1 BYTE MOVED
0040 BA0002     =1  1566         CJNE    R2,#0,DUMB1             ;STORE UNTIL BUF EMPTY
0043 8011       =1  1567         SJMP    SND_INIT_CHAN           ;DECODE COMPLETE SO CHECK FOR INIT PASS
                    =1  1568  DUMB1:
0045 2000E6   F =1  1569         JB      PWRUP,NXT_PARM          ;IF FIRST POLL AT COP PWR UP STORE ALL
0048 BA09E3     =1  1570         CJNE    R2,#CHAN00E-RATE_TYPE,NXT_PARM ;ELSE SKIP STARTING AT INIT BYTES
004B 750005   F =1  1571         MOV     CMD,#USAGE-RATE_TYPE    ;SET COUNTER TO
                    =1  1572  NO_STORE_INIT:                     ;SKIP THE INIT BYTES FROM THE HOST
004E 08         =1  1573         INC     R0
004F A3         =1  1574         INC     DPTR
0050 1A         =1  1575         DEC     R2
0051 D500FA   F =1  1576         DJNZ    CMD,NO_STORE_INIT
0054 80D8       =1  1577         JMP     NXT_PARM                ;COMPLETE THE BUFFER MOVE
                    =1  1578  SND_INIT_CHAN:
0056 300013   F =1  1579         JNB     INITNOW,SKIP_INIT       ;IF NOT REQUESTED DONT INIT CHANNEL
0059 E500     F =1  1580         MOV     A,LM_CURRENT    ; GET THE CURRENT CHAN# TO ACC AND CARRY
005B 25E0       =1  1581         ADD     A,ACC                   ;DOUBLE THE LM#
005D A200     F =1  1582         MOV     C,PH_CURRENT.1  ;GET THE MSB OF THE PHONE IDX FOR THIS LM
005F 92E0       =1  1583         MOV     ACC.0,C                 ;ADD IT TO THE CHAN#
0061 A200     F =1  1584         MOV     C,PH_CURRENT.0  ;PUT THE LSB OF CHAN# IN CARRY
0063 120000   F =1  1585         CALL    LOC_CHAN                ;CALC THE INDEX TO THIS CHAN DATA LOCATION
0066 120000   F =1  1586         CALL    INIT_1CHAN
0069 120000   F =1  1587         CALL    SET_LMCLOCK             ;REMIND HIM OF THE CURRENT TIME
                    =1  1588  SKIP_INIT:
```

```
006C 300003  F =1 1589         JNB     SYNCCLK,SKIP_CLKSET
006F 120000  F =1 1590         CALL    SET_LMCLOCK    ;DPTR=CLOCK LOC ON EXIT FROM INIT. UPDATE CLK
               =1 1591 SKIP_CLKSET:
0072 22        =1 1592         RET
               =1 1593 +1 $EJECT
               =1 1594         RSEG    EXTERNAL_DATA
               =1 1595
               =1 1596 ;********************************************************************
               =1 1597 ;*                                                                  *
               =1 1598 ;*     DEFINITION OF 1 CHANNEL OF LM DATA BASE OFFSETS              *
               =1 1599 ;*                                                                  *
               =1 1600 ;********************************************************************
               =1 1601 ;                                                                   *
               =1 1602         CHAN00:                    ;THIS LOCATES THE BASE OF CHAN DATA STORAGE
----           =1 1603         RSEG    CONSTANTS                                          ;*
               =1 1604         CHAN_PATTERN:              ;THIS IS THE BASE OF THE DEFAULT PATTERN ;*
----           =1 1605         RSEG    EXTERNAL_DATA
               =1 1606 ;PARAMETER_NAME : OFFSET : LENGTH :      DESCRIPTION                *
               =1 1607 ;==================================================================*
               =1 1608
0000           =1 1609 BOX5CENTS    EQU $-CHAN00          ;CUMMULATIVE NICKELS IN THE BOX   *
6300           =1 1610              DS      2             ;                                 *
----           =1 1611              RSEG    CONSTANTS                                       ;*
000A 00        =1 1612 IBIX5CENTS:  DB  0,0               ;0,0 AT INITIALIZATION            ;*
000B 00
----           =1 1613              RSEG    EXTERNAL_DATA                                   ;*
               =1 1614
0002           =1 1615 COLLECT5CENTS EQU $-CHAN00         ;NICKELS IN THE BOX AT THE LAST COLLECTION*
6302           =1 1616              DS      2             ;                                 *
----           =1 1617              RSEG    CONSTANTS                                       ;*
000C 00        =1 1618 ICOLLECT5CENTS: DB 0,0             ;0,0 AT INITIALIZATION            ;*
000D 00
----           =1 1619              RSEG    EXTERNAL_DATA                                   ;*
               =1 1620                                    ;                                 *
0004           =1 1621 COLLECT_TIME EQU $-CHAN00          ;2 MIN TICS FOLLOWED BY 9HR TICS SINCE LAST
6304           =1 1622              DS      2             ;COLLECTION                       *
----           =1 1623              RSEG    CONSTANTS                                       ;*
000E 00        =1 1624 ICOLLECT_TIME: DB 0,0              ;0,0 AT INITIALIZATION            ;*
000F 00
----           =1 1625              RSEG    EXTERNAL_DATA                                   ;*
               =1 1626
0006           =1 1627 COLLECT_CNT  EQU $-CHAN00          ;COUNTER OF THE # OF COLLECTION   *
6306           =1 1628              DS      1             ;EVENTS WHICH HAVE OCCURED        *
----           =1 1629              RSEG    CONSTANTS                                       ;*
0010 00        =1 1630 ICOLLECT_CNT: DB 0                 ;0 AT INITIALIZATION              ;*
----           =1 1631              RSEG    EXTERNAL_DATA                                   ;*
               =1 1632
0007           =1 1633 FAULT1       EQU $-CHAN00          ;FAULT MONITOR BYTE 1             *
6307           =1 1634              DS      1             ;                                 *
----           =1 1635              RSEG    CONSTANTS                                       ;*
0011 00        =1 1636 IFAULT1:     DB  0                 ;0 AT INITIALIZATION              ;*
----           =1 1637              RSEG    EXTERNAL_DATA                                   ;*
               =1 1638
0008           =1 1639 FAULT2       EQU $-CHAN00          ;FAULT MONITOR BYTE 2             *
6308           =1 1640              DS      1             ;                                 *
----           =1 1641              RSEG    CONSTANTS                                       ;*
0012 00        =1 1642 IFAULT2:     DB  0                 ;0 AT INITIALIZATION              ;*
----           =1 1643              RSEG    EXTERNAL_DATA                                   ;*
               =1 1644
0009           =1 1645 DIAG1        EQU $-CHAN00          ;DIAGNOSTIC BYTE 1                *
6309           =1 1646              DS      1             ;DIAG1.0=POWER FAIL RECOVERED FLAG *
----           =1 1647              RSEG    CONSTANTS                                       ;*
0013 00        =1 1648 IDIAG1:      DB  0                 ;0 AT INITIALIZATION              ;*
```

```
----        =1 1649                  RSEG    EXTERNAL_DATA                              ;*
            =1 1650
000A        =1 1651    DIAG2          EQU  $-CHAN00       ;DIAGNOSTIC BYTE 2            *
630A        =1 1652                   DS   1    ;                                        *
----        =1 1653                   RSEG    CONSTANTS                                 ;*
0014 00     =1 1654    IDIAG2:        DB   0              ;0  AT INITIALIZATION         ;*
----        =1 1655                   RSEG    EXTERNAL_DATA                             ;*
            =1 1656
000B        =1 1657    RATE_TYPE      EQU  $-CHAN00       ;INITIAL RATE AND PHONE TYPE FOR STATION  *
630B        =1 1658                   DS   1              ;RATE_TYPE.7-.5=PHONE TYPE    *
            =1 1659                                       ;RATE_TYPE.4-.0=INITIAL RATE COUNT  *
----        =1 1660                   RSEG    CONSTANTS                                 ;*
0015 05     =1 1661    IRATE_TYPE:    DB   5              ;$.25 AT INITIALIZATION       ;*
----        =1 1662                   RSEG    EXTERNAL_DATA                             ;*
            =1 1663
000C        =1 1664    CR_THRESH      EQU  $-CHAN00       ;COLLECT RETURN RETRY TRESHOLD  *
630C        =1 1665                   DS   1    ;                                        *
----        =1 1666                   RSEG    CONSTANTS                                 ;*
0016 F0     =1 1667    ICR_THRESH:    DB   0F0H           ;0F0 AT INITIALIZATION        ;*
----        =1 1668                   RSEG    EXTERNAL_DATA                             ;*
            =1 1669
000D        =1 1670    CALL_THRESH    EQU  $-CHAN00       ;MAX CALL TIME THRESHOLD 2MIN TICS  *
630D        =1 1671                   DS   1    ;                                        *
----        =1 1672                   RSEG    CONSTANTS                                 ;*
0017 F0     =1 1673    ICALL_THRESH:  DB   0F0H           ;0F0 AT INITIALIZATION        ;*
----        =1 1674                   RSEG    EXTERNAL_DATA                             ;*
            =1 1675
000E        =1 1676    IDLE_THRESH    EQU  $-CHAN00       ;MAX IDLE TIME THRESHOLD 9HR TICS  *
630E        =1 1677                   DS   1    ;                                        *
----        =1 1678                   RSEG    CONSTANTS                                 ;*
0018 F0     =1 1679    IIDLE_THRESH:  DB   0F0H           ;0F0 AT INITIALIZATION        ;*
----        =1 1680                   RSEG    EXTERNAL_DATA                             ;*
            =1 1681
000F        =1 1682    UNUSED_THRESH  EQU  $-CHAN00       ;NOT DEFINED                   *
630F        =1 1683                   DS   1    ;                                        *
----        =1 1684                   RSEG    CONSTANTS                                 ;*
0019 F0     =1 1685    IUNUSED_THRESH: DB  0F0H           ;0F0 AT INITIALIZATION        ;*
----        =1 1686                   RSEG    EXTERNAL_DATA                             ;*
            =1 1687
0010        =1 1688    USAGE          EQU  $-CHAN00       ;CUMULATIVE OFF HOOK TIME IN 2MIN TICS  *
6310        =1 1689                   DS   2              ;FOLLOWED BY 9HR TICS          *
----        =1 1690                   RSEG    CONSTANTS                                 ;*
001A 00     =1 1691    IUSAGE:        DB   0,0            ;0,0 AT INITIALIZATION        ;*
001B 00
            =1 1692                   RSEG    EXTERNAL_DATA                             ;*
            =1 1693
0012        =1 1694    CLOCK          EQU  $-CHAN00       ;TIME IN 2MIN TICS FOLLOWED BY 9HR TICS  *
6312        =1 1695                   DS   2    ;                                        *
----        =1 1696                   RSEG    CONSTANTS                                 ;*
001C 00     =1 1697    ICLOCK:        DB   0,0            ;0,0 AT INITIALIZATION        ;*
001D 00
----        =1 1698                   RSEG    EXTERNAL_DATA                             ;*
0014        =1 1699    CHAN00E        EQU  $-CHAN00       ;END OF THE CHANNEL TABLE      *
0014        =1 1700    BYTES_PER_CHAN EQU  $-CHAN00       ;                              *
            =1 1701    ;***********************************************************************
            =1 1702 +1 $EJECT
            =1 1703            RSEG    POLL_DECODE
            =1 1704    ;***********************************************************************
            =1 1705    ;*                                                                      *
            =1 1706    ;*    THIS ROUTINE MOVES COIN COUNTS AND THE COLLECT COUNT INTO THE     *
            =1 1707    ;*    COP_TO_HOST_BUFF FOR A GIVEN CHANNEL                              *
            =1 1708    ;*    IT PUTS THE 8 LSB OF THE COIN COUNT IN THE FIRST BYTE             *
            =1 1709    ;*    THEN PUTS THE NEXT 5 BITS INTO THE 5 LSB OF BYTE 2 WITH           *
```

```
                =1 1710      ;*    THE 3 LSB OF THE COLLECTION COUNTER INTO THE 3 MSB OF BYTE 2        *
                =1 1711      ;*                                                                         *
                =1 1712      ;************************************************************************
                =1 1713
                =1 1714      MON_SEND:
                =1 1715      CHAN_SEND:                        ;THIS LOCATES THE CMD TO SEND DATA TO THE IBM
0073 E500    F  =1 1716           MOV    A,LM_CURRENT          ; GET THE CURRENT CHAN# TO ACC AND CARRY
0075 25E0       =1 1717           ADD    A,ACC                 ;DOUBLE THE LM#
0077 A200    F  =1 1718           MOV    C,PH_CURRENT.1        ;GET THE MSB OF THE PHONE IDX FOR THIS LM
0079 92E0       =1 1719           MOV    ACC.0,C               ;ADD IT TO THE CHAN#
007B A200    F  =1 1720           MOV    C,PH_CURRENT.0        ;PUT THE LSB OF CHAN# IN CARRY
007D 120000  F  =1 1721           CALL   LOC_CHAN              ;CALC THE INDEX TO THIS CHAN DATA LOCATION
                =1 1722      NXT_PARM1:
0080 E0         =1 1723           MOVX   A,@DPTR               ;GET LOW 1/2 OF THE CUMM COUNT
0081 F2         =1 1724           MOVX   @R0,A                 ;STORE IT IN THE MESSAGE BUFFER
0082 08         =1 1725           INC    R0                    ;ADVANCE POINTERS
0083 A3         =1 1726           INC    DPTR
0084 E0         =1 1727           MOVX   A,@DPTR               ;FETCH THE MSB OF THE CUMM COUNT
0085 A3         =1 1728           INC    DPTR
0086 A3         =1 1729           INC    DPTR                  ;THESE WILL POINT TO THE COLLECTION COUNT
0087 A3         =1 1730           INC    DPTR                  ;PARAMETER FOR THIS CHANNEL
0088 A3         =1 1731           INC    DPTR
0089 A3         =1 1732           INC    DPTR
008A 541F       =1 1733           ANL    A,#1FH                ;STRIP THE 3MSB FROM THE COIN COUNT
008C FD         =1 1734           MOV    R5,A                  ;SET IT ASIDE FOR NOW
008D E0         =1 1735           MOVX   A,@DPTR               ;FETCH THE COLLECT COUNTER
008E C4         =1 1736           SWAP   A                     ;PUT THE 4LSBS INTO THE MSBS
008F 23         =1 1737           RL     A                     ;MOVE THE 3LSB OF COLLECT COUNT TO THE 3MSB
0090 54E0       =1 1738           ANL    A,#0E0H               ;EXTRACT THE 3LSB OF THE COLLECT COUNT
0092 2D         =1 1739           ADD    A,R5                  ;ATTACH THE 5MSB OF THE COIN COUNT
0093 F2         =1 1740           MOVX   @R0,A                 ;SEND THE TOTAL TO THE BUFFER
0094 08         =1 1741           INC    R0                    ;POINT TO THE NEXT BUFFER LOC
0095 0500    F  =1 1742           INC    PH_CURRENT            ;POINT TO THE NEXT CHANNEL
0097 E500    F  =1 1743           MOV    A,PH_CURRENT          ;CHECK FOR 4 CHAN/LM
0099 B40405     =1 1744           CJNE   A,#4,NOT4_YET
009C 750000  F  =1 1745           MOV    PH_CURRENT,#0         ;ON 4 RESET PHONE TO 0
009F 0500    F  =1 1746           INC    LM_CURRENT            ;AND ADVANCE LM
                =1 1747      NOT4_YET:
00A1 22         =1 1748           RET
                =1 1749 +1   $EJECT
                =1 1750
                =1 1751      ;************************************************************************
                =1 1752      ;
                =1 1753      ;                        THIS MODULE CONTAINS THE
                =1 1754      ;                        COMMUNICATION MODULES FOR
                =1 1755      ;                        THE COP TO BOTH THE LM AND
                =1 1756      ;                        THE IBM
                =1 1757      ;
                =1 1758      ;                        MODULES CONTAINED:
                =1 1759      ;                        ROUTE_SEL        SELECTS THE        MODEM
                =1 1760      ;                        MODEM_OUT        SENDS THE MOD       FER TO IBM
                =1 1761      ;                        MODEM_IN         RECIEVES THE IBM TO COP MSG
                =1 1762      ;                        LM_RECIEVE       HOLDS MSG FROM LM
                =1 1763      ;                        SEND_LM_BUFF     TRANSMITS MSG BUFF TO LM
                =1 1764      ;
                =1 1765      ;************************************************************************
                =1 1766
0002            =1 1767      RTS    EQU 2
0003            =1 1768      CTS    EQU 3
0006            =1 1769      ACK    EQU 6
0015            =1 1770      NAK    EQU 15H
                =1 1771
                =1 1772      COMMUNICATIONS SEGMENT    CODE
```

```
                =1  1773           RSES   COMMUNICATIONS
                =1  1774
                =1  1775
                =1  1776   ;**** CALL THIS ROUTINE WITH 80H FOR MODEM OR THE LM# IN A
                =1  1777   ;**** F0 BIT OF PSW IS SET FOR XMIT AND CLR FOR REC
                =1  1778
                =1  1779   ROUTE_SEL:
0000 B4B004     =1  1780        CJNE    A,#80H,FILE_SEL  ;IF THE MSB OF A IS 0 GOTO SELECT THE LM FILE
0003 7590C1     =1  1781        MOV     P1,#MODSEL       ;SELECT THE MODEM DISABLE ALL LM XMITTERS
0006 22         =1  1782        RET
                =1  1783
                =1  1784   FILE_SEL:
0007 C4         =1  1785        SWAP    A                ;3LSB = FILE #
0008 5407       =1  1786        ANL     A,#07H           ;EXTRACT THE FILE ONLY
000A 25E0       =1  1787        ADD     A,ACC            ;DOUBLE IT FOR XMIT AND RECIEVE
000C A2D5       =1  1788        MOV     C,F0             ;USE XMIT SET AS 1 BIT OFFSET
000E 3403       =1  1789        ADDC    A,#3             ;THIS ADDS XMIT AND OFFSET FOR THE CODE IN THE TAB
0010 83         =1  1790        MOVC    A,@A+PC          ;DO THE TRANSLATE
0011 F590       =1  1791        MOV     P1,A             ;PUT IT OUT THIS CODE ADDS 2 BYTES TO TABLE
0013 22         =1  1792        RET                      ;THIS BYTE IS IN THE TABLE HENCE THE +1 ABOVE
                =1  1793 +1 $EJECT
                =1  1794   ; ********* PORT 1 BIT ASSIGNMENTS USED TO DECODE THIS TABLE ************
                =1  1795   ;          0=ENABLE RECEPTION FROM FILES ON B LINES
                =1  1796   ;          1=DISABLE
                =1  1797   ;           00=ENABLE LM FILES FOR COMMUNICATIONS
                =1  1798   ;           10=ENABLE MODEM COMMUNICATIONS
                =1  1799   ;           01=CPU SERIAL PORT LOOPBACK
                =1  1800   ;           11=UNDEFINED
                =1  1801   ;             0=DISABLE TRANSMOSSION TO LM ON A LINES
                =1  1802   ;             1=ENABLE
                =1  1803   ;              00=SELECT LM CARD FILE 0 FOR COMMUNICATIONS
                =1  1804   ;              01=SELECT LM CARD FILE 1 FOR COMMUNICATIONS
                =1  1805   ;              10=SELECT LM CARD FILE 2 FOR COMMUNICATIONS
                =1  1806   ;              11=SELECT LM CARD FILE 3 FOR COMMUNICATIONS
                =1  1807   ;                0=DISABLE TRANSMISSION TO LM ON B LINES
                =1  1808   ;                1=ENABLE
                =1  1809   ;                 0=ENABLE RECEPTION FROM FILES ON A LINES
                =1  1810   ;                 1=DISSABLE
                =1  1811
00C1            =1  1812   MODSEL EQU 11000001B           ;SELECTS THE MODEM CHANNEL
                =1  1813
                =1  1814   ;A FILE COMMUNICATIONS SELECTS
0014 80         =1  1815        DB      10000000B        ;RECIEVE ON CHANNEL 0
0015 91         =1  1816        DB      10010001B        ;XMIT ON CHAN 0
0016 88         =1  1817        DB      10001000B        ;RECIEVE ON CHANNEL 1
0017 99         =1  1818        DB      10011001B        ;XMIT ON CHAN 1
0018 01         =1  1819        DB      00000001B        ;RECIEVE ON CHANNEL 2
0019 83         =1  1820        DB      10000011B        ;XMIT ON CHAN 2
001A 09         =1  1821        DB      00001001B        ;RECIEVE ON CHANNEL 3
001B 8B         =1  1822        DB      10001011B        ;XMIT ON CHAN 3
                =1  1823   ;B FILE COMMUNICATIONS SELECTS
                =1  1824   ;******** THESE ARE UNVERIFIED GUESSES!!!!!!!! ************************
001C 84         =1  1825        DB      10000100B        ;RECIEVE ON CHANNEL 0
001D 95         =1  1826        DB      10010101B        ;XMIT ON CHAN 0
001E 05         =1  1827        DB      00000101B        ;RECIEVE ON CHANNEL 1
001F B7         =1  1828        DB      10000111B        ;XMIT ON CHAN 1
0020 86         =1  1829        DB      10000110B        ;RECIEVE ON CHANNEL 2
0021 9D         =1  1830        DB      10011101B        ;XMIT ON CHAN 2
0022 0D         =1  1831        DB      00001101B        ;RECIEVE ON CHANNEL 3
0023 8F         =1  1832        DB      10001111B        ;XMIT ON CHAN 3
                =1  1833 +1 $EJECT
```

```
LOC  OBJ              LINE    SOURCE

=1  1834
              =1  1835
              =1  1836   ;*****************************************************************
              =1  1837   ;
              =1  1838   ;   WAIT
              =1  1839   ;
              =1  1840   ;           WAITS FOR 120MS*TIME_OUT_CNT VALUE
              =1  1841   ;           USED TO PROVIDE DELAYS TO SATISFY THE
              =1  1842   ;           *!_:#_*'NOVATION MODEM
              =1  1843   ;
              =1  1844   ;*****************************************************************
              =1  1845
              =1  1846   WAIT:
0024 75F000   =1  1847       MOV    B,#0
              =1  1848   WAIT1:
0027 7456     =1  1849       MOV    A,#86               ;256CYCLES/3MICROSEC/CYCLE
              =1  1850   WAIT2:
0029 D5E0FD   =1  1851       DJNZ   ACC,WAIT2           ;3MICRO SEC / CYCLE
002C D5F0F8   =1  1852       DJNZ   B,WAIT1
002F D500F2 F =1  1853       DJNZ   TIME_OUT_CNT,WAIT
0032 22       =1  1854       RET
              =1  1855
              =1  1856 +1 $EJECT
              =1  1857
              =1  1858   ;THIS WILL ACCEPT A MESSAGE FROM THE IBM
              =1  1859   ;** ACC HOLDS STATUS AT EXIT
              =1  1860   ;** 0= SUCCESSFUL MESSAGE
              =1  1861   ;** 1= RTS RECIEVED
              =1  1862   ;** 2= ACK RECIEVED
              =1  1863   ;** 3= NAK RECIEVED
              =1  1864   ;** 4= CHECK SUM ERROR
              =1  1865   ;** 5=TIME OUT ERROR
              =1  1866 +1 $GENONLY
              =1  1867   MODEM_IN:
0033 C0D0     =1  1868       PUSH   PSW                 ;SAVE THE BANK SELECT
              =1  1869 +1
              =1  1870 +3
              =1  1871 +3        USING 1
0035 D2D3     =1  1872 +3        SETB  RS0
0037 C2D4     =1  1873 +3        CLR   RS1
              =1  1874 +3
              =1  1875 +2
              =1  1876 +1
0039 C2D5     =1  1877       CLR    F0                  ;SET RECIEVE MODE FOR BANK SELECT
003B 7480     =1  1878       MOV    A,#80H              ;SET MODEM SELECT FOR BANK SELECT
003D 120000 F =1  1879       CALL   ROUTE_SEL           ;THIS WILL PICK THE MODEM MUX
0040 C29F     =1  1880       CLR    SM0                 ;SET THE UART FOR MODEM MODE
0042 758D8F   =1  1881       MOV    TH1,#BAUD_MOD       ;SET TIMER 1 TO MODEM BAUD RATE
0045 75A000 F =1  1882       MOV    P2,#HIGH(HOST_TO_COP_BUFF)
0048 7800     =1  1883       MOV    R0,#0               ;P2+R0 POINTS TO MODEM BUFFER
004A 7F00     =1  1884       MOV    R7,#0               ;CLR CHECKSUM
004C D29C     =1  1885       SETB   REN                 ;TURN ON THE RECIEVER
004E 7A02     =1  1886       MOV    R2,#2               ;LEADING BYTES BEFORE COUNT IS RECIEVED
              =1  1887   WAIT_MRCH1:
0050 758A00   =1  1888       MOV    TL0,#0              ;SET TIMER 0 LOW FOR DIV 256
0053 750000 F =1  1889       MOV    TIMOUT_CLK,#0       ;SAME FOR TIMER 0 HIGH FOR APPROX 120MS
0056 D2A9     =1  1890       SETB   ET0                 ;ALSO THE TIMER INTERRUPT
              =1  1891   WAIT_MRCH:
0058 20B321   =1  1892       JB     CD,MODEM_GONE
005B D28C     =1  1893       SETB   TR0                 ;TURN TIME OUT LOOSE
005D 3098F8   =1  1894       JNB    RI,WAIT_MRCH        ;WAIT FOR RECIEVED BYTE
```

```
006' C28C      =1 1895        CLR     TR0             ;STOP TIMER ASAP
00c2 E599      =1 1896        MOV     A,SBUF          ;GET CHAR FROM UART
0064 C29B      =1 1897        CLR     RI
0066 F2        =1 1898        MOVX    @R0,A           ;STORE IT
0067 B80030    =1 1899        CJNE    R0,#0,NOT_FIRST ;IF NOT FIRST CHAR SKIP TESTS
006A B40207    =1 1900        CJNE    A,#RTS,CK_ACK   ;TEST FOR RTS CHAR
006D D200    F =1 1901        SETB    SYNC.0          ;MARK LINE AS IN SYNC
006F 7401      =1 1902        MOV     A,#1            ;MARK RTS RECEIVED
0071 D0D0      =1 1903        POP     PSW             ;RESTORE BANK SEL
0073 22        =1 1904        RET
               =1 1905
               =1 1906    CK_ACK:
0074 20000A  F =1 1907        JB      SYNC.0,IN_SYNC  ;CHECK IF LINE IS SYNC-RONIZED
0077 7406      =1 1908        MOV     A,#6            ;IF NOT MARK A NO SYNC RECIEVED
0079 D0D0      =1 1909        POP     PSW
007B 22        =1 1910        RET                     ;QUIT IF NOT IN SYNC
               =1 1911
               =1 1912    MODEM_GONE:
007C 7407      =1 1913        MOV     A,#7            ;IF MODEM HUNG UP IN THE MIDDLE OF A MESSAGE
007E D0D0      =1 1914        POP     PSW
0080 22        =1 1915        RET                     ;QUIT
               =1 1916
               =1 1917    IN_SYNC:
0081 B40605    =1 1918        CJNE    A,#ACK,CK_NAK   ;TEST FOR ACK CHAR RECIEVED
0084 7402      =1 1919        MOV     A,#2            ;MARK ACK RECIEVED
0086 D0D0      =1 1920        POP     PSW             ;RESTORE BANK SEL
0088 22        =1 1921        RET
               =1 1922
               =1 1923    CK_NAK:
0089 B4150B    =1 1924        CJNE    A,#NAK,TEST1    ;TEST FOR NAK CHAR RECIEVED
008C 750004  F =1 1925        MOV     TIME_OUT_CNT,#4 ;ALLOW 500MS FOR PC TO CLEAN BUFFERS
008F 120000  F =1 1926        CALL    WAIT
0092 7403      =1 1927        MOV     A,#3            ;MARK NAK RECIEVED
0094 D0D0      =1 1928        POP     PSW             ;RESTORE BANK SELECT
0096 22        =1 1929        RET
               =1 1930    TEST1:
0097 2000B6  F =1 1931        JB      CHAR1,WAIT_MRCH1 ;IF A 1 CHAR MESSAGE IS EXPECTED WAIT FOR IT
               =1 1932    NOT_FIRST:
009A 620F      =1 1933        XRL     AR7,A           ;CHECK SUM THE CHAR
009C 08        =1 1934        INC     R0              ;ADVANCE BUFFER POINTER
009D B80203    =1 1935        CJNE    R0,#2,NOT2      ;MSG LENGTH IS 2ND BYTE
00A0 2402      =1 1936        ADD     A,#2            ;ADD 1 TO THE MSG LENGTH FOR AND CKSUM
00A2 FA        =1 1937        MOV     R2,A            ;STORE IT IN THE COUNTER
               =1 1938    NOT2:
00A3 75000A  F =1 1939        MOV     TIME_OUT_CNT,#10 ;MUST RECIEVE 1 CHAR EVERY SEC MID MESSAGE
00A6 DAA8      =1 1940        DJNZ    R2,WAIT_MRCH1   ;THEN EVERYTHING DONE SO REPEAT FOR LENGTH
00A8 E4        =1 1941        CLR     A               ;SET UP SUCCESS STATUS
00A9 BF0003    =1 1942        CJNE    R7,#0,CK_ERR    ;AFTER RECIEVING CKSUMMED MSG R7 SHOULD=0
00AC D0D0      =1 1943        POP     PSW             ;RESTORE BANK SEL
00AE 22        =1 1944        RET
               =1 1945
               =1 1946    CK_ERR:
00AF 7404      =1 1947        MOV     A,#4            ;MARK A CHECK SUM ERROR
00B1 D0D0      =1 1948        POP     PSW             ;RESTORE BANK SEL
00B3 22        =1 1949        RET
               =1 1950 +1 $EJECT
               =1 1951
               =1 1952    ;****************THESE ROUTINES INITIALIZE THE MODEM********************
               =1 1953
               =1 1954    ;******THIS WAITS UNTIL AN OK IS RECIEVED AFTER A COMMAND IS SENT****
               =1 1955    RECIEVE_OK:
00B4 C0D0      =1 1956        PUSH    PSW             ;SAVE THE BANK SELECT
               =1 1957 +1
```

```
                   =1  1958 +2
                   =1  1959 +3        USING 1
0086 D2D3          =1  1960 +3        SETB   RS0
0089 C2D4          =1  1961 +3        CLR    RS1
                   =1  1962 +3
                   =1  1963 +2
                   =1  1964 +1
00BA C2D5          =1  1965           CLR    F0                ;SET RECIEVE MODE FOR BANK SELECT
00BC 7480          =1  1966           MOV    A,#80H            ;SET MODEM SELECT FOR BANK SELECT
00BE 120000    F   =1  1967           CALL   ROUTE_SEL         ;THIS WILL PICK THE MODEM MUX
00C1 C29F          =1  1968           CLR    SM0               ;SET THE UART FOR MODEM MODE
00C3 758D8F        =1  1969           MOV    TH1,#BAUD_MOD     ;SET TIMER 1 TO MODEM BAUD RATE
00C6 D29C          =1  1970           SETB   REN               ;TURN ON THE RECIEVER
00C8 758A00        =1  1971           MOV    TL0,#0            ;SET TIMER 0 LOW FOR DIV 256
00CB 758C00        =1  1972           MOV    TH0,#0            ;SAME FOR TIMER 0 HIGH FOR APPROX 120MS
00CE D2AF          =1  1973           SETB   EA                ;ENABLE THE INTERRUPT STRUCTURE
00D0 D2A9          =1  1974           SETB   ET0               ;ALSO THE TIMER INTERRUPT
                   =1  1975   WAIT_MRCH2:
00D2 D28C          =1  1976           SETB   TR0               ;TURN TIME OUT LOOSE
00D4 3098FB        =1  1977           JNB    RI,WAIT_MRCH2     ;WAIT FOR RECIEVED BYTE
00D7 C28C          =1  1978           CLR    TR0               ;STOP TIMER ASAP
00D9 E599          =1  1979           MOV    A,SBUF            ;GET CHAR FROM UART
00DB C298          =1  1980           CLR    RI
00DD 545F          =1  1981           ANL    A,#5FH            ;STRIP PARITY AND FORCE UPPER CASE
00DF B44FF0        =1  1982           CJNE   A,#'O',WAIT_MRCH2 ;TEST FOR O CHAR
                   =1  1983   WAIT_MRCH3:
00E2 D28C          =1  1984           SETB   TR0               ;TURN TIME OUT LOOSE
00E4 3098FB        =1  1985           JNB    RI,WAIT_MRCH3     ;WAIT FOR RECIEVED BYTE
00E7 C28C          =1  1986           CLR    TR0               ;STOP TIMER ASAP
00E9 E599          =1  1987           MOV    A,SBUF            ;GET CHAR FROM UART
00EB C298          =1  1988           CLR    RI
00ED 545F          =1  1989           ANL    A,#5FH            ;STRIP PARITY AND FORCE UPPER CASE
00EF B44BF0        =1  1990           CJNE   A,#'K',WAIT_MRCH3 ;TEST FOR K CHAR
00F2 750002    F   =1  1991           MOV    TIME_OUT_CNT,#2
00F5 120000    F   =1  1992           CALL   WAIT              ;WAIT AFTER RECIEVING OK FOR 200MS
00F8 C28C          =1  1993           CLR    TR0
00FA C2AF          =1  1994           CLR    EA
00FC C2A9          =1  1995           CLR    ET0
00FE D0D0          =1  1996           POP    PSW               ;RESTORE BANK SEL
0100 C29C          =1  1997           CLR    REN               ;TURN OFF UART RECIEVE WHEN DONE
0102 22            =1  1998           RET
                   =1  1999 +1 $EJECT
                   =1  2000 +1 ;*********THIS SENDS % THEN SENDS THE REST OF THE COMMAND*******
                   =1  2001   ;*********IT NOW ALSO WAITS FOR OK AFTER A CR AND 200MS AFTER COMMAND CHAR****
                   =1  2002   SND_MOD_INIT:
0103 C29F          =1  2003           CLR    SM0               ;INIT UART FOR MODEM COM
0105 758D8F        =1  2004           MOV    TH1,#BAUD_MOD     ;INIT TIMER FOR MODEM CLOCK RATE
0108 D2D5          =1  2005           SETB   F0                ;SET FLAG FOR XMIT MODE
010A 7480          =1  2006           MOV    A,#80H            ;SET MODEM SELECT FOR ROUTE CALL
010C 120000    F   =1  2007           CALL   ROUTE_SEL
010F 7800          =1  2008           MOV    R0,#0             ;POINT TO BUFFER START
                   =1  2009   INIT_MSG_BYTE:
                   =1  2010
0111 75A000    F   =1  2011           MOV    P2,#HIGH(COP_TO_HOST_BUFF)
0114 C299          =1  2012           CLR    TI                ;CANCEL ANY OLD DATA
0116 E2            =1  2013           MOVX   A,@R0             ;GET NEXT CHAR
0117 B42002        =1  2014           CJNE   A,#' ',NOT_8SPACE ;COMPARE FOR AN 8BIT SPACE WHICH FOLLOWS THE
011A 8003          =1  2015           SJMP   SPACE_WAIT        ;COMMAND CHAR
                   =1  2016   NOT_8SPACE:
011C B4A00A        =1  2017           CJNE   A,#0A0H,NOT_SPACE ;CHECK FOR 7BIT SPACE FOLLOWING COMMAND CHAR
                   =1  2018   SPACE_WAIT:
011F 750002    F   =1  2019           MOV    TIME_OUT_CNT,#2
0122 C0E0          =1  2020           PUSH   ACC
```

```
0124 120000  F =1 2021        CALL    WAIT                    ;WAIT 200MS AFTER THE CMD CHAR BEFORE THE SP
0127 D0E0      =1 2022        POP     ACC
               =1 2023  NOT_SPACE:
0129 F599      =1 2024        MOV     SBUF,A                  ;SEND TO THE UART
012B 08        =1 2025        INC     R0
               =1 2026  COMPLETE_NXT:
012C 3099FD    =1 2027        JNB     TI,COMPLETE_NXT
012F 547F      =1 2028        ANL     A,#7FH
0131 B40D05    =1 2029        CJNE    A,#CR,NO_CR             ;CHECK FOR CARRIAGE RETURNS
0134 750028  F =1 2030        MOV     TIME_OUT_CNT,#40
0137 120000  F =1 2031        CALL    RECIEVE_OK              ;WAIT UP TO 4 SEC FOR AN OK
               =1 2032  NO_CR:
013A DAD5      =1 2033        DJNZ    R2,INIT_MSG_BYTE
013C 22        =1 2034        RET
               =1 2035 +1 $EJECT
               =1 2036  ;******THIS WILL SEND A MESSAGE BUFFER TO THE IBM
               =1 2037
               =1 2038  MODEM_OUT:
013D C0D0      =1 2039        PUSH    PSW                     ;SAVE THE CALLING BANK SELECT
               =1 2040 +1
               =1 2041 +2
               =1 2042 +2         USING 0
013F C2D3      =1 2043 +2        CLR   RS0
0141 C2D4      =1 2044 +2        CLR   RS1
               =1 2045 +2
               =1 2046 +1                ;SEL MODEM XMIT REGS
0143 C29F      =1 2047        CLR     SM0                     ;INIT UART FOR MODEM COM
0145 75BD8F    =1 2048        MOV     TH1,#BAUD_MOD           ;INIT TIMER FOR MODEM CLOCK RATE
0148 D2D5      =1 2049        SETB    F0                      ;SET FLAG FOR XMIT MODE
014A 7480      =1 2050        MOV     A,#80H
014C 120000  F =1 2051        CALL    ROUTE_SEL               ;SET MODEM SELECT FOR ROUTE CALL
014F 75A000  F =1 2052        MOV     P2,#HIGH(COF_TO_HOST_BUFF)
0152 7801      =1 2053        MOV     R0,#1                   ;POINT TO THE DATA BYTE COUNT OF MSG
0154 E2        =1 2054        MOVX    A,@R0                   ;GET COUNT
0155 2402      =1 2055        ADD     A,#2                    ;ADD 2 FOR LEADER AND COUNT
0157 FA        =1 2056        MOV     R2,A                    ;MAKE R2 THE REPEAT COUNTER
0158 7F00      =1 2057        MOV     R7,#0                   ;CLEAR THE CHECKSUM
               =1 2058  FIRST_MOD:
015A 7800      =1 2059        MOV     R0,#0                   ;POINT TO BUFFER START
               =1 2060  NXT_MOD:
015C C299      =1 2061        CLR     TI                      ;CANCEL ANY OLD DATA
015E E2        =1 2062        MOVX    A,@R0                   ;GET NEXT CHAR
015F F599      =1 2063        MOV     SBUF,A                  ;SEND TO THE UART
0161 6207      =1 2064        XRL     AR7,A                   ;CHECK SUM IT
0163 08        =1 2065        INC     R0
               =1 2066  WAIT_SND:
0164 3099FD    =1 2067        JNB     TI,WAIT_SND             ;WAIT TIL IT IS GONE
0167 B4A503    =1 2068        CJNE    A,#0A5H,NOT_A5          ;CHECK FOR A 7BIT TYPE PERCENT
016A 020000  F =1 2069 +1     JMP     DOUBLE_SND              ;MODEM SUCKS IN A % SO SEND AGAIN
               =1 2070  NOT_A5:
016D B4250D    =1 2071 +1     CJNE    A,#'%',NOT_PERCENT      ;CHECK FOR A 8BIT %
               =1 2072  DOUBLE_SND:
0170 C299      =1 2073        CLR     TI
0172 F599      =1 2074 +1     MOV     SBUF,A                  ;SEND IT AGAIN IF 7BIT OR 8BIT %
               =1 2075  WAIT_MTI1_PCNT:
0174 3099FD    =1 2076        JNB     TI,WAIT_MTI1_PCNT
0177 750003  F =1 2077        MOV     TIME_OUT_CNT,#3
017A 120000  F =1 2078        CALL    RECIEVE_OK              ;ANOTHER DUMMY WAIT
               =1 2079  NOT_PERCENT:
017D B80112    =1 2080        CJNE    R0,#1,RPT_MXMIT         ;CHECK IF PREVIOUS BYTE SENT WAS FIRST
0180 B40303    =1 2081        CJNE    A,#CTS,CK_SACK          ;WAS IT A CTS?
0183 D0D0      =1 2082        POP     PSW                     ;RESTORE BANK SELECT
0185 22        =1 2083        RET
```

```
                =1  2084
                =1  2085        CK_SACK:
0186 B40603     =1  2086            CJNE    A,#ACK,CK_SNAK      ;WAS IT A ACK
0189 D0D0       =1  2087            POP     PSW                 ;RESTORE BANK SELECT
018B 22         =1  2088            RET
                =1  2089
                =1  2090        CK_SNAK:
018C B41503     =1  2091            CJNE    A,#NAK,RPT_MXMIT    ;IF NOT NAK THEN SEND REST OF MESSAGE
018F D0D0       =1  2092            POP     PSW                 ;RESTORE BANK SELECT
0191 22         =1  2093            RET
                =1  2094
                =1  2095        RPT_MXMIT:
0192 DACB       =1  2096            DJNZ    R2,NXT_MOD          ;SEND THE NEXT BYTE
                =1  2097
                =1  2098        ;SEND THE CHECKSUM
0194 EF         =1  2099            MOV     A,R7                ;GET THE CHECKSUM BYTE
0195 F599       =1  2100            MOV     SBUF,A              ;STUFF IT
                =1  2101        WAIT_MCK:
0197 3099FD     =1  2102            JNB     TI,WAIT_MCK         ;WAIT UNTIL THE CHECK SUM IS ON THE WAY
019A D0D0       =1  2103            POP     PSW
019C 22         =1  2104            RET
                =1  2105 +1     $EJECT
                =1  2106
                =1  2107        ;****** THIS WILL LOAD THE BUFFER FROM THE LM
                =1  2108
                =1  2109        LM_RECIEVE:
019D C0D0       =1  2110            PUSH    PSW                 ;SAVE THE BANK SELECT
                =1  2111 +1
                =1  2112 +4
                =1  2113 +4         USING 2
019F C2D3       =1  2114 +4         CLR     RS0
01A1 D2D4       =1  2115 +4         SETB    RS1
                =1  2116 +4
                =1  2117 +3
                =1  2118 +2
                =1  2119 +1
01A3 D29F       =1  2120            SETB    SM0                 ;SET UART MODE FOR LM COM
01A5 758DFC     =1  2121            MOV     TH1,#BAUD_LM        ;SET TIMER 1 FOR LM CLOCK RATE
01A8 C2D5       =1  2122            CLR     F0                  ;SET RECIEVE MODE
01AA E500     F =1  2123            MOV     A,LM_CURRENT        ;GET THE LM #
01AC 120000   F =1  2124            CALL    ROUTE_SEL           ;SELECT THE CARD FILE #
01AF 75A000   F =1  2125            MOV     P2,#HIGH(LM_TO_COP_BUFF)
01B2 7F00       =1  2126            MOV     R7,#0               ;CLR CHECKSUM
01B4 7900     F =1  2127            MOV     R1,#LOW(LM_TO_COP_BUFF) ;P2+R1=POINTER TO BUFFER BYTE
01B6 D2AF       =1  2128            SETB    EA                  ;ENABLE INTERRUPTS
01B8 D2A9       =1  2129            SETB    ET0                 ;ESPECIALLY TIMER 0
01BA D29C       =1  2130            SETB    REN                 ;ENABLE RECIEVER NOW TO PREVENT GETTING TRASH
01BC 7A02       =1  2131            MOV     R2,#2               ;SET REPEAT COUNT TO BYPASS MSG HEADING
                =1  2132        WAIT_LMR1:
01BE 758A00     =1  2133            MOV     TL0,#0              ;SETS .5MS TICS
01C1 75000F   F =1  2134            MOV     TIMOUT_CLK,#15      ;ABOUT 3 MS TIME OUT
                =1  2135        WAIT_LMR:
01C4 D28C       =1  2136            SETB    TR0                 ;START YOUR ENGINES!!
01C6 3098FB     =1  2137            JNB     RI,WAIT_LMR         ;WAIT FOR DATA IN UART
01C9 C28C       =1  2138            CLR     TR0                 ;WHOA TIMER 0
01CB E599       =1  2139            MOV     A,SBUF              ;GET CHAR FROM UART
01CD C298       =1  2140            CLR     RI
01CF 6217       =1  2141            XRL     AR7,A               ;CHECKSUM THE CHARACTER
01D1 F3         =1  2142            MOVX    @R1,A               ;BUFFER CHAR
01D2 B90003   F =1  2143            CJNE    R1,#LOW(LM_TO_COP_BUFF+1),NOT_LEN  ;IF NOT THE LENGTH BYTE SKIP
                =1  2144        GET_LEN:
01D5 E3         =1  2145            MOVX    A,@R1               ;REGET IT JUST IN CASE
01D6 14         =1  2146            DEC     A                   ;COMPENSATE FOR ALREADY RECIEVED BYTES
```

```
01D7 FA       =1 2147          MOV     R2,A            ;MOVE IT TO THE REPEAT COUNT
              =1 2148  NOT_LEN:
01D8 09       =1 2149          INC     R1              ;POINT TO NEXT BUFF LOC
01D9 DAE3     =1 2150          DJNZ    R2,WAIT_LMR1    ;REPEAT IT
01DB EF       =1 2151          MOV     A,R7            ;SET STATUS TO PASS
01DC C29C     =1 2152          CLR     REN             ;TURN OFF RECIEVER WHEN DONE
01DE 7003     =1 2153          JNZ     NO_GOOD         ;CHECKSUM SHOULD = 0 ELSE FAIL
01E0 D0D0     =1 2154          POP     PSW             ;RESTORE BANK SEL
01E2 22       =1 2155          RET
              =1 2156
              =1 2157  NO_GOOD:
01E3 7404     =1 2158          MOV     A,#4            ;SET STAT= CKSUM FAIL
01E5 D0D0     =1 2159          POP     PSW             ;RESTORE BANK SELECT
01E7 22       =1 2160          RET
              =1 2161 +1 $EJECT
              =1 2162
              =1 2163  ;***** THIS SENDS TO THE LM A MESSAGE IN THE BUFFER
              =1 2164
              =1 2165  SEND_LM_BUF:
01E8 C0D0     =1 2166          PUSH    PSW             ;SAVE THE CALLING REG BANK SELECT
              =1 2167 +1
              =1 2168 +4
              =1 2169 +4          USING 2
01EA C2D3     =1 2170 +4          CLR   RS0
01EC D2D4     =1 2171 +4          SETB  RS1
              =1 2172 +4
              =1 2173 +3
              =1 2174 +2
              =1 2175 +1
01EE D29F     =1 2176          SETB    SMO             ;SET UART FOR LM COMMUNICATIONS
01F0 758DFC   =1 2177          MOV     TH1,#BAUD_LM    ;SET TIMER 1 TO UART LM CLOCK RATE
01F3 D2D5     =1 2178          SETB    F0              ;CLR FLAG FOR READ MODE
01F5 E500   F =1 2179          MOV     A,LM_CURRENT    ;PREPARE TO SELECT A CARD FILE
01F7 120000 F =1 2180          CALL    ROUTE_SEL       ;SELECT THE CARD FILE
01FA 75A000 F =1 2181          MOV     P2,#HIGH(COP_TO_LM_BUFF)
01FD 7800   F =1 2182          MOV     R0,#LOW(COP_TO_LM_BUFF+2)
01FF E2       =1 2183          MOVX    A,@R0           ;MOVE THE COUNT BYTE OF THE MESSAGE
0200 FA       =1 2184          MOV     R2,A            ;R2= #BYTES TO SEND
0201 7800   F =1 2185          MOV     R0,#LOW(COP_TO_LM_BUFF) ;POINT TO THE BEGINING
0203 D29B     =1 2186          SETB    TB8             ;SEND ADDRESS AS FIRST BYTE
              =1 2187  NXT_LMXMIT:
0205 C299     =1 2188          CLR     TI
0207 E2       =1 2189          MOVX    A,@R0           ;GET THE BYTE
0208 F599     =1 2190          MOV     SBUF,A          ;STUFF IT IN THE UART
020A 08       =1 2191          INC     R0              ;POINT TO THE NEXT CHAR
              =1 2192  WAIT_TI:
020B 3099FD   =1 2193          JNB     TI,WAIT_TI      ;WAIT FOR IT TO BE SENT
020E C29B     =1 2194          CLR     TB8             ;ALL OTHER BYTES ARE NOT ADDRESSES
0210 DAF3     =1 2195          DJNZ    R2,NXT_LMXMIT   ;REPEAT SEND UNTIL ALL GONE
0212 C298     =1 2196          CLR     RI              ;JUST INCASE OF ECHO
0214 D0D0     =1 2197          POP     PSW             ;RESTORE BTHE BASE OF CHAN DATA STORAGE
0216 22       =1 2198          RET
                 2199  END

REGISTER BANK(S) USED: 0 1 2 3, TARGET MACHINE(S): 8051

ASSEMBLY COMPLETE, NO ERRORS FOUND
```

I claim:

1. A system for monitoring the operation of a pay telephone connected to a central office exchange by means of telephone line, said system comprising:

means for detecting signals on said telephone line generated by said pay telephone when money is deposited in said pay telephone;

means for determining from said signals generated by said pay telephone the amount of money which is deposited;

means for detecting signals on said line representing a return of said deposited money to a user or the collection of said deposited money into a money box;

means for storing the cumulative amount of money residing in a money box of said telephone and for augmenting said cumulative amount with said deposited amount of money when a signal on said line representing the collection of said deposited money is detected;

means for detecting a signal on said telephone line representing the collection of money from said money box; and means for storing said cumulative amount of money as an amount of money collected and for storing a time of collection of said collected amount when said signal representing collection of money from said money box is detected.

2. A system as in claim 1, wherein the signals generated by said pay telephone when money is deposited therein are simultaneous pairs of tones having respective tone frequencies, and said means for detecting signals representing deposited money and said means for detecting signals representing a collection or return of said deposited money are part of a telephone line monitoring circuit, which comprises:

means for monitoring said telephone line and for detecting a collect or a return signal when a collect or return signal is sent from said central office to said pay telephone;

means for monitoring said telephone line and for providing at one output thereof an indication of the presence of a detected tone pair on said line and for providing at another output thereof, signals representing specific frequencies of the tone pair which is detected;

means for monitoring said telephone line and for providing a signal representing the instantaneous frequency of any signals appearing on said line; and means for monitoring said telephone line and for providing an off-hook detection signal.

3. A system as in claim 2, wherein said means for indicating the presence of said simultaneous pairs of tones is a tone frequency detector providing one output indicating the detection of a simultaneous tone pair and another multi-bit output representing the respective tone frequencies of the detected tone pair.

4. A system as in claim 2, wherein said means for determining the amount of money which is deposited and means for storing and augmenting the cumulative amount of money in the collection box are formed by a first processor which communicates with said line monitoring circuit.

5. A system as in claim 4, further comprising a second processor for communicating with and receiving data from said first processor.

6. A system as in claim 5, wherein said second processor receives data from said first processor when the second processor starts after being inactive and said first processor receives data from the second processor when the first processor restarts after being inactive.

7. A system as in claim 5, wherein said second processor polls and receives data from a plurality of first processors.

8. A system as in claim 2, further comprising means for detecting the presence of dial tone on said line.

9. A system as in claim 2, wherein said means for providing a signal representing the instantaneous frequency of signals appearing on said line includes a zero crossing detector.

10. A system as in claim 2, further comprising means responsive to signals generated by said telephone line monitoring circuit for indicating certain fault conditions.

11. A system as in claim 1, wherein said means for determining a deposited amount of money includes means for detecting a stuck coin and for setting a deposited amount of money to a local rate value when a stuck coin condition is recognized.

12. A system as in claim 1, wherein said means for determining a deposited amount of money is capable of recognizing a single signal representing a nickel-equivalent unit by itself and upon such recognition sets said deposited amount of money to zero.

13. A system as in claim 1, further comprising means for detecting an off-hook signal and means responsive to the presence of a detected off-hook signal for providing data representing how long said pay telephone is in use.

14. A system as in claim 1, further comprising means for detecting an off-hook signal and means responsive to the absence of a detected off-hook signal for providing data representing how long said pay telephone is in an idle condition.

15. A system as in claim 1, wherein said means for detecting a collect or return condition detects signals on said line sent from said central office to said pay telephone to instruct a return or a collection of said deposited money.

16. A system as in claim 15, further comprising means for determining the number of collect or return signals sent by said central office to said pay telephone to effect a collect or return operation.

17. A system as in claim 16, wherein said means for determining the number of signals sent by said central office to said pay telephone to effect a collect or return operation maintains a running average of said number over several collect or return operations.

18. A system as in claim 1, further comprising means for storing prior collected amounts of money and the time of collection of money from said money box for a plurality of prior money collections from said box.

19. A system as in claim 1, further comprising means for determining from said cumulative amount of money whether a collection of money from said money box is required.

20. A system as in claim 1, further comprising means for storing the number of times said money box has been collected since a predetermined time.

21. A system as in claim 1, further comprising means for preventing said means for storing said cumulative amount of money as a collected amount of money from operating for a predetermined period of time after a said signal indicating collection of money from said collection box has been detected.

22. A system as in claim 1, wherein the signals generated by said pay telephone when money is deposited therein are simultaneous pairs of tones having respective tone frequencies, and said means for detecting signals when money is deposited comprises a tone frequency detector providing one output indicating the presence of a detected tone pair and another multi-bit output representing the specific frequencies of the detected tone pair.

23. A system as in claim 22, wherein said tone frequency detector is a DTMF receiver capable of detecting dialing tone pairs, said DTMF receiver being operated with a crystal frequency greater than 3.58 MHz.

24. A system as in claim 23, wherein said crystal frequency is 6.513646 MHz.

25. A system as in claim 1, further comprising means for determining the cumulative amount of money collected from said phone since a predetermined time.

26. A system as in claim 1, further comprising means for determining a money box level value from said cumulative amount of money.

27. A system as in claim 26, further comprising means for determining a percentage of full box value from said cumulative amount of money.

28. A system as in claim 27, further comprising means for determining a projected money box level for a future predetermined time period.

29. A system as in claim 28, further comprising means for determining if said projected money box level exceeds a predetermined value and for issuing a warning if it does.

30. A system as in claim 1, wherein said signals generated by said pay telephone when money is deposited therein, are signals of at least one predetermined frequency and said means for detecting signals when money is deposited detects said signals of at least one predetermined frequency.

31. A system as in claim 1, wherein the signals generated by said pay telephone when money is deposited therein are signal bursts of at least one predetermined frequency with each of said signal bursts representing a nickel-equivalent unit, and wherein said means for determining the amount of money which is deposited includes means for determining said deposited amount of money only when said signals of at least one predetermined frequency have predetermined signal characteristics.

32. A system as in claim 31, wherein said signals of at least one predetermined frequency are simultaneous pairs of tone having respective tone frequencies.

33. A system as in claim 31, wherein said predetermined signal characteristics include the signal of at least one predetermined frequency being present for a predetermined period of time and, if there are signal dropouts, that such dropouts are for less than a predetermined gap time, and that a gap of at least a predetermined duration exists between bursts of said signal of at least one predetermined frequency.

34. A system as in claim 33, wherein said signals of at least one predetermined frequency are simultaneous pairs of tones having respective tone frequencies.

* * * * *